(12) United States Patent
Rayner

(10) Patent No.: US 10,005,611 B2
(45) Date of Patent: Jun. 26, 2018

(54) PROTECTIVE CASE FOR ELECTRONIC DEVICE

(71) Applicant: TreeFrog Developments, Inc., Fort Collins, CO (US)

(72) Inventor: Gary A. Rayner, Henderson, NV (US)

(73) Assignee: TreeFrog Developments, Inc., Fort Collins, CO (US)

( * ) Notice: Subject to any disclaimer, the term of this patent is extended or adjusted under 35 U.S.C. 154(b) by 145 days.

(21) Appl. No.: 15/076,800

(22) Filed: Mar. 22, 2016

(65) Prior Publication Data

US 2016/0198824 A1  Jul. 14, 2016

Related U.S. Application Data

(63) Continuation of application No. 13/907,610, filed on May 31, 2013, now Pat. No. 9,469,469.

(Continued)

(51) Int. Cl.
*G03B 17/08* (2006.01)
*B65D 85/30* (2006.01)
(Continued)

(52) U.S. Cl.
CPC .............. *B65D 85/30* (2013.01); *A45C 11/00* (2013.01); *A45F 5/00* (2013.01); *G06F 1/1613* (2013.01);
(Continued)

(58) Field of Classification Search
CPC ...................................................... H05K 5/06
(Continued)

(56) References Cited

U.S. PATENT DOCUMENTS

| 2,392,787 A | 1/1946 | Edmond |
| 2,851,670 A | 9/1958 | Senior |

(Continued)

FOREIGN PATENT DOCUMENTS

| AU | 2012271660 | 12/2012 |
| DE | 29612454 U1 | 9/1996 |

(Continued)

OTHER PUBLICATIONS

BodyGloveMobile—Apple iPhone 4 & 4S Zero 360 Case-Clear-Flat Back (no clip) [Retrieved from http://bodyglovemobile.com/product/apple-iphone-4-amp-4s-zero-360deg-case- -clear-flat-back-no-clip,338,63.htm. Dated Apr. 9, 2012].

(Continued)

*Primary Examiner* — Antoinette Spinks

(57) ABSTRACT

A protective case for an electronic device includes a top member, a bottom member, and two gaskets. The bottom member has a back wall and side walls that define a cavity and include a tapered channel. The top member has clasping members that extend from the top member to engage the tapered channel to removably attach the top member to the bottom member. The top member has an opening that frames the display of the installed electronic device. A first gasket is proximate the perimeter of the top member to form a first seal between the top member and the bottom member when the top member is attached to the bottom member. A second gasket is proximate the opening of the top member to form a second seal between the top member and the front surface of the electronic device when the top member is attached to the bottom member.

18 Claims, 116 Drawing Sheets

Related U.S. Application Data

(60) Provisional application No. 61/790,640, filed on Mar. 15, 2013, provisional application No. 61/749,870, filed on Jan. 7, 2013, provisional application No. 61/723,317, filed on Nov. 6, 2012, provisional application No. 61/715,830, filed on Oct. 18, 2012, provisional application No. 61/711,737, filed on Oct. 9, 2012, provisional application No. 61/699,239, filed on Sep. 10, 2012, provisional application No. 61/654,785, filed on Jun. 1, 2012.

(51) Int. Cl.
*A45F 5/00* (2006.01)
*G06F 1/16* (2006.01)
*H04M 1/18* (2006.01)
*H04N 5/225* (2006.01)
*A45C 11/00* (2006.01)

(52) U.S. Cl.
CPC .......... *G06F 1/1626* (2013.01); *G06F 1/1656* (2013.01); *H04M 1/185* (2013.01); *H04N 5/2252* (2013.01); *A45C 2011/002* (2013.01); *A45C 2011/003* (2013.01); *G03B 17/08* (2013.01); *G06F 2200/1633* (2013.01)

(58) Field of Classification Search
USPC .................................................. 348/370, 373
See application file for complete search history.

(56) References Cited

U.S. PATENT DOCUMENTS

| | | | |
|---|---|---|---|
| 3,023,885 A | 3/1962 | Kindseth |
| 3,143,384 A | 8/1964 | Senior |
| 3,482,895 A | 12/1969 | Becklin |
| 3,665,991 A | 5/1972 | Gillemot et al. |
| 3,689,866 A | 9/1972 | William |
| 3,832,725 A | 8/1974 | Cook |
| 3,922,477 A | 11/1975 | Glowacz |
| 4,097,878 A | 6/1978 | Cramer |
| 4,298,204 A | 11/1981 | Jinkins |
| 4,312,580 A | 1/1982 | Schwomma et al. |
| 4,375,323 A | 3/1983 | Inagaki et al. |
| 4,383,743 A | 5/1983 | Nozawa et al. |
| 4,418,830 A | 12/1983 | Dzung et al. |
| 4,420,078 A | 12/1983 | Belt et al. |
| 4,546,874 A | 10/1985 | Kirchhan |
| 4,584,718 A | 4/1986 | Fuller |
| 4,649,453 A | 3/1987 | Iwasawa |
| 4,658,956 A | 4/1987 | Takeda et al. |
| 4,686,332 A | 8/1987 | Greanias et al. |
| 4,703,161 A | 10/1987 | McLean |
| 4,712,657 A | 12/1987 | Myers et al. |
| 4,733,776 A | 3/1988 | Ward |
| 4,762,227 A | 8/1988 | Patterson |
| 4,803,504 A | 2/1989 | Maeno et al. |
| 4,836,256 A | 6/1989 | Meliconi |
| 4,942,514 A | 7/1990 | Miyagaki et al. |
| 4,963,902 A | 10/1990 | Fukahori |
| 4,977,483 A | 12/1990 | Perretta |
| 4,994,829 A | 2/1991 | Tsukamoto |
| 5,002,184 A | 3/1991 | Lloyd |
| 5,025,921 A | 6/1991 | Gasparaitis et al. |
| 5,087,934 A | 2/1992 | Johnson |
| 5,092,458 A | 3/1992 | Yokoyama |
| 5,092,459 A | 3/1992 | Uljanic et al. |
| 5,175,873 A | 12/1992 | Goldenberg et al. |
| 5,177,515 A | 1/1993 | Tsukamoto |
| 5,219,067 A | 6/1993 | Lima et al. |
| 5,231,381 A | 7/1993 | Duwaer |
| 5,233,502 A | 8/1993 | Beatty et al. |
| 5,239,323 A | 8/1993 | Johnson |
| 5,239,324 A | 8/1993 | Ohmura et al. |
| 5,285,894 A | 2/1994 | Kamata et al. |
| 5,294,988 A | 3/1994 | Wakabayashi et al. |
| 5,305,032 A | 4/1994 | Arai |
| 5,336,896 A | 8/1994 | Katz |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| 5,505,328 A | 4/1996 | Stribiak |
| 5,508,479 A | 4/1996 | Schooley |
| 5,518,802 A | 5/1996 | Colvin et al. |
| 5,541,813 A | 7/1996 | Satoh et al. |
| RE35,318 E | 8/1996 | Warman |
| 5,548,306 A | 8/1996 | Yates et al. |
| 5,583,742 A | 12/1996 | Noda et al. |
| 5,584,054 A | 12/1996 | Tyneski et al. |
| 5,586,002 A | 12/1996 | Notarianni |
| 5,590,760 A | 1/1997 | Astarb |
| 5,610,655 A | 3/1997 | Wakabayashi et al. |
| 5,613,237 A | 3/1997 | Bent et al. |
| 5,636,101 A | 6/1997 | Bonsall et al. |
| 5,660,566 A | 8/1997 | Ohsumi |
| 5,669,004 A | 9/1997 | Sellers |
| 5,681,122 A | 10/1997 | Burke |
| 5,707,757 A | 1/1998 | Lee |
| 5,713,048 A | 1/1998 | Hayakawa |
| 5,713,466 A | 2/1998 | Tajima |
| 5,845,803 A | 12/1998 | Saito et al. |
| 5,850,915 A | 12/1998 | Tajima |
| 5,907,721 A | 5/1999 | Schelling et al. |
| 5,946,501 A | 8/1999 | Hayakawa |
| 5,950,816 A | 9/1999 | Reid |
| 5,956,291 A | 9/1999 | Nehemiah et al. |
| 5,982,520 A | 11/1999 | Weiser et al. |
| 5,990,874 A | 11/1999 | Tsumura et al. |
| 6,031,524 A | 2/2000 | Kunert |
| 6,041,924 A | 3/2000 | Tajima |
| 6,068,119 A | 5/2000 | Derr et al. |
| 6,092,707 A | 7/2000 | Bowes |
| 6,094,785 A | 8/2000 | Montgomery et al. |
| 6,116,566 A * | 9/2000 | Brown ................. H05K 7/1431 248/694 |
| 6,128,441 A | 10/2000 | Kamata et al. |
| 6,132,367 A | 10/2000 | Adair |
| 6,201,867 B1 | 3/2001 | Koike |
| 6,304,459 B1 | 10/2001 | Toyosato et al. |
| 6,311,017 B1 | 10/2001 | Mori |
| 6,313,982 B1 | 11/2001 | Hino |
| 6,317,313 B1 | 11/2001 | Mosgrove et al. |
| 6,349,824 B1 | 2/2002 | Yamada |
| 6,388,877 B1 | 5/2002 | Canova et al. |
| 6,396,769 B1 | 5/2002 | Polany |
| 6,398,585 B1 | 6/2002 | Fukuda |
| 6,415,138 B2 | 7/2002 | Sirola et al. |
| 6,445,577 B1 | 9/2002 | Madsen et al. |
| 6,447,140 B1 | 9/2002 | Lu |
| 6,456,487 B1 | 9/2002 | Hetterick |
| 6,471,056 B1 | 10/2002 | Tzeng |
| 6,519,141 B2 | 2/2003 | Tseng et al. |
| 6,525,928 B1 | 2/2003 | Madsen et al. |
| 6,532,152 B1 | 3/2003 | White et al. |
| 6,536,589 B2 | 3/2003 | Chang |
| 6,571,056 B2 | 5/2003 | Shimamura et al. |
| 6,574,434 B2 | 6/2003 | Matsuoto et al. |
| 6,594,472 B1 | 7/2003 | Curtis et al. |
| 6,595,608 B1 | 7/2003 | Minelli et al. |
| 6,597,865 B1 | 7/2003 | Negishi et al. |
| 6,614,423 B1 | 9/2003 | Wong et al. |
| 6,614,722 B2 | 9/2003 | Polany et al. |
| 6,616,111 B1 | 9/2003 | White |
| 6,617,973 B1 | 9/2003 | Osterman |
| 6,625,394 B2 | 9/2003 | Smith et al. |
| 6,634,494 B1 | 10/2003 | Derr et al. |
| 6,636,697 B2 | 10/2003 | Smith et al. |
| 6,646,864 B2 | 11/2003 | Richardson |
| 6,659,274 B2 | 12/2003 | Enners |
| 6,665,174 B1 | 12/2003 | Derr et al. |

(56) References Cited

U.S. PATENT DOCUMENTS

| | | |
|---|---|---|
| 6,667,738 B2 | 12/2003 | Murphy |
| 6,669,017 B2 | 12/2003 | Linihan |
| 6,698,608 B2 | 3/2004 | Parker et al. |
| 6,721,651 B1 | 4/2004 | Minelli |
| 6,751,552 B1 | 6/2004 | Minelli |
| 6,760,570 B1 | 7/2004 | Higdon |
| 6,778,388 B1 | 8/2004 | Minelli |
| 6,785,566 B1 | 8/2004 | Irizarry |
| 6,819,866 B2 | 11/2004 | Silva |
| 6,822,161 B2 | 11/2004 | Komatsu et al. |
| 6,822,640 B2 | 11/2004 | Derocher |
| 6,844,845 B1 | 1/2005 | Whiteside et al. |
| 6,848,930 B2 | 2/2005 | Fukuda |
| 6,913,201 B1 | 7/2005 | Wagner et al. |
| 6,914,774 B1 | 7/2005 | Albertini et al. |
| 6,953,126 B2 | 10/2005 | Parker et al. |
| 6,954,405 B2 | 10/2005 | Polany et al. |
| 6,955,293 B1 | 10/2005 | Katsanevas |
| 6,971,517 B2 | 12/2005 | Chen |
| 6,975,888 B2 | 12/2005 | Buesseler et al. |
| 6,980,777 B2 | 12/2005 | Shepherd et al. |
| 6,983,130 B2 | 1/2006 | Chien et al. |
| 6,987,527 B2 | 1/2006 | Kossin |
| 6,992,659 B2 | 1/2006 | Gettemy |
| 6,995,976 B2 | 2/2006 | Richardson |
| 7,025,274 B2 | 4/2006 | Solomon et al. |
| 7,033,215 B2 | 4/2006 | Kobayashi |
| 7,046,230 B2 | 5/2006 | Zadesky et al. |
| 7,050,712 B2 | 5/2006 | Shimamura |
| 7,050,841 B1 | 5/2006 | Onda |
| 7,054,441 B2 | 5/2006 | Pletikosa |
| 7,061,762 B2 | 6/2006 | Canova et al. |
| 7,069,063 B2 | 6/2006 | Halkosaari et al. |
| 7,072,467 B2 | 7/2006 | Ono |
| 7,082,264 B2 | 7/2006 | Watanabe et al. |
| 7,085,542 B2 | 8/2006 | Dietrich et al. |
| 7,106,959 B2 | 9/2006 | Sato |
| 7,146,701 B2 | 12/2006 | Mahoney et al. |
| 7,158,376 B2 | 1/2007 | Richardson et al. |
| 7,180,735 B2 | 2/2007 | Thomas et al. |
| 7,194,086 B2 | 3/2007 | Pletikosa |
| 7,194,202 B2 | 3/2007 | Funahashi et al. |
| 7,194,291 B2 | 3/2007 | Peng |
| 7,230,823 B2 | 6/2007 | Richardson et al. |
| 7,236,588 B2 | 6/2007 | Gartrell |
| 7,255,228 B2 | 8/2007 | Kim |
| 7,263,032 B2 | 8/2007 | Polany et al. |
| 7,312,984 B2 | 12/2007 | Richardson et al. |
| 7,327,841 B2 | 2/2008 | Schreiber et al. |
| 7,341,144 B2 | 3/2008 | Tajiri et al. |
| 7,343,184 B2 | 3/2008 | Rostami |
| 7,352,961 B2 | 4/2008 | Watanabe et al. |
| 7,362,570 B2 | 4/2008 | Su |
| 7,365,281 B2 | 4/2008 | Yamaguchi et al. |
| 7,366,555 B2 | 4/2008 | Jokinen et al. |
| 7,369,881 B2 | 5/2008 | Tsujimoto |
| 7,389,869 B2 | 6/2008 | Mason |
| 7,400,917 B2 | 7/2008 | Wood et al. |
| 7,409,148 B2 | 8/2008 | Takahashi et al. |
| 7,418,278 B2 | 8/2008 | Eriksson et al. |
| 7,428,427 B2 | 9/2008 | Brunstrom et al. |
| 7,436,653 B2 | 10/2008 | Yang et al. |
| 7,448,908 B2 | 11/2008 | Iwahori et al. |
| 7,464,813 B2 | 12/2008 | Carnevali |
| 7,464,814 B2 | 12/2008 | Carnevali |
| 7,495,659 B2 | 2/2009 | Marriott et al. |
| 7,495,895 B2 | 2/2009 | Carnevali |
| 7,499,040 B2 | 3/2009 | Zadesky et al. |
| 7,502,550 B2 | 3/2009 | Ariga |
| 7,511,956 B2 | 3/2009 | Tomioka et al. |
| 7,525,792 B2 | 4/2009 | Yokote |
| 7,535,799 B2 | 5/2009 | Polany et al. |
| 7,555,325 B2 | 6/2009 | Goros |
| 7,558,594 B2 | 7/2009 | Wilson |
| 7,594,576 B2 | 9/2009 | Chen et al. |
| 7,609,512 B2 | 10/2009 | Richardson et al. |
| 7,613,386 B2 | 11/2009 | Shimamura |
| 7,623,898 B2 | 11/2009 | Holmberg |
| 7,630,746 B2 | 12/2009 | Holmberg |
| 7,653,292 B2 | 1/2010 | Yamaguchi et al. |
| 7,663,878 B2 | 2/2010 | Swan et al. |
| 7,663,879 B2 | 2/2010 | Richardson et al. |
| 7,679,674 B2 | 3/2010 | Nishizawa |
| 7,688,580 B2 | 3/2010 | Richardson et al. |
| 7,697,269 B2 | 4/2010 | Yang et al. |
| 7,733,642 B2 | 6/2010 | Liou et al. |
| 7,755,975 B2 | 7/2010 | Pettersen et al. |
| 7,772,507 B2 | 8/2010 | Orr et al. |
| 7,775,354 B2 | 8/2010 | Latchford et al. |
| 7,782,610 B2 | 8/2010 | Diebel et al. |
| 7,787,756 B2 | 8/2010 | Funahashi et al. |
| 7,789,228 B2 | 9/2010 | Zenzai |
| 7,789,696 B2 | 9/2010 | Umei et al. |
| 7,801,425 B2 | 9/2010 | Fantone et al. |
| 7,850,032 B2 | 12/2010 | Carnevali et al. |
| 7,854,434 B2 | 12/2010 | Heiman et al. |
| 7,889,489 B2 | 2/2011 | Richardson et al. |
| 7,907,394 B2 | 3/2011 | Richardson et al. |
| 7,926,818 B2 | 4/2011 | Isono |
| 7,933,122 B2 | 4/2011 | Richardson et al. |
| 7,936,566 B2 | 5/2011 | Shigyo et al. |
| 7,941,196 B2 | 5/2011 | Kawasaki et al. |
| 7,944,697 B2 | 5/2011 | Hata et al. |
| 7,975,870 B2 | 7/2011 | Laule et al. |
| 7,978,092 B2 | 7/2011 | Osaka |
| 7,993,071 B2 | 8/2011 | Clawson |
| 8,004,835 B2 | 8/2011 | Conti et al. |
| 8,024,015 B2 | 9/2011 | Araki et al. |
| 8,031,472 B2 | 10/2011 | Bicket et al. |
| 8,032,194 B2 | 10/2011 | Liu et al. |
| 8,053,668 B2 | 11/2011 | Lai et al. |
| 8,068,331 B2 | 11/2011 | Sauers et al. |
| 8,089,757 B2 | 1/2012 | Chen et al. |
| 8,101,859 B2 | 1/2012 | Zadesky |
| 8,112,130 B2 | 2/2012 | Mittleman et al. |
| 8,138,434 B2 | 3/2012 | Tang et al. |
| 8,160,657 B2 | 4/2012 | Perriello et al. |
| 8,164,899 B2 | 4/2012 | Yamaguchi et al. |
| 8,167,126 B2 | 5/2012 | Stiehl |
| 8,191,706 B1 | 6/2012 | Liu |
| 8,204,561 B2 | 6/2012 | Mongan et al. |
| 8,223,997 B2 | 7/2012 | Wilson, II et al. |
| 8,245,842 B2 | 8/2012 | Bau |
| 8,251,210 B2 | 8/2012 | Schmidt et al. |
| 8,265,264 B2 | 9/2012 | Yamaguchi et al. |
| 8,269,104 B2 | 9/2012 | Choraku et al. |
| 8,286,789 B2 | 10/2012 | Wilson et al. |
| 8,295,043 B2 | 10/2012 | Tai et al. |
| 8,311,595 B2 | 11/2012 | Takatsuka et al. |
| 8,342,325 B2 | 1/2013 | Rayner |
| 8,373,980 B2 | 2/2013 | Reber |
| 8,393,466 B2 | 3/2013 | Rayner |
| 8,430,240 B2 | 4/2013 | Kim |
| 8,454,101 B2 | 6/2013 | Kuo |
| 8,520,373 B2 | 8/2013 | Liu |
| 8,526,180 B2 | 9/2013 | Rayner |
| 8,531,824 B2 | 9/2013 | Rayner |
| 8,531,834 B2 | 9/2013 | Rayner |
| 8,548,541 B2 | 10/2013 | Rayner |
| 8,564,950 B2 | 10/2013 | Rayner |
| 8,570,737 B2 | 10/2013 | Rayner |
| 8,584,847 B2 | 11/2013 | Tages et al. |
| 8,599,547 B2 | 12/2013 | Richardson et al. |
| 8,708,142 B2 | 4/2014 | Rayner |
| 8,798,675 B2 | 8/2014 | Salmon et al. |
| 8,833,379 B1 | 9/2014 | Kaplan |
| 8,995,126 B2 | 3/2015 | Rayner |
| 9,276,626 B2 | 3/2016 | Rayner |
| 2001/0040109 A1 | 11/2001 | Yaski et al. |
| 2002/0003584 A1 | 1/2002 | Kossin |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |

(56) References Cited

U.S. PATENT DOCUMENTS

| | | |
|---|---|---|
| 2002/0085709 A1 | 7/2002 | Hsu |
| 2002/0090212 A1 | 7/2002 | Shimamura et al. |
| 2002/0092742 A1 | 7/2002 | Rohmer et al. |
| 2002/0122353 A1 | 9/2002 | Polany et al. |
| 2002/0136557 A1 | 9/2002 | Shimamura |
| 2002/0137475 A1 | 9/2002 | Shou et al. |
| 2002/0175096 A1 | 11/2002 | Linihan |
| 2002/0175901 A1 | 11/2002 | Gettemy |
| 2002/0193136 A1 | 12/2002 | Halkosaari et al. |
| 2002/0195910 A1 | 12/2002 | Hus et al. |
| 2003/0080947 A1 | 5/2003 | Genest et al. |
| 2003/0095374 A1 | 5/2003 | Richardson |
| 2003/0111366 A1 | 6/2003 | Enners |
| 2003/0118332 A1 | 6/2003 | Smith et al. |
| 2003/0118334 A1 | 6/2003 | Smith et al. |
| 2003/0128397 A1 | 7/2003 | Smith et al. |
| 2003/0223577 A1 | 12/2003 | Ono |
| 2004/0014506 A1 | 1/2004 | Kemppinen |
| 2004/0076415 A1 | 4/2004 | Silva |
| 2004/0089570 A1 | 5/2004 | Chien et al. |
| 2004/0120219 A1 | 6/2004 | Polany et al. |
| 2004/0121226 A1 | 6/2004 | Kaelin et al. |
| 2004/0188120 A1 | 9/2004 | Komatsu et al. |
| 2004/0195783 A1 | 10/2004 | Akagi et al. |
| 2004/0203502 A1 | 10/2004 | Dietrich et al. |
| 2004/0226836 A1 | 11/2004 | Schreiber et al. |
| 2005/0052425 A1 | 3/2005 | Zadesky et al. |
| 2005/0094024 A1 | 5/2005 | Sato |
| 2005/0110768 A1 | 5/2005 | Marriott et al. |
| 2005/0115852 A1 | 6/2005 | Funahashi et al. |
| 2005/0123161 A1 | 6/2005 | Polany et al. |
| 2005/0139498 A1 | 6/2005 | Goros |
| 2005/0167304 A1 | 8/2005 | Shimamura |
| 2005/0174727 A1 | 8/2005 | Thomas et al. |
| 2005/0181843 A1 | 8/2005 | Tsujimoto |
| 2005/0224508 A1 | 10/2005 | Tajiri et al. |
| 2005/0247584 A1 | 11/2005 | Lu |
| 2005/0279655 A1 | 12/2005 | Chen |
| 2005/0279661 A1 | 12/2005 | Hodges |
| 2006/0003709 A1 | 1/2006 | Wood |
| 2006/0008261 A1 | 1/2006 | Watanabe et al. |
| 2006/0110146 A1 | 5/2006 | Ariga |
| 2006/0169608 A1 | 8/2006 | Carnevali |
| 2006/0255493 A1 | 11/2006 | Fouladpour |
| 2006/0274493 A1 | 12/2006 | Richardson et al. |
| 2007/0040931 A1 | 2/2007 | Nishizawa |
| 2007/0071423 A1 | 3/2007 | Fantone et al. |
| 2007/0074473 A1 | 4/2007 | Yamaguchi et al. |
| 2007/0086273 A1 | 4/2007 | Polany et al. |
| 2007/0109730 A1 | 5/2007 | Shigyo et al. |
| 2007/0110416 A1 | 5/2007 | Yamaguchi et al. |
| 2007/0115387 A1 | 5/2007 | Ho |
| 2007/0138920 A1 | 6/2007 | Austin et al. |
| 2007/0139873 A1 | 6/2007 | Thomas et al. |
| 2007/0146985 A1 | 6/2007 | Mick et al. |
| 2007/0158220 A1 | 7/2007 | Cleereman et al. |
| 2007/0171603 A1 | 7/2007 | Yang et al. |
| 2007/0184781 A1 | 8/2007 | Huskinson |
| 2007/0215663 A1 | 9/2007 | Chongson et al. |
| 2007/0241012 A1 | 10/2007 | Latchford et al. |
| 2007/0261976 A1 | 11/2007 | Anderson |
| 2007/0261978 A1 | 11/2007 | Sanderson |
| 2007/0280053 A1 | 12/2007 | Polany et al. |
| 2007/0297149 A1 | 12/2007 | Richardson et al. |
| 2008/0055258 A1 | 3/2008 | Sauers |
| 2008/0081679 A1 | 4/2008 | Kawasaki et al. |
| 2008/0157485 A1 | 7/2008 | Isono |
| 2008/0164267 A1 | 7/2008 | Huber |
| 2009/0005136 A1 | 1/2009 | Hutzel et al. |
| 2009/0009945 A1 | 1/2009 | Johnson et al. |
| 2009/0017884 A1 | 1/2009 | Rotschild |
| 2009/0028535 A1 | 1/2009 | Funahashi et al. |
| 2009/0032420 A1 | 2/2009 | Zenzai |
| 2009/0087655 A1 | 4/2009 | Yamada et al. |
| 2009/0090532 A1 | 4/2009 | Lai et al. |
| 2009/0109635 A1 | 4/2009 | Chen et al. |
| 2009/0117957 A1 | 5/2009 | Araki et al. |
| 2009/0167545 A1 | 7/2009 | Osaka |
| 2009/0175020 A1 | 7/2009 | Zadesky |
| 2009/0211775 A1 | 8/2009 | Yamaguchi et al. |
| 2009/0215412 A1 | 8/2009 | Liu et al. |
| 2009/0260844 A1 | 10/2009 | Tseng |
| 2010/0006314 A1 | 1/2010 | Wilson, II et al. |
| 2010/0020393 A1 | 1/2010 | Mazzio |
| 2010/0044198 A1 | 2/2010 | Tang et al. |
| 2010/0053355 A1 | 3/2010 | Iwase et al. |
| 2010/0085691 A1 | 4/2010 | Yeh et al. |
| 2010/0093412 A1 | 4/2010 | Serra et al. |
| 2010/0104814 A1 | 4/2010 | Richardson et al. |
| 2010/0144194 A1 | 6/2010 | Umei et al. |
| 2010/0147737 A1 | 6/2010 | Richardson et al. |
| 2010/0181108 A1 | 7/2010 | Hata et al. |
| 2010/0200456 A1 | 8/2010 | Parkinson |
| 2010/0203931 A1 | 8/2010 | Hynecek et al. |
| 2010/0206601 A1 | 8/2010 | Choraku et al. |
| 2010/0238119 A1 | 9/2010 | Dubrovsky et al. |
| 2010/0251827 A1 | 10/2010 | Bourbeau et al. |
| 2010/0311475 A1 | 12/2010 | Takatsuka et al. |
| 2010/0313485 A1 | 12/2010 | Kuo |
| 2011/0002106 A1 | 1/2011 | Bentley et al. |
| 2011/0017620 A1 | 1/2011 | Latchford et al. |
| 2011/0024315 A1 | 2/2011 | Kim |
| 2011/0073608 A1 | 3/2011 | Richardson et al. |
| 2011/0157055 A1 | 6/2011 | Tilley et al. |
| 2011/0157800 A1 | 6/2011 | Richardson et al. |
| 2011/0228460 A1 | 9/2011 | Kim et al. |
| 2011/0300731 A1 | 12/2011 | Nakamura |
| 2012/0018325 A1 | 1/2012 | Kim |
| 2012/0019920 A1 | 1/2012 | Mongan et al. |
| 2012/0031914 A1 | 2/2012 | Liu |
| 2012/0043235 A1 | 2/2012 | Klement |
| 2012/0067711 A1 | 3/2012 | Yang |
| 2012/0099261 A1 | 4/2012 | Reber |
| 2012/0099262 A1 | 4/2012 | Reber et al. |
| 2012/0099265 A1 | 4/2012 | Reber |
| 2012/0099266 A1 | 4/2012 | Reber et al. |
| 2012/0100737 A1 | 4/2012 | Frey |
| 2012/0103844 A1 | 5/2012 | Piedra et al. |
| 2012/0118773 A1 | 5/2012 | Rayner |
| 2012/0168336 A1 | 7/2012 | Schmidt et al. |
| 2012/0180852 A1 | 7/2012 | Cheng et al. |
| 2012/0211382 A1* | 8/2012 | Rayner ............... G06F 1/1626 206/320 |
| 2012/0261289 A1 | 10/2012 | Wyner et al. |
| 2012/0305422 A1 | 12/2012 | Vandiver |
| 2012/0314354 A1 | 12/2012 | Rayner |
| 2013/0027862 A1 | 1/2013 | Rayner |
| 2013/0043777 A1 | 2/2013 | Rayner |
| 2013/0077226 A1 | 3/2013 | Rayner |
| 2013/0084728 A1 | 4/2013 | Omae et al. |
| 2013/0088130 A1 | 4/2013 | Rayner |
| 2013/0088813 A1 | 4/2013 | Su et al. |
| 2013/0088828 A1 | 4/2013 | Rayner |
| 2013/0092576 A1 | 4/2013 | Rayner |
| 2013/0098788 A1 | 4/2013 | McCarville et al. |
| 2013/0156218 A1 | 6/2013 | Annacone et al. |
| 2013/0188312 A1 | 7/2013 | Rayner |
| 2013/0220841 A1 | 8/2013 | Yang |
| 2013/0242481 A1 | 9/2013 | Kim et al. |
| 2013/0334072 A1 | 12/2013 | Rayner |
| 2014/0038443 A1 | 2/2014 | Campbell et al. |
| 2014/0065847 A1 | 3/2014 | Salmon et al. |
| 2014/0099526 A1 | 4/2014 | Powell et al. |
| 2014/0187289 A1 | 7/2014 | Cataldo et al. |
| 2014/0213088 A1 | 7/2014 | Furuya et al. |
| 2014/0228074 A1 | 8/2014 | Kulkarni et al. |
| 2014/0248787 A1 | 9/2014 | Suzuki et al. |
| 2014/0262848 A1 | 9/2014 | Fatholahi et al. |
| 2014/0339012 A1 | 11/2014 | Richardson et al. |

FOREIGN PATENT DOCUMENTS

| | | |
|---|---|---|
| EP | 1018680 A2 | 7/2000 |
| EP | 1939263 A1 | 7/2008 |

(56) References Cited

FOREIGN PATENT DOCUMENTS

| | | |
|---|---|---|
| EP | 2129202 A2 | 12/2009 |
| EP | 2180773 A1 | 4/2010 |
| GB | 2482877 | 2/2012 |
| JP | H0561069 U | 8/1993 |
| JP | H0818637 A | 6/1994 |
| JP | 3060175 U | 7/1999 |
| JP | 3066786 U | 3/2000 |
| JP | 2000125916 A | 5/2000 |
| JP | 2000341383 A | 12/2000 |
| JP | 2001046132 A | 2/2001 |
| JP | 2001061530 A | 3/2001 |
| JP | 2002280757 A | 9/2002 |
| JP | 2003164316 A | 6/2003 |
| JP | 3458295 B2 | 10/2003 |
| JP | 2003304161 A | 10/2003 |
| JP | 2005129807 A | 5/2005 |
| WO | 1994000037 A1 | 1/1994 |
| WO | 1999041958 A1 | 8/1999 |
| WO | 2000051315 A1 | 8/2000 |
| WO | 2002011161 A2 | 2/2002 |
| WO | 2011039723 A1 | 4/2011 |
| WO | 2012074151 A1 | 6/2012 |
| WO | 2012051358 | 12/2012 |
| WO | 2012174175 A2 | 12/2012 |
| WO | 2013096927 A1 | 6/2013 |

OTHER PUBLICATIONS

Casemate Chrome with Mirror Screen Protector for iPhone 4/4S Case-Mate [Retrieved from http://www.case-mate.com/iPhone-4-Cases/Case-Mate-iPhone-4-4S-Chrome-with- -Mirror- Screen-Protector.asp. Dated Apr. 9, 2012].

Drafahl, Jack; Drafahl, Sue, A Supremely Compact Video Housing, Ikelite's Sony TR-5, Skin Diver Magazine New Product Series, Nov. 1990.

Drafahl, Jack; Drafahl, Sue, Aqua Video Housing for the Sony CCD-V99, Skin Diver Magazine, Dec. 1989.

Drafahl, Jack; Drafahl, Sue, Hypertech Pro-40 An U/W video housing that is tough as nails, Skin Diver Magazine, Jun. 1989.

Drafahl, Jack; Drafahl, Sue, Hypertech's Pro-9A Housing Tough as a Tank in Battle, Skin Diver Magazine, Apr. 1989.

Drafahl, Jack; Drafahl, Sue, Ikelite Video Housing for the Sony CCD-V9 Diving's First Hybrid Video Case, Skin Diver Magazine, May 1989.

Drafahl, Jack; Drafahl, Sue, Ikelite's CCD-V101 A Sony Housing That Allows Access to 25 Camera Functions, Skin Diver Magazine, Jun. 1991.

Drafahl, Jack; Drafahl, Sue, Ikelite's JVC GR-A1U Housing, Full Range Auto Focus Video from Macro to Infinity, Skin Diver Magazine, Jun. 1990.

Drafahl, Jack; Drafahl, Sue, Sea & Sea VX-1000 Digital Video Goes Underwater, Skin Diver Magazine, Mar. 1998.

Drafahl, Jack; Drafahl, Sue, Sea & Sea's CX-600, Skin Diver Magazine, Dec. 1997.

Drafahl, Jack; Drafahl, Sue, The Delux PRO-PAK6, Equinox's Answer to the Ideal Video Housing, Skin Diver Magazine, Oct. 1989.

Eaglecell, Inc.—Eaglecell Phone Accessories—iPhone 4(AT&T/Verizon)/ 4S(AT&T/Verizon/Sprint) [Retrieved from http://www.eaglecell.com/Ecommerce/general/BrowsrCategory.aspx?C . . . Dated Apr. 9, 2012].

Gadgetmac—CaseMate Phantom Case for iPhone 4/S Review [Retrieved from http://www.gadgetmac.com/reviews/case-mate-phantom-case-for-iphon . . Dated Apr. 9, 2012].

Griffin cases & covers for iPhone 4 and iPhone 4s [Retrieved from http://www.griffintechnology.com/iphone/cases. Dated Apr. 9, 2012].

Hard Candy Cases—Bubble 360 Case for the new iPAD [Retrieved from http://www.hardcandycases.com/bubble-360-case-for-new-ipad.html. Dated Apr. 9, 2012].

OtterBox Commuter Series Cases OtterBox.com [Retrieved from http://www.otterbox.com/commuter-series,default,pg.html. Dated Apr. 9, 2012].

PCT Intl. Search Report and Written Opinion for PCT Appn. No. PCT/US2013/043799, dated Sep. 5, 2013.

Sony Corporation, MPK-F40/F340 Service Manual Handycam Marine Pack Sony, Published by A/V Engineering Service Department, 1988.

Sony Corporation, MPK-TR, Operating Instructions, Handycam Marine Pack, Downloaded from www.Manualslib.com manuals search engine, 1990.

TakTik—iPhone Case [Retrieved from http://articlesdownload.com/2012/08/16taktik-premiumprotection-system . . . Dated Apr. 9, 2012].

* cited by examiner

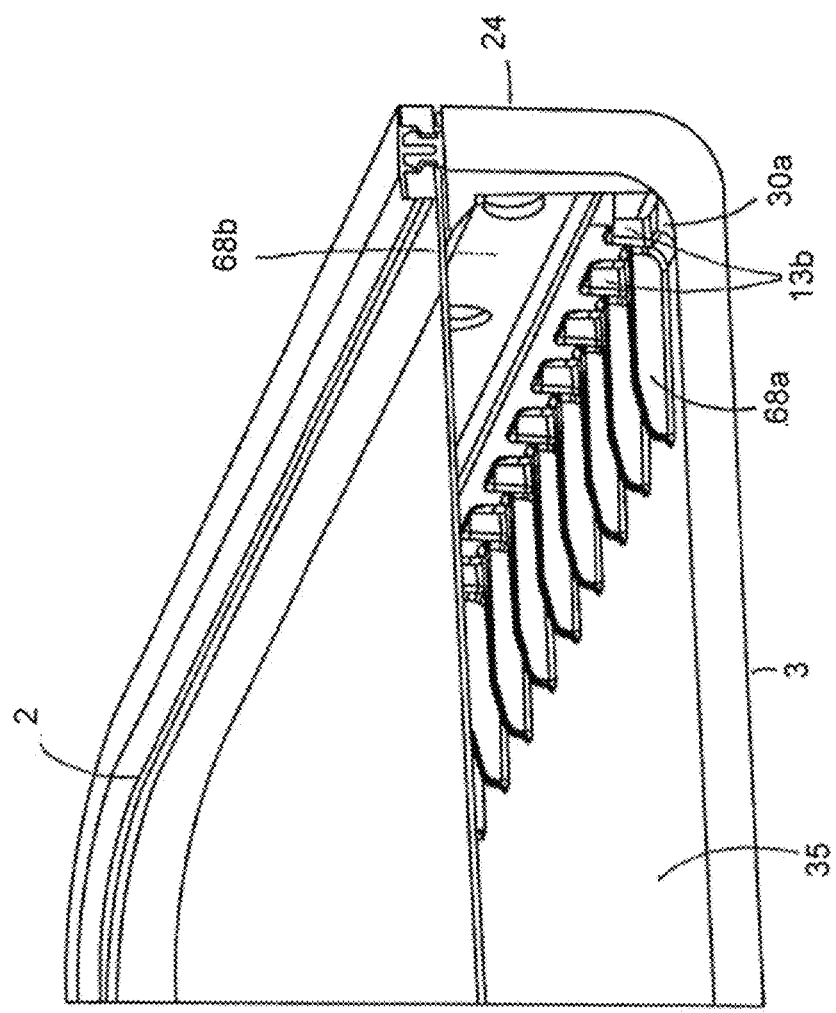

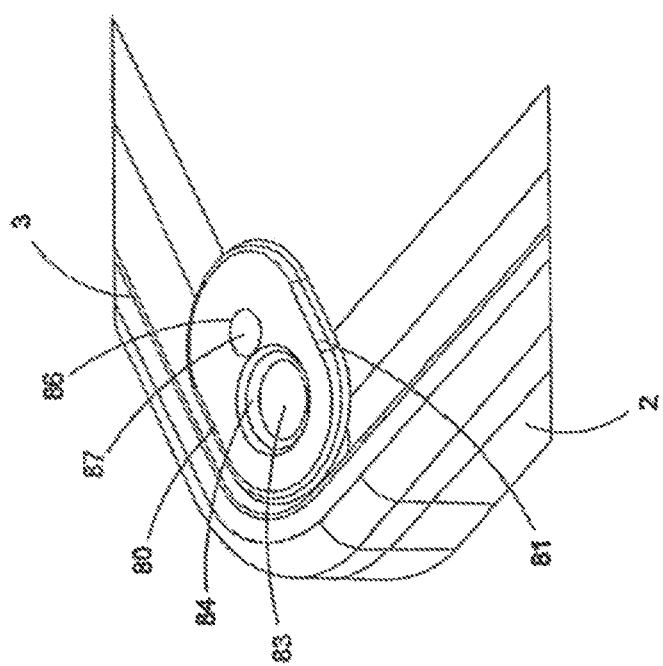

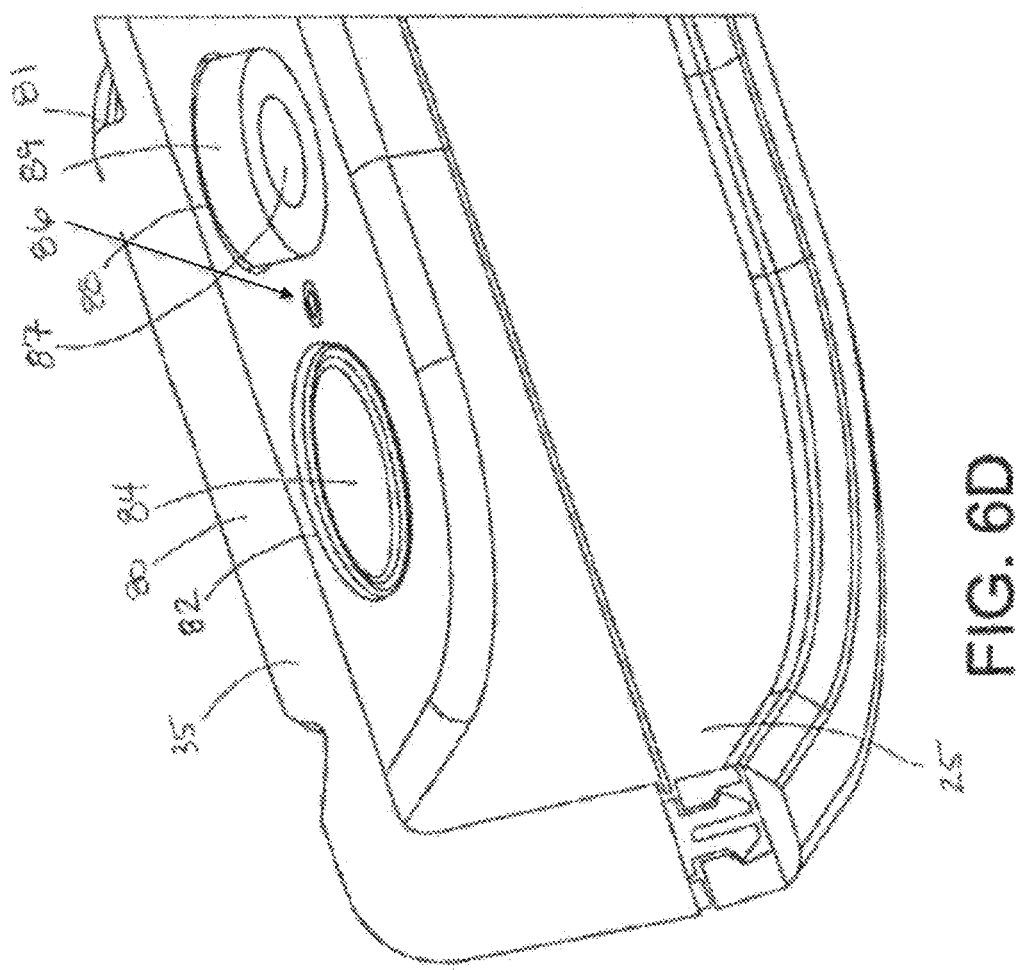

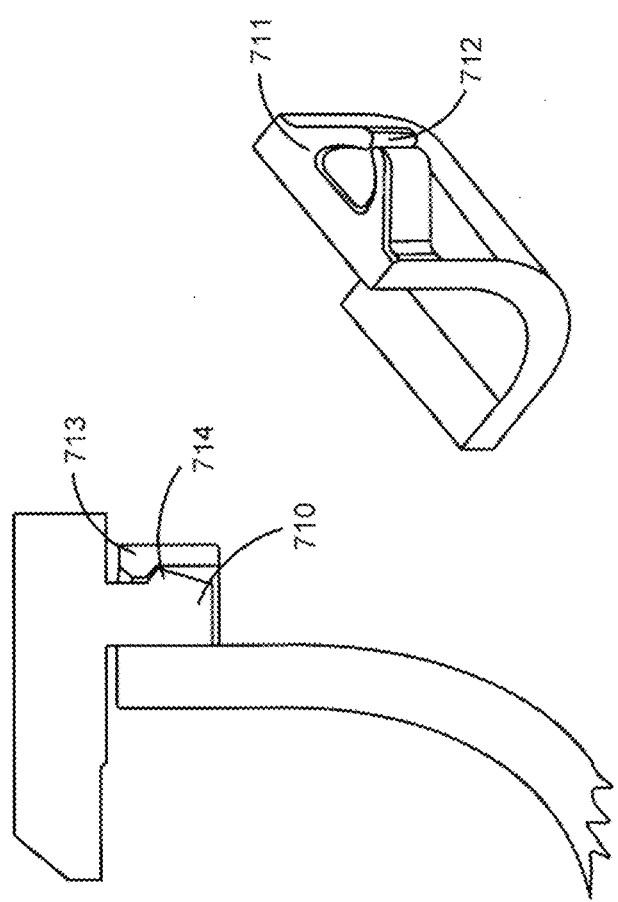

PROTECTIVE CASE FOR ELECTRONIC DEVICE

CROSS-REFERENCE TO RELATED APPLICATIONS

This application claims priority to U.S. patent application Ser. No. 13/907,610, filed May 31, 2013, which claims priority to U.S. Provisional Application No. 61/654,785, filed Jun. 1, 2012, U.S. Provisional Application No. 61/699,239, filed Sep. 10, 2012, U.S. Provisional Application No. 61/711,737, filed Oct. 9, 2012, U.S. Provisional Application No. 61/715,830, filed Oct. 18, 2012, U.S. Provisional Application No. 61/723,317, filed Nov. 6, 2012, U.S. Provisional Application No. 61/749,870, filed Jan. 7, 2013, and U.S. Provisional Application No. 61/790,640, filed Mar. 15, 2013, all of which are incorporated by reference in their entireties.

FIELD

This disclosure relates generally to a housing for protecting one or more objects, such as an electronic device, which object is in need of protection from the elements, mishandling, and/or other mistreatment. For instance, in one aspect, the disclosure relates to a housing for protecting an electronic device, for example, a tablet computer, mobile telephone, electronic reader, personal digital assistant, video recorder, camera, GPS device, and the like. In many embodiments the electronic device includes a touch screen interface and may as well include one or more other features such as a camera feature, video feature, proximity sensor, ambient light sensor, headphone port, charge port, speaker, microphone, on/off and/or volume buttons, home button control, and the like, or as indicated, one or more of the components thereof. In various instances, the electronic device has a combination camera, flash, and/or microphone feature, wherein the camera feature may include one or more of a camera lens, a microphone, and a flash lens, such as where the members of the combination are located in the same vicinity.

BACKGROUND

Rain, dirt, dust, mud, snow, and water in all of its forms can be damaging to various electronic devices. Such devices are fragile or otherwise breakable and can be damaged by mistreatment and/or other inappropriate handling, such as by dropping. It is, therefore, useful to have a housing within which such an object in need of protection may be housed so as to protect it from inclement conditions, mistreatment, and/or inappropriate handling.

Such electronic devices are well known and widely used. For instance, a mobile telephone or tablet computer are electronic devices that are convenient tools that allow people to communicate with one another while on the go and away from traditional telephone landlines or internet connections. For instance, mobile devices allow people to communicate via voice, text message, SMS, IM, and the like. Other such portable devices include computers, personal digital assistants, electronic digital readers, electronic game devices, video recorders, cameras, and the like. Various of these devices have phone, internet, and/or music playing capabilities. While these devices may be portable and handy to use, they suffer from some drawbacks. For example, they are often expensive and contain fragile electronic components that make them prone to damage due to inclement weather and/or mishandling.

Accordingly, there is a need in the art for a mechanism whereby an object, such as a portable electronic device, for instance, an electronic device having various features, such as a camera and/or video lens feature, which feature may be coupled with a microphone feature, may be protected from inclement weather and/or errant handling and/or other damage that may result from contacting a fluid, such as water, dirt, dust, mud, snow, and the like. Such protective mechanisms typically include special housings and casings designed to hold and/or encase the device so as to protect it from such damage. A problem, however, with such housings and casings is that they are often not specifically designed for enhancing or otherwise accommodating the various functionalities of the underlying electronic device or the components thereof which they are designed to encase and/or otherwise protect.

The present disclosure is directed to an apparatus and system for housing or encasing an object, such as an electronic device having one or more features, such as a camera feature, a microphone feature, a sound transmission feature, a display feature, and the like, as well as methods for using the same, in a manner that offers protection for the device from adverse environmental conditions, inclement weather, mishandling and/or damage, such as from contacting a fluid, such as water, while at the same time ensuring the optimum usability of the various features. Systems for the same are also provided.

SUMMARY

In one aspect, a protective case is provided for an electronic device having a front surface with a display on the front surface. The protective case includes a bottom member having a back wall and side walls that define a cavity. The cavity is sized for receiving at least a portion of the electronic device. The bottom member further includes a tapered channel on an interior surface of one or more of the side walls. The protective case also includes a top member having one or more clasping members positioned around a perimeter of the top member. The one or more clasping members extend from the top member to engage the tapered channel of the bottom member to removably attach the top member to the bottom member to at least partially enclose the electronic device when the electronic device is installed in the protective case. The top member has an opening that frames the display of the installed electronic device when the top member is removably attached to the bottom member. The protective case also includes a first gasket proximate the perimeter of the top member. The first gasket forms a first water resistant seal between the top member and the side walls of the bottom member when the top member is removably attached to the bottom member with the one or more clasping members. The protective case also includes a second gasket proximate the opening of the top member. The second gasket forms a second water resistant seal between the top member and the front surface of the electronic device proximate the display when the electronic device is installed in the protective case and the top member is removably attached to the bottom member.

In one aspect, a housing for encasing an object is provided. In various instances the object is an electronic device. In certain instances, the electronic device is a device having one or more functionalities, such as computing functionalities, phone functionalities, display functionalities, a camera feature(s), sound transmission features(s), and the like. In certain embodiments, the object may be an electronic device having one or more of a camera feature(s) and/or a sound transmission feature(s), wherein the electronic device is in need of protection from one or more adverse environmental conditions, inclement weather, mishandling and/or damage, such as from contacting a fluid, such as water, and/or from being dropped. The object may typically be a device, e.g., an electronic device, and the housing a casing within which the electronic device is housed. For instance, the housing may be a housing within which an electronic device, such as a tablet computer, a mobile phone, electronic reader, personal digital assistant, camera, and/or the like is to be fitted. The housing may be of any appropriate size and dimension so long as it is capable of housing the object and protecting it, for instance, from adverse environmental conditions and/or rough treatment.

As indicated, in certain embodiments, the object to be contained is an electronic device, such as a tablet computer, a mobile telephone, electronic reader, digital assistant, a computer, camera, music player, GPS device, or the like. The housing is configured for containing and protecting the electronic device. In one aspect the housing is configured for housing a device, such as an electronic device having one or more features, e.g., a camera feature, sound transmission feature, charge feature, display feature, and the like. It is to be understood that although the following description is set forth with respect to describing the shape and size of a particular housing for a particular device, e.g., a mobile computer or telephone or camera device, the shape and size of the housing and/or the object, e.g., device, to be housed can vary, for instance, as described above. Therefore, in one instance, a housing for housing a device, such as an electronic device, is provided.

The housing is configured such that the electronic device may be fitted within the housing and be protected thereby, e.g., protected from rain, dirt, dust, mud, snow, water, shock, and the like. In certain instances, the housing may include a top member and a bottom member that may be removably coupled together so as to form the housing. In certain instances, the top and bottom members are separate components capable of being reparably coupled together, such as, in various embodiments, by being snapped together.

In other instances, the top and bottom members are formed of a single member made to be folded on itself in such a manner as to fit the device within a cavity formed thereby, such as without the inclusion of a hinge member. In other instances, the top and bottom members may be formed of a single or a plurality of members that are configured for being coupled together via a hinge component. The top and/or bottom members of the housing may be unique in that one or more of them may be adapted to include features that have been configured to accommodate one or more features of the underlying electronic device to be encased therein, such as a camera feature, a sound transmission feature, a charge port feature, a display feature, and the like, which features are aligned with corresponding features of the underlying device, which accommodating features of the housing are configured so as to allow the various features of the housed device to be used without substantial interference from the housing.

In various instances, each of the top and bottom members of the housing may include both a front and a back surface surrounded by a perimeter portion. In various embodiments, the top and/or bottom members may not include front and back surfaces, but one or both of which may merely include a perimeter portion. The perimeter portion may be defined by a proximal and a distal end portion as well as opposing side portions. The perimeter portion may include a plurality of perimeter portions, such as an interior and an exterior perimeter portion, as described herein below.

In various embodiments, the top and/or bottom members of the housing may include a clasping mechanism. For instance, the top and bottom members may include respective clasping mechanisms that extend along at least a portion of the perimeter of the top and/or bottom member, which clasping mechanisms are configured for interfacing with one another in such a manner so as to couple the top and bottom members of the housing with one another thereby sealing the housing. In certain embodiments, the clasping mechanism circumscribes the entire perimeter portion of the housing. In other embodiments, the clasping mechanism is positioned along a perimeter portion of the housing but does not circumscribe the entire perimeter portion. In certain embodiments, the clasping mechanism includes a plurality of clasping mechanisms, one or more of which may or may not circumscribe the entire perimeter of the top and bottom members.

In certain embodiments, the clasping mechanism is an entirely internal clasping mechanism. By "entirely internal clasping mechanism" is meant that the clasping mechanism is entirely contained within the bounds that form the interior or cavity of the housing when the top and bottom members are coupled together so as to form the housing.

In certain embodiments, the clasping mechanism is an entirely external clasping mechanism. By "entirely external clasping mechanism" is meant that the clasping mechanism is positioned entirely on an exterior portion of the top and/or bottom member such that when the top and bottom members are coupled together so as to form the cavity of the housing the clasping mechanism is positioned exteriorly to the bounds that form the cavity of the housing.

In certain embodiments, the clasping mechanism is a hybrid clasping mechanism that is partially internal and partially external to the bounds that form the cavity of the housing. Accordingly, in certain instances, the perimeter portion may include one or more clasping mechanisms, such as internal, external, and/or hybrid clasping mechanisms that are configured so as to secure the sealing of the top and bottom members together. The clasping mechanisms may be separate elements added on to the perimeter portion of the housing, e.g., where the clasping mechanism is an external clasping mechanism, or may be an integral member therewith, e.g., where the clasping mechanism is an internal or hybrid clasping mechanism.

In certain embodiments, the clasping mechanism may include a plurality of clasping mechanisms such as one or more internal and/or one or more external and/or one or more hybrid clasping mechanisms. For instance, in various embodiments, the housing may include a plurality of internal clasping mechanisms and/or may include one or more external and/or hybrid clasping mechanisms. For example, the housing may include a first entirely internal clasping mechanism, e.g., one that circumscribes a portion or an entire perimeter of the housing; and may include a second entirely internal clasping mechanism, e.g., a second internal clasping mechanism that circumscribes an additional portion or entire perimeter of the housing. A further, external or hybrid clasping mechanism may also be provided.

Accordingly, in various embodiments, a single internal, external, or hybrid clasping mechanism may be provided; and in other various embodiments, a plurality of clasping mechanism, e.g., internal, external, and/or hybrid clasping mechanisms, may be provided. For instance, in certain embodiments, a plurality of internal clasping mechanisms are provided. In various embodiments, the clasping mechanisms may be configured such that when the top and bottom members are coupled together a liquid-proof and/or dust-proof and/or shockproof seal is provided thereby which seal protects an encased device or components thereof from liquid, such as water, dust, dirt, shock, and the like. A suitable clasping mechanism may have any suitable configuration, such as corresponding clasps, L- or T-shaped straight or slanted edges, wedge and interdigitated wedge receptacles, corresponding teeth and/or teeth receiving members, hook and groove fasteners, rib and channel fasteners, peg and peg receptacles, buttons, zippers, hook and loop fasteners, screws, bolts, rivets, external clasps, and the like.

In one embodiment, one or both of the top and bottom members may include one or more channels, such as a channel that extends along the perimeter portion of the top and/or bottom member. The channel along the perimeter portion may include an interior bounding member and an exterior bounding member, which bounding members at least partially define the bounds of the channel. Hence, in such an embodiment, the perimeter portion includes an interior perimeter portion, e.g., an interior bounding member and an exterior perimeter portion, e.g., exterior bounding member. A bottom bounding member may also be provided separately or as part of the same. Accordingly, the perimeter portion may include an interior and an exterior perimeter portion, and in certain instances, the interior and exterior bounding members of the channel are the same as the interior and exterior perimeter portions of the top and/or bottom member. A portion of the bottom member may also provide a bottom bounding for the channel. The at least one channel may additionally include a seal, such as a gasket, such as a compressible O-ring, positioned within the channel. The O-ring may be a solid or a compressible O-ring, such as an O-ring that is capable of being compressed from about 1 to about 70%, such as from about 5 to about 65%, from about 10 to about 60%, including about 15 to about 50%, for instance, about 20 to about 40%, including about 30%.

In certain embodiments, where one top or bottom member includes a perimeter portion containing a channel, e.g., bounded by interior and exterior bounding members, the opposing member may additionally include a perimeter portion that interacts with the channel, e.g., so as to compress a gasket contained therein. For instance, the top or bottom member may include an extended portion, such as a portion that extends downwards normal to a top surface of the perimeter portion so as to impinge within the channel of the opposing member thereby functioning to contact and/or compress a gasket positioned therein. For example, the top or bottom member may include an interior perimeter portion that extends normal to a front and back surface of the top or bottom member so as to interact within a channel of a corresponding top or bottom member, and may further include an exterior perimeter portion, which exterior perimeter portion may or may not interact with the channel.

The extended portion may interact with a seal within the channel or may interact with the channel itself or one or more of the bounding members of the channel, such as where one or more of the bounding members of the channel includes a clasping mechanism, such as a clasp, a groove, a tooth, a receptacle, or the like, and the extended portion additionally includes a corresponding clasping mechanism. In certain instances, the extended portion is configured so as to have a width that exceeds that of the channel such that as the extended portion fills the channel its width is compressed and it consequently exerts an outward force on the bounding members of the channel thereby functioning to couple the top and bottom members together. Hence, the extended portion and/or one or more of the channel bounding members may be fabricated from a flexible or semi-flexible material capable of being compressed when the top and bottom members are pressed together.

In certain instances, the bottom member may include a perimeter portion having a channel bounded by interior, exterior, and/or bottom bounding members; and the top member may include a perimeter portion that also includes interior and exterior perimeter portions, albeit without an intervening channel there between, which perimeter portions of the top member may be configured for interacting with one or more of the perimeter portions of the bottom member. For instance, the interior and/or exterior bounding member(s) of the channel of the perimeter portion of the bottom member may include one or more clasping mechanisms, and a corresponding interior or exterior perimeter portion of the top member may also include a corresponding clasping mechanism(s), such that when the top and bottom members are coupled together and the clasping mechanism clasped, e.g., snapped, together a liquid-proof, dustproof, and/or shockproof seal is provided thereby. Accordingly, in various embodiments, the interior and/or exterior perimeter portions as well as the interior and/or exterior bounding members of the top and bottom members may include clasping mechanisms, e.g., corresponding clasping mechanisms, that are configured for interacting with one another so as to couple the top and bottom members together, e.g., in a liquid-proof seal.

In another embodiment, for instance, where the housing is intended to house a device with a screen, such as an interactive touch screen, the front and/or back surfaces of the top and/or bottom member of the housing may each include a front and back surface member, such as at least one or more membranes. For instance, the top or bottom member may include a membrane, such as a membrane that is configured for interfacing with an interactive screen, e.g., a touch screen, of an encased device in such a manner that when a user touches the membrane one or more characteristics of that touch, e.g., mechanical, pressure, heat, capacitance, etc. are transferred to the touch screen of the underlying device, and in this manner a user is able to manipulate the screen of the encased device.

In certain embodiments, a front and/or bottom surface membrane is not provided or is provided as a separate element from the housing. For instance, in certain embodiments, a top and/or bottom member of the housing may include a perimeter portion only, which perimeter portion circumscribes the device to be encased but does not otherwise include a top and/or bottom surface element that spans from one perimeter portion to the other. In such an embodiment, the top and/or bottom member may be configured for interfacing with the perimeter of the top and/or bottom surface of a device to be encased in such a manner so as to provide a liquid and/or shockproof seal therewith, regardless of whether the top or bottom member includes a front and back surface member. For instances, in various instances, the top or bottom member may include a partial front and/or back surface, which surface impinges partially on a top and/or bottom surface of a housed device, but does not span completely from one side of the housing to the other. Rather, the top or bottom front and back surface member may be configured for interacting directly with a surface of the housed electronic device so as to form a waterproof, dustproof, and/or shockproof seal therewith. Such a sealing may be accomplished, for instance, by the inclusion of one or more at least partially circumferential seals that are included along an inside perimeter of the partial front and back surface member, such as one or more hollow or solid O-rings.

In certain embodiments, the top and bottom member of the housing may be formed of a single element or may be composed of separate elements. In certain instances, the top and bottom member may be adapted to interact with a separate top and/or bottom surface member, such as a separate top and/or bottom surface membrane member that may be coupled to the electronic device before the electronic device is positioned within the top and/or bottom member(s) of the housing. For instance, the top and/or bottom member may be configured for interacting with a surface membrane member in such a way that when the top and bottom member are coupled together, said coupling together secures the surface membrane across the surface of the top and/or bottom members and a waterproof, dustproof, and/or shockproof seal may be accomplished in that manner. In such an instance, it may be useful to have the membrane member extend beyond the top or bottom surface of the electronic device to be housed so as to impinge upon one or more, such as along all four sides of the electronic device. The membrane may include a front and a back surface one or more of which includes an adhesive on the entire or a less than entire portion of the surface, so as to facilitate the coupling with the device and/or the housing member.

In other embodiments, the top and/or bottom member may be a single member that circumscribes the perimeter of the device to be contained, and further configured for interfacing with a separate surface membrane so as to provide a liquidproof seal therewith. For example, the surface membrane may span from one perimeter of a device to be encased to another and may include an adhesive that allows the surface membrane to securely attach to the surface of the device, while the perimeter portion fits over the perimeter of the device and may or may not interact with the surface membrane attachment, but together they function to make the device both liquid proof and shockproof. In certain embodiments, only a perimeter portion or only a front or back surface membrane portion may be provided.

As described herein below, one or more membranes or portions thereof may be included herein as part of the front and/or back surface of the top or bottom member or may be provided as the entire top and/or bottom member. The membrane may include a perimeter portion and/or may interact with a perimeter portion of the housing, the device itself, both, or neither. Accordingly, the perimeter portion of the membrane may be configured so as to interface with a perimeter portion, such as an inner and/or outer perimeter portion, of the top and/or bottom member and/or of the device itself. For instance, the perimeter portion of a top and/or bottom member, such as the perimeter portion of a top member, may include a plurality of sub-portions, such as a first sub-portion, e.g., an interior perimeter portion, that includes an interior membrane interfacing member, and a second sub-portion, e.g., an exterior perimeter portion, that includes an exterior membrane interfacing member, which interfacing members are configured for interfacing with a front and back surface of a perimeter portion of the membrane, such as in an overmould fashion so as to secure the membrane to the top member. In such an instance, the top member may include a peripheral frame that comprises the interior perimeter bounds of the housing, a membrane that spans from one side of the perimeter bounds of the frame to the other, and may additionally include an additional outer perimeter member, such as an outer surface peripheral moulding member that at least partially functions to couple the membrane to the peripheral frame.

Accordingly, in certain embodiments, the membrane may be configured such that it spans from one side of the perimeter, e.g., of a top or bottom peripheral frame member, to another side of the perimeter in such a manner that the back surface of the membrane associates with at least the interior membrane interfacing member of the interior perimeter portion, and the front surface of the membrane associates with the exterior membrane interfacing member of the outer perimeter portion. In certain embodiments, the interior perimeter frame portion may be comprised of a rigid or semi-rigid material, such as polycarbonate, and the outer perimeter portion may be comprised of a flexible or semi-flexible material such as TPE, silicone, polypropylene, or other such rubber material.

Hence, in some embodiments, such as where a front surface membrane is provided, e.g., on a top member, the membrane may completely cover the front surface of an electronic device when the device is encased within the housing, however, in some embodiments, as described above, the membrane may cover less than the entire front surface, such as covering only a perimeter portion of the front surface thereby leaving the interactive touch portion of the front screen of the electronic device uncovered. In such an instance, the perimeter portion of the membrane may include a seal, such as a gasket, so as to maintain the housing's overall waterproof, dustproof, and/or shockproofness. Such as a gasket, e.g., an O-ring, that circumscribes the entire perimeter portion of the top member front surface membrane.

Accordingly, in certain embodiments, a front and/or bottom surface membrane need not be provided. Rather, the perimeter portion of the top and/or bottom member may be configured for interfacing with an encased device in such a manner so as to make the perimeter portion of an encased device waterproof and/or shockproof. For instance, the perimeter portion may include a gasket that compresses against one or more of the surfaces of an encased device thereby preventing liquid from penetrating there between. One or more other gaskets may also be provided and configured as stickers that may be placed on or around an encased device so as to cover various different sound transmission ports of the encased device thereby rendering the encased device entirely waterproof. Such gasket covering stickers may be provided entirely on their own or in combination with a perimeter portion.

Where included, the front and back surface membrane, e.g., of the top or bottom member, may have one or more features, such as additional membrane features, for instance, an acoustic membrane feature and/or a button feature. For example, the first membrane may include an acoustic membrane feature, which acoustic membrane feature may include an aperture spanning from the front to the back surface of the first membrane. The aperture may be covered by a second membrane, such as an acoustically transmissive membrane that is offset from the first membrane, such as by a space, adhesive layer, or the like. Hence, the acoustic membrane may be offset from the first membrane by any suitable element, such as by the addition of a spacer member. Accordingly, the two or more membranes may be attached to one another via a suitable adhesive.

The membrane may additionally include a button feature. The button feature may include an indented region. The indented region may simply be an indented region in the membrane or it may be a cut-out region that has been overlaid with an additional membrane configured as a button feature. In various instances, the indented region is at least partially circumscribed by a ridge region. For instance, in one embodiment, the perimeter portion of the button feature may include a raised deformable perimeter portion that surrounds the indented region. The raised deformable perimeter portion may be configured so as to allow a measure of travel for the indented region of the button feature such that when the indented region is depressed the raised portion is deformed thereby allowing the indented region to travel without causing significant stretching of the first membrane.

The membrane may also include optically opaque regions and/or optically transmissive regions, such as an optically transmissive region coincident with a proximity sensor, ambient light sensor, camera and/or flash feature, or video camera portion of an underlying device meant to be housed by the housing. In various embodiments, a front surface membrane may be configured so as to include an optical lens, which optical lens is configured for aligning with a camera or video lens of an encased device. The membrane may additionally include optically opaque regions, such as along a perimeter of the membrane. In certain embodiments such optically opaque regions function to indicate the bounds of an interactive control panel, such as a touch screen, of an underlying device to be housed within the housing.

In an additional embodiment, along with a perimeter portion and/or a front surface membrane, a bottom member may be provided. The bottom member may be comprised simply of a perimeter portion or may include a bottom front and back surface member that spans from one perimeter portion to the other. In certain embodiments the bottom front and back surface member and perimeter member are composed of the same material and fabricated together so as to form a single unit. In various instances, they are two separate components coupled together by various mechanisms well known in the art such as described herein.

The bottom member may include one or more features. For instance, the bottom member may include a lens feature, such as a camera lens feature that may include one or more lenses, for instance, a camera and/or video lens and/or a flash lens feature. The bottom member may additionally include a microphone feature. In various instances, the camera feature may be coupled with the microphone feature. In such an instance, the camera and/or flash lens and/or microphone feature may additionally include an optical skirt and/or acoustic skirt, such as one or more skirts that surround the one or more lenses and/or microphone features and prevents the transmission of light and/or ambient sound therethrough from one lens region or sound region to another lens or sound region. In certain embodiments, a speaker region may also be provided in proximity to the camera and/or microphone containing feature.

Where a microphone or speaker portion is included in the bottom member, such as on a bottom member front and back surface member, the microphone and/or speaker region may include an opening through the surface member, which opening may then be covered by a membrane that is transmissive for sound but not for liquid or particles. A skirt, such as a foam or rubber gasket, may additionally be included, which skirt may be positioned on the interior surface of the surface member so as to at least partially engage a portion of a housed electronic device, and may function to prevent the internal transmission of sound from impinging into the microphone portion of the housed device when the device is housed within the housing. In such an instance, the skirt may be configured to completely circumscribe a microphone region of an underlying device and may be made of a compressible material such that as the top and bottom members are coupled together the compressible material is compressed thereby generating a formidable barrier to sound penetration.

As indicated, the bottom member may include a front and back surface member and may additionally include a perimeter portion member. In a further instance, a portion of the perimeter portion, such as a distal end portion, may include a latch feature, for instance, a latch feature for enclosing an opening, such as a port opening. The latch feature may include a lower latch interface, a latch, and an upper latch interface, such that the latch is configured for moving from a closed position, wherein the latch is in contact with both the lower and upper latch interfaces, to an open position, wherein the latch is in contact with only one of the lower or upper latch interfaces.

In certain instances, the latch may additionally include a secondary opening, which opening may be opened or closed independently from the latch. Such a secondary opening may be an aperture that may be closed by another latch door, a sliding door, a removable plug, a screw-thread or cam-thread bung, and the like. The latch feature and/or secondary opening, may be positioned entirely on a top or bottom member, and in certain instances, portions of the latch feature may be included on both top and bottom members. In various embodiments, the latch feature is liquid-proof and/or dust-proof and/or shockproof and may include a gasket so as to provide a liquid and/or dust proof seal when the latch is in the closed position.

In another instance, the perimeter portion, such as a distal or proximal perimeter end portion, may include one or more sound transmission features, such as an acoustic vent feature for transmitting and/or channeling sound into or out of the housing. For instance, an acoustic vent feature may include a sound channel having an acoustic vent material positioned therein. The acoustic vent feature may be positioned to align with a corresponding sound transmission portion of an underlying device such as a microphone and/or speaker portion of an underlying electronic device. The acoustic vent material may span the sound channel at an angle from 0 to 180 degrees in a forward or reverse direction. The sound channel may extend from an exterior portion of the perimeter to an interior portion of the perimeter so as to permit the ingress and egress of sound therethrough, and the acoustic vent material may transect the sound channel, e.g., at an angle with respect to a centerline therethrough, so as to prevent the ingress (or egress) of water therethrough.

In one instance, the perimeter portion, such as one of the opposing side portions, may include a switch or button feature for engaging a switch or button mechanism of an encased device. The switch or button feature may include a switch or button housing and may further include an actuator having a switch interface. The switch and/or button may be fabricated from a single material or may be fabricated from a plurality of materials and then be coupled together, such as by an adhesive or moulding, e.g., an overmoulding, process.

In certain embodiments, a switch feature is included wherein the switch feature may include an axle configured for being coupled to a switch housing and/or an additional switch interface. The switch feature may be configured such that as the actuator moves, such as rotates about the axle (if included), from a first position to a second position within the switch housing, the switch interface causes the switch to move from a first to a second position, such as from an "on" to an "off" position. In certain embodiments, one or more protective bumper portions may be positioned around the one or more switches or buttons so as to protect them from impact.

In another embodiment, an outer perimeter portion may include a slot feature, such as a coin slot feature, for assisting in separating the top member of the housing from the bottom member of the housing. The slot feature may include an indented or cut out portion of the perimeter. The cut out portion may be positioned in one or both of the top and bottom members. Accordingly, the cut out portion may be positioned on a top and/or bottom portion and is further bounded by one or a plurality of overhang regions, which overhang region may be positioned in one or both of the top and bottom members thereby bounding the cut out portion. For instance, in one embodiment, the top member includes the cutout portion, and both the top and bottom member include corresponding overhang portions. A coin may be placed within the slot and twisted thereby causing the top member to move away from the bottom member.

In a further embodiment, the outer perimeter portion may include a noise cancelling feature for assisting in the cancelling of ambient noise. The noise cancelling feature may include one or more of an aperture, e.g., positioned in one or both of the top and bottom member, an acoustic membrane, and a sound guide channel. The sound guide channel may traverse from the exterior of the housing to the interior of the housing and may be configured for directing sound from the aperture toward a noise cancelling feature, such as a microphone, present on an encased electronic device. The sound channel may be intersected by an acoustic membrane feature, which acoustic membrane may be positioned so as to intersect the sound guide channel at an angle with respect to a centerline therethrough.

In certain embodiments, the acoustic membranes described herein are transmissive for gas, e.g., sound waves, but not for liquid or particles. Further, in certain embodiments, the interior portion of the various sound transmission elements described herein, such as the noise cancelling feature described above, may include a configuration that is adapted for preventing the transmission, e.g., refraction, of sound from within the case from entering the sound feature, e.g., the noise cancelling microphone, of an encased device and thereby causing an echo. Such a feature may include a raised portion that circumscribes the noise cancelling microphone, when the device is encased within the housing, and may further include a gasket, such as a compressible gasket, that circumscribes the same.

In an additional embodiment, the outer perimeter portion may include a port feature such as a headphone port feature, for instance, for receiving either a jack (such as a jack of a headphone or speaker assembly) or a closure device or the like. The port feature may include an aperture positioned in one or both of the top and/or bottom members. The aperture extends from the exterior of the assembly to the interior of the assembly. The aperture may be bounded by one or more of a gasket or gasket seat, such as an O-ring, and a threaded or cammed region, which threaded or cammed region may be configured for receiving a corresponding threaded or cammed region present on either the jack or the closure device to be inserted therein. The threaded region may be configured as a typical thread feature or may be configured as a cam feature.

A perimeter portion of a top or bottom member may additionally include one or more openings configured for receiving a tether or leash therethrough which leash or tether may facilitate with the ease of handling.

The disclosure also provides a flash isolation mechanism for a case for an electronic device having a camera and a flash. The flash isolation mechanism includes a housing member to cover at least a portion of the electronic device, the portion of the electronic device including the camera and the flash; a camera lens provided in the housing member for being positioned over the camera; a flash lens provided in the housing member for being positioned over the flash; and an optical skirt surrounding the camera lens and/or the flash lens and for being positioned between the housing member and the electronic device, the optical skirt for allowing transmission of light from the flash through the flash lens and inhibiting reflection of the light from the flash to the camera lens.

In certain embodiments, the optical skirt surrounds the camera lens. In other embodiments, the optical skirt surrounds the flash lens. In other embodiments, the optical skirt surrounds the camera lens and the flash lens. The optical skirt can include a concentric baffle to provide an enhanced field of view for the camera lens and the camera. The optical skirt can also include an elastomer material. In certain embodiments, the camera lens and/or the flash lens are at least partially attached with the elastomer material.

The disclosure also provides a housing for an electronic device having a camera and a flash. The housing includes a housing member comprising a front and a back surface and having a camera lens for being positioned over the camera and a flash lens for being positioned over the flash, the housing member being surrounded by a perimeter portion defined by a proximal end portion, a distal end portion, and opposing side portions, the perimeter portion of the housing member having a channel formed by an interior perimeter portion and an exterior perimeter portion, the channel including a compressible gasket positioned therein; and an optical skirt surrounding the camera lens and/or the flash lens and for being positioned between the housing member and the electronic device, the optical skirt for allowing transmission of light from the flash through the flash lens and inhibiting reflection of the light from the flash to the camera lens.

In certain embodiments, the optical skirt surrounds the camera lens. In other embodiments, the optical skirt surrounds the flash lens. In other embodiments, the optical skirt surrounds the camera lens and the flash lens. The optical skirt can include a concentric baffle to provide an enhanced field of view for the camera lens and the camera. The optical skirt can also include an elastomer material.

The disclosure also provides a housing for encasing and sealing an electronic device having a camera and a flash. The housing includes a bottom member comprising a front and a back surface and having a camera lens for being positioned over the camera and a flash lens for being positioned over the flash, the bottom member being surrounded by a perimeter portion defined by a proximal end portion, a distal end portion, and opposing side portions, the perimeter portion of the bottom member having a channel formed by an interior perimeter portion and an exterior perimeter portion, the channel including a compressible gasket positioned therein; a top member having an inner perimeter defined by a rigid frame that corresponds to an outer perimeter of the electronic device and the perimeter portion of the bottom member, the rigid frame extending to a ridge that is adapted to clasp within the channel of the bottom member and seal against the gasket, the top member further including a plurality of sealed buttons and a plurality of sealable apertures, and a membrane that overlays the rigid frame opposite the ridge, the membrane having a transparent area; and an optical skirt surrounding the camera lens and/or the flash lens and for being positioned between the housing member and the electronic device, the optical skirt for allowing transmission of light from the flash through the flash lens and inhibiting reflection of the light from the flash to the camera lens. In certain embodiments, the camera lens and/or the flash lens are at least partially attached with the elastomer material.

The disclosure also provides a protective case for an electronic device having a front surface that includes a touch-sensitive interactive display. The protective case includes a bottom member having an inner surface defined by a back wall and a side wall coupled to a periphery of the back wall, the side wall corresponding substantially to the periphery of the back wall and having a top edge defined by an outer periphery and an inner periphery, the back wall and the side wall each having an inner surface to receive the electronic device; a frame member that frames at least a portion of the front surface of the electronic device to enable direct touch by a user to the touch-sensitive interactive display, the frame member having an outer peripheral edge that corresponds to the outer periphery of the top edge, and having one or more coupling members that extend down from an underside of the frame member to engage with the inner surface of the side wall proximate inner periphery of the side wall; and a releasable adhesive member on an outer side of the one or more coupling members at a first interface between the underside of the frame member and the top edge of the side wall of the bottom member to seal the first interface, and on an inner side of the one or more coupling members at a second interface between the underside of the frame member and the front surface of the electronic device to seal the second interface, when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of a low compression sealant. The low compression sealant can be a poloxamer. In other embodiments, the frame member is formed of a rigid material.

The disclosure also provides a protective case for an electronic device having a front surface that includes a touch-sensitive interactive display. The protective case includes a bottom member having an inner surface defined by a back wall and a side wall coupled to a periphery of the back wall, the side wall corresponding substantially to the periphery of the back wall and having a top edge defined by an outer periphery and an inner periphery, at least part of the back wall and the side wall each having an inner surface to receive the electronic device; a frame member that frames at least a portion of the front surface of the electronic device to enable direct touch by a user to the touch-sensitive interactive display, the frame member having an outer peripheral edge that corresponds to the outer periphery of the top edge, and having one or more coupling members that extend down from an underside of the frame member to engage with the inner surface of the side wall proximate inner periphery of the side wall; and a releasable adhesive member on an outer side of the one or more coupling members at a first interface between the underside of the frame member and the top edge of the side wall of the bottom member to seal the first interface, on an inner side of the one or more coupling members at a second interface between the underside of the frame member and the front surface of the electronic device, and on the inner surface to seal the second interface, when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of a low compression sealant. The low compression sealant can include a poloxamer. In other embodiments, the frame member is formed of a rigid material.

The disclosure also provides a protective case for an electronic device. The electronic device can have a front surface that includes a display. The protective case includes a bottom member having an inner surface defined by a back wall and a side wall to receive the electronic device, the side wall having a top surface defined by an outer periphery and an inner periphery; a frame member that frames at least a portion of the front surface of the electronic device to enable operation by a user of the display, the frame member having an outer peripheral edge that corresponds to the outer periphery of the top surface of the side wall of the bottom member; one or more coupling members that couple the frame member with the bottom member; and a releasable adhesive interposed between the top surface of the side wall of the bottom member and an underside of the frame member, to seal an interface between the top surface of the side wall of the bottom member and the frame member when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of a low compression sealant. The low compression sealant can include a poloxamer. In other embodiments, the frame member is formed of a rigid material.

The disclosure also provides a system for providing a water-resistant seal to a portable electronic device that provides a fixed dimensional structure. The system includes a rigid housing formed to be disposed on at least a portion of the portable electronic device; an elastic member bonded to a portion of the rigid housing, the elastic member having an inner surface to cover a perimeter region of the fixed dimensional structure provided by the portable electronic device; and a compression member coupled to the rigid housing, the compression member to provide an opposing compressive force against the fixed dimensional structure on an outer surface of the elastic member proximate to and substantially opposite the inner surface of the elastic member, when the elastic member covers the perimeter region of the fixed dimensional structure of the portable electronic device, so as to form the water-resistant seal at the perimeter region between the inner surface of the elastic member and the fixed dimensional structure of the portable electronic device.

In certain embodiments, the compression member is unitary with the rigid housing. The rigid housing can be formed of one or more parts. In certain aspects of the disclosure, the compression member is coupled to the rigid housing by one or more coupling members selected from the group of coupling members including slides, clamps, living hinges, mushroom snaps, latches, and/or pre-stress tension members.

In other embodiments, the elastic member includes an adhesive material. The elastic member can be formed of a releasable adhesive material. The elastic member can also be further interdisposed between the rigid frame and the compression member, wherein the compression member further provides the opposing compressive force against the rigid housing to form a second water-resistant seal between the elastic member and the rigid frame.

In other embodiments, the system includes two or more elastic members. The system can also include a second elastic member interdisposed between the rigid housing and the compression member, wherein the compression member further provides the opposing compressive force against the rigid housing to form a second water-resistant seal between the second elastic member and the rigid frame.

In other embodiments, the perimeter region of the portable electronic device can include one or more features, and wherein the elastic member includes a corresponding operating region for accessing and operating the one or more features. The one or more features can include one or more of: a display, one or more speakers, one or more buttons, one or more switches, one or more earports, one or more proximity sensors, one or more lenses, and/or one or more flashes. In another embodiment, the compression member is coupled to the rigid housing by a coupling mechanism selected from the group of coupling mechanisms that consists of: mechanical retention, molding, or adhesive.

The disclosure also provides a system for providing at least one water-resistant seal to a portable electronic device that provides a fixed dimensional structure. The system includes a rigid housing formed to be disposed on at least a portion of the portable electronic device; a releasable and reusable adhesive member having an inner surface to cover a perimeter region of the fixed dimensional structure provided by the portable electronic device to form the at least one water-resistant seal at the perimeter region between the inner surface of the releasable and reusable adhesive member and the fixed dimensional structure of the portable electronic device; and a compression member coupled to the rigid housing and disposed on an outer surface of the releasable and reusable adhesive member.

In certain embodiments, the compression member provides an opposing compressive force against the fixed dimensional structure proximate to and substantially opposite the inner surface of the releasable and reusable adhesive member. In aspects of this embodiment, the opposing compressive force is to mechanically retain the releasable and reusable adhesive member to inhibit shearing and pealing of the releasable and reusable adhesive member.

In other embodiments, the releasable and reusable adhesive member is further interdisposed between the rigid housing and the compression member, and wherein the compression member further provides the opposing compressive force against the rigid housing to form a second water-resistant seal between the releasable and reusable adhesive member and the rigid frame. The system can also include two or more releasable and reusable adhesive members. The system can also include a second releasable and reusable adhesive member interdisposed between the rigid housing and the compression member, and wherein the compression member further provides the opposing compressive force against the rigid housing to form a second water-resistant seal between the second releasable and reusable adhesive member and the rigid frame. The releasable and reusable adhesive member can be flexible and can be a low compression sealant. The releasable and reusable adhesive member can be formed of poloxamer.

The disclosure also provides a system for providing at least one water-resistant seal. The system includes an elastic cover having at least one aperture; a portable electronic device that is insertable into the elastic cover, the portable electronic device providing a fixed dimensional structure to an inner surface of the elastic cover; and a rigid housing formed to be disposed on at least a portion of the elastic cover, and to provide an opposing compressive force against the fixed dimensional structure on an outer surface of the elastic cover proximate to and substantially opposite the inner surface of the elastic cover, when the elastic cover covers at least a portion of the fixed dimensional structure of the portable electronic device, so as to form the at least one water-resistant seal between the inner surface of the elastic cover and the fixed dimensional structure of the portable electronic device.

In one embodiment, the fixed dimensional structure includes a protective member that overlays the portable electronic device. The protective member can be optically transmissive. Further, the protective member can include at least one of: a microphone cover, a button actuator, an acoustic gasket, an optical filter, a lens, an optically opaque region, or a membrane. The elastic cover can also include an aperture, and wherein an inner periphery of the aperture exposes an underlying region of the fixed dimensional structure.

In another embodiment the system also includes one or more water resistant seals, each water resistant seal configured to seal an opening to the portable electronic device within the underlying region of the fixed dimensional structure. In one embodiment, the rigid housing includes the one or more water resistant seals. The one or more water resistant seals can be selected from a gasket, an adhesive, a clinging gel, a clinging elastomer, or an adhesive tape.

The disclosure also provides a method of forming at least one water resistant seal. The method includes the steps of providing a portable electronic device having a fixed dimensional structure; covering at least a portion of the portable electronic device with an elastic cover, the elastic cover having at least one aperture; disposing a rigid housing on at least a portion of the elastic cover, the rigid housing providing an opposing compressive force on an outer surface of the elastic cover proximate to and substantially opposite an inner surface of the elastic cover when the elastic cover covers at least a portion of the fixed dimensional structure of the portable electronic device; and forming the at least one water-resistant seal between the inner surface of the elastic cover and the fixed dimensional structure of the portable electronic device by the opposing compressive force.

In one embodiment, the method also includes the steps of providing one or more water resistant seals, each water resistant seal configured to seal an opening to the portable electronic device within the underlying region of the fixed dimensional structure; and sealing the opening to the portable electronic device within the underlying region of the fixed dimensional structure with the corresponding one or more water resistant seals.

The disclosure also provides a system for providing at least one water-resistant seal for a portable electronic device that provides a fixed dimensional structure. The system includes an elastic cover having at least one aperture, the elastic cover having an inner surface to cover at least a portion of the fixed dimensional structure of the portable electronic device; and a rigid housing formed to be disposed on at least a portion of the elastic cover, and to provide an opposing compressive force against the fixed dimensional structure on an outer surface of the elastic cover proximate to and substantially opposite the inner surface of the elastic cover, when the elastic cover covers at least a portion of the fixed dimensional structure of the portable electronic device, so as to form the at least one water-resistant seal between the inner surface of the elastic cover and the fixed dimensional structure of the portable electronic device.

In one embodiment, the fixed dimensional structure includes a protective member that overlays the portable electronic device. The protective member can be optically transmissive. The protective member can include at least one of: a microphone cover, a button actuator, an acoustic gasket, an optical filter, a lens, an optically opaque region, or a membrane.

In other embodiments, the elastic cover includes an aperture, and wherein an inner periphery of the aperture exposes an underlying region of the fixed dimensional structure. In another embodiment, the system also includes one or more water resistant seals, each water resistant seal configured to seal an opening to the portable electronic device within the underlying region of the fixed dimensional structure.

In another embodiment, the rigid housing includes the one or more water resistant seals. The one or more water resistant seals can be selected from a gasket, an adhesive, a clinging gel, a clinging elastomer, or an adhesive tape.

The disclosure also provides a method of providing at least one water-resistant seal for a portable electronic device that provides a fixed dimensional structure. The method includes the steps of covering at least a portion of the portable electronic device with an elastic cover, the elastic cover having at least one aperture; disposing a rigid housing on at least a portion of the elastic cover, the rigid housing providing an opposing compressive force on an outer surface of the elastic cover proximate to and substantially opposite an inner surface of the elastic cover when the elastic cover covers at least a portion of the fixed dimensional structure of the portable electronic device; and forming the at least one water-resistant seal between the inner surface of the elastic cover and the fixed dimensional structure of the portable electronic device by the opposing compressive force.

In one embodiment, the method also includes the steps of providing one or more water resistant seals, each water resistant seal configured to seal an opening to the portable electronic device within the underlying region of the fixed dimensional structure; and sealing the opening to the portable electronic device within the underlying region of the fixed dimensional structure with the corresponding one or more water resistant seals.

The disclosure provides a protective case for an electronic device, the electronic device having a front surface that includes a display. The protective case includes a bottom member having an inner surface defined by a back wall and a side wall to receive the electronic device, the side wall having a top surface defined by an outer periphery and an inner periphery; a frame member that frames at least a portion of the front surface of the electronic device to enable operation by a user of the display, the frame member having an outer peripheral edge that corresponds to the outer periphery of the top surface of the side wall of the bottom member; one or more tapered posts that couple the frame member with the bottom member by interacting with a deformable opening; and a releasable adhesive interposed between the top surface of the side wall of the bottom member and an underside of the frame member, to seal an interface between the top surface of the side wall of the bottom member and the frame member when the frame member is coupled with the bottom member.

In some embodiments, the one or more tapered posts are spaced-apart along the underside of the frame member, each tapered post having a post head to engage a deformable opening on the periphery of the bottom member. In some embodiments, the releasable adhesive member is a low compression sealant. The low compression sealant can include a poloxamer. In some embodiments, the frame member is formed of a rigid material.

The disclosure also provides a protective case for an electronic device, the electronic device having a front surface that includes a display. The protective case includes a bottom member having an inner surface defined by a back wall and a side wall to receive the electronic device, the side wall having a top surface defined by an outer periphery and an inner periphery; a screen protector that covers at least a portion of the front surface of the electronic device and enables operation by a user of the display, the screen protector having an outer peripheral edge that corresponds to the outer periphery of the top surface of the side wall of the bottom member; and a releasable adhesive interposed between the top surface of the side wall of the bottom member and an underside of the screen protector, to seal an interface between the top surface of the side wall of the bottom member and the underside of the screen protector when the screen protector is coupled with the bottom member.

In certain embodiments, the releasable adhesive member is a low compression sealant. The low compression sealant can include a poloxamer. In certain embodiments, the screen protector is formed of a transparent material.

The disclosure also provides a protective encasement within which a mobile electronic device having a multi-touch display may be fitted. The protective encasement includes a front surface to at least partially cover the mobile computing device, the front surface including a frame having an inside edge to frame the multi-touch display. The protective encasement also includes a rear surface including a first wedge that is adapted to abut a first portion of the mobile electronic device to lift the mobile electronic device against a frame of the front surface; the frame also forming at least two perpendicular side walls between the front surface and the rear surface; an insertion aperture for receiving the mobile electronic device; and a cover for covering the insertion aperture, the cover comprising a second wedge extending inwardly into the front and rear surfaces, the second wedge being adapted to abut a second portion of the mobile electronic device to lift the mobile electronic device against a second portion of the front surface.

In certain embodiments, the inside edge of the protective encasement further comprises a gasket disposed on an interior surface of the inside edge. In certain embodiments, the inside edge of the protective encasement further includes a flexible ridge at the inside edge, the flexible ridge configured to abut the front side of the mobile computing device near the periphery of the multi-touch display.

In certain embodiments, the inside edge of the protective encasement further includes a transparent membrane that allows access to the multi-touch display.

In certain embodiments, the front surface of the protective encasement further includes a sealed button region that is flexible to operate a button connected to an interior surface of the front surface.

In certain embodiments, the protective encasement further includes a first clasp mechanism and a second clasp mechanism proximate the insertion aperture, and the cover lid further comprises a third clasp mechanism for latching with the first clasp mechanism and a fourth clasp mechanism for latching with the second clasp mechanism.

In certain embodiments, the cover lid of the protective encasement is coupled by a hinge proximate the insertion aperture, and wherein the protective encasement further comprising a first clasp mechanism proximate the insertion aperture, and the cover lid further including a second clasp mechanism for latching with the first clasp mechanism.

In certain embodiments, the cover lid of the protective encasement includes a second gasket. In certain embodiments, the cover lid of the protective encasement further includes a charge port, a door, and a latch; and wherein the door has a flexible pad to seal the charge port when the door is in the closed position.

The disclosure also provides a screen protector assembly for applying a screen protector to a screen of a mobile computing device. The screen protector assembly includes a screen protector comprising an adhesive side and an non-adhesive side; a first peelable protective layer that covers the adhesive side, further including at least one peel tab; a second peelable protective layer that covers the non-adhesive side, further including at least one peel tab; and a pull tab attached to the adhesive side peelable protective layer.

In some embodiments, the pull tab of the assembly is at least as long as the screen protector.

The disclosure also provides a screen protector assembly for applying a screen protector to a screen of a mobile computing device. The screen protector assembly includes a screen protector having an adhesive side for adhering to the screen of the mobile computing device and an non-adhesive side opposite the adhesive side; a first peelable protective layer removably affixed to the adhesive side of the screen protector, the first peelable protective layer further including at least one peel tab and at least one kiss cut or perforation that divides the first peelable protective layer into two sections, such that only one section of the first peelable protective layer can be removed using the at least one peel tab; and a second peelable protective layer removably affixed to the non-adhesive side, further including at least one peel tab by which the second peelable protective layer can be removed from the non-adhesive side of the screen protector.

In some embodiments, the screen protector assembly further comprises a pull tab attached to the adhesive side peelable protective layer. In certain embodiments, the screen protector assembly of claim 4, wherein the pull tab is at least as long as the screen protector.

In certain embodiments, the adhesive side peelable protective layer of the assembly comprises two kiss cuts or perforations that divide the adhesive side peelable protective layer into three sections. In certain embodiments, the adhesive side peelable protective layer comprises three kiss cuts or perforations that divide the adhesive side peelable protective layer into four or five sections.

The disclosure also provides a screen protector assembly for applying a screen protector to a screen of a mobile computing device. The screen protector assembly includes a screen protector comprising an adhesive side and an non-adhesive side; an first peelable protective layer associated with the adhesive side, further comprising at least one peel tab; a second peelable protective layer associated with the non-adhesive side, further comprising a first frame configured to rest on one end of the mobile computing device and align the screen protector assembly over the screen of the mobile computing device.

In certain embodiments, the screen protector assembly further includes a second frame configured to rest on another end of the mobile computing device and align the screen protector assembly over the screen of the mobile computing device.

In certain embodiments, the screen protector assembly further includes a pull tab attached to the first peelable protective layer. In certain embodiments, the pull tab attached to the first peelable protective layer is at least as long as the screen protector.

In certain embodiments, the first peelable protective layer comprises two kiss cuts or perforations that divide the adhesive side peelable protective layer into three sections. In certain embodiments, the first peelable protective layer comprises three kiss cuts or perforations that divide the first peelable protective layer into four or five sections.

In certain embodiments, the screen protector assembly further includes an alignment base configured to hold the mobile computing device, the alignment base further including at least four slots; and wherein the first and second frames each comprise at least two tabs configured to fit into two of the slots in the alignment base.

In certain embodiments, the screen protector assembly further includes an alignment base configured to hold the mobile computing device, the alignment base further comprising at least four tabs; and wherein the first and second frames each comprise at least two slots configured to receive two of the tabs in the alignment base.

The disclosure also provides a protective case for an electronic device, the electronic device having a front surface that includes a touch interactive display. The protective case includes a bottom member having an inner surface and a side wall to receive the electronic device, the bottom member further having an outer surface defined at least in part by the side wall, the side wall having a top edge having an inner wall and an outer wall of at least part of the outer surface, the outer wall having a groove along at least part of a perimeter of the outer wall near the top edge; a top member having an outer wall extending over the outer surface of the side wall of the bottom member, an inner wall extending between the electronic device and the inner wall of the top edge of the side wall of the bottom member, and a wiper that extends over at least part of the front surface of the electronic device, the inner wall of the top member having a protrusion that is biased to sealably abut the inner wall of the top edge of the side wall of the bottom member when the wiper extends over at least part of the front surface of the electronic device.

The disclosure also provides a protective case for an electronic device, the electronic device having a front surface that includes a touch interactive display. The protective case includes a bottom member having an inner surface and a side wall to receive the electronic device, the bottom member further having an outer surface defined at least in part by the side wall, the side wall having a top edge having an inner wall and an outer wall of at least part of the outer surface, the outer wall having a first clasping mechanism; a top member having an outer wall extending over the outer surface of the side wall of the bottom member, an inner wall extending between the electronic device and the inner wall of the top edge of the side wall of the bottom member, a second clasping mechanism for clasping with the first clasping mechanism, and a wiper that extends over at least part of the front surface of the electronic device, the inner wall of the top member having a protrusion that is biased to sealably abut the inner wall of the top edge of the side wall of the bottom member when the wiper extends over at least part of the front surface of the electronic device.

In certain embodiments, the wiper includes a compressible gasket that forms a liquidproof seal with the front surface of the electronic device.

In certain embodiments, the protective case includes a screen protector that covers at least a portion of the front surface of the electronic device and enables operation by a user of the display, the screen protector having an outer peripheral edge that corresponds to the outer periphery of the top surface of the side wall of the bottom member; and a releasable adhesive interposed between the top surface of the side wall of the bottom member and an underside of the screen protector, to seal an interface between the top surface of the side wall of the bottom member and the underside of the screen protector when the screen protector is coupled with the bottom member.

The disclosure also provides an apparatus for covering at least part of a mobile computing device having a touch screen display, the mobile computing device further having a sound generating mechanism. The apparatus includes an encasement that enables operation of the touch screen display, the encasement having an outer surface and an inner surface; at least one sound output port in the encasement proximate the sound generating mechanism of the mobile computing device; and a sound enhancement region formed in the encasement between the outer surface and the inner surface of the encasement, the sound enhancement region having an area and a thickness configured to resonate with certain frequencies of sound from the sound generating mechanism of the mobile computing device to augment the sound from the at least one sound output port in the encasement.

In certain embodiments, the sound enhancement region is rectangular. In certain embodiments, the sound enhancement region is round. In certain embodiments, the sound enhancement region is elliptical.

The disclosure provides an apparatus for covering at least part of a mobile computing device having a touch screen display, the mobile computing device further having an electrical connection in a housing that houses the mobile computing device. The apparatus includes an encasement that covers at least part of the mobile computing device that includes the electrical connection, the encasement having a bottom member to cover at least a first portion of the mobile computing device, and a top member to cover at least a second portion of the mobile computing device, the top member being configured to allow touch access to the touch screen display; a coupling mechanism to couple the top member with the bottom member to cover the first and second portions of the mobile computing device, and to seal the top member with the bottom member; an aperture in the encasement proximate the electrical connection, the aperture having an inner wall and a peripheral edge; a door for attaching to the encasement proximate the at least one aperture, the door having an open configuration to enable access to the electrical connection of the mobile computing device, and a closed configuration to close the at least one aperture in the encasement; and a dual seal gasket for being seated on the gasket seat to seal the aperture in the encasement when the door is in the closed configuration, the dual seal gasket having an annular plug to enter the aperture and abut the inner wall of the aperture, and a face-sealing portion that surrounds the annular plug to seal against the peripheral edge of the aperture.

The disclosure provides an apparatus for covering at least part of a mobile computing device having a touch screen display, the mobile computing device further having an electrical connection in a housing that houses the mobile computing device. The apparatus includes an encasement that enables operation of the touch screen display and covers at least part of the mobile computing device that includes the electrical connection, the encasement having an outer surface and an inner surface; an aperture passing through the inner surface and the outer surface of the encasement proximate the electrical connection, the aperture having an inner wall and a peripheral edge. The apparatus also includes a door for attaching to the encasement proximate the electrical connection, the door having an open configuration to enable access to the electrical connection of the mobile computing device, and a closed configuration to close the aperture in the encasement; and a dual seal gasket for being seated on the gasket seat to seal the aperture in the encasement when the door is in the closed configuration, the dual seal gasket having an annular plug to enter the aperture and abut the inner wall of the aperture, and a face-sealing portion that surrounds the annular plug to seal against the peripheral edge of the aperture.

In certain embodiments of the apparatus including a dual seal gasket, the annular plug includes an annular protrusion that surrounds the annular plug. In certain embodiments, the dual seal gasket is formed of an elastomeric material. In certain embodiments, the dual seal gasket is a contiguous piece. In some embodiments, the annular plug is adhered to the door and is formed of a first elastomeric material, and wherein the face-sealing portion is adhered to the annular plug and is formed of a second elastomeric material that is different from the first elastomeric material.

The present disclosure provides an apparatus for covering at least part of a mobile computing device having a proximal end, a distal end, and a touch screen display. The apparatus includes a top member having a rigid frame that defines a side wall around a periphery of the mobile computing device and a frame portion that frames a periphery of the touch screen display, the side wall and frame portion of the top member defining a cavity in which the mobile computing device can be seated, the side wall further having a retention rail that protrudes from a portion of an outer surface of the side wall. The apparatus also includes a bottom member having a perimeter that corresponds to a periphery of the mobile computing device, the perimeter of the bottom member having a seal to mate with a bottom edge of the side wall of the top member. The apparatus also includes a proximal slide defining a first frame channel configured to receive and overlay a first portion of the top member and the bottom member at the proximal end of the mobile computing device, the proximal slide having a first retention channel for receiving a first portion of the retention rail of the top member, the proximal slide further having a first clasping mechanism. The apparatus includes a distal slide defining a second frame channel configured to receive and overlay a second portion of the top member and the bottom member at the distal end of the mobile computing device, the proximal slide having a second retention channel for receiving a second portion of the retention rail of the top member, the proximal slide further having a second clasping mechanism for clasping with the first clasping mechanism of the proximal slide to retain the proximal and distal slides together to seal the top member to the top member and to encase the mobile computing device.

In certain embodiments, the bottom member includes a transparent region. In certain embodiments, the bottom member includes a lens. In certain embodiments, the bottom member includes one or more acoustic vents. In certain embodiments, the top member includes apertures proximate at least one button and at least one switch on the electronic device. In certain embodiments, the distal slide includes a charge port aperture and charge port door having an open configuration to enable access to the electrical connection of the mobile computing device, and a closed configuration to close the at least one aperture in the encasement.

The present disclosure also provides a protective encasement for a mobile computing device having a housing defined by a back side, a perimeter, and a front side that includes a multi-touch display. The protective housing includes a bottom member, the bottom member including a frame defining an outer perimeter of the bottom member and having an outer wall, the outer wall having a first latching mechanism; an inner surface for receiving at least part of the perimeter or back side of the mobile computing device, and forming an inner wall spaced apart from the outer wall; and a first channel formed between the outer wall and the inner wall. The protective encasement also includes a top member to mate with the bottom member to at least partially cover the mobile computing device. The top member includes a frame having an inside edge to frame the multi-touch display, and defining an outer perimeter; a protrusion that extends down from an inner surface of the frame near the outer perimeter, the protrusion having a second latching mechanism for latching with the first latching mechanism of the outer wall of the bottom member, the protrusion further having a plurality of apertures proximate the second latching mechanism; and a flexible overmold provided over an outer surface of the protrusion and at least part of the frame near the outer perimeter. The flexible overmold further includes an inner overmold portion joined with the flexible overmold provided over the outer surface of the protrusion via the plurality of apertures in the protrusion, the inner overmold portion configured to abut and seal against the inner wall of the first channel of the bottom member when the second latching mechanism is latched with the first latching mechanism.

The disclosure also provides an apparatus for covering at least part of a mobile computing device having a touch screen display, the mobile computing device further having a sound generating mechanism. The apparatus includes an encasement that encases at least part of the mobile computing device and enables operation of the touch screen display, the encasement having an outer surface and an inner surface; a sound barrier provided to the inner surface of the encasement and forming a sound channel between the encasement and the mobile computing device for channeling sound from the sound generating mechanism of the mobile computing device to a sound enhancement region in the encasement; and a passive radiator provided in the sound enhancement region, the passive radiator having a diaphragm and a surround that surrounds the diaphragm and allows the diaphragm to move in and out of a plane of the sound enhancement region to radiate sound from the sound generating mechanism of the mobile computing device when the encasement encases the mobile computing device.

In certain embodiments, the diaphragm of the apparatus is formed of a material having a mass that is tuned to a range of frequencies of sound produced by the sound generating mechanism of the mobile computing device. In certain embodiments, the passive radiator further includes a mass-bearing member coupled with the diaphragm to provide additional mass to the diaphragm. In certain embodiments, the surround is formed as a roll surround. In certain embodiments, the surround is formed as an accordion surround. In certain embodiments, the passive radiator further comprises an inner diaphragm provided in the diaphragm, and a second surround that surrounds the inner diaphragm and provides vibrational isolation between the inner diaphragm and the diaphragm.

As used herein, the term "about" in quantitative terms refers to plus or minus 10%. For example, "about 3%" would encompass 2.7-3.3% and "about 10%" would encompass 9-11%. Moreover, where "about" is used herein in conjunction with a quantitative term it is understood that in addition to the value plus or minus 10%, the exact value of the quantitative term is also contemplated and described. For example, the term "about 3%" expressly contemplates, describes and includes exactly 3%.

The details of one or more variations of the subject matter described herein are set forth in the accompanying drawings and the following description.

BRIEF DESCRIPTION OF THE DRAWINGS

FIG. 1C shows a two-layer optical seal and a multi-layer seal that covers the acoustic aperture and proximity sensor and includes an entire layer of advanced light control film (ALCF). FIG. 1D shows a two-layer optical seal and a multi-layer seal that covers the acoustic aperture and proximity sensor and includes a partial layer of ALCF. FIG. 1E shows a two-layer optical seal and a multi-layer seal that covers the acoustic aperture and proximity sensor and has no layer of ALCF.

FIG. 1O depicts a perspective rear elevation view of an encasement or housing.

FIG. 3C shows a perspective cutaway view of another embodiment of a housing including tapered posts, sound bridges, and a screen protector.

FIG. 6C shows a close up view of the lens feature and sound transmission of FIG. 6A. FIG. 6D shows a side cutaway view of the lens feature and sound transmission feature of FIG. 6C, showing the interior of the housing.

FIG. 17C depicts side cutaway and perspective views of yet another alternative latching mechanism having a smaller lateral gap.

These and other aspects will now be described in detail with reference to the appended drawings. Like reference symbols in the various drawings indicate like elements.

DETAILED DESCRIPTION

Figure 1A:
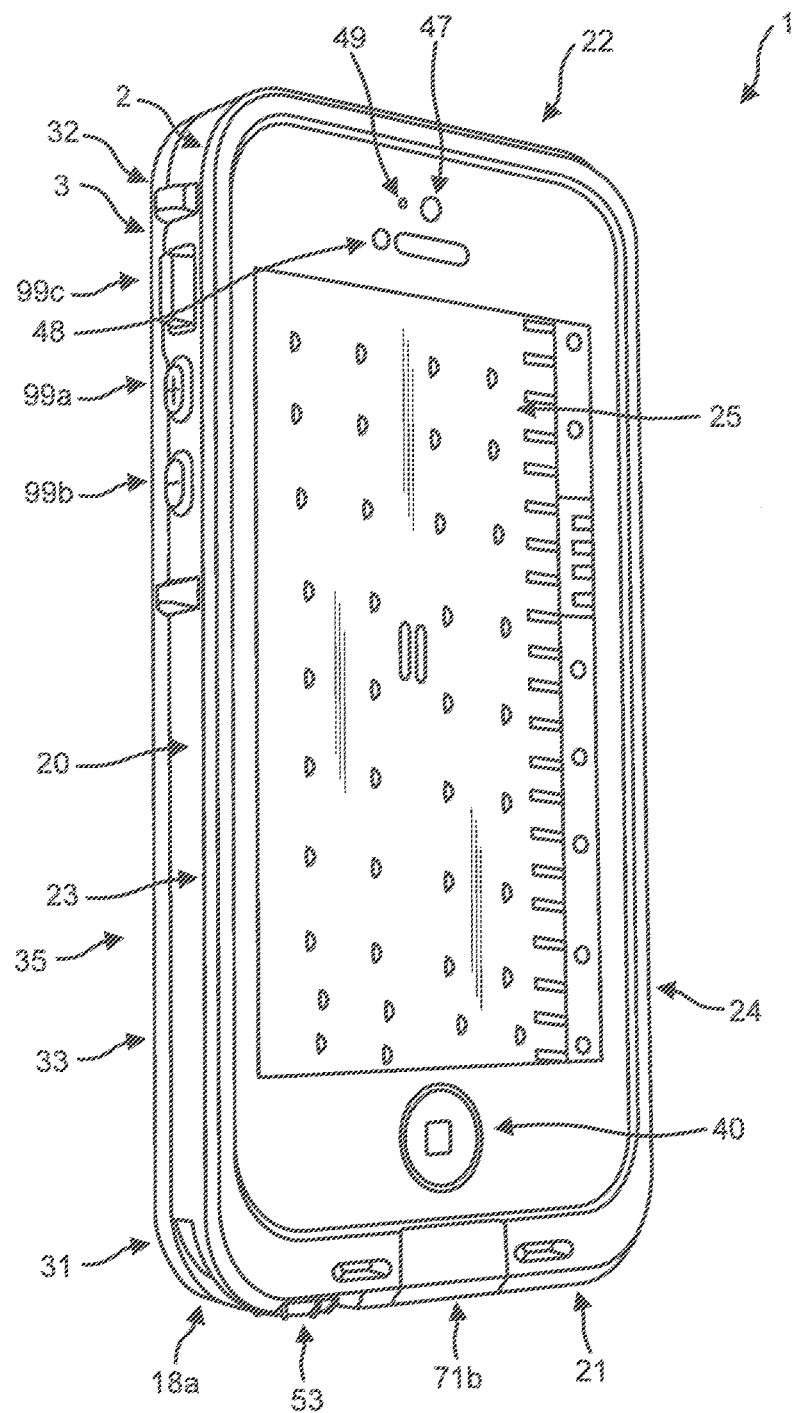
FIG. 1A shows a perspective view of a housing for an electronic device having various features.

This disclosure relates generally to a housing for protecting one or more objects, such as an electronic device having one or more unique features, for instance, a camera feature, sound transmission feature, display feature, and the like. In certain embodiments, the electronic device includes a combined camera and microphone feature, which electronic device is in need of protection from the elements, mishandling, and/or other mistreatment. For instance, in one aspect, the disclosure relates to a housing for protecting an electronic device, for example, an electronic device having both a touch screen interface as well as a camera feature and/or a sound transmission feature, including but not limited to: a computer, a digital tablet computer, a mobile telephone, electronic reader, a personal digital assistant, video recorder, camera, and the like, or as indicated, one or more of the components thereof. In various instances, the electronic device has a combination camera and sound transmission feature, wherein the camera feature may include one or more of a camera lens, a microphone, a speaker, or the like, and a flash lens, such as where the members of the combination are located in the same vicinity.

In certain embodiments, various parts of the housings described herein are sealed against environmental components, including aqueous fluids. In many embodiments described below, these seals are formed sealants, sealing compounds or seals made of substances that allow for a seal to be made. In some instances a gasket, or an O-ring is used to create seals on the housings described herein. One disadvantage to some of these more traditional sealing options is that force must be maintained at the location of the seal to keep environmental components, particularly aqueous fluids, from passing through the sealed area.

In order to form thinner housings that do not need to generate the force to maintain more traditional seals, according to some embodiments of the housing described herein, sealants, seals and sealing compounds include gels and other self-adhesive wetting materials that are able to provide seals with less pressure than traditional sealing mechanisms such as gaskets and O-rings. In certain embodiments, these sealant materials are gels that have hydrophobic cores and hydrophilic surfaces. This allows for the sealant materials to adhere easily to materials such as glass and certain types of plastic or polycarbonate to form a seal which is maintained with much less pressure. These gels can include any appropriate material. These materials include hydrophobic poloxamer materials that are coated in a hydrophilic layer. The poloxamer materials can include polyoxyethylene/propylene co-polymers. Other hydrophobic materials appropriate for use as sealant compositions include Pluronic L-101, Niax 11-34, polyetherurethane, TP 1540, PPO, pyrrol; propylene glycol monobutyl ether and polypropylene glycol. Coatings for the hydrophobic portion of the sealant can include sodium acrylate.

These hydrophobic/hydrophilic sealants require low compression to function compared to traditional sealing methods including gaskets and O-rings. Often, gaskets and O-rings can require 5-50 psi in order to form a seal that will prevent passage of liquids including aqueous fluids. According to certain embodiments, the low compression sealant compositions described herein require 0-80% of the compression force necessary to form seals with traditional seals. According to certain embodiments the low compression sealant compositions require 5-50, 10-40, 15-35, 25-45, 45-65 or 50-80% of the compression force of traditional sealant technology to make a seal that substantially stops the passage of an aqueous fluid. According to other embodiments, the low compression sealant compositions require 0, 1, 2, 3, 4, 5, 6, 7, 8 or 9 psi of pressure to stop the passage of an aqueous fluid. The low compression sealant can stop the passage of an aqueous fluid at sea level or when submerged up to 1, 5, 10, 15 or 20 meters (m) under water. In certain embodiments, the low compression sealant material requires very low pressure to maintain a seal. This pressure can be close to 0 psi, for example 0.01-0.5 psi. This allows for thinner housings to be used because the housings do not have to generate pressure to maintain the seals of the housing. However, the housing still requires some size to retain shock protection for an electronic device.

According to certain embodiments, the hardness of the low compression sealant compositions is also low. In certain embodiments, the hardness of the low compression sealant compositions is 30-70 Shore A. In other embodiments, the hardness of the low compression sealant is between 30 and 60, 30 and 50 or 30 and 40 Shore A. In other embodiments, the hardness of the low compression sealant is about 30, 35, 40, 45, 50, 55, 60, 65 or 70 Shore A.

According to certain embodiments, the low compression sealant compositions described herein are also self-healing. This means that the materials will tend to reform into their original shape when they have been deformed.

The housings described herein also can include various bumper, padding, socks, overmoulding and other shock resistant structures. These structures can be made of any material that can provide shock absorption. These materials can include a flexible or semi-flexible material such as TPE, silicone, polypropylene, or other such rubber material. In other embodiments, this material can also be any of the sealant materials described above including low compression sealant compositions.

Hence, in some embodiments, such as where a front surface membrane is provided, e.g., on a top member, the membrane may completely cover the front surface of an electronic device when the device is encased within the housing, however, in some embodiments, as described above, the membrane may cover less than the entire front surface, such as covering only a perimeter portion of the front surface thereby leaving the interactive touch portion of the front screen of the electronic device uncovered. In such an instance, the perimeter portion of the membrane may include a seal, such as a gasket or a low compression sealant material as described above, so as to maintain the housing's overall waterproof, dustproof, and/or shockproof properties. The material can circumscribe the entire perimeter portion of the top member front surface membrane.

In certain embodiments, the housing may be a case configured for encasing a device, such as an electronic device and/or camera device, for example, a mobile telephone or computer device having a camera feature. Accordingly, in various aspects, a housing for encasing an object, such as an electronic device, methods of using the object, e.g., electronic device, and/or systems for the same are provided. For instance, in one particular embodiment, a housing for encasing a device, such as an electronic device, is provided. The housing may be configured such that the device may be fitted within the housing and be protected thereby, such as from liquid, dust and/or shock. In various embodiments, the housing is specifically configured so as to accommodate the various functions of the underlying device housed therein with a minimal of user disturbance.

The housing may include a plurality of separate members, such as a top member and a bottom member that are designed to be coupled together, or may include two members that are joined by a common member, e.g., a hinge member, which members are designed to come together around an object to be encased so as to form a liquid- and/or dust-tight seal. In certain embodiments, the housing may be comprised of a single member that is configured to be folded upon itself around the device to be encased, in such an instance, a portion of the member may comprise a top member and another portion of the member may comprise a bottom member.

In various instances, a member of the housing includes a camera feature and/or sound transmission feature configured to be aligned with a camera and/or sound transmission feature of an underlying device, which camera feature and/or sound transmission feature of the housing is designed such that it does not substantially interfere with the use of the feature of the underlying device, while at the same time, protects said feature from damage from liquid, dust, and/or shock. In various instances, the camera and/or sound transmission feature of the housing and underlying device additionally includes a combined camera and microphone and/or speaker feature in close proximity to one another. For instance, the camera feature of the housing may include one or more of a camera lens, a flash lens, and/or a microphone, and/or a speaker feature, wherein a combination of these elements may be positioned in any logical order in close proximity to one another. Such elements may further include one or more additional features configured to prevent the transmission and/or interference of light or sound caused thereby, from impinging or otherwise interfering with the functioning of the other elements. Accordingly, one or more of the camera lens, flash, and/or sound transmission features may include a lens or sound skirt designed to prevent the errant transmission or light and/or sound.

There are several advantages achieved by the housings provided herein. For instance, in certain instances, a housing of the disclosure may provide a measure of shock absorbance for the protection of an encased device or components thereof. In certain instances, the housing may be configured to provide a measure of liquid and/or dust resistance for the protection of the encased device and/or components thereof. For example, in various instances, the housing may be liquid proof (e.g. waterproof) and/or dustproof and/or shockproof.

A housing as disclosed herein can also provide protection against the scratching, marring, chipping, breaking, fracturing, and the like of the underlying device or components thereof. In certain instances, the shock and/or liquid, e.g., water, resistance, is provided while at the same time as maintaining the unique technical or design features of the encased device. In various instances, the housing is designed to increase the light and/or sound transmission qualities of the underlying device, e.g., allowing use of the camera without substantial interference from the housing, allowing for the clear transmission of light and/or sound, and in some instances, enhancing the quality of said light or sound transmission, such as by amplifying light and/or sound and/or light and/or sound quality. In some instances, these advantages are provided by the housing without substantially increasing the size and/or the weight of the underlying device.

For instance, in some embodiments, the dimensions of the housing fall within the following ranges. The thickness of the various members, e.g., a top or bottom member, which members may be separate individual members capable of being coupled together, e.g., by snapping, joined by a common hinge, or a single member, and may have a thickness of about 25.4 mm or less, such as 20 mm or less, for instance, about 15 mm or less, including about 13.5 mm or about 10 mm or less, such as about 8 mm, or about 5 mm, for instance, about 4 mm or less, including about 3 mm or about 2 mm or less, for example, about 1.5 mm or 1.0 mm or less, even about 0.1 mm.

For example, in various instances, such as where the device to be contained is a mobile telephone or PDA device or tablet device, the thickness of a top and/or bottom member may be less than about 8.5 mm, such as less than about 7.0 mm, less than about 6.5 mm, for example, less than 6 mm thick, such as about 5 mm or about 4 mm, including about 3 or about 2 mm thick or less. Where the device to be contained is a mobile computer, such as a mobile tablet computer, electronic reader, or video display, the thickness of a top and/or bottom member may be less than about 15 mm, less than about 12.5 mm or about 10 mm, such as less than about 8.5 mm or less than about 7 mm or less than about 5 mm, such as less than about 4.0 mm, less than about 3.5 mm, for example, less than about 2 mm thick, such as about 1 mm thick.

In certain instances, such as where the object to be contained is a mobile electronic device, the weight of a top and/or bottom member of the housing may be less than about 10 or about 8 ounces, such as less than about 6 or about 4 ounces, for instance, less than about 3 ounces or about 1 ounce, including less than about 28 or about 27 grams. Accordingly, in one embodiment, due to the design features described herein, a housing of the disclosure is capable of providing shock and liquid resistance to a housed device, while only having a thickness and/or weight in the range recited above.

Further, in certain instances, the length and/or width of the top or bottom member may be such that it is no longer or wider than about 10 mm of the underlying device it is designed to encase, no longer or wider than about 8 mm or about 5 mm, for instance, no longer or wider than about 4 mm, including no longer or wider than about 3 mm or about 2 mm than the device the housing is designed to encase. For example, in various instances, the length and/or width of a top and/or bottom member may be less than 2.5 mm, such as less than 2.0 mm, less than 1.5 mm, for example, less than 1 mm more than the length and/or width of the device the housing is designed to house. Accordingly, in certain instances, a housing of the disclosure is configured so as to be substantially form fitting with the device it is meant to contain.

In one embodiment, due to the design features described herein, a housing of the disclosure is capable of providing liquid, dust, and shock resistance to a housed device, while only having a relative length and/or width in the ranges recited above. Several formulas may be employed for determining an adequate width and/or length of a particular housing, and thus, may be easily ascertained by determining the width and/or length of the underlying device, x, and providing a housing that has a dimension, y, such as one of the dimensions recited above, that is in addition to the dimension of the underlying device. Specifically, if the dimension of the device is x, then the dimension of the housing will be (x+y), where y is one of the dimensions set forth above, such as about 0.5 mm, about 1 mm, about 1.5 mm, about 2 mm, about 2.5 mm, about 3 mm, about 3.5 mm, etc. thicker, wider, and/or longer than the housed device. An alternative formula for determining an adequate length, width, or thickness of a housing may be to measure the distance y from the interior of the housing, which contacts the encased device, to the exterior of the housing, wherein y is within one of the ranges recited above.

To ensure the appropriate thickness, length, and/or width and/or weight of the housing have been provided, the device may be fitted within the housing, then the housing closed, and the housing and/or seal thereof may be tested for its ability to provide shock and/or liquid resistance, such as by experimentally dropping the housed device and/or exposing it to wet conditions. The thickness, length, and/or width and/or weight of the housing should be provided in such dimensions so that the encased device is not broken, cracked, or otherwise damaged by the dropping and/or exposure to liquid, e.g., water in all its forms.

In certain embodiments the top member and the bottom member of the housing are configured for being coupled together so as to from a waterproof and/or shockproof seal. By water-resistant or waterproof seal is meant that a seal is formed by the coupling of the top member with the bottom member which seal does not substantially allow the passage of liquid, e.g., water, from one side of the housing (e.g., outside of the housing) to the other side of the housing (e.g., inside of the housing).

FIG. 1A provides a housing for housing an electronic device, such as a mobile computing device like a tablet computer, a mobile telephone, an electronic reader, a personal digital assistant, and the like, and in this instance having a thin profile. In various instances, the underlying device to be housed may be a device having one or more unique features associated therewith it. Such features may include a camera feature, a speaker feature, a microphone feature, and/or a display feature. In various instances, the camera feature and/or microphone and/or speaker feature and/or display feature may be positioned within the same proximity of one another. In various instances, the device to be housed may further have music playing capabilities, for instance, the device may be an Apple iPhone®, Apple iPod®, or an iPod Touch® device. It is understood that although these features are depicted in a certain position as contained within an electronic device of the disclosure, with respect to the appended figures, the order and positioning of these features and the elements corresponding thereto may differ and in many instances may be changed within the electronic device as desired. Consequently, the order of the corresponding features of the housing will be changed accordingly. Further, an exemplary electronic device may be described as one or more of an Apple iPhone®, Apple iPod®, or an iPod Touch® device, this is for exemplary purposes only and is not meant to be unduly limited thereto.

As indicated, FIG. 1A provides a housing 1 for a device 100. The housing includes a top member 2 and a bottom member 3 that when coupled together from the housing 1. The top member 2 of the housing 1 includes a front surface 25 that is surrounded by a perimeter portion 20. The perimeter portion 20 is defined by a proximal end portion 21 and a distal end portion 22 as well as opposing side portions 23 and 24. The front surface 25 of the top member may be composed of the same material or different materials which materials may be the same or different from the material or materials of the perimeter portion.

In certain embodiments, the front 25 surface of the housing 1 is comprised of at least one membrane. Further, the front membrane may include a number of features, such as a camera, e.g. video or camera feature 47, a proximity sensor feature 48, and/or a button feature 40. In other embodiments, the front surface of the top 2 of the housing 1 may include a number of features, for example, an ambient light sensor feature 49, and an acoustic aperture (or sound transmission feature) for transmitting incoming or outgoing sound 46. Features such as the video or camera feature 47, proximity sensor feature 48, and ambient light sensor feature ("ALS"; 49) are preferably optically clear. The acoustic aperture for transmitting sound 46 preferably is covered by an element (not shown) capable of preventing liquid, dirt, dust, and the like from entering into the housing. For example, a sound transmissive yet water-impermeable material (e.g., Gore-Tex® and other materials having similar properties; not shown) may be used. In housing embodiments intended to house electronic devices that include a microphone and a speaker positioned adjacent to an acoustic aperture of housing, in addition to the sound transmissive but water-impermeable material the housing may further include one or more internal sound inhibiting gaskets or seals that partition the acoustic aperture to prevent internal transmission of sound between sound receiving and generating portions of the electronic device (e.g., microphones and speakers, respectively) and thus function as sound guide channels for directing sound into and/or out of the housing 1 via the sound transmission feature 46.

As those in the art will appreciate, the invention envisions embodiments wherein one, some, or all the camera, proximity sensor, ALS, and/or other features and acoustic aperture are present on the front surface of a housing according to the invention outside of the area that interfaces with the display or interactive touchscreen of electronic device to be housed within the housing. In other embodiments, other features may also be included. Also, as is known in the art, preferred proximity sensors employ an infrared (IR) light source and IR detector. Proximity sensors are used in smart phones, for example, to detect when the device is brought near a user's face such that the touchscreen can be deactivated to conserve battery power and/or prevent inadvertent inputs. Unless otherwise indicated, a proximity sensor feature thus allows both for the transmission of IR radiation from the IR light source as well as incoming IR radiation, particularly IR radiation from the IR light source that is reflected by an object and then detected by the IR detector of the electronic device's proximity sensor. An ALS is typically used to adjust display brightness, which also conserves energy. Cameras may be capable of capturing single or multiple digital images.

Figure 1B:
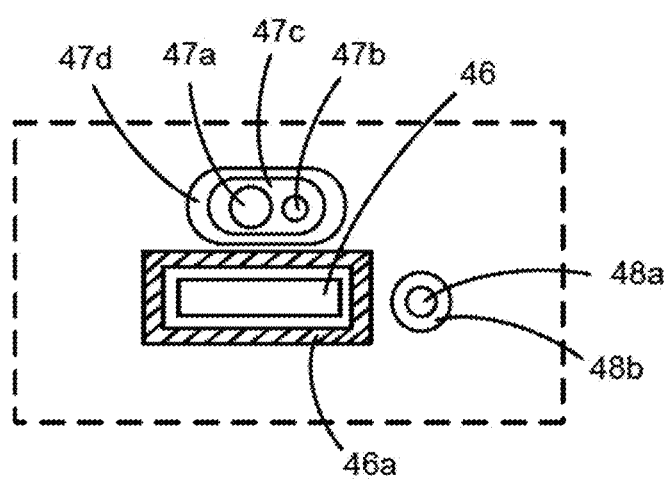
FIG. 1B shows a schematic of the inner surface of the top member of an encasement, including gaskets and seals associated with a camera feature, ambient light sensor feature, and acoustic aperture.

FIG. 1B shows the inner surface 25*a* of the hatched portion of the top 2 of the housing depicted in FIG. 1A. To prevent or attenuate transmission of sound and light between different electronic components in an electronic device (not shown) disposed in the housing 1 different combinations of material and gaskets are preferably employed. In the embodiment shown in FIG. 1B, a thin, optically clear layer of poly(ethylene terephthalate) (PET; 47*c*) is placed on the inner surface 25*a* of the top 2 of the housing. In certain embodiments, the optically clear layer of PET 47*c* is bonded via an optically clear adhesive 47*d* to the inner surface 25*a* of the top 2 of the housing. In specific embodiments, the optically clear layer of PET 47*c* bounds the video or camera feature 47 and/or the ambient light sensor feature 49. Another gasket or seal 46*a* bounds the acoustic aperture 46, and another gasket or seal 47*d* bounds the proximity sensor feature 48 and the camera or video feature 47. These gaskets or seals 46*a* and/or 47*d* may be made any suitable material, may be integrated into single gasket, and provide for sound-tight seals when an electronic device having complementary electronic components is properly sealed within the housing 1. In certain embodiments, a single gasket surrounds the acoustic aperture 46, proximity sensor 48, ambient light sensor 49 and camera or video feature 47. In other embodiments, at least one of the acoustic aperture 46, proximity sensor 48, ambient light sensor 49 and camera or video feature 47 are outside of the limits of the single gasket. In another embodiment, the proximity sensor feature 48 has its own gasket 48*a* surrounding it.

Figure 1C:
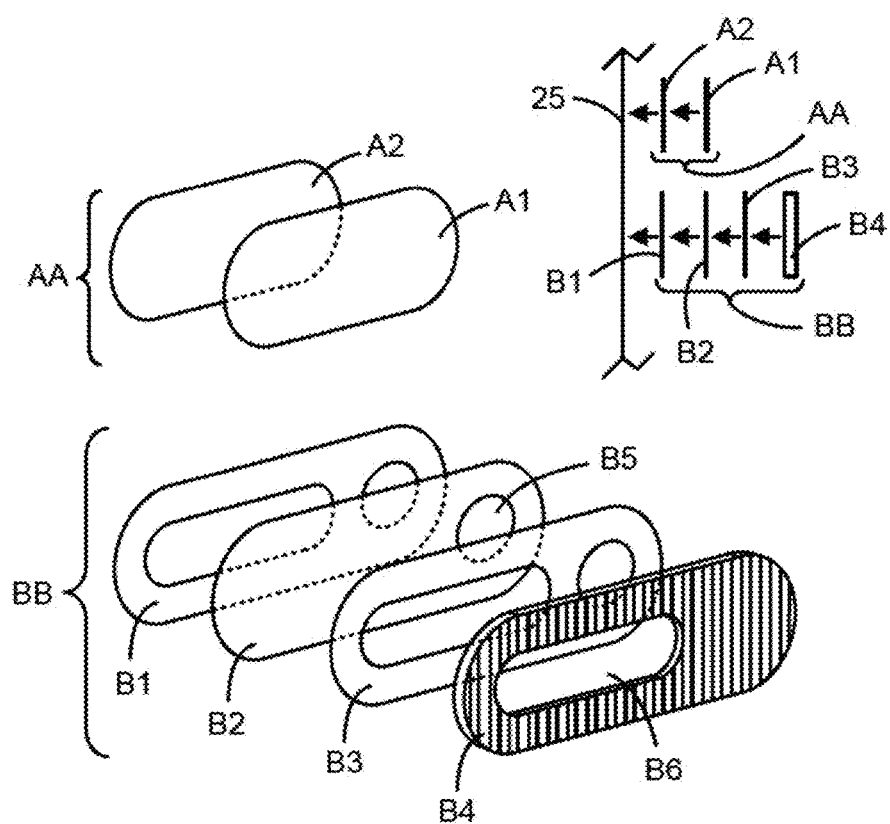
FIGS. 1C-E show preferred embodiments of multi-layered acoustically and optically transmissive seals.
Figure 1D:
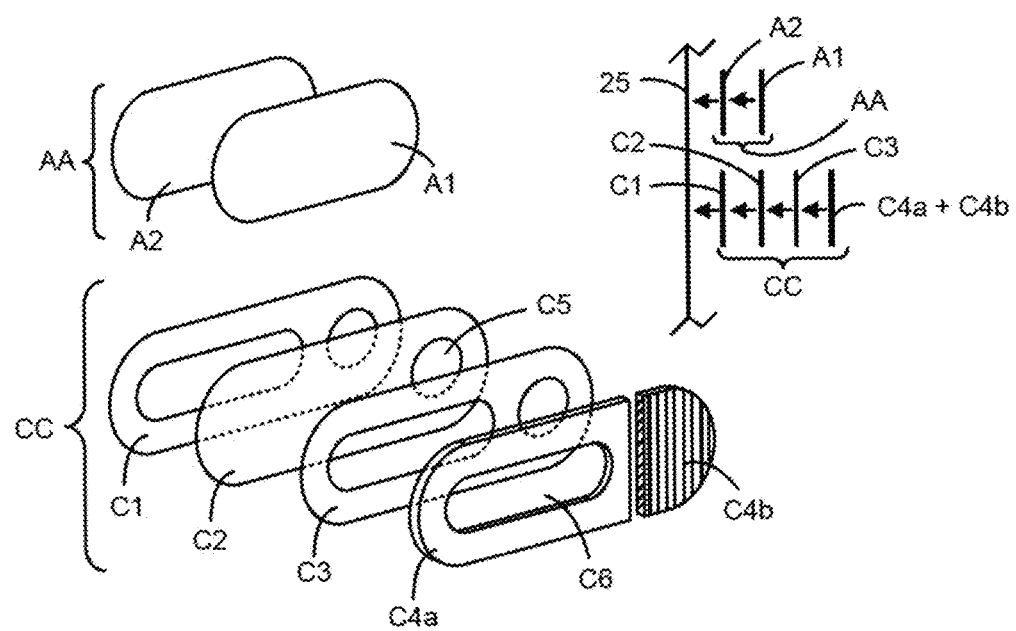
Figure 1E:
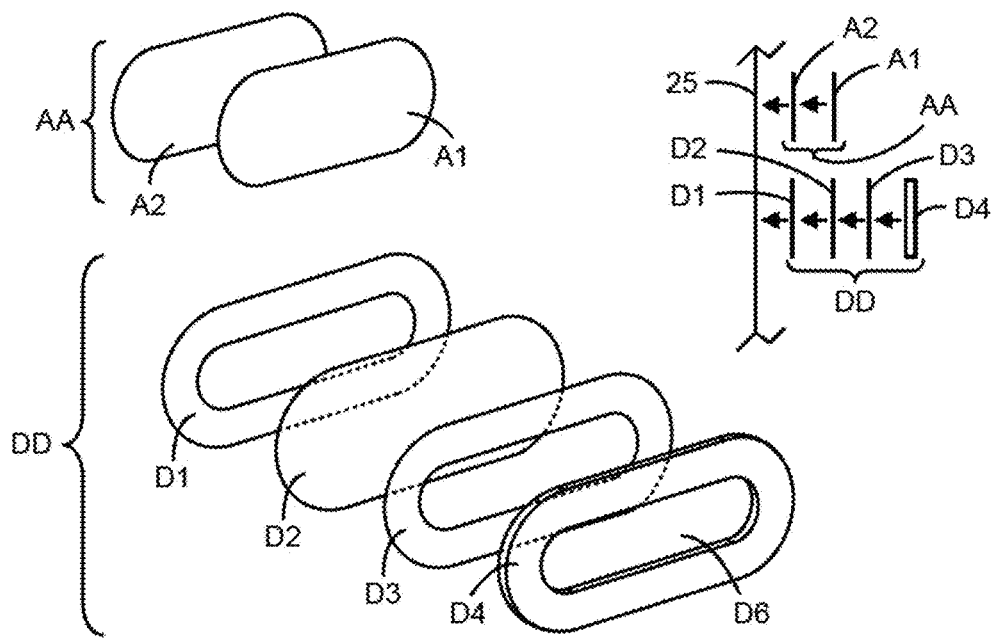

FIGS. 1C-E depict various preferred embodiments of materials used to provide hard, acoustically transmissive but water/dirt/dust-tight seals and optically transmissive layers in housings according to the invention. FIG. 1C illustrates two multi-layered configurations, AA and BB, for adhering to the inside of the front surface 25 of a housing according to the invention layers used to provide optically and acoustically transmissive features to a housing according to the invention. Configuration AA includes a thin, optically clear layer (A1; preferably made from PET) adhered to the inside of the front surface 25 using a suitable, optically clear adhesive A2. Such a configuration of optically clear materials can enhance the optics of the camera feature 47*a* on the front surface 25 of a housing of the invention, thereby providing for enhanced performance of a forward-facing camera in an electronic device (e.g., an iPhone 5) disposed in the housing. As will be appreciated, in the embodiment shown in FIG. 1C, configuration AA includes both a camera feature and an ALS feature. The invention envisions other embodiments where the optically clear layer and optically clear adhesive are found only as part of the camera feature, but are not included as part of the ALS feature. In preferred embodiments, an AA configuration is used to ameliorate birefringence attributable to front surface 25 of the housing.

Configuration BB, which creates a sound-transmissive, watertight seal over an acoustic aperture in the front surface of the housing, includes an advanced light control film (ALCF; B4) bonded via an adhesive layer B3 to an acoustic membrane B2, which is in turn adhered to the inside of the housing's front surface 25 using a layer of adhesive B1. The acoustic membrane B2 includes an opening B5 to allow light transmission to and from the proximity sensor of a housing-compatible electronic device. In certain embodiments, the light is infrared light. However, the light could be any wavelength of light that is consistent with the operation of a proximity sensor. The ALCF serves to filter at least some of the incident light entering the housing from the outside environment, minimizes light reflected from the inner face of the front surface of the housing from being sensed by the proximity sensor detector, and includes an acoustic opening B6 to allow efficient sound transmission. The ALCF can be made from any suitable material, including those containing prisms, oriented carbon nanotubes, etc. Any suitable adhesives can be employed in adhesive layers B1 and B3. The adhesives used to form such layers are preferably not applied to areas on the acoustic membrane B2 and ALCF B4 layers that form the acoustic aperture and proximity sensor features of the housing. The combined thickness of the various layers used to form configurations AA and BB should not interfere with or impinge upon an electronic device housed within a housing that includes such elements. Of course other or additional layers may be included, for example, a sound-channel forming seal. In certain configurations of BB, the layers B3 and B4 and any additional layers are used as a spacer between the electronic device and B2.

Direct contact of the acoustic membrane and the electronic device can cause interference and garbling of the audio signal transferred across the acoustic membrane. Including a space between the electronic device and the acoustic membrane reduces this interference. This space between the acoustic membrane and the electronic device can be between 0.1 and 10 mm. In certain embodiments, the space between the acoustic membrane and the electronic device can be about 0.1, 0.5, 1, 2, 3, 4, 5, 6, 7, 8, 9 or 10 mm. In other embodiments, the space between the acoustic membrane and the electronic device can be between 0.1 and 1 mm, 1 and 5 mm, 5 and 10 mm, 2 and 7 mm, 3 and 8 mm, 4 and 9 mm, 5 and 10 mm or 0.5 and 2.0 mm.

It should also be appreciated that in certain embodiments, the AA configuration is used in the absence of the BB configuration and vice versa.

FIG. 1D shows a variation of the embodiment depicted in FIG. 1C. In the embodiment shown in FIG. 1D, configuration AA is the same as the configuration AA shown in FIG. 1C. Configuration CC is similar to configuration BB of FIG. 1C, the difference being that the ALCF structure (B4, FIG. 1C) is replaced by two pieces, one made of a compressible material, for example foam C4*a*, the other of a suitable ALCF material C4*b*. FIG. 1E shows another variation of the embodiment depicted in FIG. 1C. In the embodiment shown in FIG. 1E, configuration AA is the same as the configuration AA shown in FIG. 1C. Configuration DD is similar to configuration BB of FIG. 1C, the difference being that the ALCF structure (B4, FIG. 1C) is replaced by a piece of foam D6 having an opening D6.

FIGS. 1C-E depict three aspects of the housing described herein. The first aspect is represented by the embodiment presented as AA. This embodiment shows a transparent layer adhered to the inner surface of the housing proximate to the location of the video or camera feature of the housing. This transparent layer can be made of plastic, glass, or any other transparent or translucent material. This transparent layer can focus light as it passes through it. The transparent layer could also polarize light as it passes through it. The transparent layer could also filter light as it passes through it. This filtering could involve opacity to certain wavelengths of light, allowing only visible light of a certain color through, or only visible light. The filter could substantially allow visible light of between 380 and 450 nm, 450 and 495 nm, 495 and 570 nm, 570 and 590 nm, 590 and 620 nm or 620 and 750 nm, such that a person viewing the light passing through the filter would see the light as violet, blue, green, yellow, orange or red. The filter could also be substantially opaque to infrared or ultraviolet light.

The transparent layer can be attached to the inner surface of the housing by any method known in the art. FIGS. 1C-E depict the use of a transparent adhesive. The transparent layer could also be molded onto the inner surface of the housing. The transparent layer could also be physically affixed to the inner surface of the housing by using a physical coupler that holds the transparent layer in place. The physical coupler could be itself adhered to the housing or attached to the housing in some other way.

The second aspect is represented in part as B4, C4a and D4. These aspects are spacers that separate the electronic device from the acoustic membrane. It was found that in certain embodiments, contacting the acoustic membrane to the electronic device directly distorted the sound passing through the acoustic membrane. In order to reduce distortion, a spacer is introduced, as explained above. Further, this spacer can be positioned to prevent leakage of acoustic energy within the housing from speakers at other positions on the electronic device. This spacer can act as an acoustic shield that blocks 10-100% of the acoustic energy generated at other positions by the electronic device or transmitted through the housing from outside the housing. This shielding prevents acoustic artifacts with interfering with reception of sound by microphones in the electronic device. The spacer can be positioned to surround only the acoustic aperture, or the acoustic aperture and any one or more of the ambient light sensor, the proximity sensor and/or the camera or video aperture or any other feature located near the acoustic aperture on the electronic device. In other embodiments, this spacer is entirely absent.

The third aspect is represented, in part, as C4b and B4. This element is a light gasket that limits the path of light taken pertaining to the proximity sensor. In certain embodiments, proximity sensors in portable electronic devices operate by emitting light and receiving reflected light emitted by the proximity sensor. In the absence of a case, housing or encasement portion over the proximity sensor, the emitted light reflects off an object located in proximity to the proximity sensor of the electronic device. In certain embodiments, the proximity sensor will cause a display component of a portable electronic device to be powered down when the proximity sensor detects that the portable electronic device is near an object. In certain embodiments, the portable electronic device is a mobile phone and the nearby object is the head of an operator using the mobile phone. The screen of the mobile phone need not be active when the mobile phone is near the head of the operator when the mobile phone is carrying a phone call. Thus, in this embodiment, the display of the mobile phone is inactivated when it is near the head of the operator.

Figure 1F:
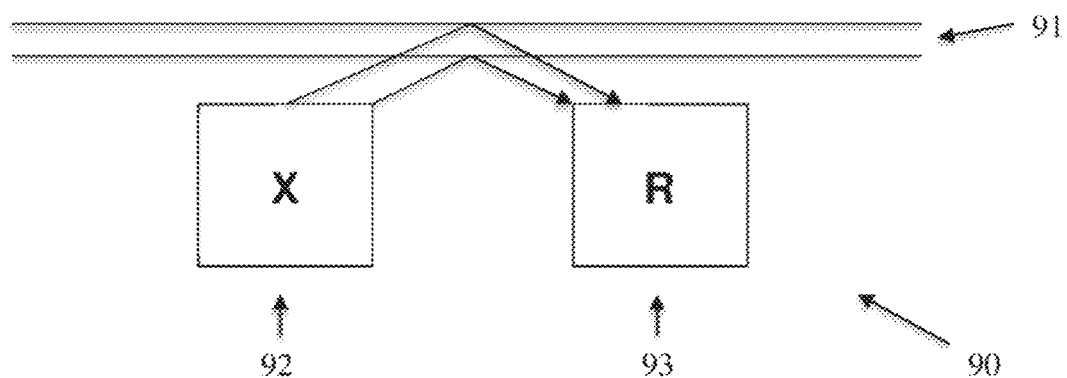
FIG. 1F shows a schematic of a side view of light emitted from an emitting portion of a proximity sensor and reflected from a portion of a housing proximate the sensor.

In certain embodiments, the proximity sensor of the portable electronic device includes an emitting portion and a receiving portion. In certain embodiments, the emitting and receiving portion of the proximity sensor are located near each other on the portable electronic device. As shown in FIG. 1F, in embodiments, wherein a housing, case or encasement covers a proximity sensor 90 of the portable electronic device, it is possible that light emitted by the emitting portion of the proximity sensor 92 can be reflected by the portion of the housing, case or encasement proximate the proximity sensor 91 to the receiving portion of the proximity sensor 93. This can cause the proximity sensor 90 to inactivate a display on the portable electronic device at inappropriate times. For example, when the portable electronic device is a mobile phone, this inappropriate reflection could cause the display of the mobile phone to be inactivated when the mobile phone starts processing a phone call, even when the mobile phone is not in proximity to the head of the operator. In certain embodiments, the housing, case or encasement is transparent or translucent at least at the portion that is proximate to the proximity sensor, thereby allowing light emitted from the emitting portion 92 to pass through the housing, case or encasement 91. In certain embodiments, the portion of the housing, case or encasement that is proximate to the proximity sensor also reflects at least some of the light that is emitted from the emitting portion of the proximity sensor 92 and at least a portion of this light is reflected back to the receiving portion of the proximity sensor 93. The light can be reflected off of the inner surface, outer surface or some combination of both surfaces of the housing, case or encasement. In certain embodiments, 1, 2, 3, 4, 5, 10, 15, 20, 25, 30, 35, 40, 45, 50, 55, 60, 65, 70, 75, 80, 85, 90, 95 or 100% of the light emitted from the emitting portion of the proximity sensor 92 is reflected to the receiving portion of the proximity sensor 93 without passing through the housing, case or encasement 91.

In certain embodiments, the emitting portion and the receiving portion of a portable electronic device are located within 0.01, 0.05, 0.1, 0.2, 0.3, 0.4, 0.5, 0.6, 0.7, 0.8, 0.9, 1.0, 1.2, 1.4, 1.5, 1.8, 2.0, 3.0, 4.0, 5.0, 6.0, 7.0, 8.0, 9.0 or 10 mm apart. The light gasket prevents light emitted from the emitting portion from being reflected by the housing, case or encasement portion that covers the proximity portion of the portable electronic device to the receiving portion of the proximity sensor of the portable electronic device. In certain embodiments, the light gasket inhibits the amount of light from the emitting portion being reflected by the housing, case or encasement portion that covers the proximity sensor of the portable electronic device to the receiving portion of the proximity sensor of the portable electronic device by 5, 10, 15, 20, 25, 30, 35, 40, 45, 50, 55, 60, 65, 70, 75, 80, 85, 90, 95, 96, 97, 98, 99 or 100%.

Figure 1G:
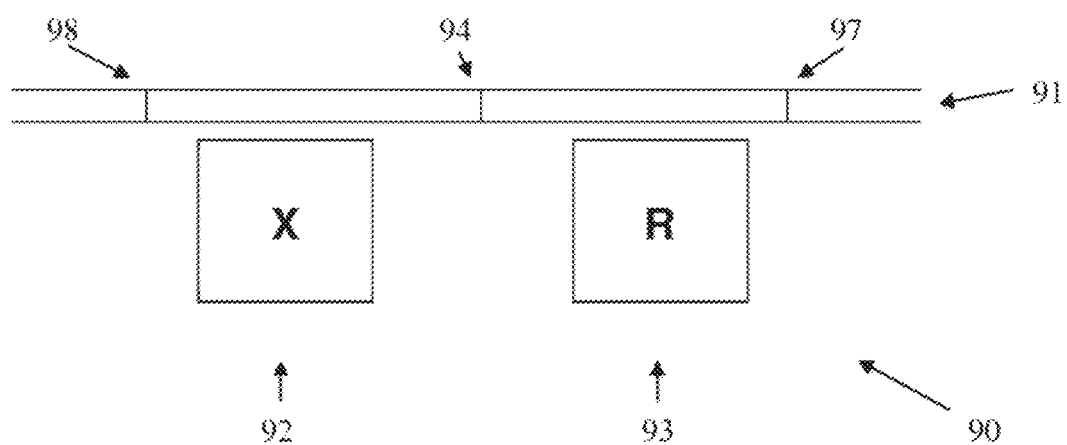
FIG. 1G shows a schematic of a side view of a light divider that is proximate to a proximity sensor.
Figure 1H:
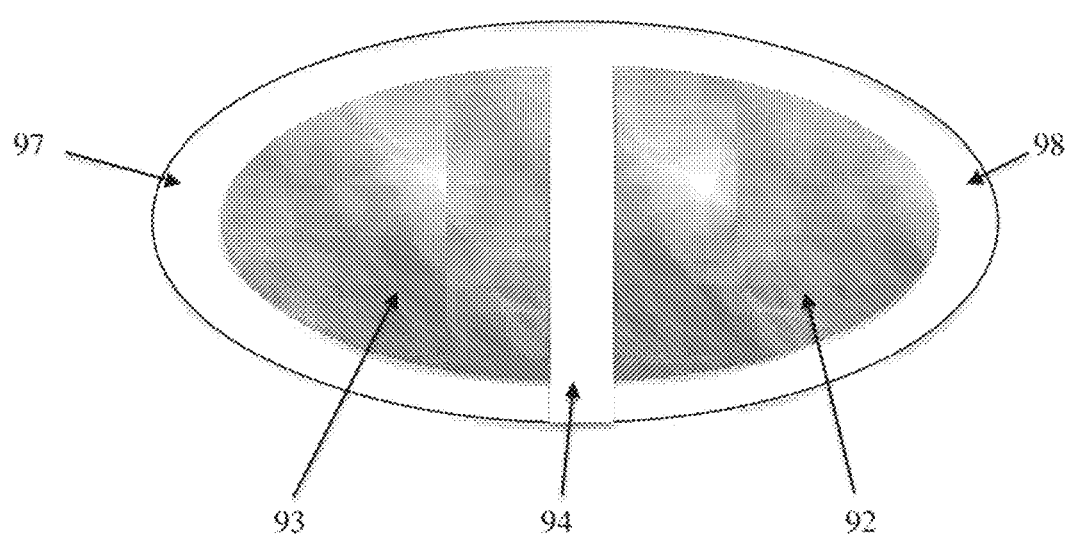
FIG. 1H shows a front view of a light divider.

The light gasket can include one or more light dividers. In certain embodiments, light dividers prevent light being emitted at certain angles from the emitting portion of the proximity sensor on the portable electronic device to be blocked, thereby preventing them from reflecting off of the housing, case or encasement and directly back to the receiving portion of the proximity sensor on the portable electronic device. As shown in FIG. 1G, in certain embodiments, the light gasket includes at least one light divider 94 positioned between the emitting portion 92 and the receiving portion 93 of the proximity sensor 90. The light divider can penetrate the housing, case or encasement as shown in FIGS. 1G and 1H. The portion of the light divider that extends into the housing, case or encasement 95 can extend fully through the housing, case or encasement or partially through. The light divider may pass through 25, 30, 35, 40, 45, 50, 55, 60, 65, 70, 75, 80, 85 90, 95 or 100% of the housing, case or encasement. Further, the light divider can extend below the case into any space that exists between the housing, case or encasement and the portable electronic device 1. The portion of the light divider that exists between the housing, case or encasement and the portable electronic device 96 may block light from passing through 25, 30, 35, 40, 45, 50, 55, 60, 65, 70, 75, 80, 85 90, 95 or 100% of any space that exists between the housing, case or encasement and the portable electronic device 1.

In certain embodiments, the light gasket can include a plurality of light dividers. In one embodiment, one or more light dividers 94 can be placed between the emitting portion 92 and the receiving portion 93 of the proximity sensor, as shown in FIG. 1G. In other embodiments, light dividers can also be placed outside of the emitting portion 92 and/or the receiving portion 93 of the proximity sensor. These light dividers are shown schematically in FIG. 1G as 97 and 98. The properties of each of these light dividers can be as described above for the single light divider 94. This configuration is shown from a top view in FIG. 1H. The center light divider 94 is shown bisecting the portion of the housing, case or encasement that is transparent or translucent and proximate to the proximity sensor. The external light dividers 97, 98 wrap around the outer surface of the housing, case or encasement that is transparent or translucent and proximate to the proximity sensor, delimiting the edges of the emitting portion 92 and receiving portion 93 of the proximity sensor that has optical access to the outside of the housing, case or encasement.

Figure 1I:
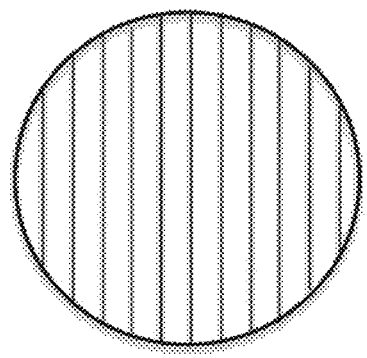
FIG. 1I shows a schematic of a plurality of parallel light dividers.
Figure 1J:
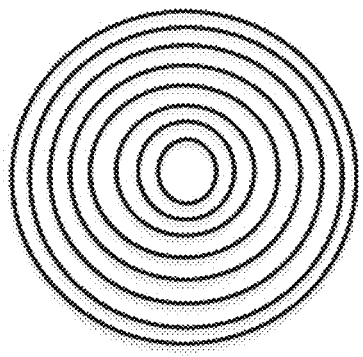
FIG. 1J shows an embodiment of a plurality of concentric light dividers.

The light gasket can also be a plurality of light dividers that are positioned over some portion of the emitting portion 92 and/or the receiving portion 93 of the proximity sensor. The plurality of light dividers can be arranged in a series of slits or a grid. The series of slits can include a plurality of light dividers that are parallel to each other as shown in FIG. 1I. In other embodiments, the light dividers provide slits that are made up of concentric shapes, for examples circles as shown in FIG. 1J. The concentric shapes could also be squares, rectangle, parallelograms or any trapezoidal shape. The concentric shapes could also be ovals, ellipses, triangles, pentagons, hexagons, octagons, nonagons, decagons, 11, 12, 13, 14, 15, 16, 17, 18, 19 or 20 sided shapes. Concentric shapes with greater numbers of sides can also be used. The light dividers can also be arranged in a grid. The grid can be any combination of non-parallel lines that cross. The shapes formed by the grid can be regular or irregular and can have any number of sides. In certain embodiments, the shapes formed by the grid include squares, rectangle, parallelograms or any trapezoidal shape. The shapes formed by the grid could also be ovals, ellipses, triangles, pentagons, hexagons, octagons, nonagons, decagons, 11, 12, 13, 14, 15, 16, 17, 18, 19 or 20 sided shapes. Shapes with greater numbers of sides can also be used. A grid can also be made by forming holes in an opaque material. These holes can be any shape including squares, rectangle, parallelograms or any trapezoidal shape. The shapes could also be ovals, ellipses, triangles, pentagons, hexagons, octagons, nonagons, decagons, 11, 12, 13, 14, 15, 16, 17, 18, 19 or 20 sided shapes. Shapes with greater numbers of sides can also be used.

Figure 1K:
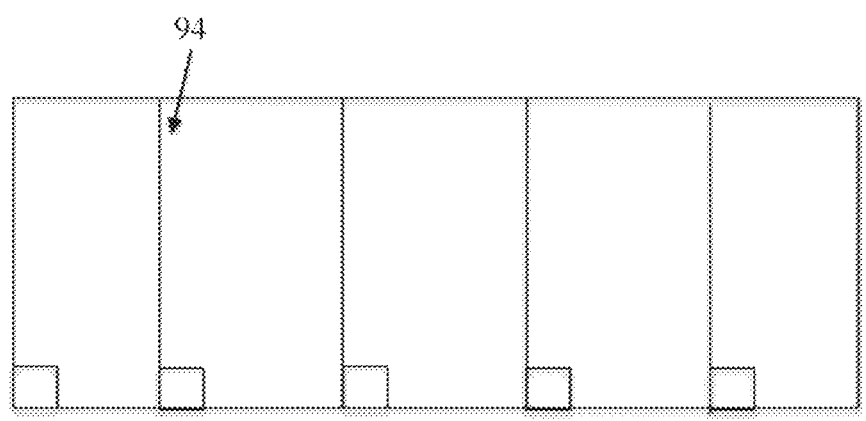
FIG. 1K shows an embodiment wherein the light dividers are positions at a 90 degree angle to the plane of the housing, case or encasement proximate to the proximity sensor of the portable electronic device.
Figure 1L:
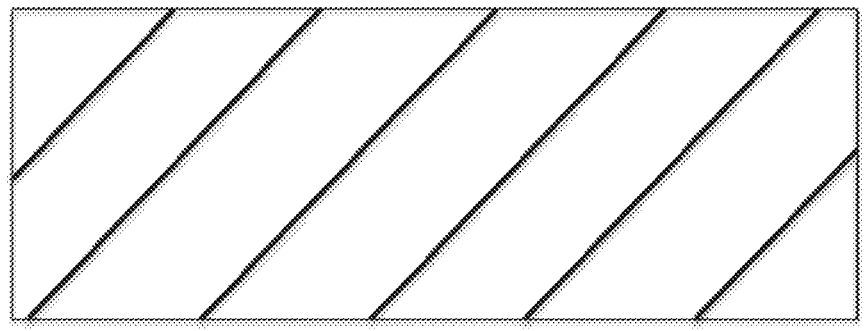
FIG. 1L shows an embodiment wherein the light dividers are positioned at a 45 degree angle to the plane of the housing, case or encasement proximate to the proximity sensor of the portable electronic device.

In certain embodiments, the spaces between the light dividers formed as slits or spaces in a grid have an average width between 50 to 500 μm or from 70 to 200 μm. In other embodiments, the widths of the slits or spaces in the grid are 50, 100, 150, 200, 250, 300, 350, 400, 450, 500, 550, 600, 650 or 700 μm. Width is measured as the size of the light divider in the direction in parallel with the surface of the portable electronic device when the housing, case or encasement is closed around the portable electronic device. In certain embodiments, the light-transmitting portion in between the light dividers has a larger width than the width of the light dividers. This maximizes the transmittance of light through the housing, case or encasement to and from the proximity sensor. The width of the light dividers can be between 1 and 100 μm, or 10 and 50 μm. In other embodiments, the widths of the light dividers are 50, 60, 70, 80, 90, 100, 110, 120, 130, 140, 150, 160, 170, 180, 190 or 200 μm. In other embodiments, the angle of the light divider is between 40 to 90 degrees from the plane of the housing, case or encasement proximate to the proximity sensor of the portable electronic device. FIG. 1K shows an embodiment wherein the light dividers are positions at a 90 degree angle to the plane of the housing, case or encasement proximate to the proximity sensor of the portable electronic device. FIG. 1L shows an embodiment, wherein the light dividers are positioned at a 45 degree angle to the plane of the housing, case or encasement proximate to the proximity sensor of the portable electronic device. In other embodiments, the angle of the light divider is 40, 45, 50, 55, 60, 65, 70, 75, 80, 85 or 90 degrees from the plane of the housing, case or encasement proximate to the proximity sensor of the portable electronic device.

The thickness of the one or more light dividers can be suitably determined according to the other properties of the light gasket. As the thickness of the light dividers decreases, the effect to control the propagation direction of light tends to decrease. When the thickness of the louver layer is large, it is difficult to decrease the total thickness of the light gasket. Accordingly, the thickness of the light dividers is preferably from 10 to 1,000 μm, more preferably from 40 to 500 μm. In certain embodiments, the thickness if the light dividers is 10, 100, 200, 300, 400, 500, 600, 700, 800 900 or 1,000 μm.

In certain embodiments, the light-transmitting parts of the light gasket are preferably made of a polymer having a high transparency. As such a polymer, a thermoplastic resin, a thermosetting resin, a resin curable with an actinic ray such as UV ray, etc. can be used. Examples of such resins include cellulose resins such as cellulose acetate butyrate, triacetylcellulose, etc.; polyolefin resins such as polyethylene, polypropylene, etc.; polyester resins such as polyethylene terephthalate, etc.; polystyrene; polyurethane; polyvinyl chloride; acrylic resins; polycarbonate resins; and the like.

The light gasket with a plurality of light dividers can cover the entirety of the proximity sensor, the entirety of the emitting portion of the proximity sensor or the receiving portion of the proximity sensor. In other embodiments, the light gasket can cover a portion of the proximity sensor, the emitting portion of the proximity sensor or the receiving portion of the proximity sensor. In certain embodiments, the portion of the proximity sensor where the emitting portion and the receiving portion either about each other or a portion of the proximity sensor between the emitting portion and the receiving portion is the portion covered by the light gasket. In other embodiments, the light gasket covers 10-100%, 50-100% or 75-100% of the area of the surface of the proximity sensor. In other embodiments, the light gasket covers 10, 15, 20, 25, 30, 35, 40, 45, 50, 55, 60, 65, 70, 75, 80, 85, 90, 95, 96, 97, 98, 99 or 100% of the area of the surface of the proximity sensor.

Figure 1M:
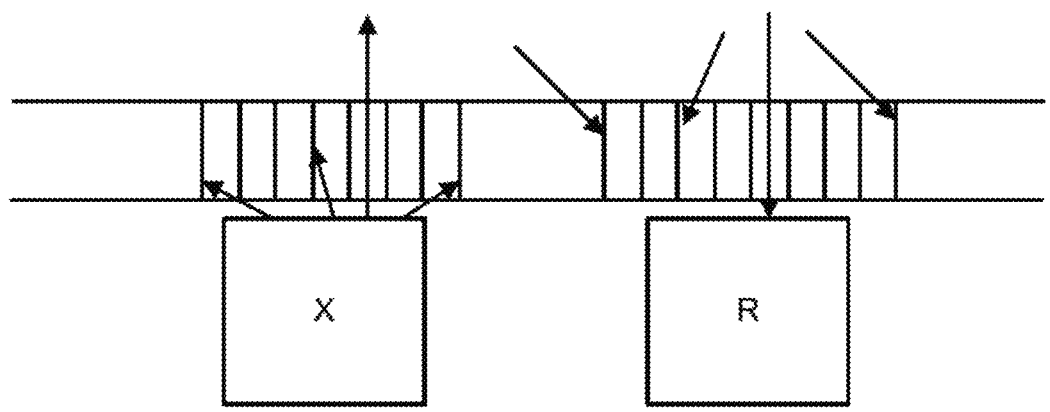
FIG. 1M depicts a schematic of a side view of a proximity sensor, and a light gasket that transmits and reflects different angles of light.

In other embodiments, the light gasket prevents light transmitted at a certain range of angles from being transmitted across the housing, case or encasement or reflected by the housing, case or encasement as demonstrated in FIG. 1M. In some embodiments, the light gasket prevents light transmitted at between 0 and 45 degrees from parallel with the surface of the proximity sensor. In other embodiments, the light gasket prevents light transmitted between 0 degrees from parallel with the surface of the proximity sensor to 5, 10, 15, 20, 25, 30, 35, 40, 45, 50, 55, 60, 65, 70, 75, 80 or 85 degrees from parallel with the surface of the proximity sensor. In other embodiments, the light gasket prevents light transmitted between 0-45 degrees from parallel with the surface of the proximity sensor to 5, 10, 15, 20, 25, 30, 35, 40, 45, 50, 55, 60, 65, 70, 75, 80 or 85 degrees from parallel with the surface of the proximity sensor.

In other embodiments, the light gasket can be made up of a material that modulates the properties of light passing through it so as to prevent the light from being reflected from the emitting portion 92 of the proximity sensor to the receiving portion 93 without first passing through the housing, case or encasement. The material can be a polarizing filter, a color filter or a filter of a particular wavelength of light. This filtering could involve opacity to certain wavelengths of light, allowing only visible light of a certain color through, or only visible light. The filter could substantially allow visible light of between 380 and 450 nm, 450 and 495 nm, 495 and 570 nm, 570 and 590 nm, 590 and 620 nm or 620 and 750 nm, such that a person viewing the light passing through the filter would see the light as violet, blue, green, yellow, orange or red. The filter could also be substantially opaque to infrared or ultraviolet light.

In certain embodiments, the light gasket covers more than the proximity sensor. In certain embodiments, the light gasket covers the entire side of the portable electronic device that includes the proximity sensor. In this embodiment, the light gasket could also act as a privacy filter as well as preventing light from leaking between the emitting portion and the receiving portion of the proximity sensor. In other embodiments, the light gasket covers a portion of the side of the portable electronic device including the proximity sensor. In embodiments where the portable electronic device includes a display, the light gasket could also cover at least a portion of the display. The light gasket could cover between 50 and 100% of the display. In other embodiments, the light gasket could cover 10, 15, 20, 25, 30, 35, 40, 45, 50, 55, 60, 65, 70, 75, 80, 85, 90, 95, 96, 97, 98, 99 or 100% of the area of the surface of the display.

Additionally, a bottom member 3 of the housing 1 includes a bottom surface 35 surrounded by a perimeter portion 30. The perimeter portion 30 is defined by a proximal and distal end portions 31 and 32 as well as opposing side portions 33 and 34 (not shown). The bottom surface 35 of the bottom member 3 may be composed of the same material or different materials, which materials may be the same or different from the material or materials of the perimeter portion 30. In certain embodiments, the bottom surface 35 of the bottom member 3 is comprised of at least one membrane. In other instances, the bottom surface 35 and the perimeter portion 30 of the bottom member 3 of the housing 1 is comprised of a single, semi-rigid material, such as polypropylene, that is capable of vibrating in such a manner that it amplifies the sound characteristics emitted from an encased device.

In various instances, a top member or a bottom member may have a plurality of features, such as button features, sound transmission features, port features, latch features, and the like. For example, as depicted with respect to FIG. 1, the top member 2 includes button features 99a, 99b and 99c, which features are configured for corresponding to various button features, such as volume up and volume down features as well as a mute switch, respectively, of a housed electronic device 100. And further, the top member 2 may include a sound transmission feature 60, a latch port feature, including a latch port door 71, and may further include a sound port feature, having a sound port cover 53 positioned therein. A coin slot feature 18 for assisting in separating the top member from the bottom member may also be included.

Figure 1N:
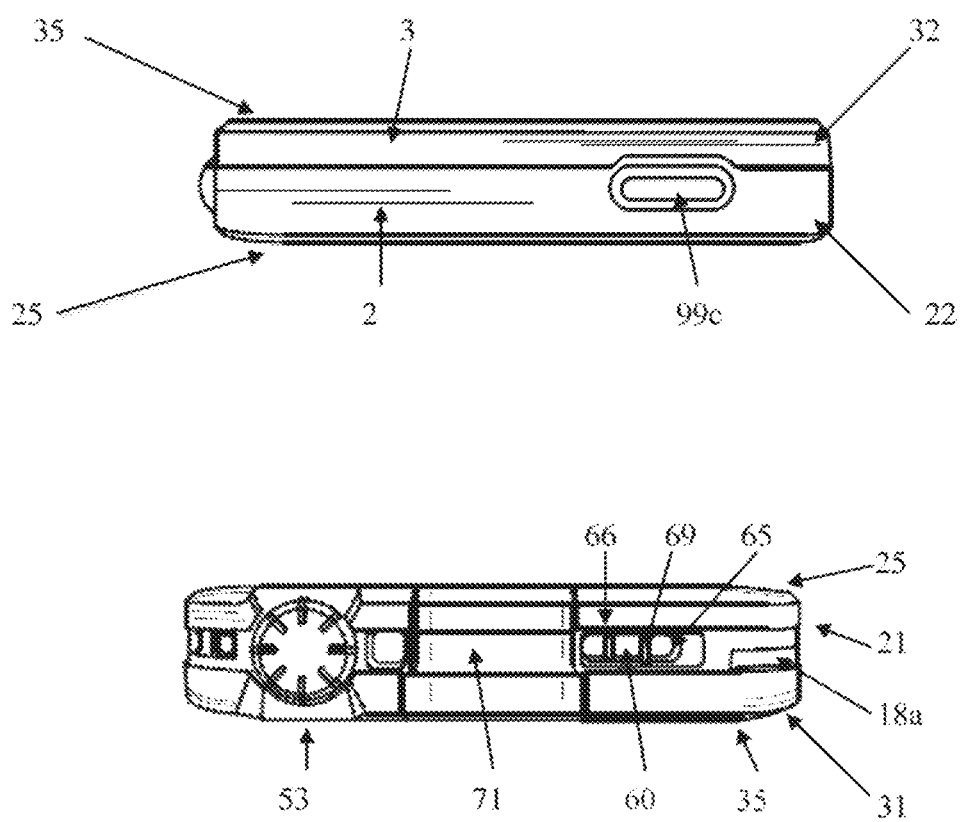
FIG. 1N shows top and bottom plan views of an encasement of the present technology.

With respect to FIG. 1N, in particular embodiments, the housing 1 may include a top member 2 and a bottom member 3 that when removably coupled together form the housing 1. The top and bottom members may be fabricated from any suitable material but typically are fabricated from materials that are capable of providing one or more of shock and liquid resistance to an encased device when the top and bottom members are properly coupled together. In certain embodiments, the top and bottom members may be composed of various different components and therefore may be fabricated from a plurality of different materials. Suitable materials from which the top and bottom member may be fabricated include rigid, semi-rigid, and flexible materials that may be fabricated together so as to provide shock and/or liquid resistance to the housing. Such materials may include but are not hereby limited to plastics, metals, polycarbonates, nylon, liquid crystal polymers, and/or rubber, thermal plastic urethanes, polyethylenes, and/or polypropylenes, mixtures thereof and the like.

As can be seen in FIG. 1N, proximal portions 21 and 31 and distal portions 22 and 32 of the top 2 and bottom 3 members are depicted. The proximal portion 21 of the top member 2 includes a sound transmission portion 60 and a headphone port feature, having a headphone port cover 53 positioned therein, are depicted as being offset from one another with a charge port cover 71 being positioned there between. The distal portion 22 of the top member 2 includes a button feature 99c, such as an on/off button feature, and between the top 2 and bottom members 3 are positioned coin slot features 18a and 18b. The top surface 25 and bottom 35 surface are also depicted.

FIG. 1O provides a housing 1 including a top member 2 and a bottom member 3 being fitted around an electronic device 100 that is fitted therein. Depicted is the bottom surface 35 as well as perimeter portions 30 and 20 of the housing 1. The top (not shown) or bottom 35 surface may include one or more features, such as a lens feature 80, having a camera lens 83 positioned therein, and/or a microphone feature 86, wherein the lens feature 80 and the microphone feature 86 are coupled in alignment with one another so as to from a single, coupled feature in this embodiment. One or more of the outer perimeter portions 20 and/or 30 may also include additional utility features. For instance, an outer perimeter portion, e.g., 20 or 30, may include one or more button features 99a, 99b and 99c, a latch port feature, having a latch cover 71b, a sound transmission portion 60, and a headphone port feature, having a headphone port cover 53 positioned therein. As depicted, the latch feature, sound transmission feature, and headphone port feature are positioned on the top member 2, however, in other embodiments, one or more of these features may be positioned on the bottom member or may encompass both the top and bottom members.

Further, it is to be noted, with respect to FIG. 1O, the bottom surface 35 includes a camera or video feature 80 that can include a camera or video aperture 83, a sound transmission feature 86 and a flash aperture 82. In certain embodiments, the bottom surface includes a camera or video feature 80 that includes a camera or video aperture 83 and a flash aperture 82. In other embodiments, the camera or video feature 80 includes only a camera or video aperture 83 and a sound transmission feature 86. In other embodiments, the camera or video feature 80 includes only a sound transmission feature 86 and a flash aperture 82. In other embodiments, the camera or video feature 80 includes only a camera or video aperture 83. In other embodiments, the camera or video feature 80 includes only a flash aperture 82. In other embodiments, the camera or video feature 80 includes only a sound transmission feature 86. The housing 1, therefore, may include various feature elements as part of the housing so as to accommodate the functionality of corresponding features of an underlying device that is to be housed within the housing. In this instance, shown in FIG. 1O, the various features of the housing 1 are configured so as to be aligned with those complimentary features of the underlying device 100.

In certain embodiments, the flash aperture and sound transmission feature may be combined into a single subfeature of the camera feature. For example, a single sound-transmitting flash subfeature may include a single aperture that is covered by a membrane attached to the aperture that allows both light and sound to be transmitted efficiently. In such embodiments, the membrane is adhered in a manner that creates a waterproof seal, e.g. an adhesive, bonding, welding, etc. Preferably, the sound-transmitting flash membrane has a light transmittance of at least about 92% and a Shore A Durometer of between about 45 and 70. In some embodiments, the Shore A Durometer of the sound-transmitting flash membrane is about 50. In certain embodiments, the sound-transmitting flash membrane has a thickness of between about 1 mil to about 7 mil (about 0.001 inches to about 0.007 inches, or about 0.0254 mm to about 0.1778 mm). In certain embodiments, the sound-transmitting flash membrane has a thickness of between about 4 mil to about 6 mil (about 0.004 inches to about 0.006 inches, or about 0.1016 mm to about 0.1524 mm). In some embodiments, the sound-transmitting flash membrane is about 5 mil thick (about 0.005 inches or about 0.127 mm). The membrane may have a single layer of a single material, multiple layers of a single material, or multiple layers of multiple materials. An example of a material that may be used as a sound-transmitting flash membrane is 45 Durometer clear silicone membrane cast on a 5 mil polyester film (PS-1283; Polymer Science, Inc., Monticello, Ind., USA).

The bottom surface 35 can include a waterproof or liquid proof gasket that circumscribes the camera or video aperture 83 or the flash aperture 82, or both individually or both together. The bottom surface 35 can also include a sound proof gasket that circumscribes the camera or video aperture 83 or the flash aperture 82, or both individually or both together.

Figure 2:
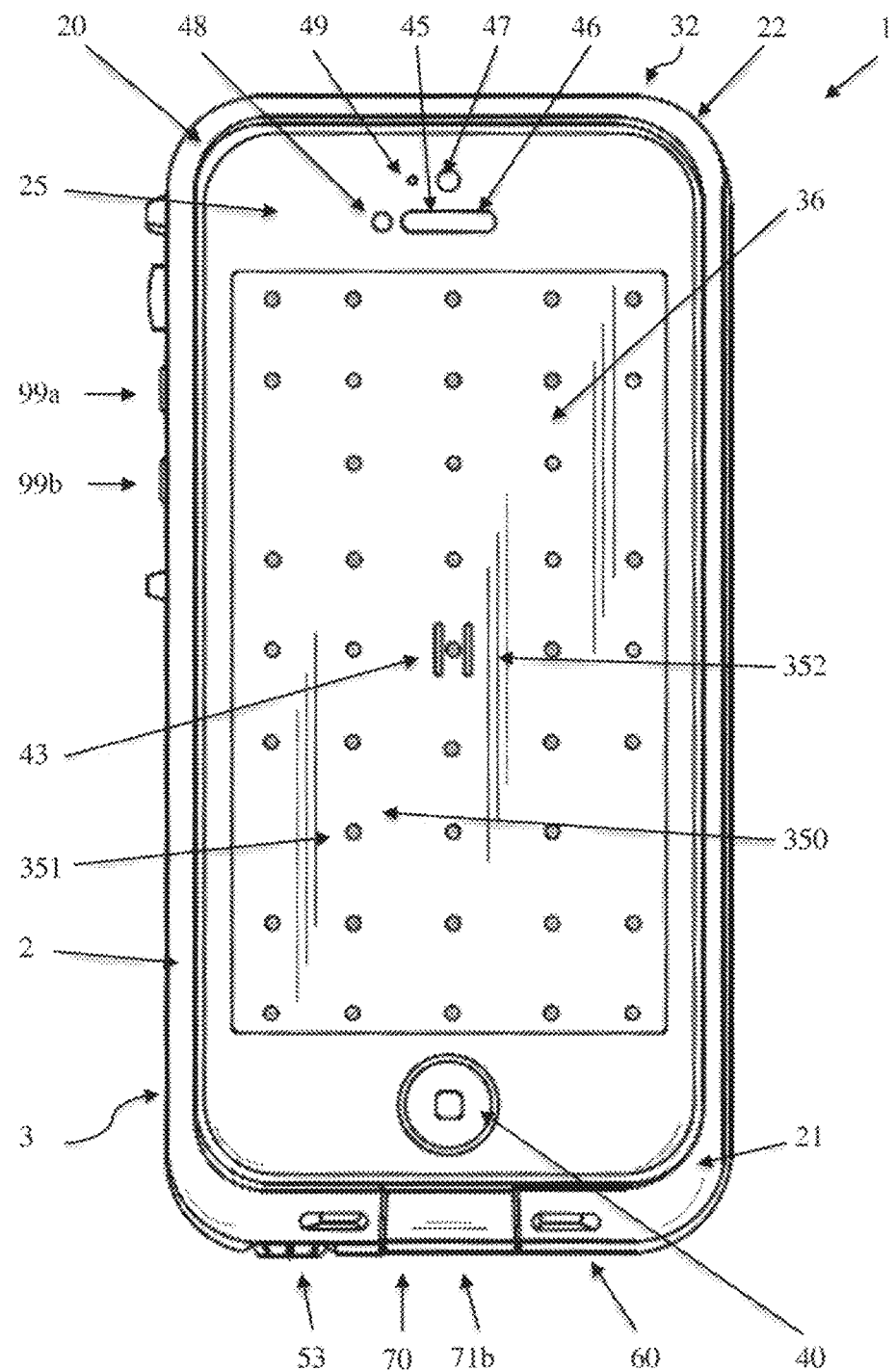
FIG. 2 shows a front elevational view of an encasement of the present technology.

FIG. 2 provides a view of the front of the housing 1. The top front surface 25 comprises a transparent membrane that includes an opaque perimeter. As illustrated in this embodiment, the top front membrane 25 includes an acoustic membrane portion 45, including an acoustic apertures 46, e.g., for transmission of sound through the housing, an optically clear region 47, configured for being used in conjunction with a photo or video camera of an underlying device, and another optically clear region 48, configured for being used in conjunction with a proximity sensor of an underlying device. It is to be noted that if desired, the optically clear region 47 may be configured to include a lens 80, which lens may be aligned with a camera lens of an underlying device.

FIG. 2 also provides a view of the front bottom portion of the housing 1. The bottom portion of the front surface 25 comprises a membrane that includes a button feature 40. The membrane 25 is transparent but includes an opaque perimeter that is not optically transmissive. Also depicted are a headphone port cover 53, and a perimeter latch feature cover 71 all of which, in this embodiment, are positioned at the proximal end 21, 31 of the housing 1.

FIG. 2 provides a view of an assembled housing 1, wherein a device to be encased therein is not present. In this embodiment, the top front surface 25 is composed of a translucent membrane that spans from one side of the perimeter portion 20 to the other, such as from proximal end 21 to distal end 22 and from side 23 to side 24. Accordingly, the inside surface 36 of the bottom member 3 is seen through the translucent membrane 25 of the top member 2. A portion of the translucent membrane 25 may be configured so as to include one or more opaque regions, such as towards the perimeter of the membrane, which opaque region circumscribes a visibly translucent area. An opaque region may be entirely opaque or may include optically transmissive sub-regions.

As depicted, the top membrane 25 includes a plurality of features. For instance, the top surface membrane 25 includes a button feature 40, optically clear regions 47 and 48, e.g., corresponding to a video camera portion and a proximity sensor portion of an encased device, respectively; and an acoustic membrane portion including an aperture 46 for transmitting sound. Aperture 46 is prevented from passing liquid therethrough by the presence of a waterproof gasket 45, which gasket is permissive to sound but not to liquid. Such a gasket may be comprised of several different water phobic materials such as Gore-Tex® and the like.

As depicted, the outer perimeter portion 20 also includes a plurality of features including a speaker sound transmission portion 60 and a latch feature 70 including a latch cover 71b for covering a charge port. Also depicted is a headphone port for receiving a sound transmission auxiliary device, such as a headphone jack, wherein the sound port is depicted as being covered by sound port cover or bung 53 so as to generate a liquid tight seal therein. Although not depicted, the inner surface 36 of the bottom member may include stand-offs 43 so as to allow separation between the bottom of the housing 3 and an encased device, for instance, for enhanced sound transmission.

The stand-off 43 shown in FIG. 2 comprises two raised parallel lines. These lines form a bridge that contacts the portable electronic device when it is encased in the housing 1. This prevents the inside surface 36 of the bottom member 3 from repeatedly striking the rear of the portable electronic device when sound is being transported through the bottom member 3 of the housing. In certain embodiments, the bottom member 3 is able to effectively transmit and modulate the frequency of sound that passes through it from the portable electronic device encased in the housing to the outside of the housing. In certain embodiments, as sound interacts with the inside surface 36 of the bottom member 3 certain sound transmitting areas 350. Sound transmitting areas are areas of the bottom member 3 particularly effective in transmitting sound. In certain embodiments, the sound transmitting areas are able to transmit 25, 30, 35, 40, 45, 50, 55, 60, 65, 70, 75, 80, 85, 90, 95, 96, 97, 98, 99 or 100% of the sound that interacts with the sound transmitting area 350. Sound can interact with the sound transmitting area 350 via the vibration of fluids (i.e. gases or air) adjacent to the sound transmitting area 350 or through vibrations of portions of non-sound transmitting areas 352 of the bottom member that are adjacent to a sound transmitting area 350, or both.

Sound transmitting areas 350 can also amplify certain pitches present in sound emitted from the portable electronic device. Because of the size of the bottom member 3 and the size of certain sound transmission areas, low frequencies of sound can preferably be amplified, allowing the bottom member 3 to act as a sub-woofer. However, the size, shape and configuration of the sound transmission areas 350 of the bottom member can be arranged to amplify any frequency of sound. In certain embodiments, the sound transmission areas 350 of the bottom member allow for the amplification of frequencies between 16 and 32 Hz; 32 and 512 Hz; 513 and 1023 Hz; 1024 and 2048 Hz; 2049 and 4095 Hz; 4096 and 8192 Hz; 8193 Hz and 16383 Hz and 16384 and 32768 Hz.

In certain embodiments, sound transmitting areas 350 include pips 351 on the inside surface 36 of the bottom member 3. Pips 351 can be any shape. In certain embodiments, pips are half spheres that extend out from the inside surface 36 of the bottom member 3. However, pips could have a profile that is square, rectangular, a parallelogram, trapezoidal, triangular or having 5, 6, 7, 8, 9, 10, 11, 12, 13, 14, 15, 16, 17, 18, 19, 20 or more sides. In certain embodiments, changing the shape of the pips 351 can change the acoustic properties of the sound transmitting areas 350. The pips can also have a variety of sizes. The pips can have diameters at the broadest point of between 0.01 and 10 mm. In other embodiments, the pips have diameters at their broadest point of 0.1-8 mm; 0.2-6 mm; 0.5-5 mm; or 1-3 mm. The pips can be raised from the inside surface 36 of the bottom member 3 between 0.01 and 10 mm. In other embodiments, the pips have heights from the inside surface 36 of the bottom member 3 of 0.1-8 mm; 0.2-6 mm; 0.5-5 mm; or 1-3 mm. The pips can be arranged in the sound transmitting areas 350 in various configurations. In certain embodiments, the pips are arranged in a regular grid. In other embodiments, the pips are randomly arranged across a sound transmitting area 350. The pips can be arranged so that they are a regular distance from each other. This distance can be between 0.5 and 50 mm. This distance between the pips can also be 1-25 mm; 2-20 mm; 5-15 mm; 7-12 mm or 9-11 mm. The pips can be arranged so that there is no defined distance between the pips, but a range of distances between the pips. This range can be between 0.5 and 50 mm. This range can also be 1-25 mm; 2-20 mm; 5-15 mm; 7-12 mm or 9-11 mm. The pips 351 can be made of the same material as the bottom member 3 or they can be made of a distinct material.

The pips 351 change the acoustic properties of the sound transmitting areas 350 by adding mass thus changing the resonance associated with these areas. This allows for some sound frequencies to be amplified, while others are dampened. This can be used to optimize the sound output from the portable electronic device encased in the housing.

Outside of the sound transmitting areas, stand-offs 43 contact the portable electronic device when encased in the housing to prevent the bottom member 3 or pips 351 in sound transmitting areas 350 from vibrating against the portable electronic device, causing a buzzing sound or otherwise interfering with sound transmission through the bottom member 3 of the housing. Stand-offs 43 can be any shape. For example, stand-offs 43 can have the shape of narrow rectangles as shown in FIG. 2. The stand-offs can also be circular, ovals, ellipses, square, rectangular, a parallelogram, trapezoidal, triangular or having 5, 6, 7, 8, 9, 10, 11, 12, 13, 14, 15, 16, 17, 18, 19, 20 or more sides. The stand-offs 43 can be a range of sizes. Stand-offs 43 can be 0.1-5 mm wide and 0.1-15 mm long. In other embodiments, the stand-offs 43 are 0.5-3 mm or 1-2 mm in width and 0.5-10 mm; 1-8 mm or 2-5 mm in length.

In certain embodiments, the stand-offs are narrow rectangles, wherein the width is much smaller than the length. These narrow rectangles can be arranged in pairs as shown in FIG. 2. These pairs of rectangles can be arranged in the middle of the inside surface 36 of the bottom member as shown in FIG. 2. They can also be arranged in any other pattern. In certain embodiments, there are two sets of pairs of rectangles along the center axis of the inside surface 36 of the bottom member 3. In other embodiments, there are 3, 4, 5, 6, 7, 8, 9 or 10 sets. In other embodiments, the pair of rectangles are along enough to extend the length of the inside surface 36 of the bottom member 3. In certain embodiments, the stand-offs 43 could form lines (extended rectangles) that extend across the inside surface 36 of the bottom member 3 in any direction. For example, the lines could extend across the length or width of the inside surface 36 of the bottom member. In certain embodiments, the stand-offs are positioned around the perimeter of the inside surface 36 of the bottom member as shown in FIG. 3E. In other embodiments, the stand-off is a square or rectangular pad of foam like material that contacts the rear surface of the portable electronic device when the portable electronic device is encased in the housing.

The stand-offs 43 are configured so that they contact the rear surface of the portable electronic device when the portable electronic device is encased in the housing. In certain embodiments, the stand-offs 43 are in contact with the electronic device even when the bottom member 3 is vibrating due to sound being transmitted through the bottom member 3. In certain embodiments, when the bottom member 3 is vibrating due to transmission of sound, the one or more of the stand-offs 43 remain in contact with the portable electronic device 5, 10, 15, 20, 25, 30, 35, 40, 45, 50, 55, 60, 65, 70, 75, 80, 85, 90, 95, 96, 97, 98, 99 or 100% of the time. In certain embodiments, the stand-offs 43 remain in contact with the portable electronic device 90-100% of the time when sound is being transmitted across the bottom member.

The areas occupied by the stand-offs 43 are not sound transmitting areas 350 for the housing. However, the areas occupied by the stand-offs 43 still transmit sound. However, in certain embodiments, the areas occupied by the stand-offs 43 transmit less sound than sound transmitting areas 350. Further, in some embodiments the areas occupied by the stand-offs 43 do not amplify or dampen sound of certain pitches in the same manner as sound transmitting area 350.

In some embodiments, the front and back surfaces of the top and bottom members of the housing each include perimeter portions. In certain embodiments, the perimeter portion of the top and/or bottom member may include a plurality of sub-portions. For instance, the perimeter portion of a top member may include an interior and an exterior perimeter portion, which perimeter portions may be configured for interacting with different portions of a top member membrane. In certain embodiments, the perimeter portion of a bottom member may include an interior and an exterior perimeter portion. In certain instances, one or both of the interior and exterior portions may form an interior bounding member and an exterior bounding member which together may in turn form a channel. The channel may be positioned on the bottom member or on the top member.

The perimeter portion of a top and bottom member, or a sub-portion thereof, may be fabricated from any suitable material. The perimeter portion may be fabricated from the same material as a top and/or bottom surface member or may be fabricated from one or more different materials than the top and/or bottom surface members. For instance, in various instances, such as when there is an interior and exterior perimeter portion, such as on a top member, the interior perimeter portion may be fabricated from a rigid material, such as a rigid plastic, polycarbonate, or the like, so as to provide structural integrity to the housing, whereas the outer perimeter portion may be fabricated from a more flexible, e.g., semi-rigid or flexible material, such as a polyethylene or polypropylene material, or the like, so as to provide the perimeter of the housing with a measure of shock absorbance and protection.

In this embodiment, the top member includes a perimeter portion. The perimeter portion includes an interior perimeter portion and an exterior perimeter portion. The interior perimeter portion is composed of a rigid material and is configured for associating with an enclosed device so as to secure the device within the housing within a snug fit and to provide support to the device while it is within the housing. The exterior perimeter portion is composed of a flexible or semi-flexible material and is positioned above and along a side of the interior perimeter portion. The outer perimeter portion may be composed of a flexible or semi-flexible material that is adapted so as to dampen the transference of shock from the outer side of the housing to the interior of the housing and thus may function to absorb shock, such as due to impact.

The interior and exterior perimeter portions may be fabricated together, such as in an overmould process, or may be fabricated separately and joined together. For instance, in certain embodiments, the outer perimeter portion may be removable from the interior perimeter portion. In other instances, the interior and exterior perimeter portions are fabricated together along with the front surface membrane, when included, in such a manner that the interior perimeter portion associates with a bottom surface of the membrane, the exterior perimeter portion associates with a top surface of the membrane. In such a manner as this, the membrane may be integrally associated with the perimeter portion of the top member. In various embodiments, the interior bounding member includes a clasping mechanism.

The bottom member includes a perimeter portion. The perimeter portion also includes an interior perimeter portion and an exterior perimeter portion. In this instance, the interior perimeter portion forms an interior bounding member and the exterior perimeter portion forms an exterior bounding member. Together the interior and exterior bounding members can bound a channel. The channel can further include a gasket, such as a gasket, for instance, an O-ring. The exterior bounding member includes a clasping mechanism.

The clasping mechanisms of the interior and exterior bounding members can have any configuration so long as either clasping mechanism is capable of interacting with the corresponding clasping mechanism so as to couple the top and bottom members together to form the housing. In this instance, clasping mechanism on top member interacts with corresponding clasping mechanism on the bottom member so as to provide a seal thereby, such as a liquid-tight seal. Hence, the clasping mechanism of the top member is configured for interacting with a corresponding clasping mechanism of the bottom member, which clasping mechanisms are configured for coupling the top and bottom members together and in combination with the perimeter gasket forming a liquid-proof seal.

In another embodiment, a clasping mechanism is associated with exterior bounding member of the bottom member, and a clasping mechanism is associated with the interior perimeter portion of the top member. It is to be noted, however, that a clasping mechanism may be associated with interior bounding member of the bottom member, and a clasping mechanism may be associated with exterior perimeter portion of top member. In this embodiment the clasping mechanisms are configured as corresponding catches but may have other configurations, such as a rib with extended protrusion member and groove configuration, and the like.

Further, in this embodiment, the housing includes an additional clasping mechanism, which clasping mechanism is further included to secure the sealing of the top and bottom members together so as to ensure a tight coupling of the top with the bottom member, such as in a liquidproof and drop proof sealing. Hence, in this embodiment, the top member includes one or more tooth members that are configured for being received within one or more tooth receptacle members, which members function so as to couple the top and bottom members together. Although in this embodiment the two clasping mechanism are shown together, in other embodiments, only one or more clasping mechanisms may be included.

It is to be noted that although the bottom member perimeter portion may have bounding members, and the top member perimeter portion may have interior and exterior perimeter portions, in certain instances, the top member perimeter portion may have bounding members and a bounding channel; and the bottom member perimeter portion may have interior and exterior perimeter portions, which do not bound a channel.

As described above, in certain instances, the top member includes a more rigid interior perimeter portion that is coupled with a more flexible exterior perimeter portion. The rigid interior perimeter portion provides structure to the top member of the housing, while the flexible exterior perimeter portion of the housing provides shock absorbance. As depicted, the interior and exterior perimeter portions are integrally formed together, such as in the manufacturing process, for instance, in an overmoulded manner, but in other embodiments they may be two separate elements that are capable of being coupled together after the manufacturing process. For example, in certain embodiments, the more flexible exterior portion may be a flexible sleeve that is stretched over the more rigid frame of the interior perimeter portion. Accordingly, in some embodiments, the top member may include a perimeter portion that includes a rigid skeletal frame, such as a polycarbonate frame, which frame is further associated with, e.g., is overmoulded with, a more flexible material, such as a rubber or a urethane material such as a polyethylene or the like, so as to form an exterior perimeter portion.

Further, in certain instances, a perimeter portion of a top or bottom member may include an interior and exterior bounding member. For instance, the bottom member may include a perimeter portion, which perimeter portion further includes an interior bounding member and an exterior bounding member. The interior and exterior bounding members may be fabricated from the same or different materials, such as a rigid material, like a rigid plastic, or the like, or a semi-rigid material, such as a polypropylene material, so as to provide structural integrity to a channel positioned between the interior and exterior bounding members of the bottom member of the housing. The interior and exterior bounding members may be configured in such a manner so as to form a channel therebetween.

Hence, in one embodiment, one or both of the top and bottom members may include a channel, such as a channel that extends along at least a portion of the perimeter portion of the top and/or bottom member. It is to be noted that with respect to this instance, the top and bottom members may be separate members configured for being removably coupled together, or they can be a single or a plurality of members joined by a hinge element. The channel may comprise an interior bounding member and an exterior bounding member, which bounding members may at least partially define the bounds of the channel. The channel may further include a gasket, such as an O-ring, positioned within the channel.

In certain instances, the interior and exterior bounding members may run along a portion or the entire perimeter of the top and/or bottom member of the housing. For example, the interior and exterior bounding members forming channel may circumscribe the entire perimeter portion of bottom member. One or both of the interior or exterior bounding members may include one or more clasping mechanisms that also run along a portion or the entire perimeter of the top and/or bottom member. In this instance, the exterior bounding member runs along the entire perimeter of the bottom member of the housing. The exterior bounding member includes a clasping mechanism that also runs along the entire perimeter of the bottom member. The interior perimeter member also includes a clasping mechanism that runs along one or more portions, e.g., a plurality of portions, of the perimeter of the bottom member. It is to be noted that where an interior or exterior bounding member of a channel, e.g., of a bottom member, includes a clasping mechanism, the opposing member of the housing, e.g., the top member, may also include complementary clasping mechanisms that are configured for interacting with the clasping mechanisms, on the opposing housing member, e.g., on the interior or exterior bounding member of the bottom member.

The clasping mechanism(s) of the top and bottom member may have any suitable configuration so long as they are capable of interacting with one another in such a manner so as to couple the top member of the housing with the bottom member of the housing. In certain instances, this coupling is in such a manner so as to provide a liquid-proof and/or drop proof seal between the top and bottom members of the housing.

Accordingly, the top and bottom members of the housing may include corresponding clasping mechanisms that extend along the perimeter portion of the top and bottom member, which clasping mechanisms may be configured for interfacing with one another in such a manner so as to couple the top and bottom members of the housing with one another thereby sealing the housing.

A clasping mechanism may extend around the entire perimeter of the housing members or a portion thereof. For instance, the clasping mechanisms may extend around about 99% or more, about 95%, about 90%, about 85%, about 80%, about 75%, about 70%, about 65%, about 60%, about 55%, about 50%, about 40%, about 30%, about 25%, about 20%, about 10%, or less of the perimeter, such as where the top and bottom members are joined by a suitable hinge element. For instance, where a top or bottom member includes an interior or exterior perimeter portion and/or a channel bounded by an interior or exterior bounding member, the interior and/or exterior perimeter portion may be configured such that a portion thereof forms the clasping mechanism.

In one embodiment, the housing may include a clasping mechanism that is configured as a catch clasping mechanism. In this embodiment, the top member includes an interior perimeter portion and an exterior perimeter portion. The interior perimeter portion is fabricated from a rigid material, such as a rigid plastic or polycarbonate, and includes top catch clasping mechanism. The rigid plastic provides a structure for the housing. The rigid plastic material of the interior perimeter portion is overlaid with a more flexible, e.g., semi-rigid material, such as rubber, TPE, or the like, which material forms the outer perimeter portion, which material may be included so as to provide protection, e.g., against shocks, to the housing.

As set forth above, the top clasping mechanism of the interior perimeter portion of the top member; and the bottom clasping mechanism of the exterior perimeter portion, e.g., a bounding member of the bottom member, may have any suitable configuration. In some embodiments, the top and bottom clasping mechanisms are configured as corresponding catches. Accordingly, the clasping mechanisms includes a catch or lip region.

The catch region includes a slanting surface that is intersected by an intersecting surface. Together the slanting surface and the intersecting surface form an edge, or lip, that comprises the catch clasping mechanism of the top member. The slanting surface and intersecting surface form an angle. Additionally, the catch region includes a slanting surface that is intersected by an intersecting surface. Together the slanting surface and the intersecting surface form an edge, or lip, that comprises the catch clasping mechanism of the bottom member. The slanting surface and intersecting surface form an angle. For instance, the slanting surfaces may slope with respect to the intersecting surface at a degree that ranges from 0 to about 90 degrees, such as from about 5 or about 10 degrees to about 80 or 85 degrees, for instance, from about 15 or 20 degrees to about 70 or 75 degrees, such as from about 30 or 40 degrees to about 50 or 60 degrees, including about 45 degrees.

Accordingly, the catch clasping mechanism of the top member is configured for engaging a corresponding catch clasping mechanism of bottom member. The corresponding clasping mechanisms may have corresponding surfaces, e.g., lip or edge regions or may have different, but complimentary surfaces. In one embodiment, the top member has a perimeter portion having a catch clasping mechanism that includes a lip or edge region that comprises a slanting surface that is intersected by an intersecting surface. The bottom member has a perimeter portion having a catch clasping mechanism that also includes a lip or edge region that comprises a slanting surface that is intersected by an intersecting surface. In this embodiment, the corresponding lip or edge regions are configured for being coupled together. It is to be noted that although a particular configuration of clasping mechanisms has been described herein, e.g., as corresponding catch clasping mechanisms, other configurations may also be suitable, for instance, where the slanted surfaces are straight or substantially straight, etc. For example, in one embodiment, one of a top or bottom member may have a clasping member configured as described above, e.g., having a lip edge region, and the corresponding member may have a clasping member that is configured as a receiving element, such as a groove, e.g. a circumferential groove, that is adapted for receiving the corresponding lip edge of the opposing member.

However, in this embodiment, the slanting surface and the intersecting surface comprise the clasping mechanism of the bottom member, which clasping mechanism is configured for engaging corresponding surfaces of the top member clasping mechanism. Together the top and bottom clasping mechanisms form opposing snap closures that are configured for interacting with one another in such a manner that when they are coupled together, e.g., snapped together, they seal the housing, for instance, in a liquid-proof seal. It is to be noted in this embodiment, the clasping mechanisms are entirely internal clasping mechanism that circumscribe the entire perimeter of the housing. Although the top and bottom clasping mechanisms have been described herein with respect to one particular configuration, e.g., entirely internal and circumscribing the entire perimeter portion, it is to be understood that this configuration is a non-limiting example and may be modified in various ways so long as the clasping mechanisms are capable of being joined together in a manner sufficient to couple the top and bottom members together and thereby seal the housing.

In addition or as an alternative to the catch clasping mechanism set forth herein above, the housing may include an entirely internal clasping feature configured as a tooth and receptacle clasping mechanism. The entirely internal tooth and receptacle clasping feature may include one or more sections of one or more teeth. The entirely internal clasping feature may also include one or more sections of one or more teeth receiving members or receptacles. The tooth or teeth may be configured for interfacing with the tooth or teeth receiving members in such a way that as the teeth are coupled with the teeth receiving members, e.g., are fitted within, the top member and bottom member are coupled together so as to form the housing.

For instance, in certain embodiments, the teeth may be configured as extended or protruding elements that are positioned along a portion or the entire perimeter of a top or bottom member; and the corresponding member will have the teeth receiving members, which may be configured as indents or openings that are adapted to fit at least a portion of the tooth members therein. In this instance, the teeth are positioned along a perimeter portion of the top member, and the teeth receiving members are positioned along a perimeter portion of the bottom member. However, in other instances, the teeth may be positioned along a perimeter portion of the bottom member, and the teeth receiving members may be positioned along a perimeter portion of the top member. These teeth and receptacle members function to couple the top member to the bottom member to form the housing, which in certain embodiments may be a shockproof, liquidproof, and/or dustproof seal. In certain embodiments of a housing, the clasping mechanisms may be configured such that they lessen and/or remove the deflection that would be typical when coupling the two members of the housing together when employing a classic latching mechanism known in the art. For instance, when employing a typical latching mechanism known in the art, e.g., one that clasps at single point along a perimeter portion of the housing, deflection often occurs as a result of a latching mechanism that only exerts a closing force on discrete locations on the opposing surfaces. Such a latching mechanism leaves substantial gaps between the various tensioning points. A configuration such as this results in deflection as the two parts of the housing work against each other, because these tensioning points between the gaps are where the opposing forces get integrated and therefore are maximized.

In certain instances, the present housing and features thereof are configured for constraining these oppositional forces. For instance, the top or bottom members of the housing may include opposing clasping mechanism that are configured for dispersing these oppositional forces along the length of the housing thereby minimizing the deflection that may be caused by the sealing of the two members of the housing. In certain instances, one or both of the top or bottom member includes a channel, such as a channel that contains a gasket, a portion of which channel may include a clasping mechanism that is configured for dispersing the opposing forces throughout the channel.

For example, a channel may be included within a member of the housing, e.g., bottom member, which channel is configured so as constrain the oppositional forces caused by clasping the members of the housing together within the channel. In such an instance, the oppositional forces can be constrained to the small space of the channel and further be minimized by a tight coupling of the clasping mechanisms of the top and bottom members and, respectively. This is especially beneficial where a gasket, such as an O-ring, is included in the channel so as to further compress the gasket and thereby generate a liquid-tight seal.

Gaskets of different sizes and shapes may be included so as to facilitate a liquid-tight sealing of the housing. The gasket may be a solid gasket or a hollow gasket allowing for greater compressibility, such as compressibility up to 10%, up to 15%, up to 20%, up to 25%, up to 30%, up to 40%, up to 50% and above. A gasket may be positioned wherever a watertight sealing is beneficial, such as within a channel. The inclusion of such a gasket, however, creates additional opposing forces as the gasket resists the compression caused by the coupling together of the two members of the housing. The clasping mechanism, therefore, may be configured to be substantially continuous along a substantial circumference of the perimeter so as to better disperse these oppositional forces. Such a continuous, circumferential clasping system may wrap around the entire or a substantial portion of the circumference of the device, minimizing transitional gaps and dispersing the oppositional forces that build up in gaps between tensioning points.

Accordingly, the top member includes a perimeter portion. The perimeter portion includes an interior perimeter portion and an exterior perimeter portion. The interior perimeter portion of the top member includes a clasping mechanism. It is to be noted that although the interior perimeter portion includes the clasping mechanism, in certain embodiments, the exterior perimeter portion may include the clasping mechanism.

The top member clasping mechanism includes a surface, which surface is depicted as slanted. It is to be noted that although this surface is depicted as slanted, in certain embodiments, it may have a different configuration, for instance, it may be substantially straight. The top member clasping mechanism also includes an intersecting surface, which in this instance is also an interfacing surface. The interfacing surface is depicted as a substantially horizontal surface that intersects surface. However, this configuration may be modified so long as a suitable clasping mechanism is formed thereby. In this manner a lip or edge is formed, which edge is configured for interfacing with a corresponding clasping mechanism, e.g., a lip edge or groove member, of a bottom member so as to couple and seal the top and bottom members together.

The bottom member also includes a perimeter portion. The perimeter portion includes an interior bounding member and an exterior bounding member, which bounding members bound the channel. The exterior bounding member of the bottom member includes a clasping mechanism. However, in other instances, the interior bounding member of the bottom member may include the clasping mechanism.

The bottom member clasping mechanism includes a surface, which surface is depicted as slanted. It is to be noted that although this surface is depicted as slanted, in certain embodiments, it may have a different configuration, for instance, it may be substantially straight. The bottom surface clasping mechanism also includes an intersecting surface that in this instance is also an interfacing surface. The interfacing surface is depicted as a substantially horizontal surface that intersects surface. It is to be understood that the configuration of these surfaces may differ from that depicted so long as it is capable of forming a clasping mechanism for interfacing with a corresponding clasping mechanism on the top surface. In a manner such as this a lip or edge is formed, which edge is configured for interfacing with a corresponding edge of a top member so as to couple and seal the top and bottom members together. It is to be noted that although the exterior bounding member includes the clasping mechanism, in certain embodiments, the interior bounding member may include the clasping mechanism. It is also to be noted, that one of the top or bottom clasping mechanisms may have a configuration as a receiving member, such as a groove, rather than the lip edge configuration described above.

Additionally, teeth regions are positioned along the perimeter portion of the top member. Each teeth region may include one or a plurality of teeth. In this instance, the depicted teeth region includes a plurality of teeth. The teeth extend laterally and internally toward the internal cavity of the housing away from the longitudinal length of the interior perimeter member of the top member. The teeth are configured for being received within corresponding teeth receiving members of the bottom member.

Consequently, as depicted, there are teeth receiving region positioned along the interior perimeter, e.g., interior bounding member, of the bottom member. As depicted, the teeth receiving members are configured as apertures within which the teeth may be fitted. Accordingly, as the top member is coupled to the bottom member the teeth of the depicted teeth region interface and engage with the teeth receiving members of the teeth receiving member region of the bottom member and the housing is therefore formed by the coupling of the top member with the bottom member and sealed by the clasping mechanisms and as well as clasping mechanism and joining together.

It is to be noted that the teeth and teeth receiving members may have any suitable configuration so long as they are capable of interacting with one another so as to couple the top and bottom members of the housing together. Hence, the number, size, and location of the teeth and/or corresponding teeth receiving members may vary. For example, one long tooth or several short teeth may be included. The teeth may be positioned along the entire perimeter portion or any number of sub-portions thereof. As depicted, there are three teeth regions positioned along three sides of the top member. However, the teeth can be positioned on the bottom member instead of the top member and/or where desired one, two, three, or more teeth regions can be included along one, two, three, or more sides of the top or bottom member.

Likewise, one long tooth receiving member or several short teeth receiving members may be included. The teeth receiving members may be positioned along the entire perimeter portion or any number of sub-portions thereof. The teeth receiving members are configured so as to correspond to and interact with the teeth members so as to secure and seal the housing when the top and bottom members are coupled together. It is to be noted that the teeth and/or teeth receiving members can be positioned on either or both of the top or bottom members as well as on the interior or exterior perimeter portions, as desired.

The bottom surface member additionally includes a plurality of sound bridges that function to both provide direct communication between the back surface of the bottom member and a housed device as well as to provide a small space between the two so as to enhance the flow of sound through the interior of the housing.

A channel is formed in part by the interior and exterior bounding members as well as the bottom back surface of the bottom member perimeter portion. In certain embodiments, the channel can be included as part of the top member, with the corresponding changes being made to the structures of the top and bottom members.

The interior perimeter portion with the clasping mechanism of the top member is configured for being inserted into the channel and may further be configured for engaging the gasket; and may additionally be configured for engaging the clasping mechanism of the exterior bounding member of the bottom member in such a manner as to couple the top and bottom members together, for example, in a liquid-proof seal. In this embodiment, therefore, the interior perimeter portion includes a gasket interfacing portion that is configured for interfacing with the gasket in such a manner as to compress the gasket and thereby form a liquid-proof seal.

It is to be noted that in certain embodiments a gasket need not be present within the channel. Rather, the top member may include an impinging member, such as an extended, flexible/compressible member, that is configured for impinging within the channel in such a manner that it fills the channel thereby producing a liquidproof sealing therewith, such as when the impinging member is comprised of a material capable of being compressed and fitted within the channel so as to produce a liquidproof seal therewith. Further, in certain embodiments, the interior and/or exterior bounding members of the bottom member may be configured differently or not included at all. A different clasping mechanism may be included, e.g., a separate clasping mechanism that is external or distinct from the perimeter portions of the top and bottom members, although the clasping mechanism as depicted herein has certain advantages over such an external clasping mechanism. Nevertheless, an external clasping mechanism may be provided, such as a clamp or other form of external clasping mechanism. Such an external clasping mechanism may be included in addition to the internal clasping mechanisms described herein or in substitution therefore.

Figure 3A:
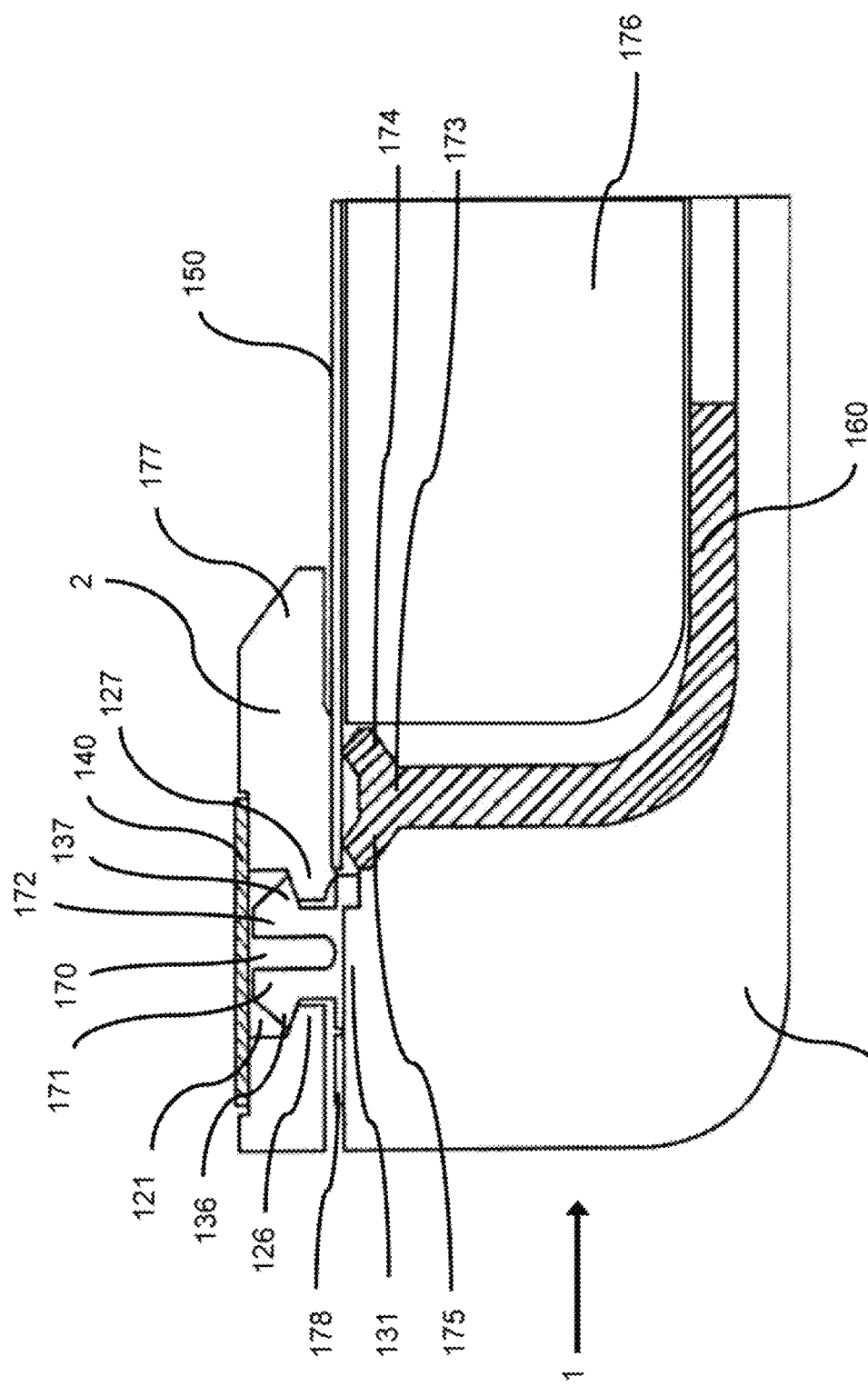
FIG. 3A shows a side view cutaway of a housing configuration having tapered posts.

FIG. 3A shows a cutaway drawing of another housing configuration of the invention. In the depicted embodiment of this configuration, the housing 1 comprises top and bottom members 2 and 3, respectively, that snap together using a plurality of tapered posts 131 arrayed about the upper perimeter of the bottom member 3 to engage deformable openings 121 arrayed in complementary positions in the perimeter of the top member 2 when the top and bottom members 2 and 3 are brought into joined association. Suitable materials from which the top and bottom members 120, 130 may be fabricated include rigid, semi-rigid, and flexible materials, including, without limitation, plastics, metals, polycarbonates, nylon, liquid crystal polymers, and/or rubber, thermal plastic urethanes, polyethylenes, and/or polypropylenes, mixtures thereof and the like. In other embodiments, the housing also includes an external gasket 178 shown in FIG. 3A. The external gasket 178 creates a seal with the top member 120 that is sufficient to exclude environmental constituents such as water, dust, dirt, shock, and the like. The external gasket 178 can be made of any kind of sealant or seal material as described above.

As depicted in FIG. 3A, the tapered posts 131 of the bottom member 3 include split heads 171 and 172 separated by a slot 170. The split heads have tapered lower faces 136 and 137 shaped to engage complementary retention faces 126 and 127 of the deformable opening 121 for retention. As will be appreciated, any suitable geometry for the posts of the bottom member and complementary openings of the top member may be employed. In some embodiments, the heads are solid instead of split. In these embodiments, the deformable openings are made of materials or in shapes or thicknesses that allow them to be more pliable than is necessary when the head is a split head. For either split or solid heads, suitable geometries include spheres, cubes, rhomboids, ovals and any combination of these geometries, so that the tapered posts 131 may engage the deformable openings 121 in a way that secures the top and bottom members 120, 130 of the housing. Likewise, any suitable geometry of the deformable openings 121 may be employed, as long as the tapered posts 131 and deformable openings 121 can be joined in a way that secures the top and bottom members 2 and 3 of the housing. Suitable geometries include spheres, cubes, rhomboids, ovals and any combination of these geometries, so that the tapered posts 131 may engage the deformable openings 121 in a way that secures the top and bottom members 120, 130 of the housing. In certain embodiments, the deformable openings 121 have a similar geometry to the tapered posts 131 that they are matched with. In other embodiments, the deformable openings 121 have different geometry from the tapered posts 131 that they are matched with. In certain preferred embodiments, the deformable openings 121 have a geometry that allows them to securely hold the geometry of the tapered posts 131 that they are matched with.

In the embodiment shown in FIG. 3A, the deformable opening 121 is deeper than the height of the tapered post 131, which allows a head cover 140 to be removably yet securely attached to the top member 2. In this way, the head cover 140 allows tapered posts 131 protruding through the deformable openings 121 of the top member 120 to be concealed. In other embodiments, the head cover 140 provides a fluid proof seal over the deformable openings 121, preventing water from leaking between the tapered posts 131 protruding through the deformable openings 121. The head cover 140 can be made of a variety of materials. In some embodiments, the head cover 140 is made of plastic, metal, precious metal, polycarbonate, TPE or any sealant or seal material described above.

To ensure a watertight seal, in certain embodiments a compressible layer 160, e.g., a layer of TPE, can be positioned in the bottom member 3. In FIG. 3A, a compressible TPE layer 160 covers a portion of the corner of the device-housing cavity of the bottom member 3. It will be appreciated that any suitable material may be employed as the compressible material. For example, an elastomeric material, such as rubber, TPE, polyethylene, polypropylene, and the like can be used so as to provide compressibility and/or shock absorbance. The compressible material may also be a seal material as described above.

As shown in FIG. 3A, the compressible layer may have a Y-shaped end 173 that interfaces with the top member 2. The Y-shaped end 173 includes an inner face 174 and an outer face 175. The inner face 174 forms a seal between the electronic device 176 and the wiper 177 and/or a screen protector 150 that overlays the electronic device 176. In certain embodiments, the inner face 174 prevents water from leaking between the tapered posts 131 and contacting the electronic device by forming a seal between the compressible layer 160 and the screen protector 150. In other embodiments, the housing lacks a screen protector 150. In these embodiments, the inner face 174 forms a seal between the wiper 177 and the electronic device 176. This allows fluids to contact the face of the electronic device 176 but does not allow them to cross the seal with the compressible layer and contact the rear of the electronic device 160. This is preferable for electronic devices that have water resistant faces that do not necessarily need a screen protector 150 to be resistant to leakage of fluids into the electronic device.

The outer face 175 prevents fluids from leaking between the tapered posts 131 and contacting the electronic device 176 by forming a seal between the top member 120 and the compressible layer 160. In certain embodiments, the outer face 175 can also form a seal between the screen protector 150 and the compressible layer 160 in order to prevent fluids from leaking between the tapered posts 131 and contacting the electronic device (not shown).

Figure 3B:
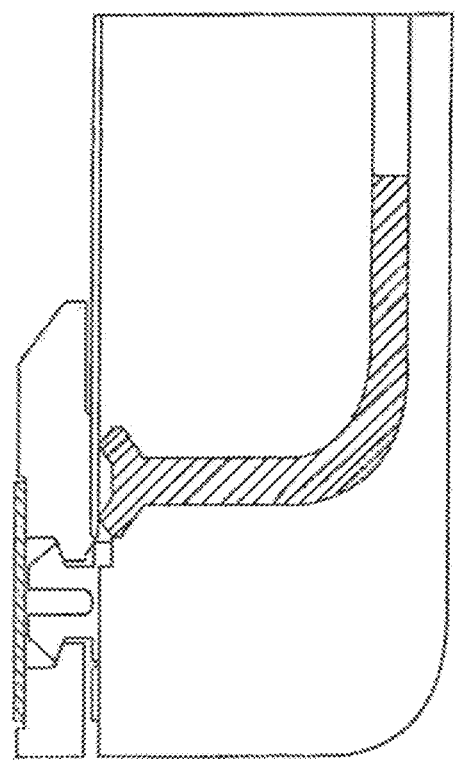
FIG. 3B shows the housing configuration of FIG. 3A without the presence of a mobile device.

FIG. 3B depicts the housing embodiment of FIG. 3A described above, without the presence of an electronic device.

FIG. 3C illustrates a perspective cutaway view of another embodiment of a housing 1 employing representative clasping mechanisms of the top and bottom members. Bottom member 3 includes a plurality of tapered posts 131 with split heads 171 and 172, as described above for FIG. 3A. Top member 2 is mated with the tapered posts 131 via deformable openings 121. A screen protector 150 is also shown. The bottom surface member 35 additionally includes a plurality of sound bridges 68a that function to both provide direct communication between the back surface 35 of the bottom member 3 and a housed device (not shown) as well as to provide a small space between the two so as to enhance the flow of sound through the interior of the housing.

Figure 3D:
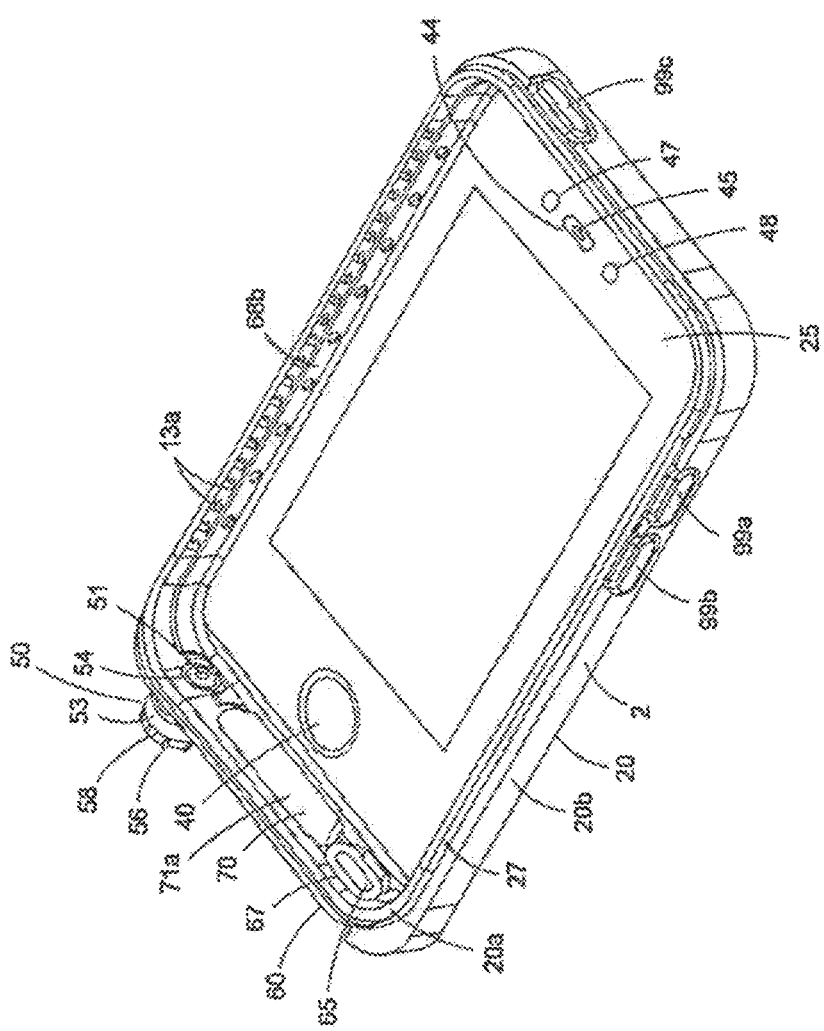
FIG. 3D depicts a perspective view of the underside of a top member of an embodiment of an encasement.
Figure 3E:
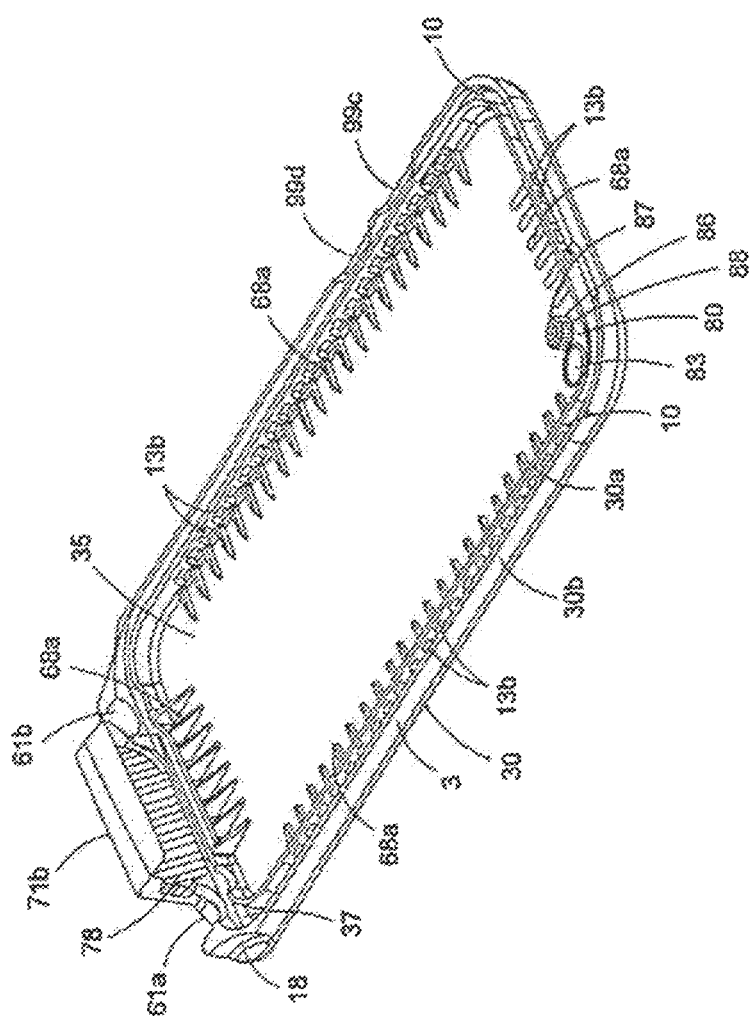
FIG. 3E shows a perspective view of the underside of a bottom member configured to mate with the top member of FIG. 3D.

FIG. 3D provides a perspective view of the underside of a top member 2 and, FIG. 3E provides a perspective view of the underside of a bottom member 3, such that when the top member 2 and bottom member 3 are coupled together they form the housing 1. As can be seen with respect to FIG. 3D, the top member 2 includes a perimeter portion 20. The perimeter portion 20 includes an interior perimeter portion 20a and an exterior perimeter portion 20b.

The top member further includes an interior clasping mechanism 27. The interior clasping mechanism 27 is configured as a lip region that is positioned on a raised ridge portion, which raised ridge portion extends downwards from the bottom surface of the perimeter frame member 20 and front surface 25 of the top member 2. As depicted, the interior clasping mechanism 27 is an entirely internal clasping mechanism. The entirely internal clasping mechanism 27 circumscribes the entire internal circumference of the perimeter of the top member 2. This entirely internal clasping mechanism 27 functions in conjunction with the corresponding clasping mechanism 37 on bottom member 3 to effectively seal the housing 1 in such a manner that the seal is internal to the housing. As depicted, the entirely internal clasping mechanism 27 is configured as a catch and is adapted for being coupled with a groove clasping mechanism 37 of bottom member 3.

Also depicted with respect to FIG. 3D is an additional entirely internal clasping mechanism depicted herein as teeth regions 13a. This clasping mechanism is shown as being in addition to the one described above, but may be used in substitution thereof. The teeth regions are positioned along the perimeter portion 20a of the top member 2. Each teeth region may include one or a plurality of teeth. In this instance, the depicted teeth region includes a plurality of teeth 13a. The teeth extend laterally and internally toward the internal cavity of the housing away from the longitudinal length of the interior perimeter member 20a of the top member 2. The teeth 13a are configured for being received within corresponding teeth receiving members of the bottom member 3.

The top member 2 further includes a front surface member 25 that is configured as a screen protector. The screen protector 25 includes an opaque region and a transparent region through which the interactive display of a housed electronic device may be seen and manipulated. The screen protector includes a plurality of additional features such as an optically clear region 47, which functions as a video screen region; an optically clear region 48, which functions as a proximity sensor screen region; and a sound transmission region 44 for transmitting sound therethrough. In this embodiment the video camera and proximity sensor regions are optically clear regions. As will be appreciated, an alternative to the arrangement of features depicted in the embodiment shown in FIG. 3D follows from the embodiment shown in FIGS. 1B-E. In that embodiment, the additional features include optically clear camera, ambient light, and proximity features (47a, 47b, and 48a, respectively) and an aperture for transmitting sound 46. In various other embodiments, the camera feature may include a lens configured to be aligned with the camera lens of a housed device.

In various embodiments, the sound transmission region is configured as an acoustic aperture feature 44 having an acoustic exit aperture 46 that is overlaid with a water-impermeable gasket, e.g., an acoustic membrane or vent material 45, which membrane material covers the acoustic aperture 46, thereby preventing the ingress of water therethrough while at the same time allowing sound to travel in and/or out of the aperture 46. In certain instances, the acoustic membrane material 45 may be offset from the membrane 25 and attached therewith by an adhesive ring such that it covers the acoustic exit aperture 46 thereby preventing the ingress of water therethrough while at the same time allowing the transmission of sound.

The top member 3 surface membrane 25 also includes a button feature 40. The button feature 40 may simply be a specifically designed detent that is integral with the membrane material 25, or it may be an additional feature added to the membrane, such as a feature that includes a layer of stiff or flexible material that has been molded, adhered, or otherwise attached to the membrane 25 as a button area. If the button feature 40 is an additional feature to be added to the front membrane 25, the button feature may be configured such that the button feature does not increase the thickness of the membrane 25 so as not to decrease the functionality and aesthetics of the housing 1.

The top member 2 further includes a perimeter portion 20 that includes a peripheral interior frame 20a that is coupled to a flexible exterior member 20b. The perimeter portion 20 also includes a plurality of features. For instance, the perimeter portion 20 of the top member 2 includes several button features 99a, 99b, and 99c, such as volume up, volume down, and on/off buttons that are configured for interfacing with respective buttons on an underlying housed device.

The perimeter portion additionally includes a sound transmission portion 60, a latch port feature 70, and a sound port feature 50. The sound transmission portion 60 includes a sound inlet aperture (not shown), which aperture passes from the exterior of the perimeter portion 20 to the interior of the perimeter portion, so as to facilitate the passage of sound into and/or out of the housing. The sound inlet aperture may be configured as a microphone acoustic aperture and/or a speaker acoustic aperture that is covered by an acoustic vent material 65, which vent material may be positioned on a gasket seat 67, such as in an overmoulded fashion or via the application of a simple adhesive, and which vent material allows the passage of sound therethrough but not the passage of liquid, such as water.

Accordingly, as depicted the sound transmission portion 60 is positioned within a perimeter portion 20 of the top member 2 and traverses from the outside of the housing 1, through the exterior and interior perimeter portions 20a, b of the top member 2, and into the interior of the housing 1. The acoustic channel includes an acoustic membrane 65 that transects the acoustic channel and may be seated on an acoustic channel gasket seat 67 such as in an overmoulded fashion. However, in certain embodiments, the sound transmission portion 60 may be positioned within a perimeter portion 30 of the bottom member 3. The acoustic membrane 65 is transmissive for sound but is non-transmissive for liquid. Thus, sound can travel through the sound channel in the housing but liquid, such as water, cannot because it cannot pass through the acoustic vent membranes 65.

The latch, e.g., charge port, feature 70 of the perimeter portion 20 of the top member 2 may be positioned anywhere along the perimeter portion 20, but in this instance is positioned on its proximal end 21. The charge port feature 70 includes a charge port opening 71a, which charge port opening is covered by a charge port latch cover or door (not shown).

The charge port opening 71a may be bounded by a bounding member. The bounding member may be formed of any suitable material and may be in any suitable shape. For instance, the charge port bounding member may be composed of the same material from which the interior and/or exterior perimeter portions 20a and/or b are made. Hence, the charge port bounding member may be integrally formed along with the interior perimeter portion 20b and/or further formed along with the exterior perimeter portion 20b. In certain embodiments, the charge port bounding member may be integrally formed along with the stiff and/or rigid interior perimeter portion 20a of the top member 2 so as to form a charge port opening 71a. A second flexible perimeter portion 20b may then be overlaid upon the rigid interior perimeter portion 20a, wherein a charge port cutout may be cut into the flexible perimeter portion 20b so as to at least partially bound the charge port opening 71a of the interior perimeter portion 20a.

Also depicted is a sound port feature 50 herein depicted as an earphone jack port opening 51 having an ear phone jack port cover or bung 53 positioned therein. The earphone jack port bung 53 includes a threaded region 54b corresponding to a similar threaded region 54a positioned within the earphone jack port opening 51. The earphone jack port bung 53 further includes a gasket (not shown) circumscribing the bung 53. It is noted that although the gasket is described as being associated with the bung 53, in other instances it may be associated with the jack port opening 51. In this embodiment, the earphone jack port bung 53 is inserted into the earphone jack port 50, bung threads 54b are aligned with port threads 54a, and the gasket (not shown) is compressed by the screwing of the bung 53 into the bung port 50 thereby creating a watertight sealing therewith. The jack port bung 53 also includes a top member 58 having grip features 56.

The bottom member 3 includes a perimeter portion 30. The perimeter portion 30 also includes an interior perimeter portion 30*a* and an exterior perimeter portion 30*b* wherein the interior and exterior perimeter portions bound a channel 10. Accordingly, the interior perimeter portion of the bottom member 3 comprises an interior bounding member 30*a*, and the exterior perimeter portion of the bottom member 3 comprises an exterior bounding member 30*b*, which bounding members 30*a* and 30*b* bound the channel 10.

The bottom member 3 of FIG. 3E also includes an internal clasping mechanism 37. In this embodiment, the clasping mechanism of the bottom member is configured as a groove 37 that is configured for being coupled together with a corresponding clasping mechanism 27 of the top member 2 so as to seal the housing 1 together. It is to be noted that although the entirely internal clasping mechanism 37 has been set forth herein in a certain embodiment, e.g., a groove, other variations to the entirely internal clasping mechanism 37 can be provided without departing from the nature of this disclosure. For instance, in certain instances, the clasping mechanism need not circumscribe the entire perimeter portion of the bottom member, need not be entirely internal, and may be configured differently from the groove configuration set forth herein.

In this embodiment, the bottom member 3 further includes an additional internal clasping mechanism herein depicted as teeth receiving region 13*b*, which regions are positioned along the interior perimeter, e.g., interior bounding member, 30*a* of the bottom member 3. As depicted, the teeth receiving members 13*b* are configured as apertures within which the teeth 13*a* of the top member 2 may be fitted. Accordingly, as the top member 2 is coupled to the bottom member 3 the teeth 13*a* interface and engage with the teeth receiving members 13*b* of the bottom member 3 and the housing 1 is therefore formed by the coupling of the top member 2 with the bottom member 3 and sealed by the clasping mechanisms 27 and 37 as well as clasping mechanism 13*a* and 13*b* joining together.

Accordingly, in view of FIGS. 3D and E, the housing 1 may include a one or a plurality of interior clasping mechanism 27 and 37 as well as 13*a* and 13*b*. As depicted, the interior clasping mechanisms are entirely internal clasping mechanisms. Each of the entirely internal clasping mechanisms may circumscribe the entire internal circumference of the perimeter of the housing 1 or only a portion or portions thereof. These entirely internal clasping mechanisms may be configured such that they effectively seal the housing in such a manner that the seal is entirely internal to the housing. As depicted, the entirely internal clasping mechanism 27 and 37 is configured as a catch 27 and groove 37 clasping mechanism, and the entirely internal clasping mechanism 13*a* and 13*b* is configured as a tooth 13*a* and receptacle 13*b* mechanism.

Also depicted in association with the bottom member 3 of FIG. 3E is bottom member back surface 35. The back surface includes a plurality of features, such as a combined lens and sound transmission feature, such as a microphone feature, which in this instance is a combined feature. For instance, the back surface 35 includes a camera lens feature 80 having a camera lens 83 positioned therein, and positioned adjacent thereto is a sound transmission feature 86, in this instance a microphone feature, having a sound transmission aperture 87 that passes from the top surface of the bottom surface 35 through the back surface. The microphone feature 86 further includes a liquid impermeable gasket 88 that is impermissible for liquid, such as water, but is permissible for sound thereby allowing sound to pass therethrough but not water. Additionally, the microphone sound transmission feature includes an internal sound inhibiting gasket 89, which gasket circumscribes the sound transmission aperture 87 and prevents the internal transmission of sound either out of or into the sound transmission aperture, which aperture therefore functions as a sound guide channel directing sound into and/or out of the housing 1 via the sound transmission feature 86.

The bottom surface member 35 additionally includes a plurality of sound bridges 68*a* that function to both provide direct communication between the back surface 35 of the bottom member 3 and a housed device (not shown) as well as to provide a small space between the two so as to enhance the flow of sound through the interior of the housing. Note in this embodiment the bottom surface 35 does not include pips populated throughout the back surface, but in other embodiments such pips may be provided such as in rows of elevated bumps along the bottom surface member 35.

Further, the top member 2 includes a speaker aperture 60 at the bottom. This speaker aperture 60 includes a sound membrane 65 that allows for sound to pass through the membrane but does not allow fluids such as aqueous fluids including water to pass through the membrane. The speaker aperture 60 also includes an acoustic gasket 67 around its outside edge. In certain embodiments, the acoustic gasket includes an opening on the side facing the bottom member 3 of the housing. This opening allows sound to be transmitted to the bottom member 3 of the housing to be transmitted outside of the housing using the sound transmitting areas 350 described above.

The perimeter 30 of the bottom member 3 additionally includes a plurality of features such as a coin-slot cut out feature 18, to assist in the separating of the top member from the bottom member when the housing has been formed. The perimeter portion additionally includes a plurality of sound transmission cutouts 61*a* and 61*b*, which function to form a bounding member for a channel or port of the bottom member 3 that when coupled to the top member 2 from said channel or port through which sound may pass through. Between the two sound passage cutouts is a latch port door 71*b* having a water impermeable seal, e.g., a gasket 78, positioned thereon. Additionally depicted are button feature cutouts 99*c* and 99*d*, which function to from bounding members for the respective button features.

Figure 3F:
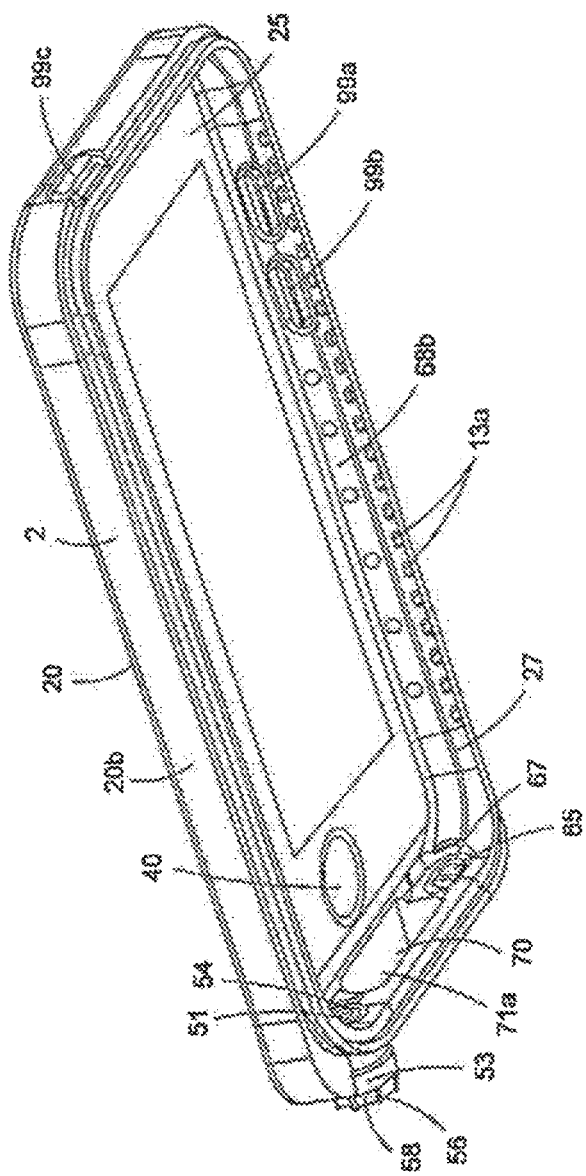
FIG. 3F shows another perspective view of the underside of the top member shown in FIG. 3D.
Figure 3G:
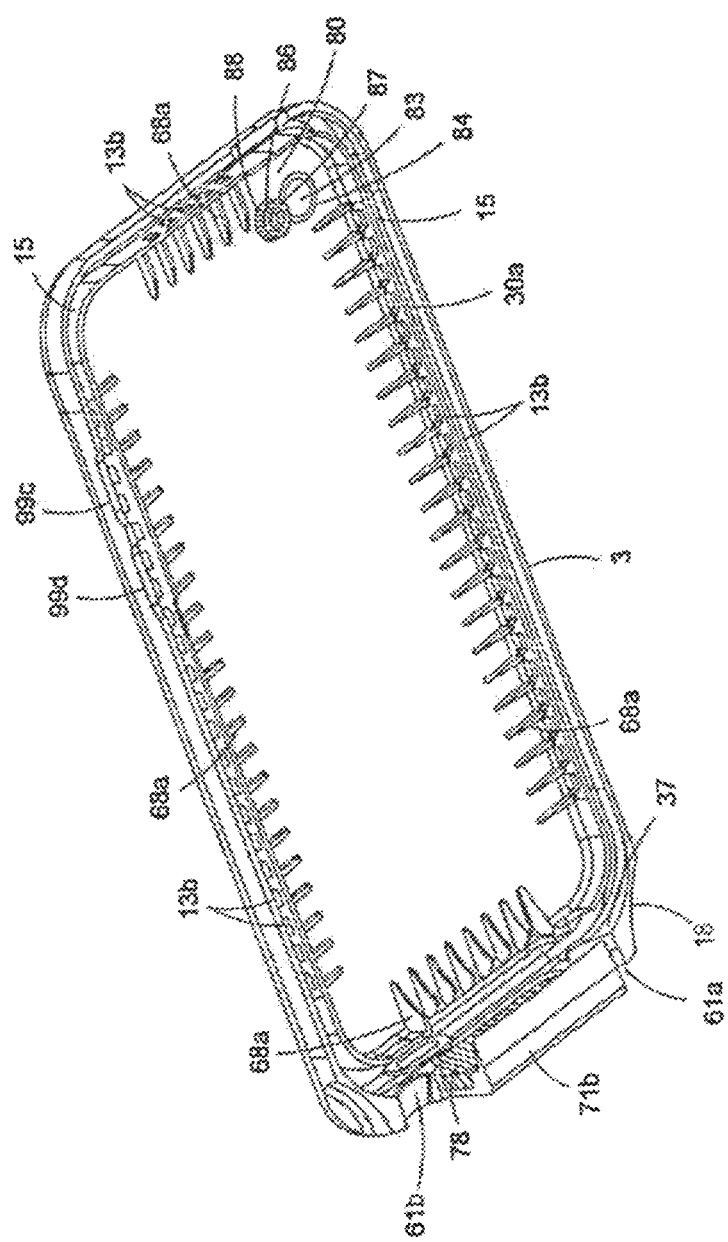
FIG. 3G shows another perspective view of the underside of the bottom member shown in FIG. 3E.
Figure 3H:
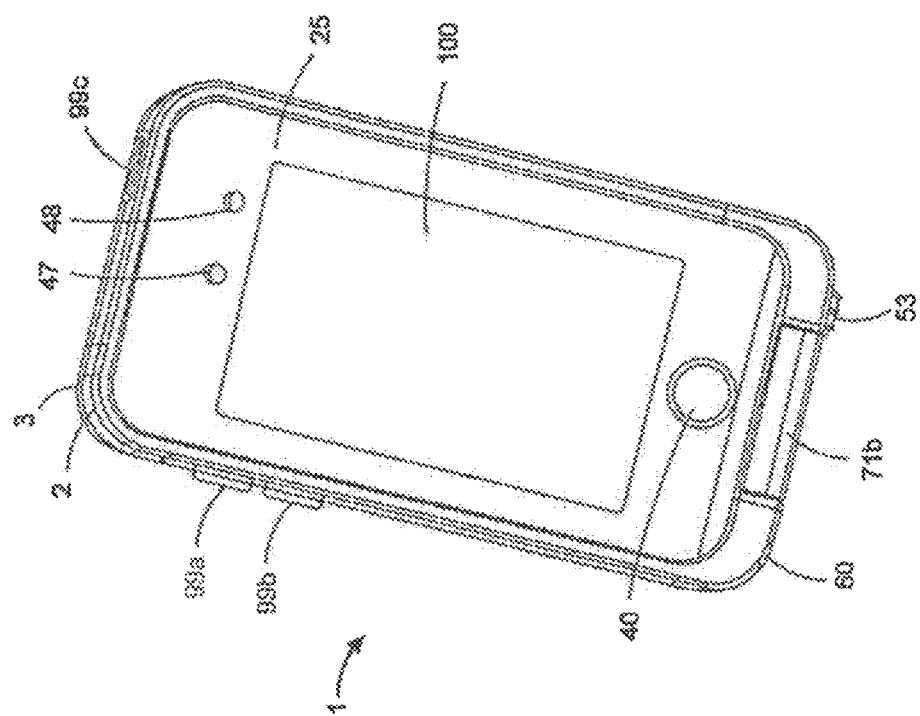
FIG. 3H shows a front view of the mated top and bottom members of FIGS. 3D-3G.

FIGS. 3F and 3G provide bottom up views of the respective top 2 and bottom 3 members of FIGS. 3D and 3E as they would be prior to the insertion of an electronic device there between so as to form the housing 1 as depicted in FIG. 3H. Accordingly, in inserting an electronic device within the housing 1, the device may first be positioned within the top member 2, e.g., by toeing it therein, such as by first aligning a sound transmission port feature, e.g., a headphone jack receiving portion of the device, with the corresponding port feature, e.g., bung 53, of the top member 2, and then pressing the back surface of the device downward along its length so that it is flattened within the top member so that the display of the device is aligned with the front screen 25 of the top member 2. Once the device is inserted within the top member 2, e.g., of FIG. 3F, then the bottom member 3, e.g., of FIG. 3G, may be aligned therewith and pressed onto the top member 2 in such a manner that the clasping mechanism(s) are coupled together, such as by snapping, and thus the housing 1, e.g., of FIG. 3H, is formed thereby protecting the housed device 100 from shock, liquid, and/or dust.

The ability of the housing 1 to provide such strong shock, liquid, and/or dustproof protections to a housed device are due in part to the unique clasping mechanism(s) described herein. Accordingly, a unique feature of the perimeter portion clasping mechanism(s) herein depicted with respect to FIG. 3 is that they are entirely internal to the housing 1. By "entirely internal to the housing" is meant that the corresponding clasping mechanisms are entirely within the bounds of the housing 1 such that when the top member 2 is coupled to the bottom member 3 (See FIG. 3C), the corresponding clasping mechanisms are contained entirely within the inside of the housing and not exterior thereto, e.g., the clasping mechanisms may be positioned along the inside of the perimeter of the housing 1. Additional latching elements, such as external latching mechanisms, can further be included, e.g., along an outside perimeter of the housing, so as to further ensure that a liquid-tight seal is provided. Additional internal latching mechanisms may also be provided.

Accordingly, a clasping system of the disclosure can provide a small cross section that solves the problems of: how to close/assemble the housing and keep it joined together in a close, snug or form-fitting slim profile, how to minimize the material necessary to make the housing (so thicker materials are not required in order to resist the band inflection), and ensuring the seal, e.g., gasket, such as an O-ring, is suitably compressed between the two case housings, thereby creating a liquid-proof and seamless seal, which sealing may further function to direct shocking forces along the channel member thereby preventing a substantial force being directed into the housed device.

As set forth above, a plurality of clasping mechanisms both internal and/or external may be included as part of the housing. For instance, the housing may include one or a plurality of internal clasping mechanisms and/or one or a plurality of external clasping mechanisms. As explained below, the clasping mechanisms may have a variety of different configurations. For example, the top and bottom members may include an internal clasping mechanism that is configured as opposing catches or hooks and/or extended portions and grooves, which clasping mechanisms circumscribe an internal portion of the perimeter of the top and bottom members. Alternatively, or in addition to the opposing catch mechanisms, the top and bottom member may include an internal clasping mechanism that is configured as male and female counter parts, e.g., teeth and holes or receptacles. Additionally or alternatively the housing may include an external clasping mechanism that may have any suitable configuration such as a clip or peg and slot configuration. One or more of these configurations are detailed herein.

Figure 4A:
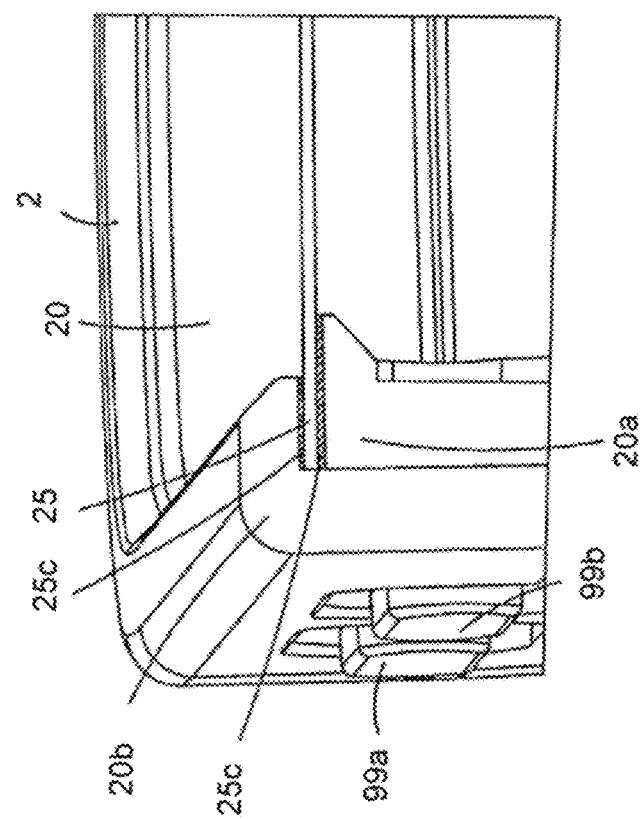
FIG. 4A shows a perspective cutaway view of mated top and bottom members with an interactive membrane.

FIG. 4A illustrates an embodiment of how the top surface, e.g., interactive membrane 25, of the top member 2 associates with a top member perimeter portion 20. The perimeter portion 20 includes an interior perimeter portion 20a, which portion comprises a framework, such as a rigid body, e.g., fabricated from a stiff material like metal, polycarbonate, and the like, that can be fabricated in a first process. The membrane 25 can then be associated therewith it either directly during the fabrication process, e.g., the moulding process, or indirectly through the addition of one or more intervening adhesive layers, e.g., 25c. In certain embodiments, the one or more adhesive layers need not be included.

In one embodiment, once the rigid internal framework 20a has been fabricated and the membrane 25 attached thereto, a second, more flexible perimeter portion 20b may be fabricated and overlaid or otherwise moulded over the interior perimeter portion 20a and membrane 25. In certain instances, the membrane 25 may be attached to the perimeter portions 20a and/or b via one or more adhesives 25c. In a manner such as this a liquid-tight and/or dust-tight seal is produced between the membrane 25 and the perimeter portion 20, wherein the interior perimeter portion 20a interfaces with a bottom surface of membrane 25 (e.g., via adhesive 25c), and an outer perimeter portion 20b is configured with respect to the top member 2 such that it interfaces with a top surface of the membrane 25 (e.g., via adhesive 25c). It is to be noted that, in various embodiments, the membrane may be attached to a top or a bottom surface of 20a and/or 20b, and/or the flexible portion 20b may be removably or non-removably coupled to 20a. Also depicted with respect to FIG. 4A are button overmould features 99a and 99b.

Figure 4B:
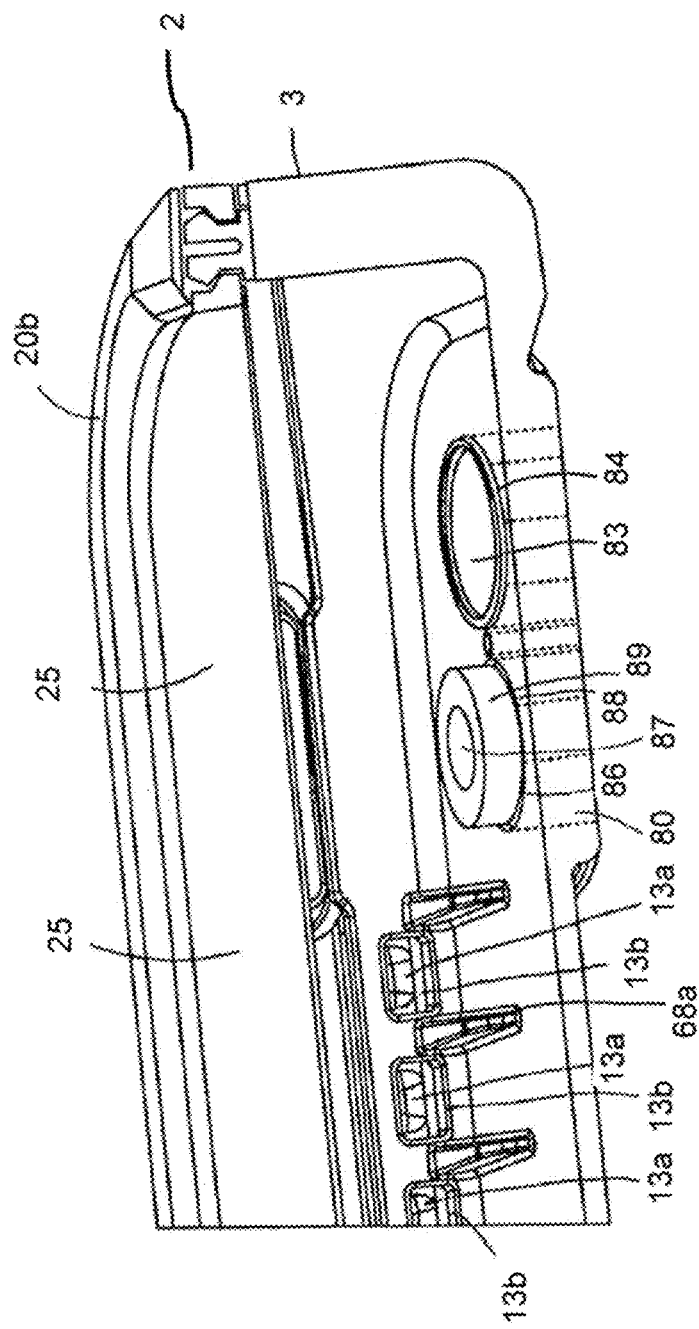
FIG. 4B depicts a perspective cutaway view of an embodiment of an encasement having deformable openings and tapered posts.
Figure 4C:
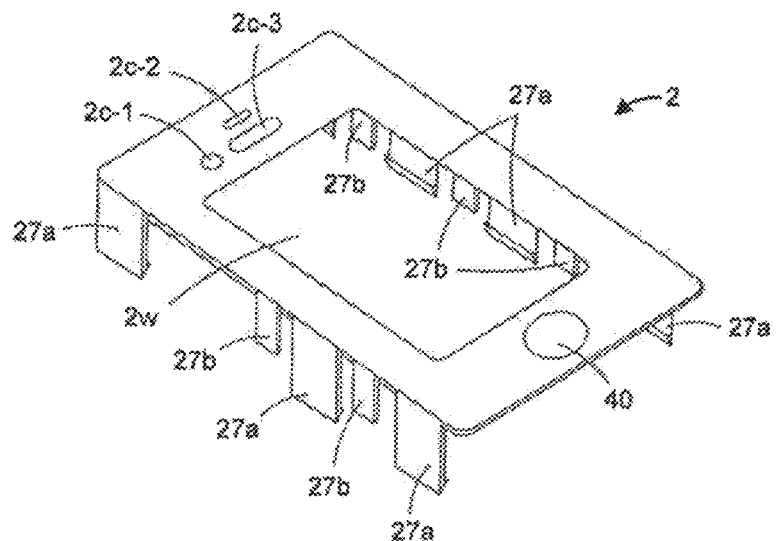
FIG. 4C shows a perspective view of an embodiment of a top member of an encasement having clasping members.
Figure 4D:
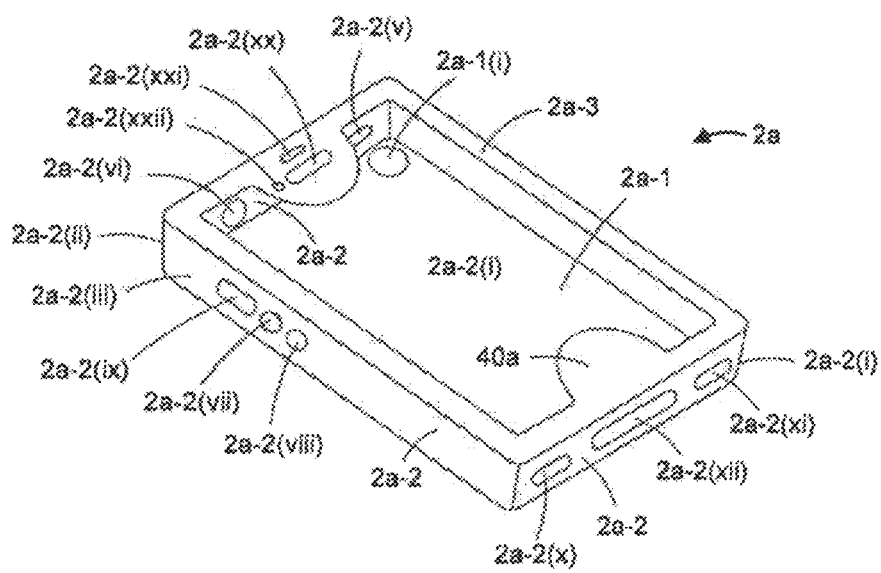
FIG. 4D shows a perspective view of an elastic boot configured to hold an electronic device and be encased by the top and bottom members of FIGS. 4C and 4E.
Figure 4E:
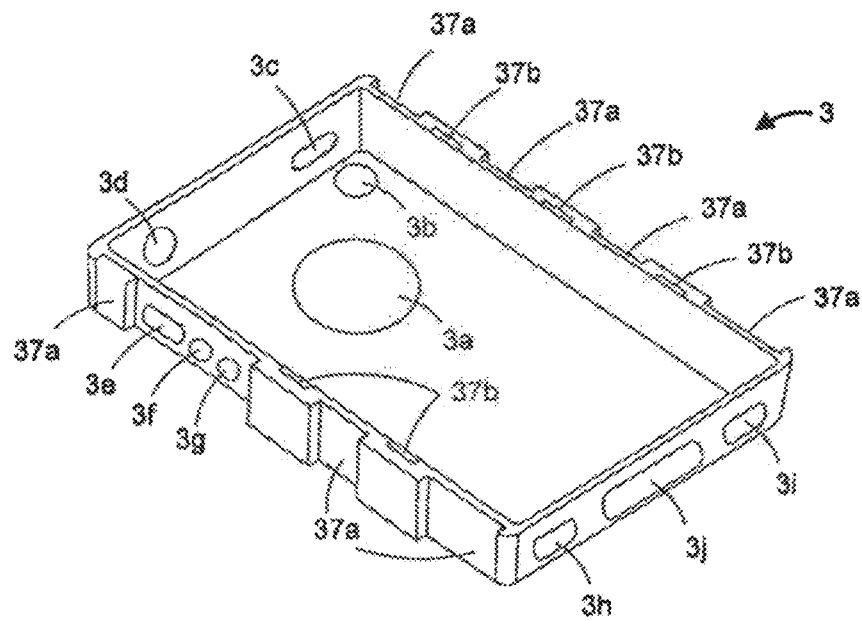
FIG. 4E shows a perspective view of a bottom member of a case configured to mate with the top member of FIG. 4C.
Figure 4F:
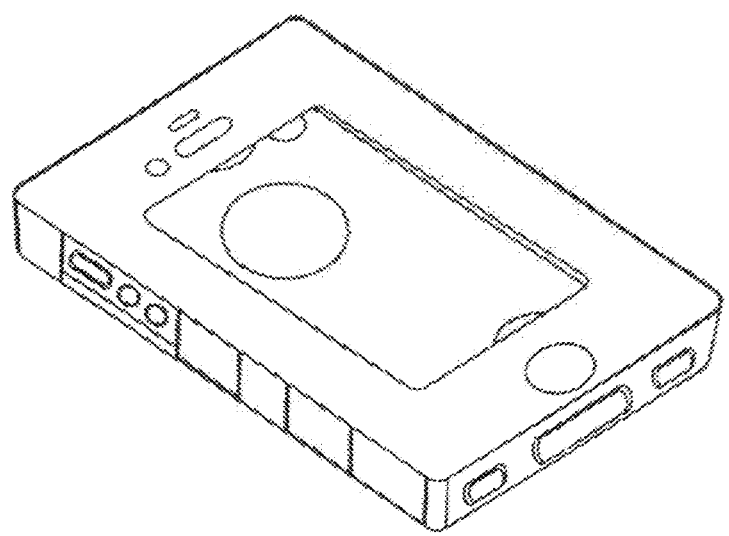
FIG. 4F shows a perspective view of the top member, elastic boot, and bottom member of FIGS. 4C-4E mated together.

FIG. 4B depicts a further embodiment of the overmoulded top member 2 of FIG. 4A. The rigid interior member 20a is fabricated such as from a hard polycarbonate material and a screen protector, e.g. an interactive membrane 25, is associated therewith, e.g., either with or without the application of an intervening adhesive. Any suitable adhesive or molecular bonding material may be employed. Once the membrane 25 has been attached to the rigid body 20a, a second more flexible member 20b, e.g., a semi-flexible or flexible material such as TPE, may be fabricated and molded over both the rigid body 20a and a perimeter portion of the membrane 25, so as to circumscribe at least a portion or the entire perimeter thereof. In this manner the internal rigid body 20a will give the top member 2 a strong internal framework and the flexible external body 20b will provide a layer of shock absorbance to the top member 2. Furthermore, an over-moulding process such as this will enhance the bonding of the membrane 25 to the external and internal bodies 20a, b of the perimeter portion 20 thereby enhancing reliability of the seal and ensuring that the seal is liquid-proof.

As can be seen with respect to FIG. 4B, the rigid interior perimeter portion 20a of top member 2 includes a plurality of deformable openings and the bottom member includes tapered posts, as described above for FIG. 3A. However, the housing shown in FIG. 4B can be latched according to any method known in the art. In another embodiment, a first clasping mechanism of the top member is designed to associate with a corresponding clasping mechanism of the exterior perimeter portion, e.g., bounding member, of the bottom member in a liquid tight seal. The liquid tight seal is further insured by the presence of the gasket within the channel of bottom member, as well as by the impingement of the extended member within the channel which functions to engage and compress the gasket within the channel. For instance, as the impinging member of the interior perimeter portion of the top member, having clasping member positioned thereon, slides into the channel of the bottom member and associates with its corresponding clasping member of the exterior bounding member, a portion of the interior perimeter portion of the top member contacts and presses down on the gasket thereby compressing the gasket and further insuring a liquid tight and shockproof seal therewith. The shockproof seal is further assured by the ability of the impinging member to increase the surface area of the rigid frame within the channel and in contact with the compressible gasket thereby confining the transference of shock to within the bounds of the channel and increasing the dispersal of shock therein thereby diminishing the transference of shock to a housed device.

In this embodiment, the clasping member of the exterior perimeter portion is formed as a circumferential groove that circumscribes at least a portion of the channel. Hence, the clasping mechanism of the interior perimeter portion of the top member is configured for at least partially being received within the groove so as to be coupled therewith and therefore at least partially circumscribes the channel when the top member is coupled to the bottom member. Also included is an additional clasping mechanism that includes a plurality of teeth, associated with top member, that are fitted within a plurality of corresponding teeth receptacles, associated with the bottom member, such that when the top member is coupled to the bottom member, the teeth intrude within the receptacles, thereby further enforcing the sealing of the top member to the bottom member and the forming of the housing.

Additionally depicted is top surface membrane 25, which top surface membrane 25, which membrane material spans from one perimeter portion to the other thereby preventing the ingress of water therethrough and into the housing. Further depicted is a bottom member 3 having a lens feature 80 and a sound transmission feature 86 positioned on a back surface 35 of bottom member 3. In this embodiment, the bottom member 3 includes a combined camera 80 and microphone 86 feature. The combined feature may include a camera lens 83 and may further include a flash lens (not shown). However, where a camera lens and a flash lens is provided in conjunction, the camera lens should be separated from the flash lens, and where an additional sound transmission feature, such as a microphone feature, is further included, the three features should be separated one from the other. For instance, the sound transmission portion may be positioned in between the camera and the flash lens features thereby separating the one from the other. The camera lens 83 is surrounded by a non-transmissive feature 84, such as a gasket that prevents the transmission of light from the surround from impinging upon the camera lens feature 80. In this embodiment, the microphone feature 86 includes a sound transmission aperture 87 that is overlaid with a membrane member 88 that is at least partially transmissive for both light and sound but not permissive for liquid, such as water. Such a membrane 88 may be fabricated from a thin layer of TPE, for example a layer of TPE that is 0.3 mm or less. The sound transmission feature additionally includes a sound isolating gasket 89 that circumscribes the aperture 87 and functions to prevent the internal of transmission of sound therethrough.

The disclosure also provides a system for providing at least one water-resistant seal. The system includes an elastic cover having at least one aperture; a portable electronic device that is insertable into the elastic cover, the portable electronic device providing a fixed dimensional structure to an inner surface of the elastic cover; and a rigid housing formed to be disposed on at least a portion of the elastic cover, and to provide an opposing compressive force against the fixed dimensional structure on an outer surface of the elastic cover proximate to and substantially opposite the inner surface of the elastic cover, when the elastic cover covers at least a portion of the fixed dimensional structure of the portable electronic device, so as to form the at least one water-resistant seal between the inner surface of the elastic cover and the fixed dimensional structure of the portable electronic device.

In one embodiment, the fixed dimensional structure includes a protective member that overlays the portable electronic device. The protective member can be optically transmissive. Further, the protective member can include at least one of: a microphone cover, a button actuator, an acoustic gasket, an optical filter, a lens, an optically opaque region, or a membrane. The elastic cover can also include an aperture, and wherein an inner periphery of the aperture exposes an underlying region of the fixed dimensional structure.

In another embodiment the system also includes one or more water resistant seals, each water resistant seal configured to seal an opening to the portable electronic device within the underlying region of the fixed dimensional structure. In one embodiment, the rigid housing includes the one or more water resistant seals. The one or more water resistant seals can be selected from a gasket, an adhesive, a clinging gel, a clinging elastomer, or an adhesive tape.

The disclosure also provides a method of forming at least one water resistant seal. The method includes the steps of providing a portable electronic device having a fixed dimensional structure; covering at least a portion of the portable electronic device with an elastic cover, the elastic cover having at least one aperture; disposing a rigid housing on at least a portion of the elastic cover, the rigid housing providing an opposing compressive force on an outer surface of the elastic cover proximate to and substantially opposite an inner surface of the elastic cover when the elastic cover covers at least a portion of the fixed dimensional structure of the portable electronic device; and forming the at least one water-resistant seal between the inner surface of the elastic cover and the fixed dimensional structure of the portable electronic device by the opposing compressive force.

In one embodiment, the method also includes the steps of providing one or more water resistant seals, each water resistant seal configured to seal an opening to the portable electronic device within the underlying region of the fixed dimensional structure; and sealing the opening to the portable electronic device within the underlying region of the fixed dimensional structure with the corresponding one or more water resistant seals.

The disclosure also provides a system for providing at least one water-resistant seal for a portable electronic device that provides a fixed dimensional structure. The system includes an elastic cover having at least one aperture, the elastic cover having an inner surface to cover at least a portion of the fixed dimensional structure of the portable electronic device; and a rigid housing formed to be disposed on at least a portion of the elastic cover, and to provide an opposing compressive force against the fixed dimensional structure on an outer surface of the elastic cover proximate to and substantially opposite the inner surface of the elastic cover, when the elastic cover covers at least a portion of the fixed dimensional structure of the portable electronic device, so as to form the at least one water-resistant seal between the inner surface of the elastic cover and the fixed dimensional structure of the portable electronic device.

In one embodiment, the fixed dimensional structure includes a protective member that overlays the portable electronic device. The protective member can be optically transmissive. The protective member can include at least one of: a microphone cover, a button actuator, an acoustic gasket, an optical filter, a lens, an optically opaque region, or a membrane.

In other embodiments, the elastic cover includes an aperture, and wherein an inner periphery of the aperture exposes an underlying region of the fixed dimensional structure. In another embodiment, the system also includes one or more water resistant seals, each water resistant seal configured to seal an opening to the portable electronic device within the underlying region of the fixed dimensional structure.

In another embodiment, the rigid housing includes the one or more water resistant seals. The one or more water resistant seals can be selected from a gasket, an adhesive, a clinging gel, a clinging elastomer, or an adhesive tape.

The disclosure also provides a method of providing at least one water-resistant seal for a portable electronic device that provides a fixed dimensional structure. The method includes the steps of covering at least a portion of the portable electronic device with an elastic cover, the elastic cover having at least one aperture; disposing a rigid housing on at least a portion of the elastic cover, the rigid housing providing an opposing compressive force on an outer surface of the elastic cover proximate to and substantially opposite an inner surface of the elastic cover when the elastic cover covers at least a portion of the fixed dimensional structure of the portable electronic device; and forming the at least one water-resistant seal between the inner surface of the elastic cover and the fixed dimensional structure of the portable electronic device by the opposing compressive force.

In one embodiment, the method also includes the steps of providing one or more water resistant seals, each water resistant seal configured to seal an opening to the portable electronic device within the underlying region of the fixed dimensional structure; and sealing the opening to the portable electronic device within the underlying region of the fixed dimensional structure with the corresponding one or more water resistant seals.

The disclosure also provides a system for providing at least one water-resistant seal. The system includes an elastic cover having at least one aperture; a portable electronic device that is insertable into the elastic cover, the portable electronic device providing a fixed dimensional structure to an inner surface of the elastic cover; and a rigid housing formed to be disposed on at least a portion of the elastic cover, and to provide an opposing compressive force against the fixed dimensional structure on an outer surface of the elastic cover proximate to and substantially opposite the inner surface of the elastic cover, when the elastic cover covers at least a portion of the fixed dimensional structure of the portable electronic device, so as to form the at least one water-resistant seal between the inner surface of the elastic cover and the fixed dimensional structure of the portable electronic device, wherein the rigid housing comprises a top portion and a bottom portion, wherein the bottom member comprises an inner surface defined by a back wall and a side wall to receive the electronic device, the side wall having a top surface defined by a periphery; and a top member that frames at least a portion of the front surface of the electronic device to enable operation by a user of the display, the frame member having a peripheral edge that corresponds to the periphery of the top surface of the side wall of the bottom member; wherein the peripheries of one or both of the top and bottom members comprise one or more vertical couplers and one or more rotational couplers and wherein the peripheries of one or both of the top and bottom members comprise one or more vertical coupler receivers and one more rotational coupler receivers so that any vertical coupler on one member is positioned to interact with a vertical coupler receiver on the other member and any rotational coupler on one member is positioned to interact with a rotational coupler receiver on the other member when the top and bottom members are positioned with their peripheries aligned.

In one embodiment, the fixed dimensional structure includes a protective member that overlays the portable electronic device. The protective member can be optically transmissive. Further, the protective member can include at least one of: a microphone cover, a button actuator, an acoustic gasket, an optical filter, a lens, an optically opaque region, or a membrane. The elastic cover can also include an aperture, and wherein an inner periphery of the aperture exposes an underlying region of the fixed dimensional structure.

In another embodiment the system also includes one or more water resistant seals, each water resistant seal configured to seal an opening to the portable electronic device within the underlying region of the fixed dimensional structure. In one embodiment, the rigid housing includes the one or more water resistant seals. The one or more water resistant seals can be selected from a gasket, an adhesive, a clinging gel, a clinging elastomer, or an adhesive tape.

Another embodiment of the disclosure described generically above is shown in FIGS. 4C-4F. As can be seen with respect to FIGS. 4C and 4E, the top member 2 of the housing 1 may include clasping members 27a positioned about the perimeter portion of the top member 2, which clasping members 27a are configured for aligning and interfacing with clasp mating elements 37a disposed in corresponding perimeter locations about the perimeter of the bottom member 3 in such a manner so as to allow coupling of the top and bottom three members 2, 3 of the housing with one another, thereby closing the housing. To further facilitate alignment and sealing of the top and bottom members, in preferred embodiments the top member 2 further comprises downward-projecting alignment posts 27b for insertion into complementary alignment channels 37b disposed in the bottom member 3. The bottom member 3; (FIG. 4E) may also comprise a number of other elements or features, including an optically clear, tinted, and/or translucent viewing window 3a that allows a portion of an electronic device encased within the housing to be visualized, as well as an optically clear camera window that aligns with a camera portion of an encased electronic device. A number of ports or apertures 3c-3i may also be disposed about the periphery of the bottom member 2. The clasping members 27a and alignment posts 27b may be distributed around the periphery of the top member 2 of the housing 1 in any combination. The clasping members 27a and alignment posts 27b may be positioned on the top or bottom sides of the top member 2 of the housing 1, instead of or along with the left and right sides of the top member 2 of the housing 1. The clasping members 27a and alignment posts 27b may be present in any number. In certain embodiments, there are 1, 2, 3, 4, 5, 6, 7, 8, 9, 10, 11, 12, 13, 14, 15, 16, 17, 18, 19 or 20 clasping members 27a on the top member 2 of the housing 1. In other embodiments, there are 1, 2, 3, 4, 5, 6, 7, 8, 9, 10, 11, 12, 13, 14, 15, 16, 17, 18, 19 or 20 alignment posts 27b on the top member 2 of the housing 1. In other embodiments, the clasping members 27a and alignment posts 27b are placed on the bottom member 3 of the housing 1. The embodiments regarding the clasping members 27a and alignment posts 27b for the top member 2 are also true for clasping members 27a and alignment posts 27b when they are positioned on the bottom member 3 of the housing 1.

In certain embodiments, for each clasping member 27a there is a corresponding clasp mating element 37a on the opposite member positioned so that the clasping member 27a and clasp mating element 37a interact to couple together. For example, if a clasping member 27a is present on the top member 2 of the housing 1, a corresponding clasp mating element 37a will be present on the bottom member 3 of the housing 1. In other embodiments, for each alignment post 27b there is a corresponding alignment channel 37b on the opposite member positioned so that the alignment post 27b and alignment channel 37b interact to hold the top and bottom members in an aligned configuration in relation to each other. For example, if an alignment post 27b is present on the top member 2 of the housing 1, a corresponding alignment channel 37b will be present on the bottom member 3 of the housing 1.

The top member 2; (FIG. 4C) preferably contains a variety of features, including a window 2w to allow access to the touch screen of an encased electronic device encased in the housing, a button feature 40 and optically clear regions 2c-1, 2c-2, e.g., corresponding to a video camera portion and a proximity sensor/ambient light sensor portion of an encased device, respectively; and an acoustic membrane (not shown) disposed to cover an acoustic aperture 2c-3 for transmitting sound. The acoustic aperture 2c-3 is preferably covered (via placement on the inner surface of the top portion 2) by a sound-transmissive waterproof gasket, which prevents liquid, dirt, dust, etc. from entering the housing but is permissive to sound. Such a gasket may be comprised of several different water phobic materials such as GoreTex® and the like.

Suitable materials from which the top and bottom members 2, 3 may be fabricated include rigid, semi-rigid, and flexible materials, including, without limitation, plastics, metals, polycarbonates, nylon, liquid crystal polymers, and/or rubber, thermal plastic urethanes, polyethylenes, and/or polypropylenes, mixtures thereof and the like.

In order to seal an electronic device such as a smart phone (not shown) in the housing embodiment, an flexible, elastic boot (FIG. 4D); 2a is provided into which the portable electronic device can be snugly inserted by stretching the boot over and around the electronic device such that the features on the device align with complementary features on the flexible, elastic boot 2a. The boot 2a includes a bottom panel 2a-1, a perimeter portion 2a-2 defined by a proximal end portion 2a-2(i) and a distal end portion 2a-2(ii) as well as opposing side portions 2a-2(iii) and 2a-2(iv), and a top portion 2a-3.

The perimeter portion 2a-2 of the boot 2a may include a plurality of additional features, such as an "on" and "off" switch feature 2a-2(v), a headphone port sealing feature 2a-2(vi), button protection features 2a-2(vii) and (viii), a switch feature 2a-2(ix), a microphone feature 2a-2(x), and a speaker feature 2a-2(xi), and a power connector feature 2a-2(xii). The bottom panel 2a-1 may also contain one or more features corresponding to functional elements of the electronic device intended to be encased in the housing, including an aperture for a camera 2a-1(xi). In these embodiments, the perimeter portion 2a-2 is fabricated from a malleable material, such as an elastomeric material, such as rubber, TPE, polyethylene, polypropylene, and the like so as to provide flexibility and/or shock absorbance.

The top portion 2a-3 of the boot 2a may also contain a variety of features, including a button cover feature 40a and apertures 2a-2(xxii) and (xxi) that correspond to optically clear regions 2c-1, 2c-2 of the top member 2, which are intended to correspond to a video camera portion and a proximity sensor/ambient light sensor portion of an encased device, respectively; and an acoustic opening 2a-2(xx) that corresponds to the acoustic aperture 2c-3 of the top member 2. The features in the boot 2a may be apertures in the boot 2a, they may be transparent portions of the boot or they may be a sound-transmissive waterproof gasket, which prevents liquid, dirt, dust, etc. from entering the housing but is permissive to sound.

To encase an electronic device in such an embodiment (see FIG. 4F, electronic device not shown), the device is inserted into the flexible boot 2a. The boot/device combination is then placed in the bottom member 3, after which the clasping members 27a and alignment posts 27b of the top member 2 are aligned with the clasp mating elements 37a and alignment channels 37b of the bottom member 3. In other embodiments, the boot/device combination is then placed in the bottom member 3, after which the clasping members 27a and alignment posts 27b of either member are aligned with the clasp mating elements 37a and alignment channels 37b of the opposite member. In other embodiments, the boot/device combination is placed in the top member 2 after which the clasping members 27a and alignment posts 27b on either member are aligned with the clasp mating elements 37a and alignment channels 37b of the opposite member. The top and bottom members 2, 3 are then pressed together, causing closure of the clasping members 27a to clasp mating elements 37a and compression of the flexible boot 2a so as to create a watertight seal encasing the device. At the same time, the touch screen of the encased device is easily accessible to the user through the opening 2w in the top member 2.

Figure 5A:
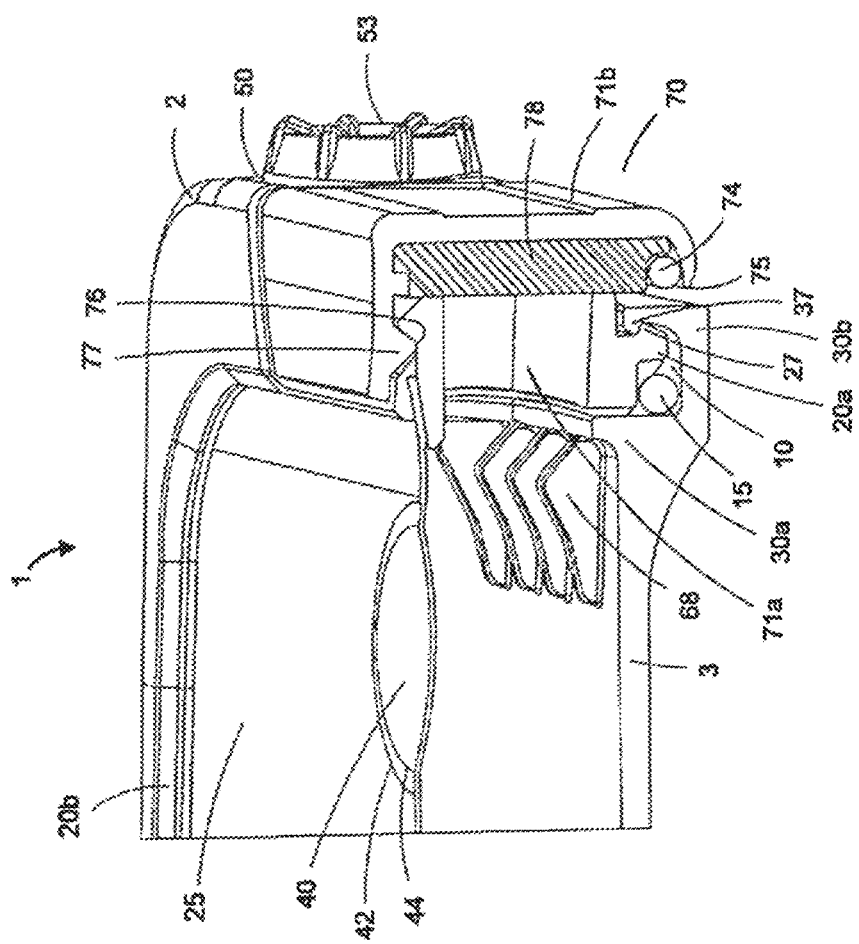
FIG. 5A shows a side cutaway, cross section view of a housing with an indented button in a flexible membrane, a charge port door, and headphone bung, as well as a channel and gasket in the bottom member.

FIG. 5A provides a side cut-away, cross section view of a housing 1 of the disclosure, showing an indented button feature 40 as well as a latch port feature 70. The housing 1 includes a top member 2 and a bottom member 3. The top member 2 includes a front surface, which in this embodiment is composed of a flexible membrane 25. The front membrane includes a button feature 40, which button feature includes a pivot edge 41 and a raised pivot ridge 42. The button feature 40 is indented and configured to interface with the "home" or "menu" button of an encased device. The pivot ridge portion 42 is raised and at least partially circumscribes the button feature 40 so as to accommodate the travel pursuant to the button 40 being depressed. For instance, as the button 40 is depressed, pivot edge 41 flattens and pivot ridge 42 extends downwards.

The housing 1 further includes a charge port feature 70 on its proximal end. The charge port feature 70 includes a charge port opening 71a, which charge port opening is covered by a charge port latch cover or door 71b. The charge port opening 71a is bounded by a bounding member. The bounding member may be formed of any suitable material, such as the same material from which the rest of the framework member is made, and may be in any suitable shape. For instance, the charge port bounding member may be composed of the same material from which the interior and/or exterior perimeter portions 20a and/or b are made. In certain embodiments, the charge port opening is an aperture positioned along the rigid frame material of the interior perimeter portion 20a of the top member 2. Of course, in various embodiments, the charge port opening may be part of the bottom member.

Hence, the charge port bounding member may be integrally formed along with the interior perimeter portion 20b and/or further formed along with the exterior perimeter portion 20b. In certain embodiments, the charge port bounding member may be integrally formed along with the stiff and/or rigid interior perimeter portion 20a of the top member 2 so as to form a charge port opening 71a. A second flexible perimeter portion 20b may then be overlaid upon the rigid interior perimeter portion 20*a*, wherein a charge port cutout may be cut into the flexible perimeter portion 20*b* so as to at least partially bound the charge port opening 71*a* of the interior perimeter portion 20*a*.

In certain other instances, the charge port bounding member may include a plurality of materials from which the charge port opening 71*a* is composed. For instance, the charge port opening 71*a* may be bounded by a plurality of materials having a different stiffness. For instance, a first bounding material may be a stiff material which material is provided to give structure to the charge port opening 71*a*. A second more flexible material may be included which material is configured for receiving a portion of a charge port door gasket 78.

The charge port feature 70 may further include a charge port door 71*b* that may include a charge port door gasket 78. Together the charge port door 71*b* and gasket 78 function to provide a waterproof sealing of the charge port orifice 71*a*. For instance, in this embodiment, the charge port bounding member includes a charge port door latch ramp receiving member 76, and the charge port door 71*b* includes a corresponding charge port door latch ramp 77. The charge port door latch ramp 77 is configured for being received within the charge port door latch ramp receiving member 76 thereby latching the charge port door 71*b* to the bounding member. Thus, when the charge port door 71*b* is closed, the gasket 78 covers the charge port opening 71*a* thereby effectively sealing the opening 71*a* and preventing the entrance of liquid and/or dirt or dust therethrough. The gasket may be composed of any suitable compressible material, which if desired may be further overlaid with a less flexible rubber or silicone material so as to provide greater resilience to the gasket 78.

The charge port door 71*b* is configured for opening and closing so as to allow and/or prevent access to the charge port opening 71*a*. Hence, the charge port feature 70 may further include a charge port axle 74, e.g., positioned to extend from a bottom member, about which the charge port door 71*b* rotates or pivots. The charge port door 71*b* therefore may be configured to include an axle receiving orifice 75 though which the axle 74 is fitted. In a manner such as this, the charge port door 71*b* may be rotated about the axle 74 from an opened to a closed position thereby permitting access to the charge port opening 71*a*, when in the opened position, or preventing access thereto by providing a waterproof seal when the charge port door 71*b* is in the closed position.

The bottom member 3 includes a perimeter portion 30 having a channel 10 therein having a gasket 15 positioned therein. The channel 10 may be bounded by an interior perimeter portion 30*a* and an exterior perimeter portion 30*b*. In this embodiment, the bottom member 3 is configured for being connected to the top member 2, such as via corresponding latching mechanism 27 and 37, so as to form a waterproof sealing of the housing 1. Specifically, the top member 2 may include an interior perimeter portion 20*a* that further includes an internal clasping mechanism 27. The exterior perimeter portion 30*b* of the bottom member 3 may include the corresponding clasping mechanism 37. The clasping mechanisms 27 and 37 may be configured for being coupled together so as to clasp the top 2 and bottom 3 members together thereby forming the housing 1.

To further insure a waterproof sealing, the channel 10 is included along a perimeter portion of the housing 1. The channel 10 includes a gasket 15 positioned therein. Accordingly, as the interior perimeter portion 20*a* of the top member 2 is aligned with the exterior perimeter portion 30*b* of the bottom member 3, and the corresponding clasping mechanisms 27 and 37 are coupled together, the impinging member of the interior perimeter portion 20*a* of the top member 2 impinges within the channel 10, contacting and compressing the gasket 15 within the channel 10 of the bottom member 3, and thereby creating a waterproof sealing of the housing 1. The perimeter portion 30 of the bottom member 3 also includes a sound port feature 50 having a latch port cover or bung 53 positioned therein.

Figure 5B:
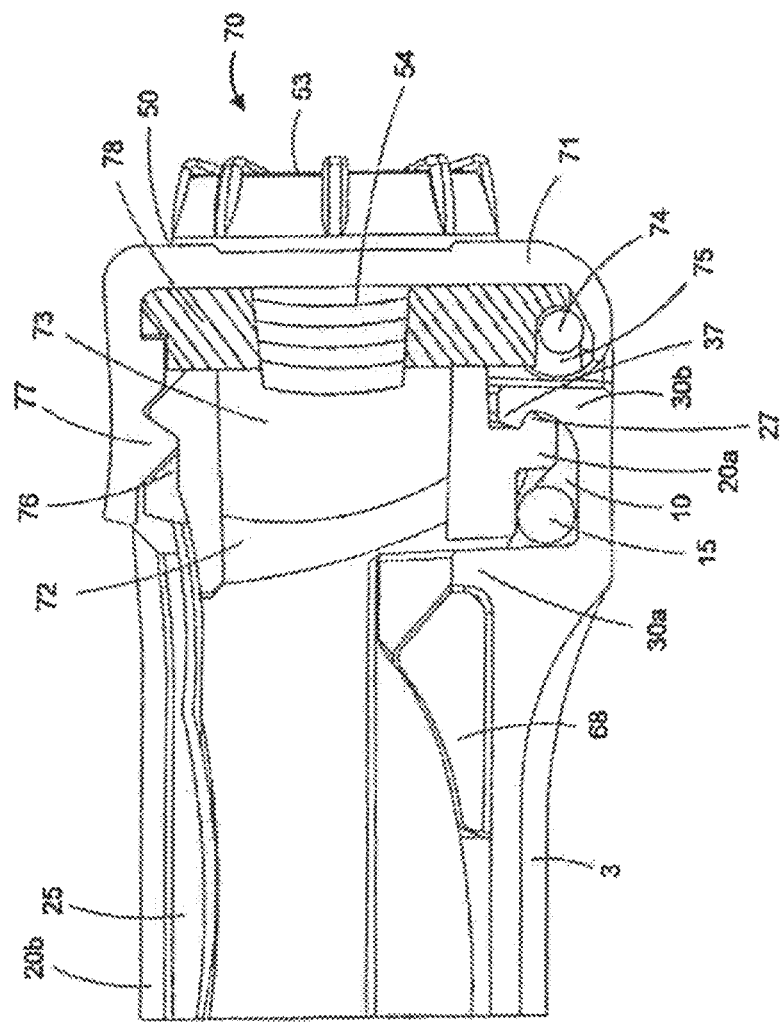
FIG. 5B shows a side cutaway view of the encasement depicted in FIG. 5A.

In this embodiment, the sound port feature 50 is positioned adjacent to the latch port feature 70. However, as can be seen with respect to FIG. 5B, in various embodiments, the sound port feature 50 may be combined or otherwise positioned within the latch port feature 70. For instance, as depicted in FIG. 5B, the sound port feature 50 is positioned within the latch port door 71*b*. Accordingly, the latch port door 71*b* includes an aperture 51 there though into which an exterior member, such as an accessory member, e.g., a headphone jack or charger plug, may be fitted, such as without having to open the charge port door 71*b*. The opening 51 provides access to the opening 71*a*, however in this embodiment, the sound port aperture 51 has received within it bung 53, which bung includes an extended member having a gasket (not shown) positioned thereon, as well as thread elements 54 which interface with corresponding thread elements on the latch door so that by inserting the bung 53 into the aperture 51 and associating the corresponding threaded elements (thereby compressing the gasket), the aperture 51 may be suitably closed, such as in a liquidproof and/or dirtproof seal.

Figure 5C:
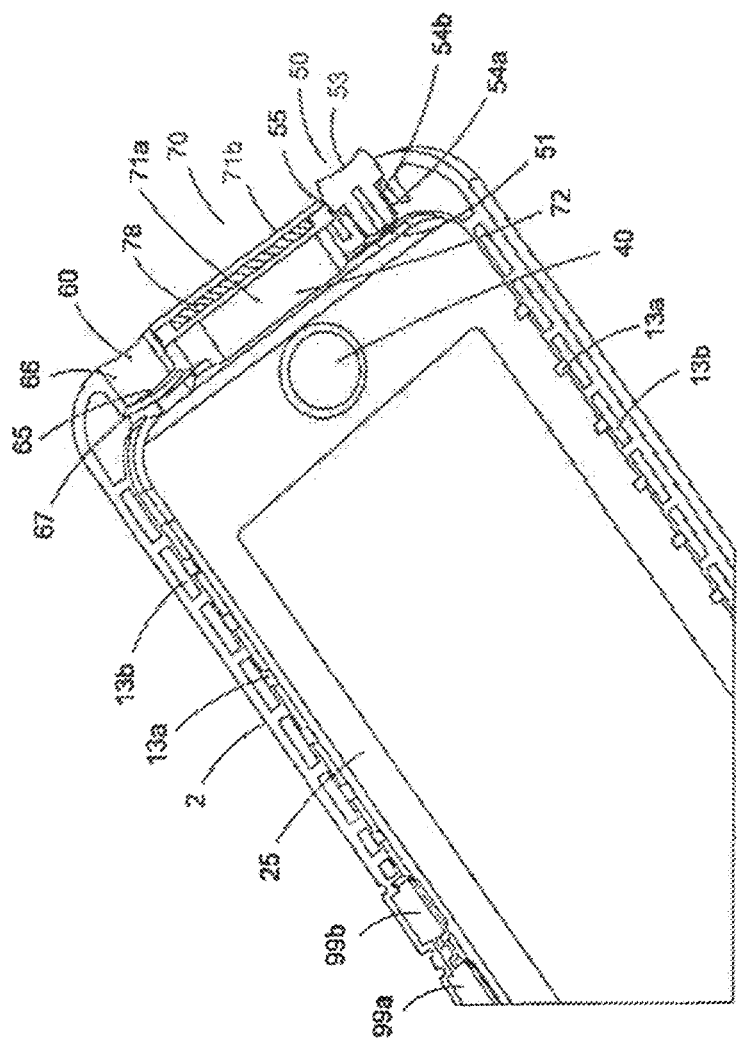
FIG. 5C shows a top-down view of a cross section of the housing of FIG. 5A.

FIG. 5C provides a top-down view of a cross section of the housing 1 showing a charge port feature 70 separated by a sound port feature 50 and a sound transmission feature, such as a speaker sound transmission port 60. The charge port feature 70 includes a charge port opening 71*a* that is covered by a charge port door 71*b* having a gasket 78 positioned thereon, which gasket 78 covers and seals the charge port opening 71*a*. The speaker sound transmission port 60 includes a sound channel 66, wherein the sound channel 66 tapers toward an acoustic vent material 65, which sound channel is configured for directing sound toward a speaker (or microphone) portion of an underlying electronic device housed within the housing 1. An acoustic vent bounding member, e.g., an overmoulded skirt seat 67 is also included and circumscribes the acoustic vent membrane 65.

For instance, a portion of the acoustic vent material 65 has been overmoulded with a rigid material 67 so as to facilitate the isolation and reduction of transmission of sound, such as from the microphone vent portion, so as to prevent interference therewith, and may further strengthen the seal between the housing and the acoustic membrane thereby ensuring the liquid-proof nature of the acoustic channel 60. As indicated above, in various embodiments, the acoustic vent bounding member 67 may be configured simply as a gasket seat, which gasket seat is adapted so as to be coupled with a suitable acoustic vent material 65, e.g., via a suitable adhesive.

The sound port feature 50 includes an opening 51 within which a suitable sound port closure device, e.g., plug 53, has been inserted so as to seal the opening. Specifically, the plug includes a seal, such as an O-ring 55 and a locking mechanism, such as threaded region 54*b*, which threaded region corresponds to a similar region, e.g., threaded region 54*a* of the housing 1, so as to secure the closure device within the opening 51 thereby sealing the opening in a liquid and/or dustproof sealing.

Figure 6A:
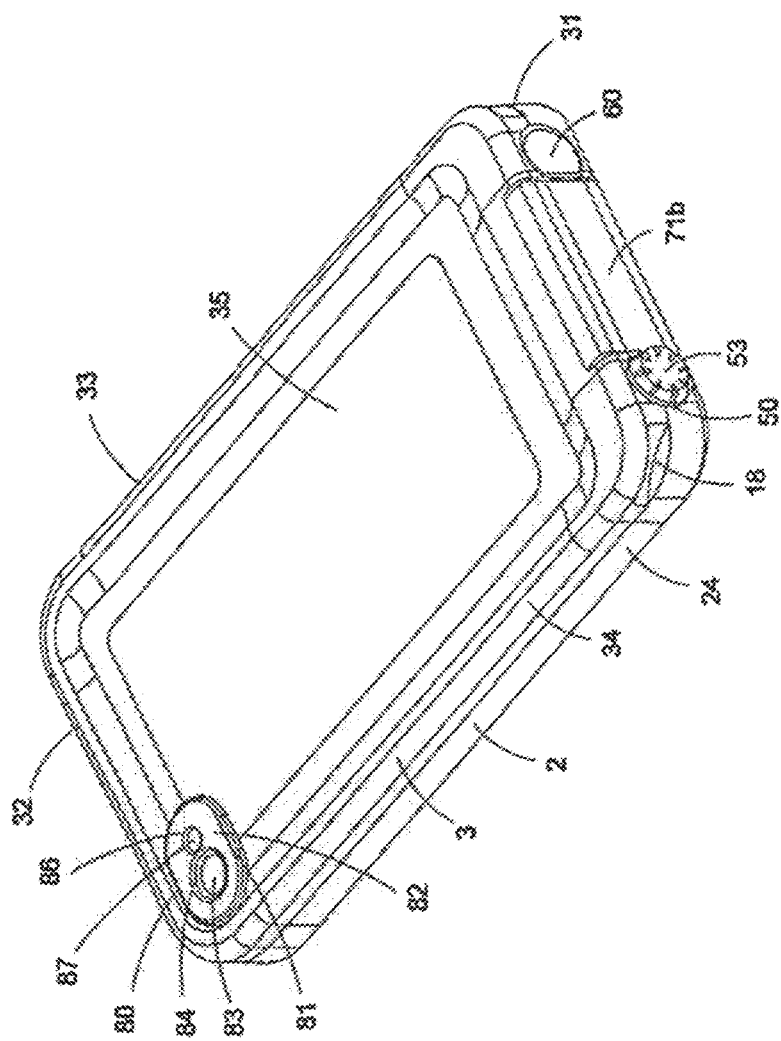
FIG. 6A depicts a perspective view of a back surface of a bottom member of an encasement having a lens feature and a sound transmission feature.

As indicated above, in certain embodiments, the housing 1 may include a bottom member includes one or more auxiliary features. For instance, a top or bottom member may include a lens feature and/or an acoustic transmission feature. In certain instances, the bottom member 3 includes one or both of a lens feature 80 and/or a sound transmission feature 86. For example, FIG. 6A provides a perspective view of a back surface 35 of a bottom member 3 of a housing 1 of the disclosure. The bottom member 3 includes both distal and proximal end portions 31 and 32 as well as bottom side portions 33 and 34. A camera portion 80 as well as a sound transmission portion 86 are also included.

The camera portion 80 may include one or more of a raised lip portion 81 surrounding an optical skirt 84. The optical skirt 84 is configured for housing at least a camera lens region having a camera lens 83 positioned therein. The camera portion may additionally include a flash lens region, which may have a flash lens therein. Either of such lenses can be replaced by an optically transmissive region. Accordingly, in certain embodiments, a top and/or a bottom member may include a camera portion having a lens feature, such as a camera and/or flash feature. In typical cases, a lens and/or flash feature is not provided. Rather, there is simply an optically transmissive region provided. However, in other embodiments an optical grade lens is provided.

In either instance, where a camera and a flash portion is provided in the same region interference between the two may occur causing problems with the pictures taken by the camera of an underlying device. For instance, where a flash is provided, an unprotected optically clear region may allow the transmission of light incident to the camera lens of the underlying device thereby causing pictures taken to be washed out. Accordingly, as can be seen with respect to FIG. 6A in certain embodiments, a lens feature 80 is provided wherein one or more lenses, such as a camera and/or a flash lens are positioned within the top or bottom member of the housing so as to be integral therewith. The lens feature 80 may include a lens 83 for a camera and/or another lens or optically clear region for a flash (not shown), and may further include an optical skirt 84 surrounding the one or more lenses so as to prevent inerrant light transmission, e.g., to reduce internal reflection and thereby reduce flair. In fabricating a lens feature, the one or more lenses may be pressed into the top or bottom member, so as to be pressed flush against the housing material. Such a fabrication method may be better than molding because typical molding process using rubber and other such materials are difficult with respect to glass due to the difference in thermal expansions and contraction. Further, it is difficult to make such seals watertight.

Accordingly, in one embodiment, a housing containing a lens element is provided wherein one or more lenses are provided therein. The lenses may be designed to have a diameter that is less, equal, or greater than that of the lenses provided in the underlying device. In fabricating a housing member having a lens element, the housing member may be fabricated, e.g., molded, and a suitable lens provided separately. A mandrel, or other such tool, may then be employed to press the lens feature into the housing member. This will give the lens feature a clean, well-fit interface with the surrounding material of the housing member. The lens feature should be configured such that the transition is flush with no cavities between the lens feature and the housing material.

The bottom member 3 also includes a sound transmission feature 86. In this embodiment, the bottom member 3 includes a combined camera 80 and sound transmission feature 86. However, in various embodiments, these features may be separated. It is understood that although the described sound transmission feature is herein described as a microphone feature, in other embodiments it may be a speaker feature that may be included and/or substituted for the microphone feature, with corresponding changes being made with respect thereto. The microphone feature 86 includes a sound aperture 87 extending from an exterior of the bottom member back surface 35 to an interior thereof, which aperture 87 is overlaid with a sound transmissive, but liquid, e.g., water, impermeable membrane 88 (not shown).

As depicted here, the combined feature includes a camera lens 83 wherein the camera lens 83 is separated a distance d from a sound transmission feature 86. The camera lens 83 is surrounded by a non-transmissive feature 84, such as a ridge, a metal ring, a gasket, an O-ring, or the like, which feature is designed to prevent the transmission of light from the surround from impinging upon the camera lens 83. Accordingly, light impinging within the diameter of the non-transmissive feature 84 may enter the camera lens 83, but light outside of the feature 84, substantially cannot.

Also depicted in FIG. 6A is latch door 71 as well as sound inlet and/or outlet portion 60, and sound port aperture 50, having plug 53 positioned therein, as described herein in greater detail above, which features are positioned on a proximal portion of the housing 1.

Figure 6B:
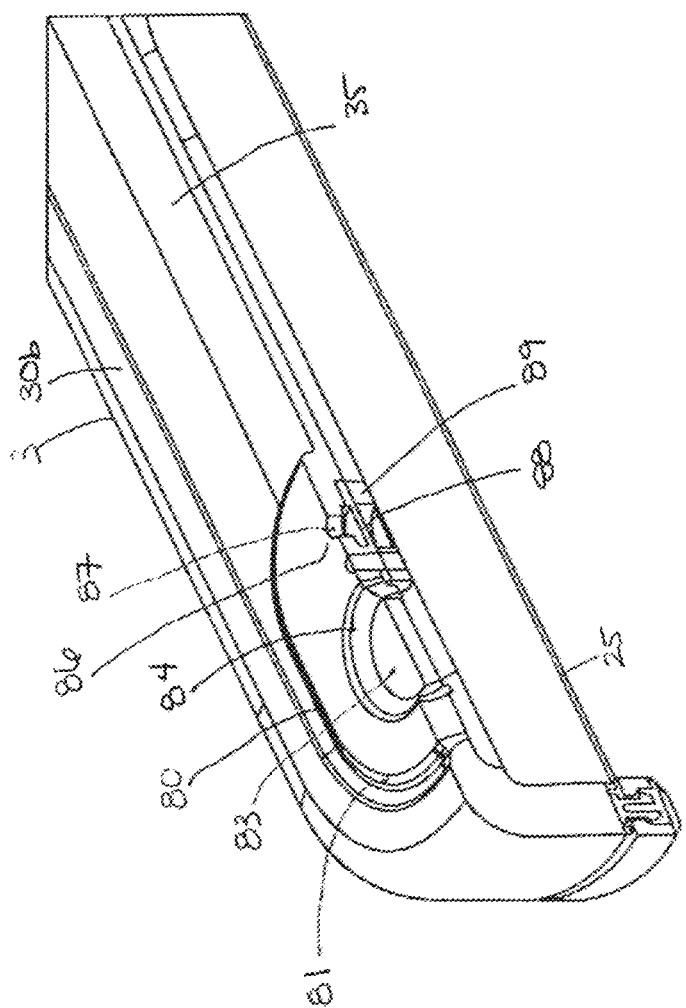
FIG. 6B shows a cut-away cross section view of the lens feature and sound transmission feature of FIG. 6A.

FIG. 6B provides a cut-away cross section view of the lens feature 80, e.g., camera feature, and microphone feature 86 of FIG. 6A. In this embodiment, the lens feature 80 is provided on a bottom member 3 of the housing 1, although in various other embodiments, the lens feature 80 may be provided on a top member 2. The camera feature 80 includes a raised lip portion 81 that surrounds an optical skirt 84. The optical skirt 84 includes a camera lens orifice containing a camera lens 83 (a flash lens orifice containing a flash lens could also be provided, but in this instance is not provided).

As depicted in this embodiment, the camera feature 80 and microphone 86 feature are a combined feature positioned adjacent to one another. The microphone feature includes a sound in/outlet aperture 87 that is overlaid with a membrane member 88 that is at least partially transmissive for both light and sound but is impermissive for liquid such as water. Such a membrane 88 may be fabricated from any suitable material, but in some instances, may be a plastic or rubber or the like, such as a thermoplastic elastomer, such as a thin layer of TPE, for example a layer of TPE that is 0.10 mm or less, such as 0.05 mm or less, such as 0.3 mm or less. In this embodiment, the membrane member 88 is comprised of a single membrane component. However, in other embodiments, the membrane member 88 may comprise a plurality of different membranes, which membranes may serve the same of different functions. The membrane portion 88 may be attached to the bottom member 3 via any method well known in the art, such as by the addition of an adhesive or by being moulded therewith, such as in an overmould process. The sound transmission aperture is further surrounded by sound impermissible gasket 89, which gasket at least partially surrounds the in/outlet aperture, so as to prevent the transmission of sound in or out of the sound channel 87.

FIG. 6C provides a close up view of the combined lens and microphone feature of FIG. 6A. The camera feature 80 includes a raised lip portion 81 that surrounds an optical skirt 84. This configuration provides a liquid proof interface between the bottom housing 3 and the camera feature 80. The optical skirt 84 includes a camera lens orifice containing a camera lens 83 (and may include a flash lens), wherein the optical skirt is configured for preventing the transmission of light therethrough, such as from a flash lens to camera lens. The microphone feature 86, includes a sound inlet aperture 87, which aperture allows sound to be transmitted into the housing, but not liquid such as water.

FIG. 6D provides a side cutaway view of the lens feature 80 and sound transmission feature 86 of FIG. 6C showing the interior of the housing 1. The lens feature 80 includes an optical skirt 84. The optical skirt 84 includes a camera lens orifice containing a camera lens 83. It is to be noted that in this embodiment a flash lens with or without a flash lens skirt is not provided, however, in other embodiments, a flash lens and/or skirt may be present. In this embodiment, the camera lens 83 comprises an optical grade lens, however, in other embodiments the camera lens may simply be an optically clear transmissive region such as an acrylic screen or membrane. The optical skirt 84 may be configured so as to prevent the transmission of light from the flash to the camera lens.

Also included is a microphone feature 86 that is configured to be aligned with a microphone portion of an underlying device and includes a sound inlet aperture 87, which aperture allows sound to be transmitted into the housing and toward said microphone portion, but because the aperture is covered by a liquid impermeable membrane 88, liquids such as water are not able to pass through the aperture 87. The inlet aperture 87 is further surrounded by a sound inhibiting gasket 89, which gasket is raised above the bottom surface 35 of the bottom member 3 and circumscribes the entire perimeter of the aperture 87 thereby forming a sound channel therewith. The sound channel so formed functions to prevent the passage of sound in to or out of the sound channel, thereby preventing the interference that could otherwise be caused by the internal transmission of sound, such as by an included speaker sound transmission portion. Accordingly, although the microphone transmission portion 86 has been described with respect to being a microphone transmission portion and being positioned at a particular position within the housing, the sound transmission portion could be a speaker transmission portion, and may be positioned anywhere along the housing.

As described briefly above, in certain embodiments, the housing may include a port opening, such as an electrical interface port, for instance, a charge port. To ensure increased protection of the underlying device, such as to protect the underlying device from dirt, liquid, snow, shock, etc., the housing may additionally include a port latch cover that is capable of opening and closing so as to cover and seal the port opening. The port and/or latch cover may be positioned, for instance, along a perimeter of the housing, such as at a proximal or distal end or a side thereof. In certain instances, the port and port cover latch is a shock and liquid resistant latch port cover. The port and latch cover may be positioned on a top or a bottom perimeter member of the housing and may be configured for spanning across from one side of the opening to another.

Figure 7A:
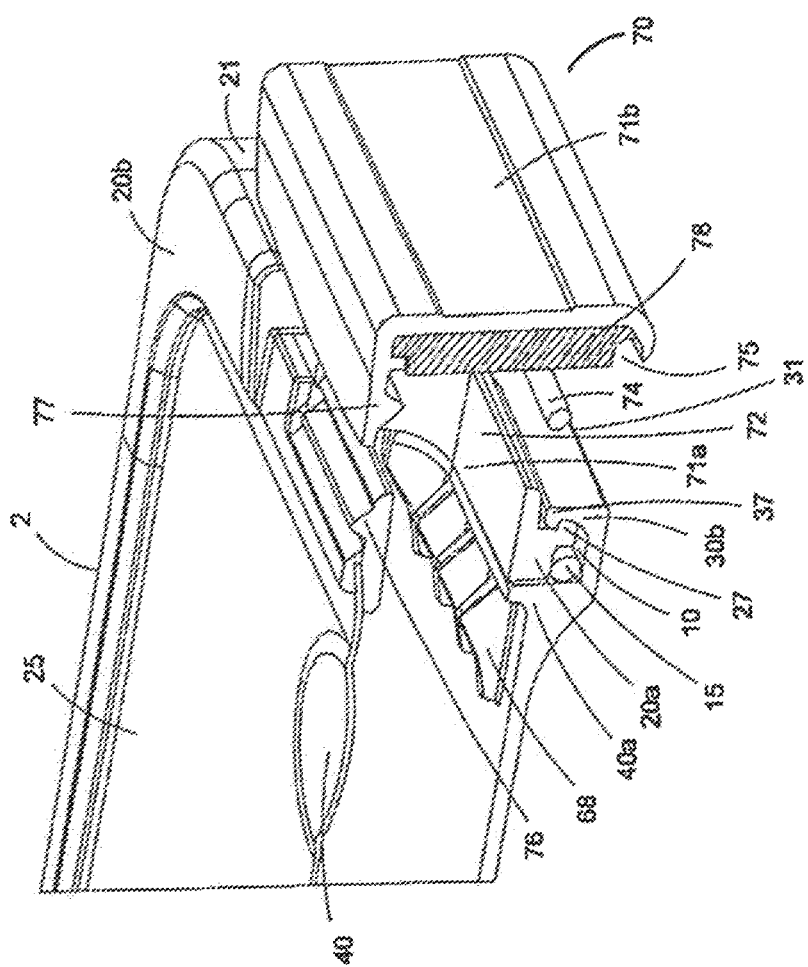
FIG. 7A shows an exploded perspective view in cross section of a charge port and charge port door of an encasement.

For example, as can be seen with respect to FIG. 7A, in certain instances, a latch feature 70 may be positioned on a proximal end of the housing 1. The latch feature 70 includes a port or latch opening bounding member 72, having a port opening therein 71*a*, and may further include a latch cover 71*b*. The port opening bounding member 72 circumscribes the opening 71*a*, wherein the opening may be configured to receive a charge member for charging an underlying electronic device. The latch feature 70 may also include a latch cover 71*b* that is configured for covering the latch opening bounding member 72. In this embodiment, the latch opening bounding member 72 is formed integrally with an interior perimeter portion 20*b* of the top member 2, which perimeter portion forms the port opening.

The latch feature 70 and port opening bounding member 72 may have any suitable configuration. As depicted in FIG. 7A, the latch feature 70 is configured for spanning from one housing member, e.g., bottom member 3, to the other housing member, e.g., top member 2. Thus, the opposing housing members 2 and 3 will have corresponding latch feature interfaces that are configured for engaging the latch cover 71*b* so as to seal the port opening 71*a* bounded by bounding member 72. For instance, the latch feature bounding member 72 is positioned within the proximal end portion 21 of top member 2, and the latch feature cover 71*b* is positioned upon the proximal end portion 31 of bottom member 3. The latch feature 70 also includes a plurality of latch cover interfaces, such as a latch cover connector 74, which connector 74 connects the latch cover 71*b* to the bottom member 3 by interfacing with the axle orifice 75 of the latch cover 71*b*.

The latch cover connector 74 may have any suitable configuration so long as it is capable of interfacing with a latch cover 71*b*, connecting the latch cover 71*b* to a top 2 or bottom 3 member, and facilitating the movement of the latch cover 71*b*, such as from an opened to a closed position. In this instance, the latch cover connector 74 is configured as a latch axle that is positioned on the proximal end portion 31 of the bottom member 3. The latch cover connector 74 is positioned below the latch feature bounding member 72, which is contained in top member 2. The latch cover connector 74 is configured for engaging the latch cover 71*b* via a latch connector orifice 75 so as to assist the latch cover 71*b* in moving from an opened to a closed position, where in the closed position the latch cover 71*b* spans the opening bounded by the latch cover bounding member 72. Thus, the moving of the latch cover 71*b* from an opened to a closed position results in the covering and/or sealing of the opening 71*a* bounded by the latch cover bounding member 72. In this instance, the latch cover 71*b* is configured for rotating about the latch cover connector 74.

Above the latch cover bounding member 72 is another latch cover interface that is configured for engaging the latch cover 71*b* so as to secure the latch cover 71*b* in a closed position. In this instance, the latch cover interface above the latch cover bounding member 72 is a latch ramp receiving or impinging member 76, which latch ramp receiving/impinging member 76 is configured for engaging a corresponding latch ramp interface portion 77 of the latch cover 71*b* when the latch cover is in the closed position thereby securing the latch cover 71*b* in the closed position. As depicted, the latch ramp receiving/impinging member 76 is positioned on the top member 2 above the latch port opening bounding member 72.

In certain embodiments, the closing of the latch cover 71*b* closes the port opening 72 in a liquid-tight and/or dust tight seal. To ensure a liquid-tight seal, the latch feature 70 may have one or more additional features. For instance, the latch feature 70 may include a seal 78, such as a gasket, e.g., an O-ring or other depressible gasket. For example, as depicted in FIG. 6A, the latch cover 71*b* includes a gasket 78, which gasket is of a dimension so as to be fitted within and/or around the opening of the latch opening bounding member 72 such that as the latch cover 71*b* is moved from an opened to a closed position, the gasket 78 is fitted within and/or around the port opening 71*a*, thereby sealing the port.

Accordingly, in various instances, the gasket 78 is configured for not fitting entirely within the latch port opening, but rather surrounding it.

Figure 7B:
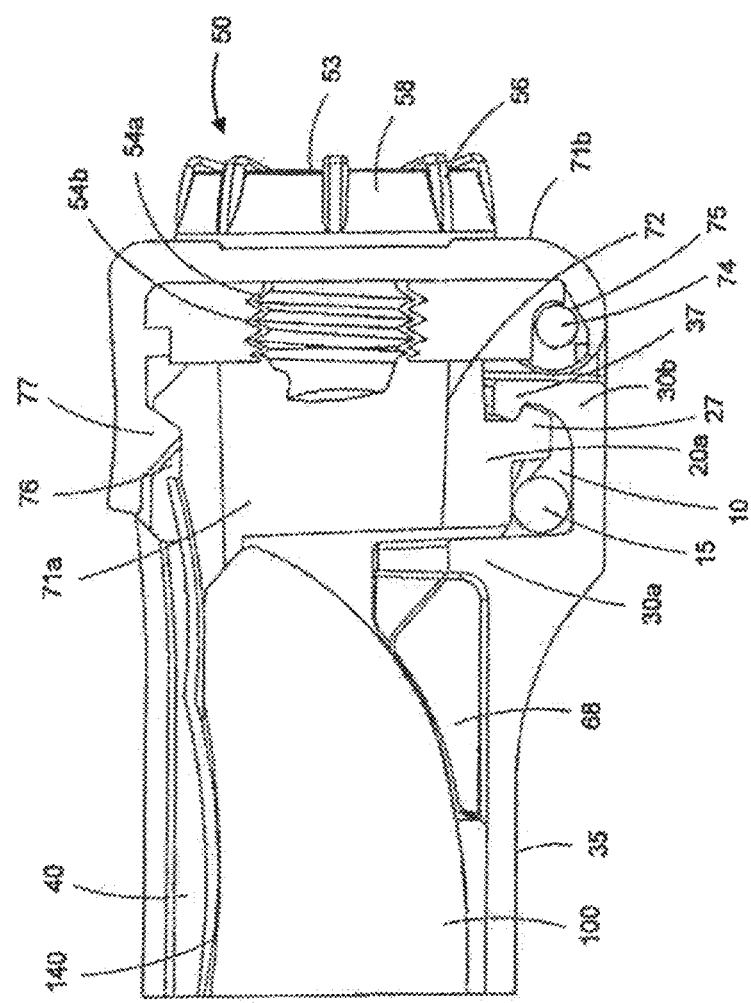
FIG. 7B depicts a non-exploded side view in cross-section of the encasement of FIG. 7A.

As depicted in FIG. 7B, the latch opening bounding member 72 includes a gasket interface that is positioned in such a manner so as to interact with the gasket 78 and thereby provide a watertight seal when the latch cover 71*b* is in the closed configuration, e.g., when the latch ramp interface 77 is coupled to the latch ramp 76. The gasket 78 may be positioned on a gasket seat of the latch cover 71*b*. In certain embodiments, the gasket 78 may further include an over-gasket 78, which over gasket may be less compressible, less porous material, such as rubber, or silicon, or the like, so as to effectuate a firmer sealing of the latch feature 70.

To facilitate this interaction, in certain embodiments, it may be beneficial for the housing member, e.g., 2, having the port opening bounding member 72 therein to include an additional rigid structural feature, which structural feature may be positioned in such a manner as to provide increased structural integrity to the port opening bounding member 72 and thereby provide additional support for the port opening. For example, in certain instances, when there is a port opening bounding member 72 in a top member 2 of the housing 1, the port opening may have a tendency to make the immediate surrounding material weaker. Therefore, a rigid support material may be associated with this material so as to support the region surrounding the port opening.

Without the inclusion of the rigid support material the top and bottom portions surrounding the opening may be forced away from one another thereby compromising the ability of the opening to be sealed in a watertight manner. In such an instance, the rigid stiffening material may be added so as to insure the integrity of the port opening. For instance, an injection molded stiffener, such as a stainless steel, magnesium, rigid plastic component, polycarbonate, or the like may be included in the top member 2 and associated with the material surrounding the port opening 72 so as to provide increased rigidity thereto, thereby maintaining the physical integrity of the port opening and preventing flexing. In certain instances, this reinforcing is accomplished without thickening the material of the housing member because this might result in making the overall housing thicker, wider, and/or longer, although it can be done in this manner. It is to be understood that although the above has been described with respect to the port opening being positioned in the top member 2, the port opening can be positioned in the bottom member 3 as well with consequent changes to the other latch features.

Accordingly, FIG. 7B provides a cut-away view of the proximal end of the housing 1 having the latch feature 70 of a housing of the disclosure. The latch feature 70 includes a port opening bounding member 72 having a latch cover 71*b*. As depicted, the top member 2 includes the port opening bounding member 72 having a latch ramp receiving member 76 associated therewith. The latch opening bounding member 72 bounds an opening, e.g., a port opening 71*a*, in the top member 2. The bottom member 3 includes a latch axle, e.g., a pivot axle 74. A latch cover 71*b* interfaces with the pivot axle 74 on the bottom member 3 via axle receptacle 75. The latch cover 71*b* additionally includes a latch ramp interface portion 77 that interfaces with the latch ramp receiving member 76 of the port opening bounding member 72 of the top member 2. Accordingly, when the latch cover 71*b* is in the closed position the latch ramp interface portion 77 couples with the latch ramp 76 to close and/or seal the port opening.

It is to be noted that in this embodiment, the latch cover 71*b* also include an additional port feature, such as a sound port feature 50. In this embodiment, the sound port feature 50 is depicted as an earphone jack port opening 51 having an ear phone jack port cover or bung 53 positioned therein. The earphone jack port bung 53 includes a threaded region 54*b* corresponding to a similar threaded region 54*a* positioned within the earphone jack port opening 51. The earphone jack port bung 53 further includes a gasket (not shown) circumscribing the bung 53. The earphone jack port bung 53 is inserted into the earphone jack port opening 51, bung threads 54*b* are aligned with port threads 54*a*, and the gasket (not shown) is compressed by the screwing of the bung 53 into the bung port 51 thereby creating a watertight sealing therewith in the latch port cover 71*b*. The jack port bung 53 also includes a top member 58 having grip features 56.

Figure 8A:
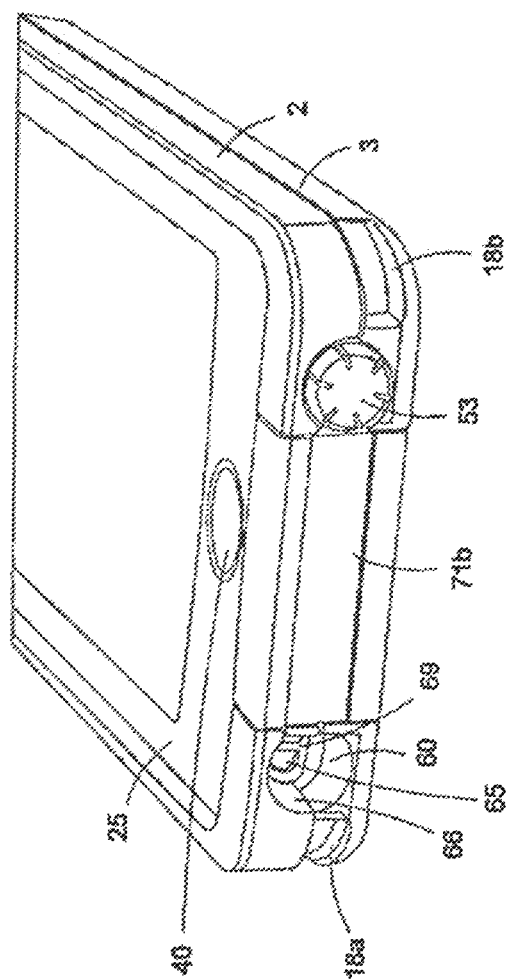
FIG. 8A depicts a proximal end portion of a housing with a speaker transmission vent and a port opening latch cover.

As can be seen with respect to FIG. 8A, a proximal end portion of the housing 1 may include one or more, such as a plurality of sound transmission portions 60 having one or more acoustic vents, for instance, a microphone acoustic vent or a speaker acoustic vent positioned therein. In this embodiment, the sound transmission portion 60 is configured as a speaker transmission vent. The proximal end portion of the housing 1 further includes a latch feature 70 having a port opening latch cover 71*b*, a plurality of coin slot features 18*a* and 18*b*, which coin slot openings are configured for assisting in the separating of the top member 2 from the bottom member 3, and a sound transmission port 50 having a port closure 53 positioned therein.

FIG. 8A provides an outward in view of the proximal end portion of the housing 1. As depicted the sound transmission portions 60 is positioned on the top member 2, with the bottom member 3 having a cutout portion to accommodate and form part of the sound outlet channel 66. In this embodiment, the proximal end portion 21 of the top member 2 includes a single, e.g., speaker, sound transmission portion 60, but in other embodiments, a plurality of sound transmission portions, e.g., a speaker and/or a microphone sound transmission portion, may be included. As depicted, the speaker sound transmission portion 60 includes a sound channel 66 leading to a speaker acoustic vent material, e.g., a sound permissible but non water transmissive membrane 65, which membrane is protected by a protective grille feature 69.

Figure 8B:
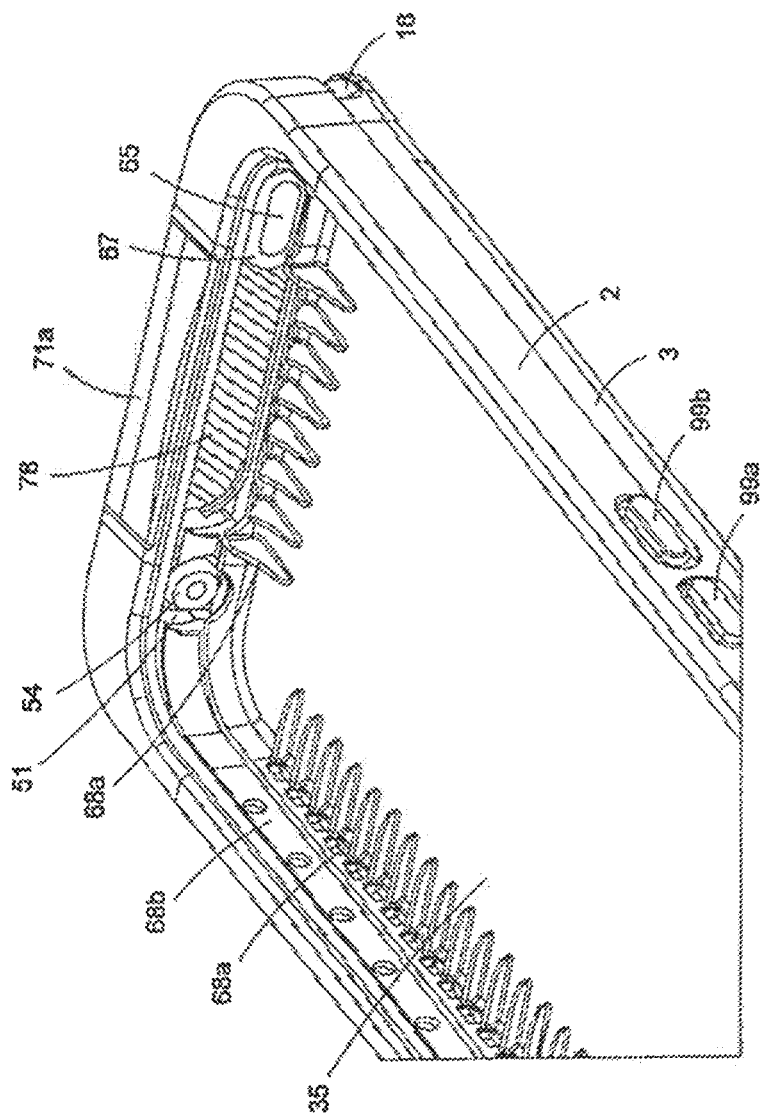
FIG. 8B shows a perspective view of the interior of a bottom portion of the housing of FIG. 8A.

As can be seen with respect to FIG. 8B, the sound transmission portion 60 is positioned within a top member 2 and traverse from the outside of the housing 1, through the exterior and interior perimeter portions 20*a, b* of the top member 2 and into the interior of the housing 1. The acoustic channel 66 includes an acoustic membrane 65, which transects the acoustic channel 66, such as a membrane, e.g. a GoreTex® membrane, configured for receiving and transmitting sound, but is not transmissive to liquids, such as water.

The housing surrounding the acoustic membrane 65 may be configured so as to be overmoulded therewith. Hence, the sound channel 66 may further include an overmould portion 67 that is configured to interface with a perimeter portion of the membrane 65 so as to be overmoulded therewith and thereby secure a liquid-tight and/or dust tight seal between the housing and the acoustic membrane. However, in various embodiments, element 67 may simply form a gasket seat upon which an acoustic vent membrane 65 is positioned and/or attached by a suitable method, such as by the addition of an adhesive. The acoustic membrane 65 is transmissive for sound but is non-transmissive for liquid. Thus, sound can travel through the sound channel 66 from (or into) the housing but liquid, such as water, cannot because it cannot pass through the acoustic vent membrane 65. A latch feature 70 having a latch opening 71*a* bounded by a bounding member 72 and covered by a latch cover 71*b* having a gasket 78 positioned thereon to seal the opening 71*a* are also provided on the proximal end of the housing 1 adjacent to the sound transmission portion 60. Also adjacent to the latch feature 70 is a sound inlet port 50, having an inlet aperture 51, and being closed by closure plug 53 having an extended member 52 that extends at least partially into and/or through the aperture 51.

Figure 8C:
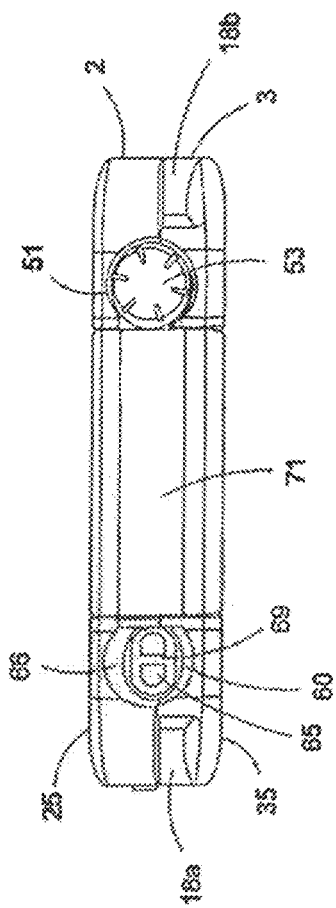
FIG. 8C shows a bottom plan view of the housing of FIG. 8A.

FIG. 8C provides an exterior inward view of the proximal end portion of the housing 1 of FIG. 8B. The proximal end portion may include one or a plurality of sound transmission portions such as speaker sound transmission portion 60. The speaker sound transmission portion may include a sound channel 66 that is transected by an acoustic membrane 65. For instance, one sound transmission portion, such as 60, may be configured as a speaker (or microphone) transmission portion that includes a sound channel 66 leading toward a speaker (or microphone) portion of an underlying device. The sound channel 66 is transected by microphone acoustic vent material 65, which acoustic vent is protected on an exterior portion by a protective acoustic grill 69, which may be a molded grill portion that functions to provide structural integrity to the sound channel and/or support to the acoustic vent material 65. A latch feature 70 and latch cover 71*b* as well as a sound port feature 50 and sound port closure are also provided on the proximal end of the housing 1.

In certain embodiments, a perimeter portion of a housing of the disclosure may include one or more fabricated switch or button features. For instance, a switch or button feature for engaging a switch or button mechanism of an encased device, such as a silence switch, an orientation switch, or volume control, or "on"/"off" button, may be provided. As can be seen with respect to FIG. 9A, a button feature, e.g., 99*a* and/or 99*b*, may be included on a portion of the housing 1, such as on one of the opposing side portions. The perimeter of the housing 1 may further include other features such as one or more of/off control buttons (not shown); a coin slot feature 18; one or more sound transmission portions 60; a latch feature 70; a sound port feature 50, and the like.

The switch and/or button 99 features are fabricated along with the housing 1 and are specifically configured for engaging the corresponding switches and buttons of a housed device. Hence, the switches and buttons are designed to model and ensure both the functionality and aesthetics of the underlying switches and buttons of the underlying device.

Figure 9A:
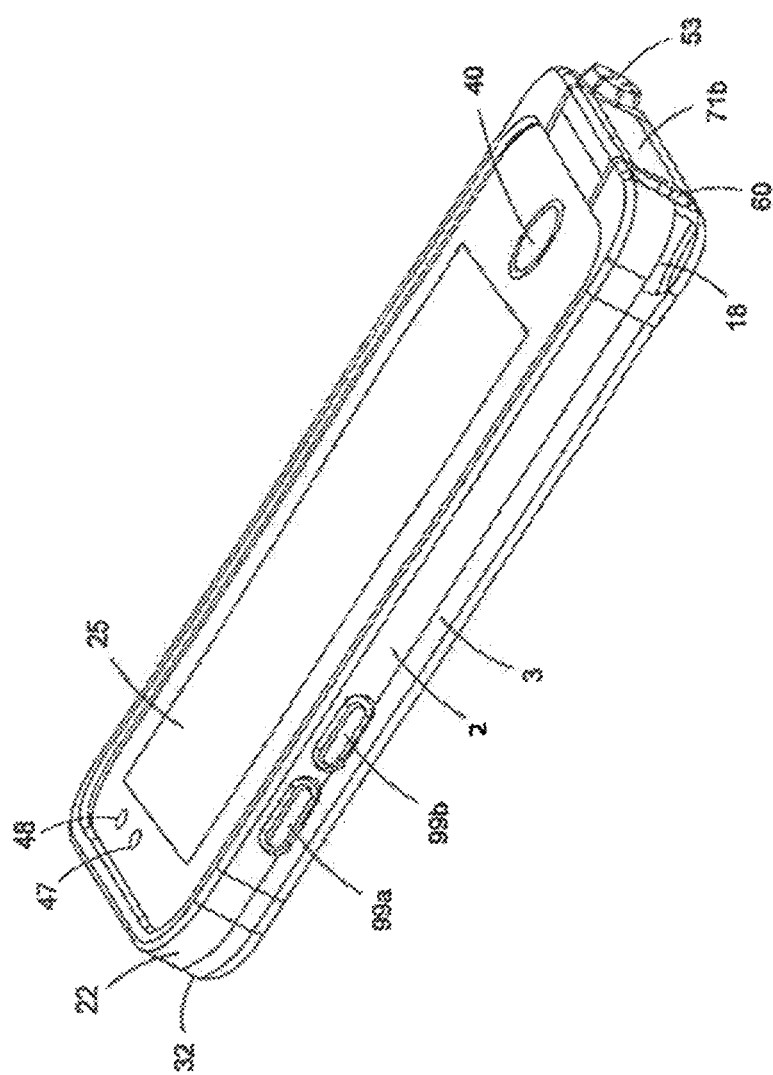
FIG. 9A shows a perspective view of the side of an encasement having switch and button features.
Figure 9B:
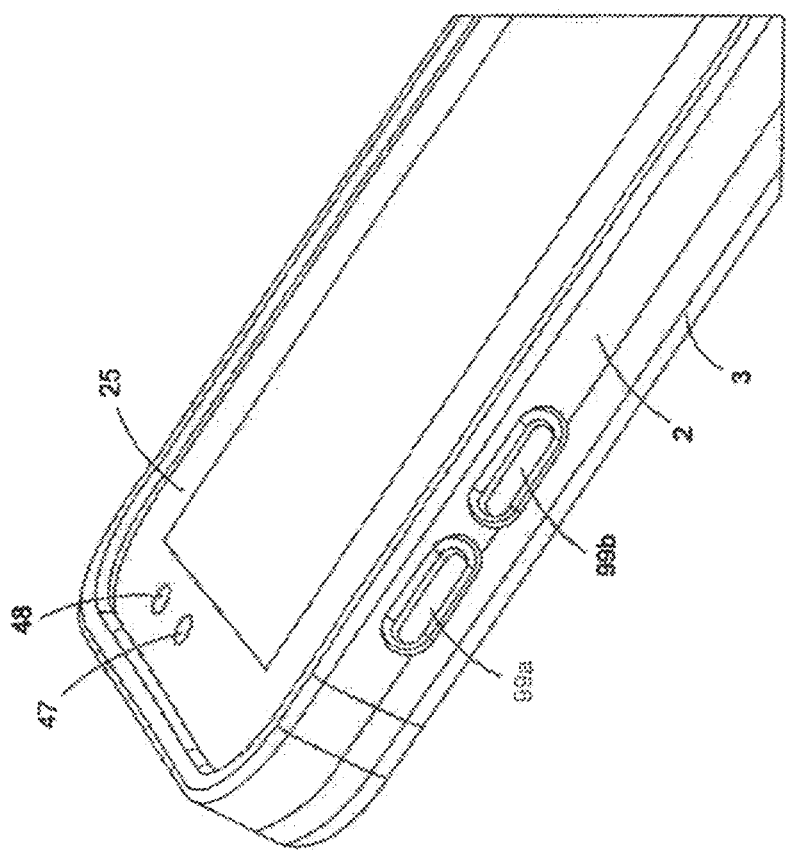
FIG. 9B depicts a close up perspective view of the side of the housing of FIG. 9A.

FIG. 9B provides a close up view of FIG. 9A showing the perimeter portion of the housing 1 that contains the volume buttons 99*a* and 99*b*. The housing 1 includes a top housing member 2 having a perimeter portion 20, and a bottom housing member 3, having a perimeter portion 30. As depicted, the volume buttons 99*a* and 99*b* are positioned along a perimeter portion 20 of the top member 2, but in other embodiments may be positioned on the bottom member 3.

In this embodiment, the style of the button 99 features are designed to retain the stylistic features and functionality of the switches and buttons of the underlying device. The volume buttons are configured for engaging a respective volume button of a housed device so as to change the volume characteristics of the housed device. Hence, each of the volume control toggles or buttons 99*a* and *b* are configured for engaging their corresponding buttons on a housed device for the increasing and decreasing of the volume of an underlying device. These configurations may differ as the configuration of the underlying device differs. Additionally depicted is a top surface membrane 25 of top member 2, which top member membrane 25 includes a video camera lens or optically clear region 47 and an optically clear proximity sensor region 48. Although not shown, the membrane 25 may also include other optically clear regions, such as for a ambient light sensor and/or may include an acoustic vent portion (as described above) including a sound transmission aperture for transmitting sound through the top member membrane 25 and/or a waterproof membrane overlaying the same.

Figure 9C:
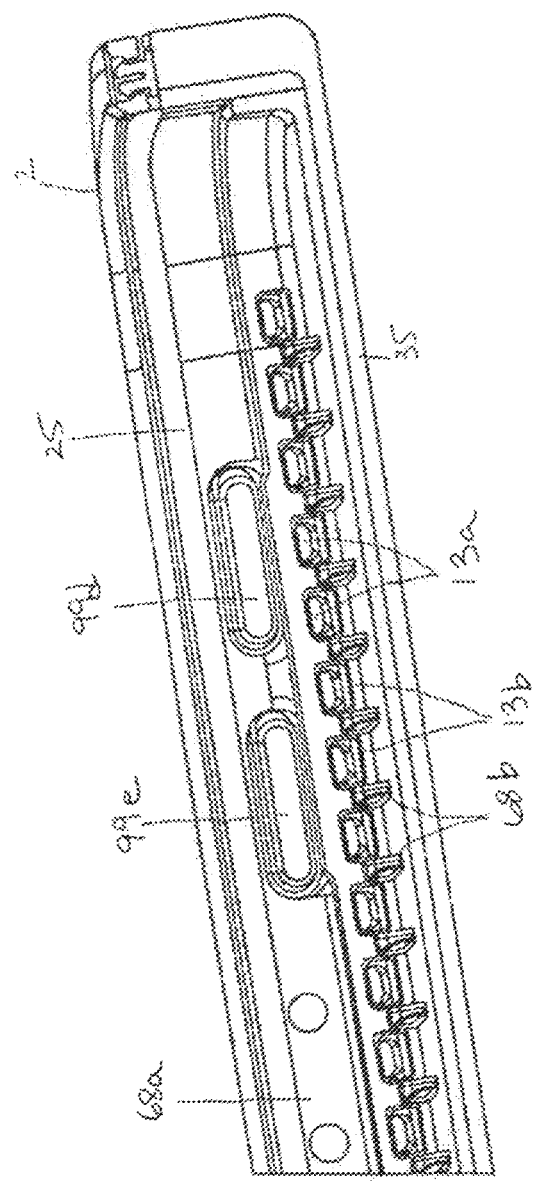
FIG. 9C shows a cutaway side view of a housing depicted in FIG. 11A, infra, with volume toggles.
Figure 10:
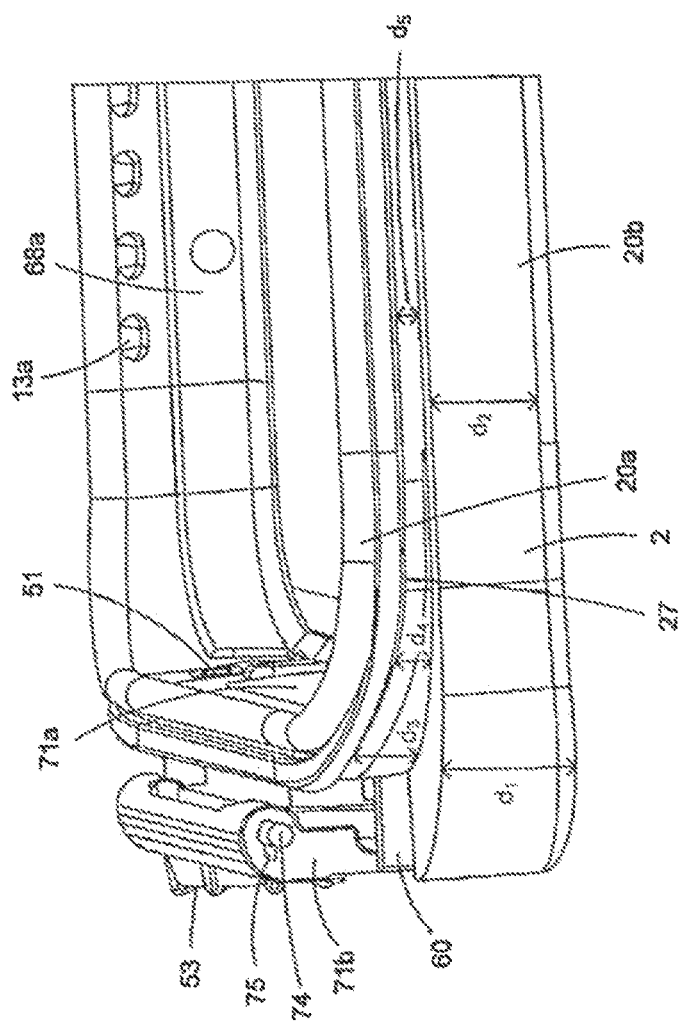
Figure 11A:
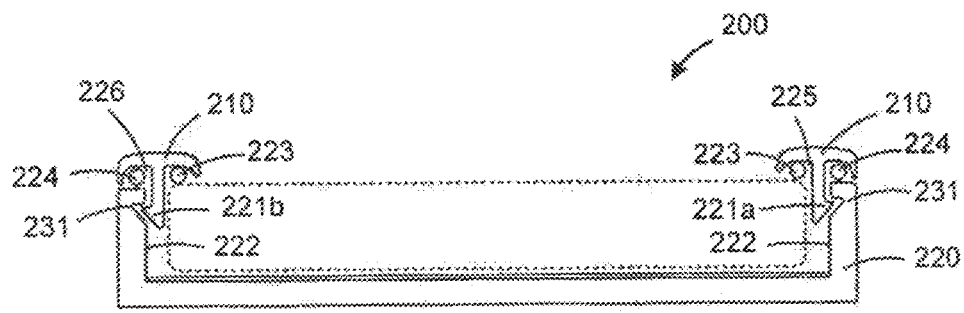
FIG. 11A depicts a cutaway view of an embodiment of housing with top and bottom members having an internal clasping mechanism and gaskets.

FIG. 9C provides a cutaway inside view of the volume toggles 99*a* and *b* as depicted in FIG. 11A. The volume control toggles 99*a* and *b* include a flat user engagement surface portion, which may be engaged by a user and an extended button engagement portion that is configured for engaging a button of a housed device. One or more additional spacers may be added to the extended button engagement portions so as to enhance the engagement of the buttons of a housed device.

Also depicted are complementary clasping mechanisms 13*a* and 13*b* as well as complimentary clasping mechanisms 27 and 37. The interior perimeter portion further includes a rubber bumper portion 68*a* to further provide a form-fitting interface with a housed device.

Figure 10:
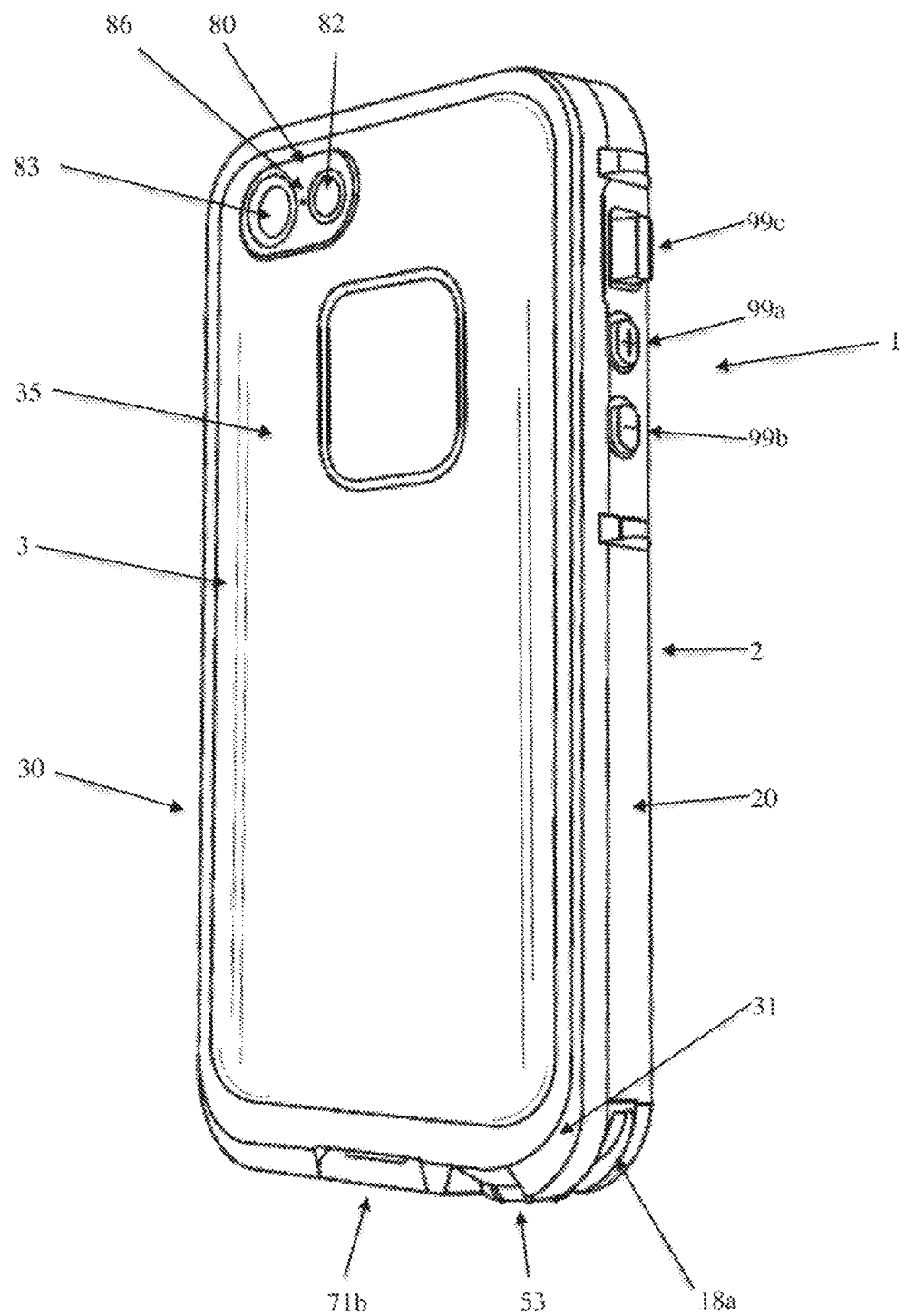
FIG. 10 depicts a perspective view of an embodiment of a top member of an encasement having a perimeter portion with a stepped up configuration.

As can be seen with respect to FIG. 10, in certain embodiments, the perimeter portion 20 of the top member 2 may include a stepped up configuration so as to allow the separate housing members 2 and 3 to more closely interface with one another, despite the presence of one or more features of the housing and/or an underlying device, such as headphone port feature 50.

For instance, where the interior perimeter portion 20*a* of the top member 2 includes the clasping mechanism 27, the interior perimeter portion 20*a* and clasping mechanism 27 may have a transition that moves from lower d5, along the sides of the housing, to higher d3, along the corners of the housing. This transition may be included along all the corners to ensure a tight seal, and/or may be included anywhere suitable so as to accommodate for the presence of a perimeter feature such as the headphone port feature 50.

Accordingly, FIG. 10D provides a view of a corner edge detail of the proximal portion of the housing having a stepped up configuration, showing the transition of interior perimeter portion 20*a* and clasping member 27 from low to high, which transition accommodates for the presence of the headphone port 50 by providing the necessary clearance while at the same time as maintaining the clasping interface. It is to be noted that this transition may be included without reference to its relation to any other perimeter feature and may be included in a top or bottom member with consequent changes being made to its components. In this instance, the step up is from d5 along the perimeter portion 20*a* sides of the housing to d4 at the beginning of the corner, to a maximum height of d3 in the height of the corner, wherein anyone of d3, d4, and d5 may be the same or different, depending on the configuration of the housing and/or the device to be housed. Additionally, the flexible perimeter portion 20*b* may also have a change in thickness, length, or height, such as indicated by any difference between d1 and d2, wherein anyone of d1 and d2 may be the same or different, depending on the configuration of the housing and/or the device to be housed.

The disclosure also provides a protective case for an electronic device having a front surface that includes a touch-sensitive interactive display. The protective case includes a bottom member having an inner surface defined by a back wall and a side wall coupled to a periphery of the back wall, the side wall corresponding substantially to the periphery of the back wall and having a top edge defined by an outer periphery and an inner periphery, the back wall and the side wall each having an inner surface to receive the electronic device; a frame member that frames at least a portion of the front surface of the electronic device to enable direct touch by a user to the touch-sensitive interactive display, the frame member having an outer peripheral edge that corresponds to the outer periphery of the top edge, and having one or more coupling members that extend down from an underside of the frame member to engage with the inner surface of the side wall proximate inner periphery of the side wall; and a releasable adhesive member on an outer side of the one or more coupling members at a first interface between the underside of the frame member and the top edge of the side wall of the bottom member to seal the first interface, and on an inner side of the one or more coupling members at a second interface between the underside of the frame member and the front surface of the electronic device to seal the second interface, when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of an elastomer. The elastomer can be a polyurethane gel. In other embodiments, the frame member is formed of a rigid material.

The disclosure also provides a protective case for an electronic device having a front surface that includes a touch-sensitive interactive display. The protective case includes a bottom member having an inner surface defined by a back wall and a side wall coupled to a periphery of the back wall, the side wall corresponding substantially to the periphery of the back wall and having a top edge defined by an outer periphery and an inner periphery, at least part of the back wall and the side wall each having an inner surface to receive the electronic device; a frame member that frames at least a portion of the front surface of the electronic device to enable direct touch by a user to the touch-sensitive interactive display, the frame member having an outer peripheral edge that corresponds to the outer periphery of the top edge, and having one or more coupling members that extend down from an underside of the frame member to engage with the inner surface of the side wall proximate inner periphery of the side wall; and a releasable adhesive member on an outer side of the one or more coupling members at a first interface between the underside of the frame member and the top edge of the side wall of the bottom member to seal the first interface, on an inner side of the one or more coupling members at a second interface between the underside of the frame member and the front surface of the electronic device, and on the inner surface to seal the second interface, when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of an elastomer. The elastomer can be a polyurethane gel. In other embodiments, the frame member is formed of a rigid material.

The disclosure also provides a protective case for an electronic device. The electronic device can have a front surface that includes a display. The protective case includes a bottom member having an inner surface defined by a back wall and a side wall to receive the electronic device, the side wall having a top surface defined by an outer periphery and an inner periphery; a frame member that frames at least a portion of the front surface of the electronic device to enable operation by a user of the display, the frame member having an outer peripheral edge that corresponds to the outer periphery of the top surface of the side wall of the bottom member; one or more coupling members that couple the frame member with the bottom member; and a releasable adhesive interposed between the top surface of the side wall of the bottom member and an underside of the frame member, to seal an interface between the top surface of the side wall of the bottom member and the frame member when the frame member is coupled with the bottom member.

According to certain embodiments, the releasable adhesive seals a second interface between the frame member and the electronic device when the frame member is coupled with the bottom member. In another embodiment, the one or more coupling members include a latch extending from the underside of the frame member, the latch for latching with the inner surface of the side wall of the bottom member. In another embodiment, the one or more coupling members include a plurality of latches spaced-apart along the underside of the frame member, each latch having an outwardly-facing protrusion to engage an inward depression formed in the inner surface of the side wall of the bottom member. The one or more coupling members can be selected from snaps, screws, bolts, fasteners, clasps, locks, or catches.

In certain embodiments, the releasable adhesive member is formed of an elastomer. The elastomer can be a polyurethane gel. In other embodiments, the frame member is formed of a rigid material.

FIG. 11 shows two views, A and B, of embodiments of a housing according to the invention described generically, above. In these embodiments, the housings comprise top and bottom members joined together to encase an electronic device (designated by hatched lines in FIG. 11A) within the housing. In the configuration of this embodiment depicted in FIG. 11, the housing 200 comprises top and bottom members 210, 220 that are joined together, here, by being snapped together after the device to be encased is positioned within the bottom member 220. Of course, any suitable mechanical system can be adapted to effect watertight joining of the top and bottom members. In the embodiments shown in FIG. 11, the top member 210 is joined to the bottom member 220 using a clasping mechanism. Such a clasping mechanism may include a plurality of clasping mechanisms such as one or more internal and/or one or more external and/or one or more hybrid clasping mechanisms. For instance, in various embodiments, the housing may include an internal clasping mechanism, e.g., one comprised of a plurality of internal clasping members 221a, 221b configured to engage complementary structure (e.g., a tapered channel 231) present on the interior surface 222 of the bottom member 220. In some embodiments, the internal clasping members 221a, 221b may be positioned on the interior surface 222 of the bottom member 220 and the tapered channel 231 may be positioned on the top member. Alternatively, the clasping member may circumscribe one or more portions of the perimeter of a bottom-member engaging structure of the top member 210 of the housing 220. Combinations of clasping mechanisms may also be employed.

As shown in the embodiment depicted in FIG. 11A, a plurality of internal clasping members 221a, 221b are provided. These clasping members are configured such that when the top and bottom members 210, 220 are coupled together, a liquid-proof and/or dustproof and/or shockproof seal is provided, preferably by the presence of one or more seals, such as gaskets 223, 224, that are compressed to form the seal(s) when the top and bottom members 210, 220 are securely joined together (as happens, for example, when clasping members 221 are brought into joining association with complementary structures, such as a tapered channel 231. The seals protect the encased electronic device (or the internally housed electrical components of such a device) from environmental constituents such as water, dust, dirt, shock, and the like. In certain embodiments, the outer gasket 224 is not present because the seal between the outer side of the top member 210 and the outer side of the bottom member 220 is sufficient to exclude environmental constituents such as water, dust, dirt, shock, and the like.

A suitable clasping mechanism may have any suitable configuration, such as corresponding clasps, L- or T-shaped straight or slanted edges, wedge and interdigitated wedge receptacles, corresponding teeth and/or teeth receiving members, hook and groove fasteners, rib and channel fasteners, peg and peg receptacles, buttons, zippers, hook and loop fasteners, screws, bolts, rivets, external clasps, and the like.

Figure 11B:
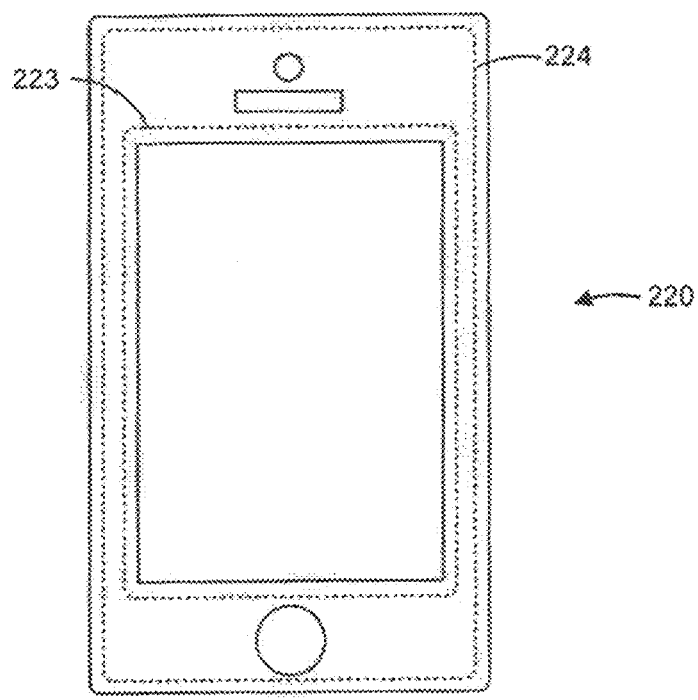
FIG. 11B shows a front elevational view of the embodiment depicted in FIG. 11A.

FIG. 11B shows a top view of the housing 200 depicted in FIG. 11A wherein the gaskets 223, 224 that provide sealing functionality are illustrated. Any suitable sealing material can be used. In this embodiment, the gaskets 223, 224 are elastic, compressible O-rings, each positioned within a gasket channel 225, 226 in the underside of the top member 210. The O-rings may be solid or compressible O-rings, such as O-rings that are capable of being compressed from about 1% to about 70%, such as from about 5% to about 65%, from about 10% to about 60%, including about 15% to about 50%, for instance, about 20% to about 40%, including about 30%. In other embodiments, tacky or sticky compressible materials, such as TPE, silicone, polyurethane gel, slow-flowing adhesive, or the like is used as the seal 223 and/or 224. Such materials include also include sticky, gelatinous materials such as a melt blend admixture of poly (styrene-ethylene-butylene-styrene) triblock copolymer and plasticizing oils. Such materials preferably are high surface energy materials, self-adhere, have a high degree of surface tackiness, and are flowable and releasable (to allow detachment from an encased electronic device in the event a user wishes to remove the device from the housing). Such materials allow for watertight sealing even when no external pressure is applied. When the top and bottom members are joined (e.g., using clasping components), such materials compress and wet (or wick) out to form a watertight seal between the components that contact the particular seal. Excess material, if any, may be removed, if desired, after a seal has been formed. As will be appreciated, in such embodiments the display screen of the encased electronic device, for example, a smart phone directly contacts the seal innermost 223 of the two seals 223, 224.

This embodiment can also include a screen protector over the electronic device that covers all or substantially all of the area bounded by the inner seal 223. The screen protector can be placed so that it is impinged upon by the inner and/or outer seals 223, 224. In certain embodiments, the perimeter of the screen protector 150 preferably contains a plurality of prefabricated holes that allow the clasping members 221a, 221b to pass through the screen protector as it is positioned in the housing, for example, over an electronic device to be encased in the housing, at its periphery, between the top and bottom members 210, 220.

The disclosure also provides a system for providing at least one water-resistant seal to a portable electronic device that provides a fixed dimensional structure. The system includes a rigid housing formed to be disposed on at least a portion of the portable electronic device; an elastic member coupled with a portion of the rigid housing, the elastic member having an inner surface to cover a perimeter region of the fixed dimensional structure provided by the portable electronic device; and a compression member coupled to the rigid housing, the compression member to provide an opposing compressive force against the fixed dimensional structure on an outer surface of the elastic member proximate to and substantially opposite the inner surface of the elastic member, when the elastic member covers the perimeter region of the fixed dimensional structure of the portable electronic device, so as to form the at least one water-resistant seal at the perimeter region between the inner surface of the elastic member and the fixed dimensional structure of the portable electronic device.

In certain embodiments, the compression member is unitary with the rigid housing. The rigid housing can be formed of one or more parts. In certain aspects of the disclosure, the compression member is coupled to the rigid housing by one or more coupling members selected from the group of coupling members including slides, clamps, living hinges, mushroom snaps, latches, and/or pre-stress tension members.

In other embodiments, the elastic member includes an adhesive material. The elastic member can be formed of a releasable adhesive material. The elastic member can also be further interdisposed between the rigid frame and the compression member, wherein the compression member further provides the opposing compressive force against the rigid housing to form a second water-resistant seal between the elastic member and the rigid frame.

In other embodiments, the system includes two or more elastic members. The system can also include a second elastic member interdisposed between the rigid housing and the compression member, wherein the compression member further provides the opposing compressive force against the rigid housing to form a second water-resistant seal between the second elastic member and the rigid frame.

In other embodiments, the perimeter region of the portable electronic device can include one or more features, and wherein the elastic member includes a corresponding operating region for accessing and operating the one or more features. The one or more features can include one or more of: a display, one or more speakers, one or more buttons, one or more switches, one or more earports, one or more proximity sensors, one or more lenses, and one or more flashes. In another embodiment, the compression member is coupled to the rigid housing by a coupling mechanism selected from the group of coupling mechanisms that consists of: mechanical retention, molding, or adhesive.

The disclosure also provides a system for providing a water-resistant seal to a portable electronic device that provides a fixed dimensional structure. The system includes a rigid housing formed to be disposed on at least a portion of the portable electronic device; an elastic member bonded to a portion of the rigid housing, the elastic member having an inner surface to cover a perimeter region of the fixed dimensional structure provided by the portable electronic device; and a compression member coupled to the rigid housing, the compression member to provide an opposing compressive force against the fixed dimensional structure on an outer surface of the elastic member proximate to and substantially opposite the inner surface of the elastic member, when the elastic member covers the perimeter region of the fixed dimensional structure of the portable electronic device, so as to form the water-resistant seal at the perimeter region between the inner surface of the elastic member and the fixed dimensional structure of the portable electronic device.

In certain embodiments, the compression member is unitary with the rigid housing. The rigid housing can be formed of one or more parts. In certain aspects of the disclosure, the compression member is coupled to the rigid housing by one or more coupling members selected from the group of coupling members including slides, clamps, living hinges, mushroom snaps, latches, and/or pre-stress tension members.

In other embodiments, the elastic member includes an adhesive material. The elastic member can be formed of a releasable adhesive material. The elastic member can also be further interdisposed between the rigid frame and the compression member, wherein the compression member further provides the opposing compressive force against the rigid housing to form a second water-resistant seal between the elastic member and the rigid frame.

In other embodiments, the system includes two or more elastic members. The system can also include a second elastic member interdisposed between the rigid housing and the compression member, wherein the compression member further provides the opposing compressive force against the rigid housing to form a second water-resistant seal between the second elastic member and the rigid frame.

In other embodiments, the perimeter region of the portable electronic device can include one or more features, and wherein the elastic member includes a corresponding operating region for accessing and operating the one or more features. The one or more features can include one or more of: a display, one or more speakers, one or more buttons, one or more switches, one or more earports, one or more proximity sensors, one or more lenses, and one or more flashes. In another embodiment, the compression member is coupled to the rigid housing by a coupling mechanism selected from the group of coupling mechanisms that consists of: mechanical retention, molding, or adhesive.

The disclosure also provides a system for providing at least one water-resistant seal to a portable electronic device that provides a fixed dimensional structure. The system includes a rigid housing formed to be disposed on at least a portion of the portable electronic device; a releasable and reusable adhesive member having an inner surface to cover a perimeter region of the fixed dimensional structure provided by the portable electronic device to form the at least one water-resistant seal at the perimeter region between the inner surface of the releasable and reusable adhesive member and the fixed dimensional structure of the portable electronic device; and a compression member coupled to the rigid housing and disposed on an outer surface of the releasable and reusable adhesive member.

In certain embodiments, the compression member provides an opposing compressive force against the fixed dimensional structure proximate to and substantially opposite the inner surface of the releasable and reusable adhesive member. In aspects of this embodiment, the opposing compressive force is to mechanically retain the releasable and reusable adhesive member to inhibit shearing and pealing of the releasable and reusable adhesive member.

In other embodiments, the releasable and reusable adhesive member is further interdisposed between the rigid housing and the compression member, and wherein the compression member further provides the opposing compressive force against the rigid housing to form a second water-resistant seal between the releasable and reusable adhesive member and the rigid frame. The system can also include two or more releasable and reusable adhesive members. The system can also include a second releasable and reusable adhesive member interdisposed between the rigid housing and the compression member, and wherein the compression member further provides the opposing compressive force against the rigid housing to form a second water-resistant seal between the second releasable and reusable adhesive member and the rigid frame. The releasable and reusable adhesive member can be flexible and can be an elastomer. The releasable and reusable adhesive member can be formed of polyurethane.

In other embodiments, the releasable and reusable adhesive member is bonded to the compression member. The releasable and reusable adhesive member can also be bonded to the rigid frame.

Figure 12A:
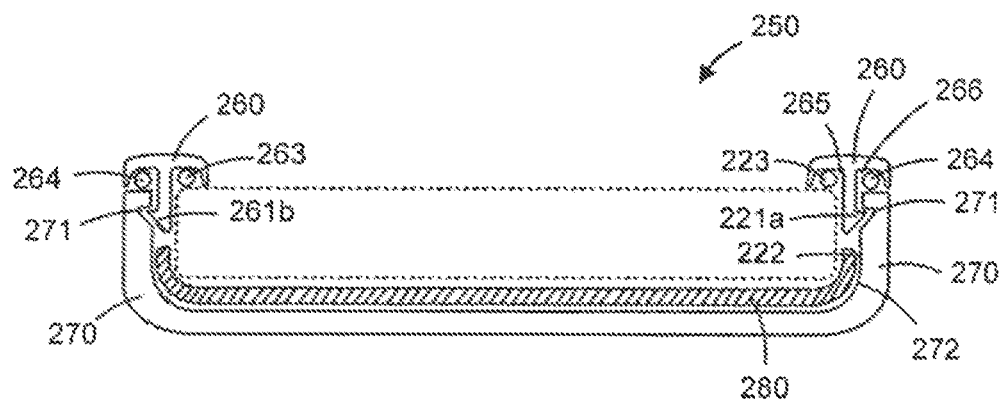
FIG. 12A shows a cutaway view of an embodiment of a housing with top and bottom members having an internal clasping mechanism, gaskets, and a dampening member.

FIG. 12 shows two views, A and B, of additional embodiments of a housing according to the invention described generically, above. These embodiments are similar to those depicted in FIG. 11. In these embodiments, the housings again comprise top and bottom members joined together to encase an electronic device (designated by hatched lines in FIG. 12A) within the housing. In the configuration of this embodiment depicted in FIG. 12, the housing 250 comprises top and bottom members 260, 270 that are joined together, also by being snapped together after the device to be encased in positioned within the bottom member 270. Of course, any suitable mechanical system can be adapted to effect watertight joining of the top and bottom members of these embodiments. In the embodiments shown in FIG. 12, the top member 260 is joined to the bottom member 270 using a clasping mechanism. Here, a plurality of internal clasping members 261a, 261b are configured to engage complementary structure, here, a tapered channel 271 present on the interior surface 272 of the bottom member 270. These clasping structures are configured such that when the top and bottom members 260, 270 are coupled together, a liquid-proof and/or dustproof and/or shockproof seal is provided, preferably by the presence of one or more seals, such as gaskets (263, 264), that are compressed to form the seal(s) when the top and bottom members 260, 270 are securely joined together (as happens, for example, when clasping members 261 are brought into joining association with complementary structures, such as a tapered channel 271). The seals protect the encased electronic device (or the internally housed electrical components of such a device) from environmental constituents such as water, dust, dirt, shock, and the like. In some embodiments, the internal clasping members 261a, 261b may be positioned on the interior surface 272 of the bottom member 270 and the tapered channel 271 may be positioned on the top member.

In these embodiments, also associated with the bottom member 270 and positioned between the bottom member 270 and the electronic device to be encased in the housing, is a dampening member 280. The dampening member can be a single piece (as shown), or multiple pieces. In certain embodiments, when the dampening member is made up of multiple pieces the pieces can be strips that run down or across the length of the bottom member 270 or diagonally across the bottom member 270. In certain embodiments, the multiple pieces can crisscross the bottom member 270. The dampening device serves to cushion the electronic device when positioned between the device and the bottom member 270. The dampening member 280 can be made from any suitable material, or combination of materials, including silicone, rubber, or other elastomeric or polymeric materials. As will be appreciated, in order to form watertight seals between the top and members 260, 270 and an encased electronic device, the seals 263, 264 and dampening member 280 preferably do not provide for sufficient movement of the device between the top and bottom members so as to break or otherwise disrupt either of the seals formed by the seals formed by the gaskets 263, 264 between the top and bottom members 260, 270 and the display of the encased electronic device (or a screen protector or other such optically clear or translucent layer (not shown) adhered to the outer surface of the display).

Figure 12B:
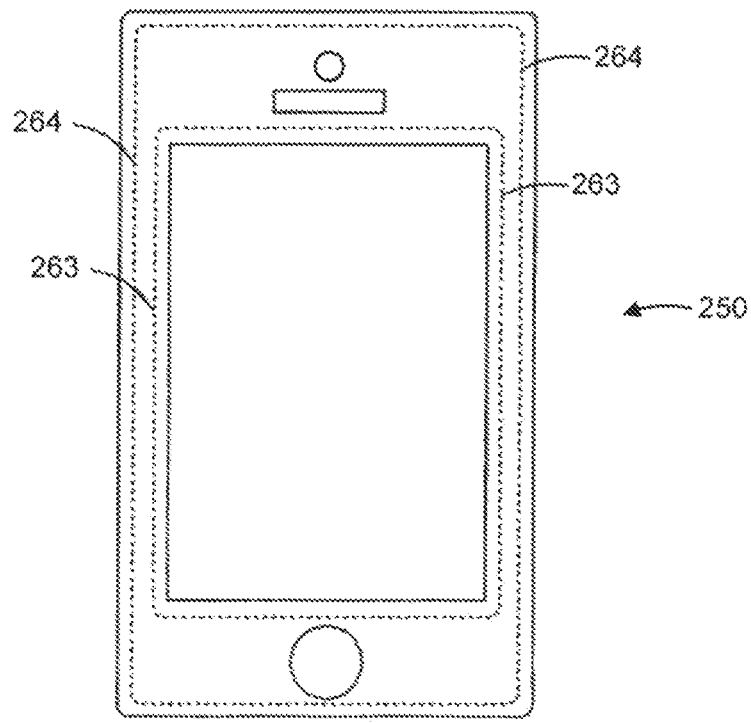
FIG. 12B shows a front elevation view of the housing embodiment of FIG. 12A.

FIG. 12B shows a top view of the housing 200 depicted in FIG. 12A wherein the gaskets 263, 264 that provide sealing functionality are illustrated. Again, any suitable sealing material can be used. In this embodiment, the gaskets 263, 264 are elastic, compressible O-rings, each positioned within a gasket channel 265, 266 in the underside of the top member 210. The O-rings may be solid or compressible O-rings, such as O-rings that are capable of being compressed from about 1% to about 70%, such as from about 5% to about 65%, from about 10% to about 60%, including about 15% to about 50%, for instance, about 20% to about 40%, including about 30%. In other embodiments, tacky or sticky compressible materials, such as TPE, silicone, polyurethane gel, slow-flowing adhesive, or the like is used as the seal 263 and/or 264. Such materials include also include sticky, gelatinous materials such as a melt blend admixture of poly (styrene-ethylene-butylene-styrene) triblock copolymer and plasticizing oils Such materials preferably are high surface energy materials, self-adhere, have a high degree of surface tackiness, and are flowable and releasable (to allow detachment from an encased electronic device in the event a user wishes to remove the device from the housing). Such materials allow for watertight sealing even when no external pressure is applied. When the top and bottom members are joined (e.g., using clasping components), such materials compress and wet (or wick) out to form a watertight seal between the components that contact the particular seal. Excess material, if any, may be removed, if desired, after a seal has been formed. As will be appreciated, in such embodiments the display screen of the encased electronic device, for example, a smart phone directly contacts the seal innermost 263 of the two seals 263, 264. In certain embodiments, the outer gasket (264) is not present because the seal between the outer side of the upper member 260 and the outer side of the bottom member 270 is sufficient to exclude environmental constituents such as water, dust, dirt, shock, and the like.

This embodiment can also include a screen protector over the electronic device that covers all or substantially all of the area bounded by the inner seal 223. The screen protector can be placed so that it is impinged upon by the inner and/or outer seals 223, 224. In certain embodiments, the perimeter of the screen protector 150 preferably contains a plurality of prefabricated holes that allow the clasping members 221a, 221b to pass through the screen protector as it is positioned in the housing, for example, over an electronic device to be encased in the housing, at its periphery, between the top and bottom members 210, 220.

Figure 13A:
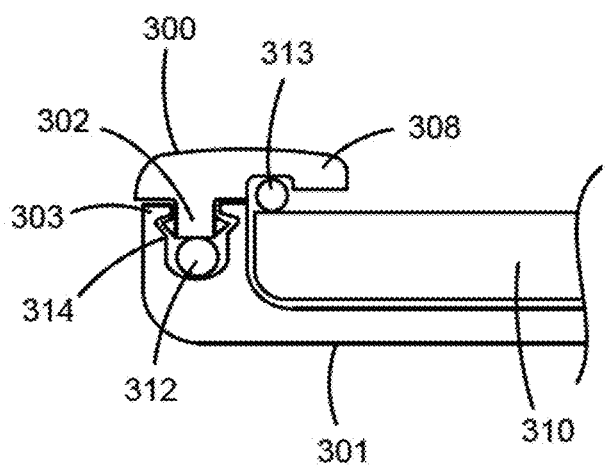
FIG. 13A shows a side cutaway view of an embodiment of a housing with top and bottom members and gaskets.

The disclosure also provides a housing for an electronic device, wherein the housing has a top member 300 and a bottom member 301, as shown in FIG. 13A. The top member 300 is joined to the bottom member 301 through a top member prong 302 interacting with a bottom member prong 303. As shown in FIG. 13A, the top member prong includes a tooth that interacts with a receptacle on the bottom member prong. However, this could be reversed in certain embodiments. Further, the tooth or receptacle can be on the exterior side or interior side of the top member prong. Further, the bottom member prong can be positioned to the interior or exterior of the top member prong when the top member and bottom member are joined. In other embodiments, the top member prongs can have some prongs with a tooth or receptacle on the exterior side and some prongs with the tooth or receptacle on the interior side. The bottom member prong would be positioned appropriately to interact with the top member prong. In certain embodiments, the direction of the tooth or receptacle could alternate or could be distributed in any way known in the art. In certain embodiments 40-60% of the top member prongs have teeth or receptacles facing to the exterior or interior of the housing.

Figure 13B:
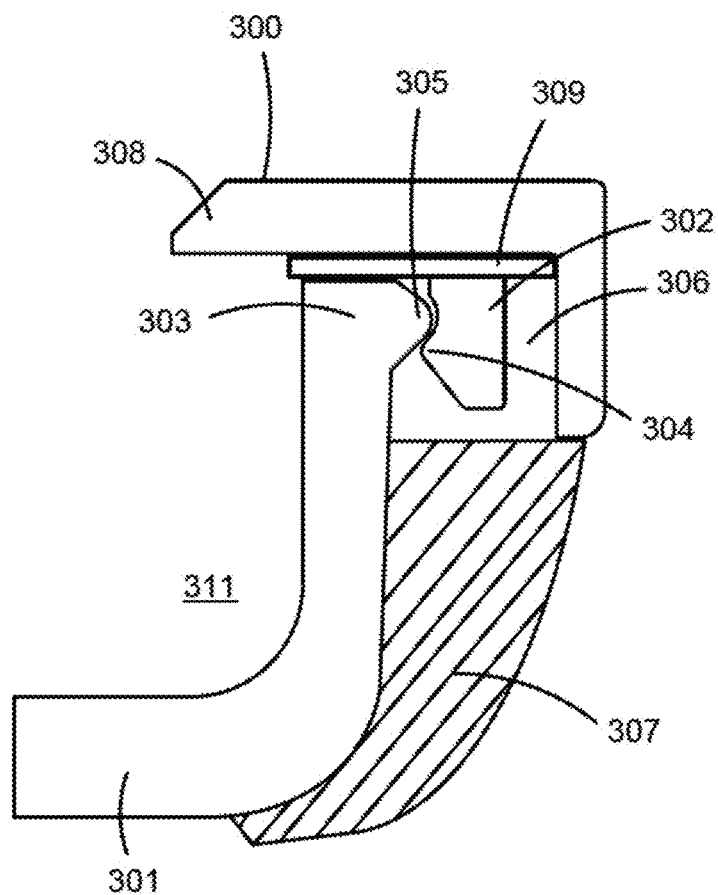
FIG. 13B shows a side cutaway of another embodiment of a housing with top and bottom members and a bumper on the exterior of the housing.
Figure 13C:
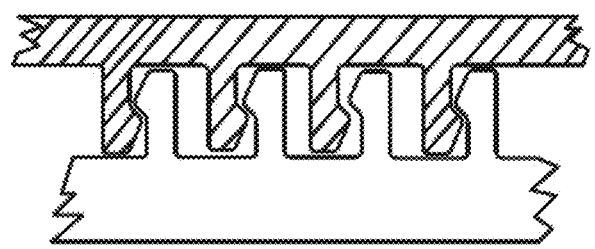
FIG. 13C depicts alternative embodiments of teeth and receptacles that may be used to latch top and bottom members.
Figure 13C:
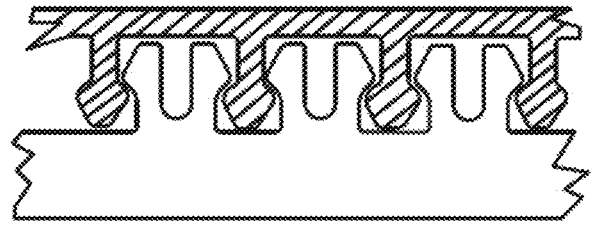

In the embodiment shown in FIG. 13B, the top member prong 302 includes a tooth 305 and the bottom member prong 303 include a tooth receptacle 304. In other embodiments, the bottom member prong could include the tooth 305 and the top member prong could include the tooth receptacle. When the top member 300 is aligned with the bottom member 301 and the two members fitted together, the tooth 305 interacts with the tooth receptacle 304 to hold the top member 300 and the bottom member 301 together to enclose an electronic device 310. See also FIG. 13C.

In certain embodiments, the side of the prong on which the tooth 305 is placed can vary. For example, the tooth 305 can be present on the outside or inside of the top prong 302. This is shown in FIG. 13A. In these embodiments, the bottom prong 303 including a tooth receptacle 304 is found on the outside or inside of the top prong 302 for interaction with the tooth 305. In some embodiments, the placement of the tooth 305 on the inside or outside of the top prong 302 can vary. In certain embodiments, the position of the tooth 305 can alternate. FIG. 13A depicts bottom prongs 303 alternating on either side of top prongs 302.

As shown in FIG. 13B an air gap 306 is necessary, in some embodiments, to allow the top member prong 303 space to flex when interacting with the bottom member prong 303. In certain embodiments, the air gap 306 is found on the outside of the top member prong 302. In other embodiments, the air gap 306 is found in the outside of the top member prong 302 and also below the top member prong 302 when the top member 300 and bottom member 301 are fitted together. In some embodiments, the bottom member prong 303 can flex when interacting with the top member prong 302 by being pushed into the cavity 311 formed by the inner surface of the bottom member 301. In other embodiments, the bottom member prong 303 remains stationary. The bottom member prong 303 may remain stationary because of close proximity to the electronic device 310.

In certain embodiments, the housing has one or more seals as shown in FIG. 13A. In some embodiments, the housing has a seal located in a prong cavity 314 into which the top member prong 302 is placed when interacting with the bottom member prong 303. The prong cavity seal 312 is composed of any of the materials described above for seals. In certain embodiments, the end of the top member prong 302 impinges upon the prong cavity seal 312 causing a seal that is sufficient to exclude environmental constituents such as water, dust, dirt, shock, and the like.

In another embodiment a wiper seal 313 is located under a wiper 308 found on the top member 300 as shown in FIG. 13A. The wiper seal 313 is composed of any of the materials described above for seals. When the housing is assembled around the electronic device 310, the wiper 308 and wiper seal 313 are pressed against the face of the electronic device 310. The composition of the wiper seal 313 is such that a seal between the wiper 308 and the electronic device 310 is formed that is sufficient to exclude environmental constituents such as water, dust, dirt, shock, and the like. In certain embodiments, a housing includes both a prong cavity seal 312 and a wiper seal 313. In other embodiments, a housing includes only a prong cavity seal 312. In other embodiments, a housing includes only a wiper seal 313. In other embodiments, the wiper seal may take the form of a wiper seal gasket 309. In certain embodiments, the wiper seal gasket 309 extends from the interior of the housing around the top member prong 302 and to the outer sidewall of the top member 300 as shown in FIG. 13B. In certain embodiments, the wiper seal gasket 309 is a strip that extends down the surface between the top member 300 and the bottom member 301 wherein apertures are present to allow the top member prongs 302 to pass through the wiper seal gasket 309. In other embodiments, the wiper seal gasket 309 does not extend as far from the interior of the housing to interface with the top member prong 302 and is only present at the wiper 308 similar to the embodiment shown in FIG. 13A. The wiper seal gasket 309 is composed of any of the materials described above for seals. When the housing is assembled around the electronic device 310, the wiper 308 and wiper seal gasket 309 are pressed against the face of the electronic device 310. The composition of the wiper seal gasket 309 is such that a seal between the wiper 308 and the electronic device 310 is formed that is sufficient to exclude environmental constituents such as water, dust, dirt, shock, and the like.

In other embodiments of this housing, a bumper 307 can be found on the exterior of the bottom member 301, as shown in FIG. 13B. The bumper 307 can provide added shock resistance to the electronic device 310 in the housing. The bumper 307 can extend around the entire outside surface of the bottom member 301, only the sides of the bottom member 301 as shown in FIG. 13B, or only on the bottom surface of the bottom member 301. The bumper can be constructed of TPE or other materials appropriate for cushioning the electronic device, for example any of the sealants including low compression sealants described above.

The disclosure provides a protective case for an electronic device, the electronic device having a front surface that includes a display. The protective case includes a bottom member having an inner surface defined by a back wall and a side wall to receive the electronic device, the side wall having a top surface defined by an outer periphery and an inner periphery; a frame member that frames at least a portion of the front surface of the electronic device to enable operation by a user of the display, the frame member having an outer peripheral edge that corresponds to the outer periphery of the top surface of the side wall of the bottom member; one or more tapered posts that couple the frame member with the bottom member by interacting with a deformable opening; and a releasable adhesive interposed between the top surface of the side wall of the bottom member and an underside of the frame member, to seal an interface between the top surface of the side wall of the bottom member and the frame member when the frame member is coupled with the bottom member.

In some embodiments, the one or more tapered posts are spaced-apart along the underside of the frame member, each tapered post having a post head to engage a deformable opening on the periphery of the bottom member. In some embodiments, the releasable adhesive member is a low compression sealant. The low compression sealant can include a poloxamer. In some embodiments, the frame member is formed of a rigid material.

Figure 14A:
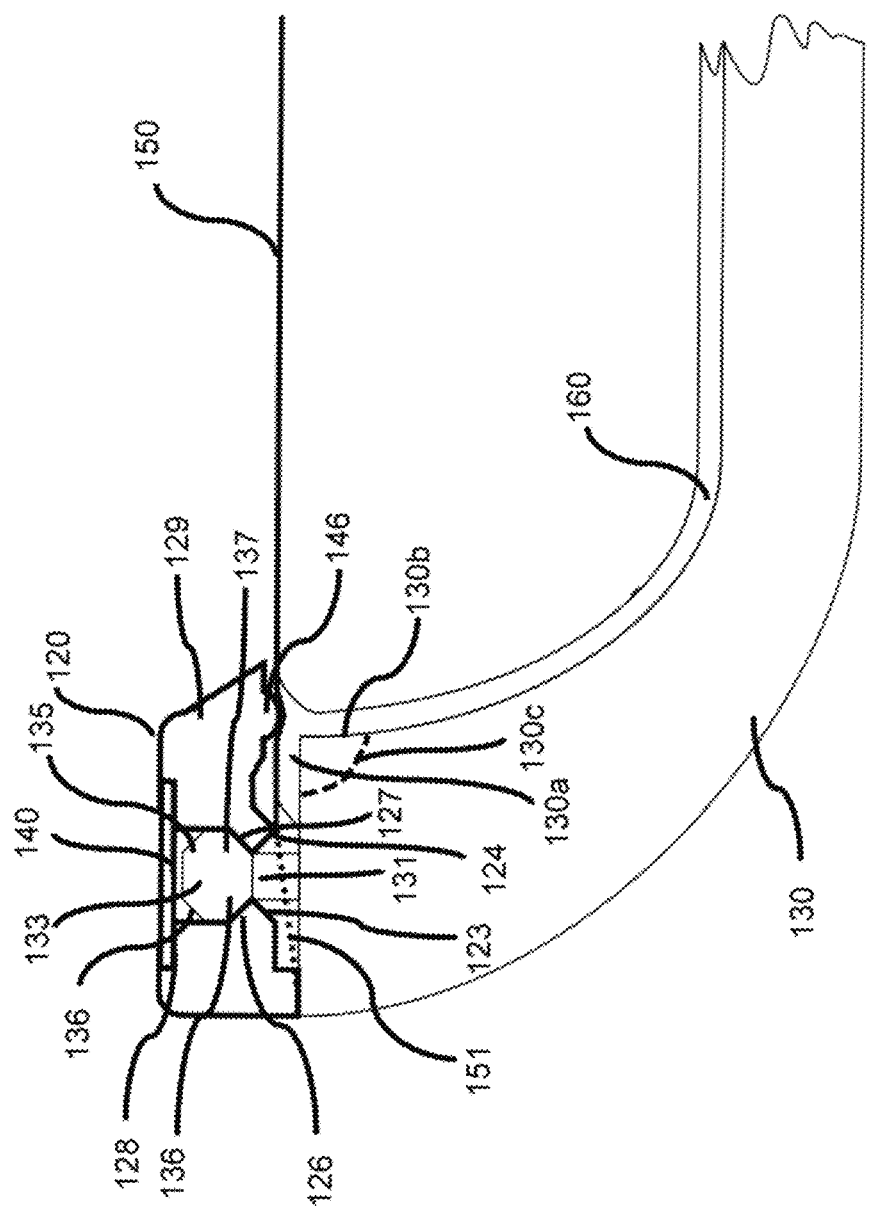
FIG. 14A shows a cross section of the side of a housing with a bottom member having tapered posts and a top member having deformable openings.

FIG. 14A shows a cutaway drawing of another housing configuration of the invention. In the depicted embodiment of this configuration, the housing 110 comprises top and bottom members 120 and 130, respectively, that snap together using a plurality of tapered posts 131 arrayed about the upper perimeter 132 of the bottom member 130 to engage deformable openings 121 arrayed in complementary positions in the perimeter 122 of the top member 120 when the top and bottom members 120, 130 are brought into joined association. Suitable materials from which the top and bottom members 120, 130 may be fabricated include rigid, semi-rigid, and flexible materials, including, without limitation, plastics, metals, polycarbonates, nylon, liquid crystal polymers, and/or rubber, thermal plastic urethanes, polyethylenes, and/or polypropylenes, mixtures thereof and the like.

In cross-section (FIG. 14A), the tapered posts 131 of the bottom member 130 comprise heads 133 having tapered upper faces 134, 135 and tapered lower faces 136, 137 shaped to engage complementary insertion faces 123, 124 of the deformable openings 125 of the top member 120 during insertion and complementary retention faces 126, 127 of the deformable openings 125 of the top member 120 for retention. As will be appreciated, any suitable geometry for the posts of the bottom member and complementary openings of the top member may be employed. Suitable geometries include spheres, cubes, rhomboids, ovals and any combination of these geometries, so that the tapered posts 131 may engage the deformable openings 121 in a way that secures the top and bottom members 120, 130 of the housing. Likewise, any suitable geometry of the deformable openings 121 may be employed, as long as the tapered posts 131 and deformable openings 121 can be joined in a way that secures the top and bottom members 120, 130 of the housing. Suitable geometries include spheres, cubes, rhomboids, ovals and any combination of these geometries, so that the tapered posts 131 may engage the deformable openings 121 in a way that secures the top and bottom members 120, 130 of the housing. In certain embodiments, the deformable openings 121 have a similar geometry to the tapered posts 131 that they are matched with. In other embodiments, the deformable openings 121 have different geometry from the tapered posts 131 that they are matched with. In certain preferred embodiments, the deformable openings 121 have a geometry that allows them to securely hold the geometry of the tapered posts 131 that they are matched with.

In certain embodiments, the angles associated with the tapered upper faces 134, 135, the tapered lower faces 136, 137, the insertion faces 123, 124, and the retention faces 126, 127 are critical for successful implementation of a housing that can be closed and then reopened using tapered posts 131 and deformable openings 121. If the angle between the tapered lower faces 136, 137 and a vertical line are too acute the tapered post 131 will not be retained in the deformable openings 121 with enough force to hold the top and bottom members 120, 130 housing together. The angle 161a is shown in FIG. 14C. Likewise, if the angle between the tapered lower faces 136, 137 and a vertical line are too obtuse the tapered post 131 will be retained in the deformable openings 121 with too much force so that the tapered posts 131 could break off if the top and bottom members 120, 130 were separated after being joined together. In certain embodiments, the angle between the tapered lower faces 136, 137 and a vertical line can be between 20 and 60 degrees. In other embodiments, the angle between the tapered lower faces 136, 137 and a vertical line can be between 25 and 50 degrees or 30 and 45 degrees. In other embodiments, the angle between the tapered lower faces 136, 137 and a vertical line is about 20, 25, 30, 35, 40, 45, 50, 55 or 60 degrees. In other embodiments, the angle between each tapered lower face 136, 137 is substantially the same. In other embodiments, the angle between each tapered lower face 136, 137 is different. In certain embodiments, the difference between the angles for each tapered lower face 136, 137 and a vertical line is between 5 and 20 degrees. In other embodiments, the difference between the angles for each tapered lower face 136, 137 and a vertical line is about 1, 2, 3, 4, 5, 6, 7, 8, 9, 10, 11, 12, 13, 14, 15, 16, 17, 18, 19 or 20 degrees.

In certain embodiments, the angle of the retention faces 126, 127 should closely match the angles of the tapered lower faces 136, 137. In certain embodiments, the difference between the angle of the retention faces 126, 127 and the tapered lower faces 136, 137 is between 0 and 15 degrees. In other embodiments, the difference between the angle of the retention faces 126, 127 and the tapered lower faces 136, 137 is about 0, 1, 2, 3, 4, 5, 6, 7, 8, 9, 10, 11, 12, 13, 14 or 15 degrees.

If the angle between the insertion faces 123, 124 and a vertical line are too acute the tapered post 131 will not be retained in the deformable openings 121 with enough force to hold the top and bottom members 120, 130 housing together. This is because the opening at the base of the deformable opening 121 would have to be too large to accommodate the tapered post 131. The angle 161b is shown in FIG. 14C. Likewise, if the angle between the tapered upper faces 134, 135 and a vertical line are too obtuse the tapered post 131 it will be difficult to insert the tapered post 131 into the deformable opening 121. In certain embodiments, the angle between the tapered lower faces 136, 137 and a vertical line can be between 20 and 60 degrees. In other embodiments, the angle between the tapered upper faces 134, 135 and a vertical line can be between 25 and 50 degrees or 30 and 45 degrees. In other embodiments, the angle between the tapered upper faces 134, 135 and a vertical line is about 20, 25, 30, 35, 40, 45, 50, 55 or 60 degrees. In other embodiments, the angle between each tapered upper face 134, 135 is substantially the same. In other embodiments, the angle between each tapered upper face 134, 135 is different. In certain embodiments, the difference between the angles for each tapered lower face 136, 137 and a vertical line is between 5 and 20 degrees. In other embodiments, the difference between the angles for each tapered upper face 134, 135 and a vertical line is about 1, 2, 3, 4, 5, 6, 7, 8, 9, 10, 11, 12, 13, 14, 15, 16, 17, 18, 19 or 20 degrees.

In certain embodiments, the angle of the insertion faces 123, 124 should closely match the angles of the tapered upper faces 134, 135. In certain embodiments, the difference between the angle of the insertion faces 123, 124 and the tapered upper faces 134, 135 is between 0 and 15 degrees. In other embodiments, the difference between the angle of the insertion faces 123, 124 and the tapered upper faces 134, 135 is about 0, 1, 2, 3, 4, 5, 6, 7, 8, 9, 10, 11, 12, 13, 14 or 15 degrees.

In certain embodiments, the tapered posts 131 are arrayed on the upper peripheral face of bottom member 130. However, the tapered posts 131 could also be arrayed on the lower peripheral face of the upper member 120 while the deformable openings could be arrayed on the upper peripheral face of bottom member 130. In some embodiments, each of the tapered posts 131 on the peripheral face of the upper or bottom members 120, 130 have substantially the same geometry and size. In other embodiments, the tapered posts 131 can have variable geometries on different portions of the peripheral face of the upper or bottom members 120, 130. In other embodiments, the tapered posts 131 can have variable sizes on different portions of the peripheral face of the upper or bottom members 120, 130. In some embodiments, each tapered post 131 has a different size and/or shape from each other tapered post 131 on the peripheral face of the upper or bottom members 120, 130. In other embodiments, there are multiple groups of tapered posts 131. Each tapered post 131 in each group has substantially similar size and shape and there are differences in the size and/or shape of tapered posts 131 between groups. Likewise, the deformable openings 121 may have substantially similar or different geometries and/or sizes as described for the tapered posts 131 above. In certain embodiments, the deformable openings 121 have similar or smaller sizes than the tapered posts 131. In other embodiments, the deformable openings 121 have substantially similar or dissimilar geometries to the tapered posts 131.

In certain embodiments, the tapered posts 131 have a tip with a hexagonal or octagonal shape that interfaces with the deformable openings 121. However, any shape that allows for stable interaction between the tapered posts 131 and deformable openings 121 is possible. In some embodiments, each tapered post includes a slot 170 (see FIG. 14D). This slot allows the split heads 171, 172 of the tapered post 131 to flex when it is inserted into the deformable opening 121. In some embodiments, the deformable opening 121 remains substantially still when the tapered post 131 is inserted. In other embodiments, both the deformable opening 121 and the tapered post 131 change configuration when the tapered post 131 is inserted into the deformable opening 121. The slot 170 can have a length that is between 1 and 100% of the height of the tapered post 131. Further, in other embodiments, the slot 170 can be between 1 and 75% of the width of the tapered post 131. The relative height and width of the slot 170 is important to ensure proper interaction of the tapered post 131 and the deformable opening 121. The greater the size of the slot 170 the more readily the split heads 171, 172 would flex and the easier it is to insert the tapered post 131 into the deformable opening 121 and the easier it is to remove the tapered post. In certain embodiments, the slot 170 is between 1 and 50%, 25 and 75%, 30 and 60% or 40 and 50% if the height of the tapered post. In other embodiments, the slot 170 is between 1 and 50%, 25 and 75%, 30 and 60% or 40 and 50% if the width of the tapered post.

The deformable openings 121 may have a depth that is less than, equal to, or greater than the height of a head 133 of a tapered post 131, once inserted and retained bringing the tapered lower faces 136, 137 of the head 133 into retaining association with complementary retention faces 126, 127 of the deformable opening 125. The deformable openings 121 may also have a width or diameter that is less than, equal to, or greater than the width or diameter of a head 133 of a tapered post 131, once inserted and retained bringing the tapered lower faces 136, 137 of the head 133 into retaining association with complementary retention faces 126, 127 of the deformable opening 125.

Figure 14B:
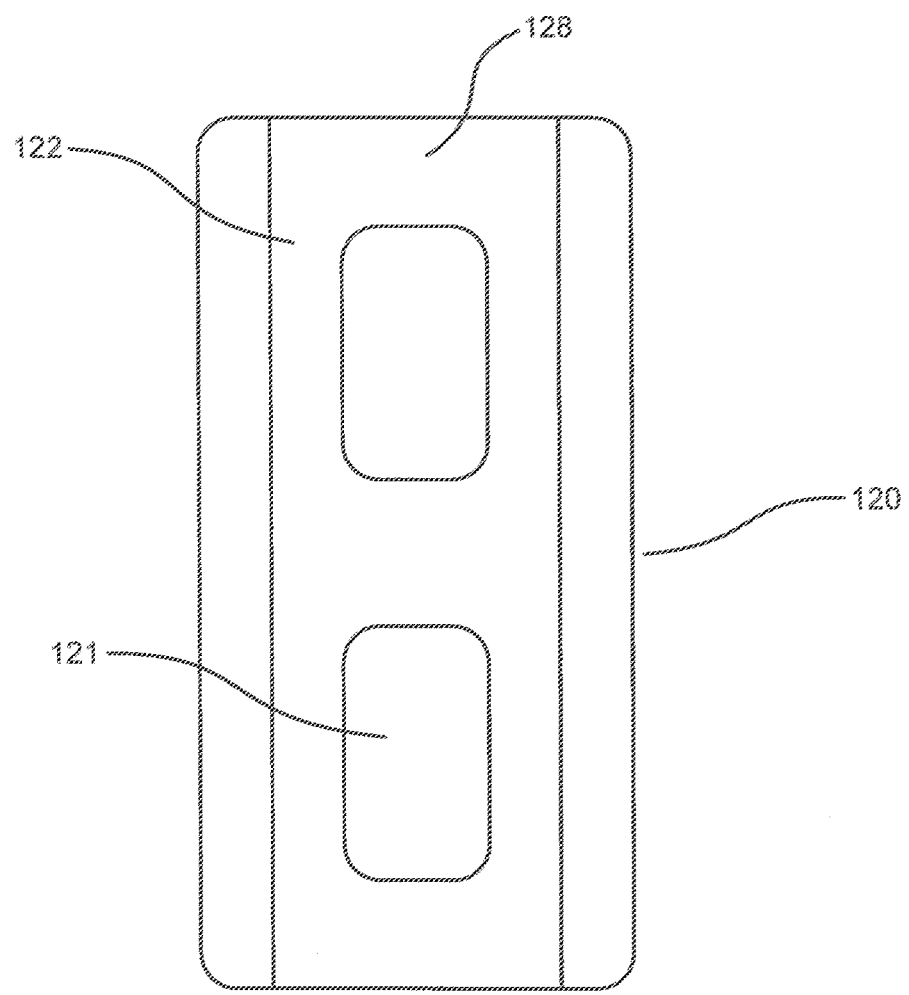
FIG. 14B shows a top view of deformable openings depicted in FIG. 14B.
Figure 14C:
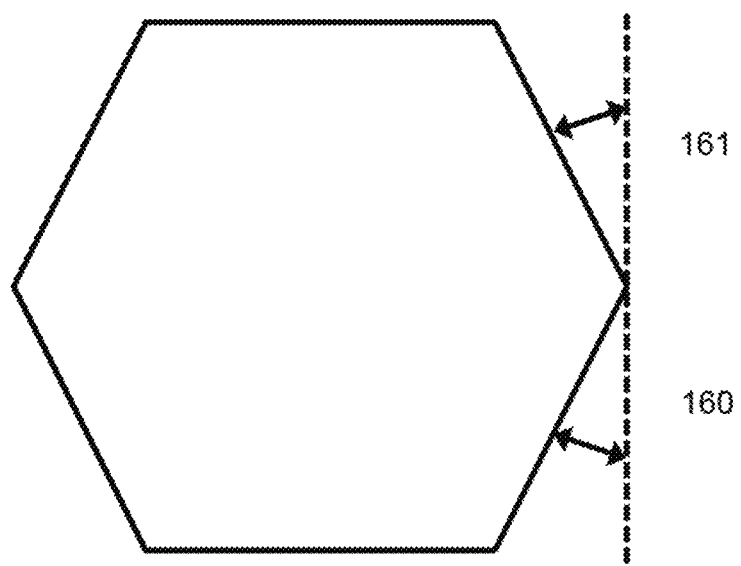
FIG. 14C depicts a side view of the head of a tapered post and angles of the upper and lower faces of the tapered post.

In the embodiment shown in FIG. 14A, the deformable opening 121 is deeper than the height of the head 133, which allows a head cover 140 to be removably yet securely attached to the top member 120 in a cover channel 128; see FIG. 14B formed in the top member 120. In this way, the head cover 140 allows heads 133 protruding through the openings 125 of the top member 120 to be concealed. In other embodiments, the head cover 140 provides a fluid proof seal over the openings 125, preventing water from leaking between the heads 133 protruding through the openings 125. The head cover 140 can be made of a variety of materials. In some embodiments, the head cover 140 is made of plastic, metal, precious metal, polycarbonate, TPE or any sealant or seal material described above.

The top member 120 also preferably includes an inner portion 129 that includes a bump or elevated shoulder 146 that contacts and loads a screen protector 150 that overlays an electronic device (e.g., a smart phone; not shown) in order to provide a watertight seal. In such a configuration, the perimeter (151; hatched in FIG. 14A) of the screen protector 150 preferably contains a plurality of prefabricated holes (not shown) that allow the heads 133 of the bottom member 130 to pass through the screen protector as it is positioned in the housing, for example, over an electronic device (not shown) to be encased in the housing, at its periphery, between the top and bottom members 120, 130. In other embodiments, the screen protector 150 is not present. In these embodiments, the bump or elevated shoulder 146 can directly content the device in such a way that fluid does not pass between where the elevated shoulder 146 and the surface of the device meet.

To ensure a watertight seal, preferably a compressible layer 160, e.g., a layer of TPE, can be positioned in the bottom member 130 such that the compressible layer 160 covers at least the upward facing portion 130a and inward facing portion 130b of the inner shoulder 130c of the bottom member 130. In FIG. 14A, a compressible TPE layer 160 covers the entire device-housing cavity of the bottom member 130 and extends to cover the upward facing portion 130a of the bottom member. It will be appreciated that any suitable material may be employed as the compressible material. For example, an elastomeric material, such as rubber, TPE, polyethylene, polypropylene, and the like can be used so as to provide compressibility and/or shock absorbance. The compressible material may also be a seal material as described above.

Figure 14D:
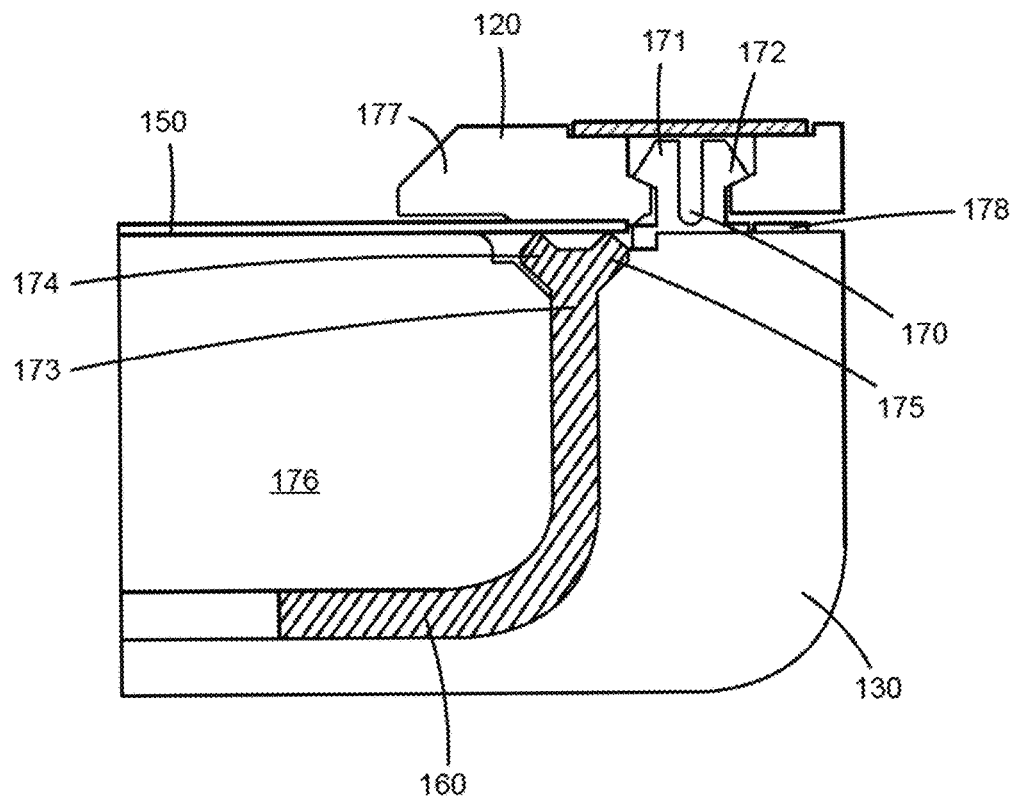
FIG. 14D shows an embodiment of a housing having tapered posts configured with slots, as well as a compressible layer with a Y-shaped end.

As shown in FIG. 14D, the compressible layer may have a Y-shaped end 173 that interfaces with the top member 120. The Y-shaped end 173 includes an inner face 174 and an outer face 175. The inner face 174 forms a seal between the electronic device 176 and the wiper 177 and/or a screen protector 150 that overlays the electronic device 176. In certain embodiments, the inner face 174 prevents water from leaking between the tapered posts 131 and contacting the electronic device by forming a seal between the compressible layer 160 and the screen protector 150. In other embodiments, the housing lacks a screen protector 150. In these embodiments, the inner face 174 forms a seal between the wiper 177 and the electronic device 176. This allows fluids to contact the face of the electronic device 176 but does not allow them to cross the seal with the compressible layer and contact the rear of the electronic device 160. This is preferable for electronic devices that have water resistant faces that do not necessarily need a screen protector 150 to be resistant to leakage of fluids into the electronic device.

The outer face 175 prevents fluids from leaking between the tapered posts 131 and contacting the electronic device 176 by forming a seal between the top member 120 and the compressible layer 160. In certain embodiments, the outer face 175 can also form a seal between the screen protector 150 and the compressible layer 160 in order to prevent fluids from leaking between the tapered posts 131 and contacting the electronic device 176.

In other embodiments, the housing also includes an external gasket 178 shown in FIG. 14D. The external gasket 178 creates a seal with the top member 120 that is sufficient to exclude environmental constituents such as water, dust, dirt, shock, and the like. The external gasket 178 can be made of any kind of sealant or seal material as described above.

Figure 14E:
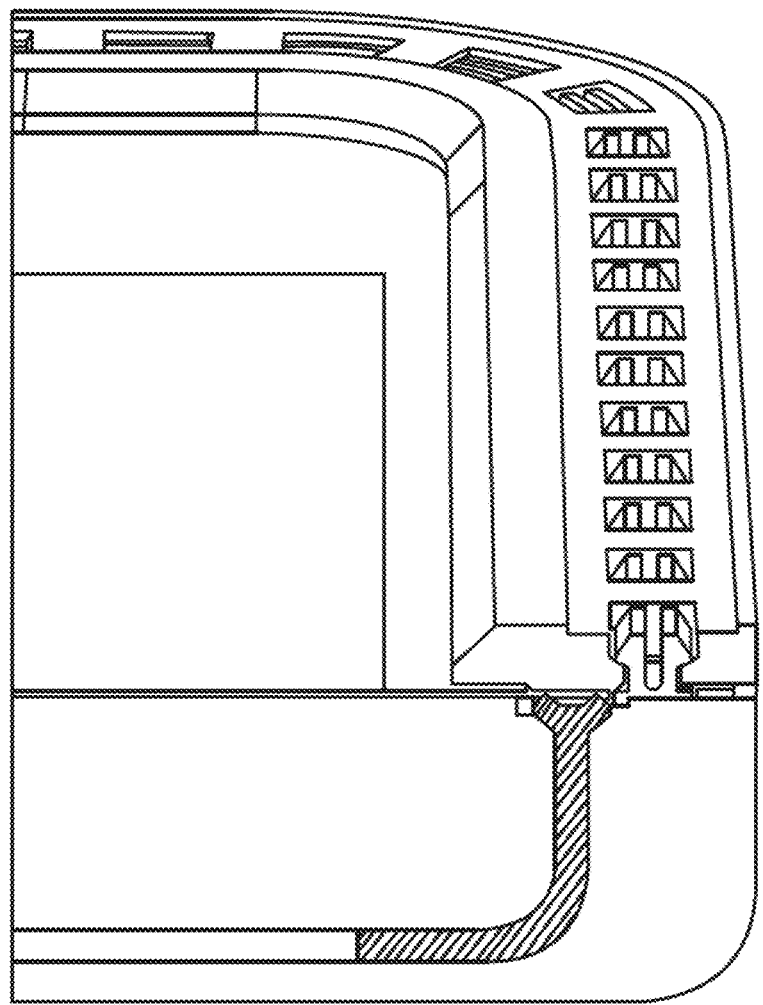
FIG. 14E shows a perspective cutaway view of the housing embodiment depicted in FIG. 14D.
Figure 14F:
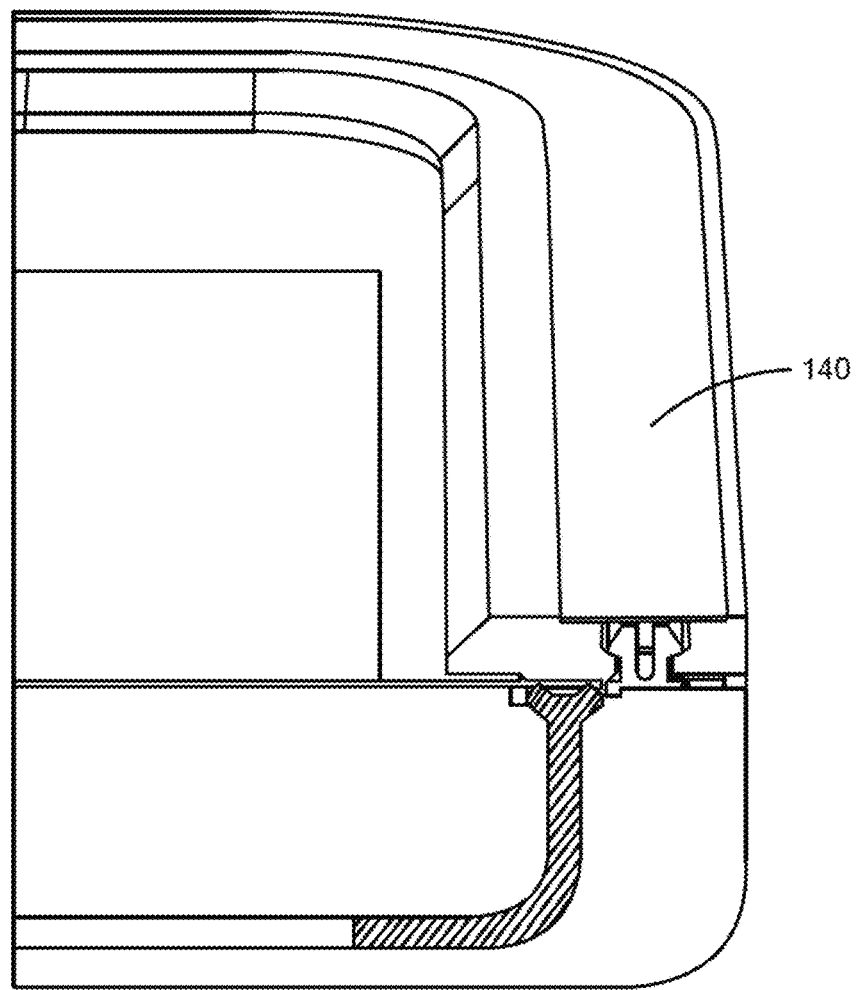
FIG. 14F shows a perspective cutaway view of the housing embodiment depicted in FIG. 14E with a head cover that covers the tapered posts.
Figure 14G:
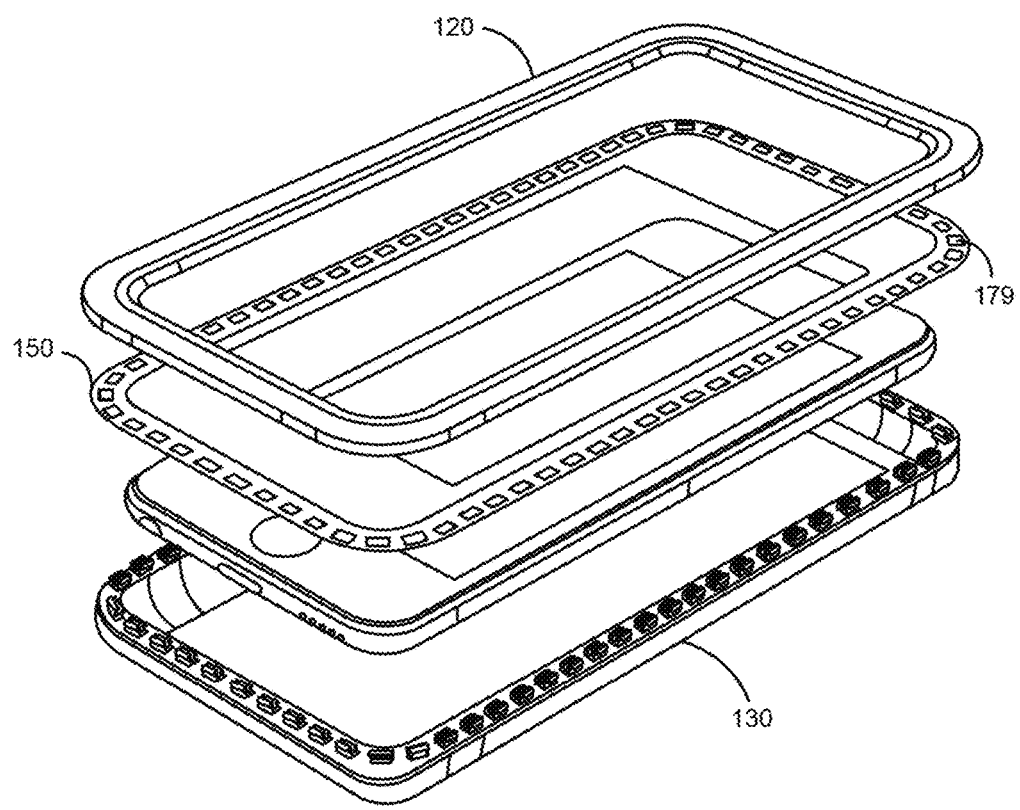
FIG. 14G depicts an exploded view of the encasement of the housing in FIG. 14E with a screen protector in between the top member and the mobile electronic device.
Figure 14H:
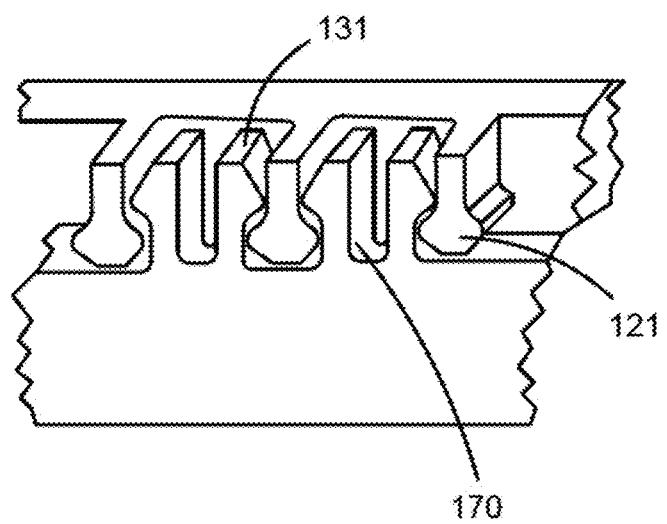
FIG. 14H shows a cross section of an embodiment of tapered posts interacting with deformable openings.
Figure 14I:
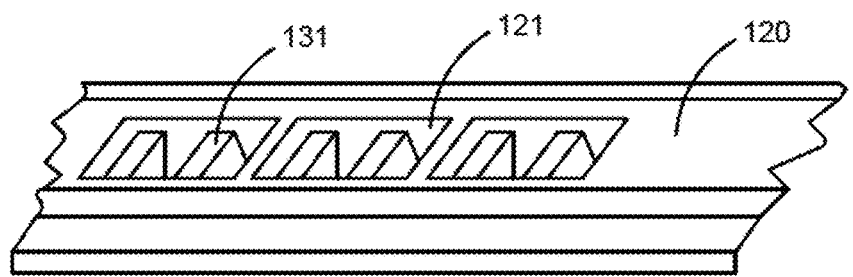
FIG. 14I depicts a top perspective view of the tapered posts and deformable openings from FIG. 14H.
Figure 14J:
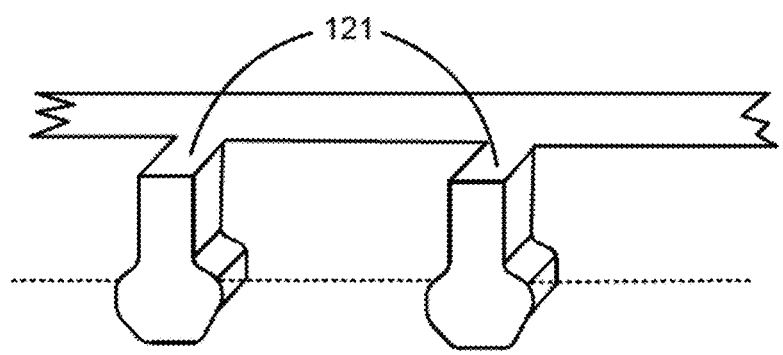
FIG. 14J shows a detailed cross section of an embodiment of a deformable opening without insertion of a tapered post.

FIG. 14E shows a perspective view of the same embodiment shown in FIG. 14D without the head cover 140 to show the tapered posts 131 inserted into the deformable openings 121. In this embodiment, the top member 120 can be made of polycarbonate or alkali-aluminosilicate sheet glass (Gorilla Glass®), the bottom member can be made of polycarbonate and the seal can be made of TPE or any other seal material described above. FIG. 14F shows the same view with the head cover 140. FIG. 14G shows the entire case with a screen protector 150 between the top member 120 and the electronic device. Note the apertures 179 in the edges of the screen protector 150 to allow the tapered posts 131 to interact with the deformable openings 121. FIG. 14H provides a more detailed cross section of one embodiment of a tapered post 131 with a slot 170 and the two walls of a deformable opening 121. FIG. 14I shows detail of the tapered posts 131 inserted into the deformable openings 121 from the top of the top member 120. FIG. 14J provides a detailed cross section of one embodiment of the deformable opening 121 without insertion of the tapered post 131.

Figure 14K:
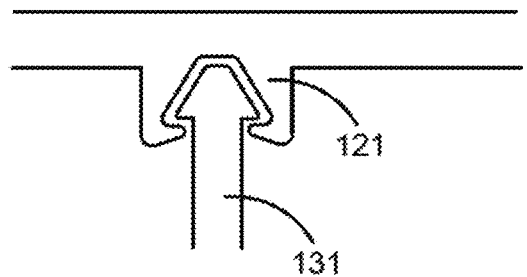
FIGS. 14K, 14L, and 14M show additional embodiments of a tapered post and deformable opening.
Figure 14L:
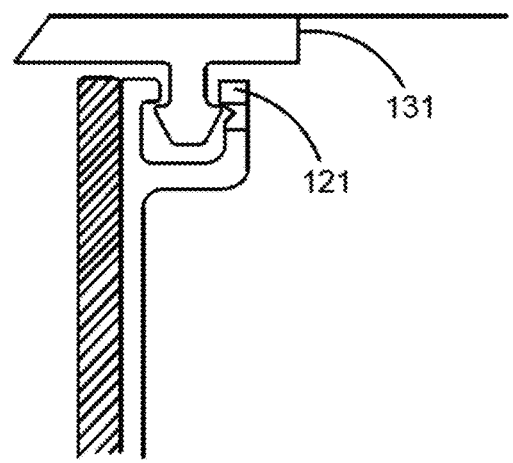
Figure 14M:
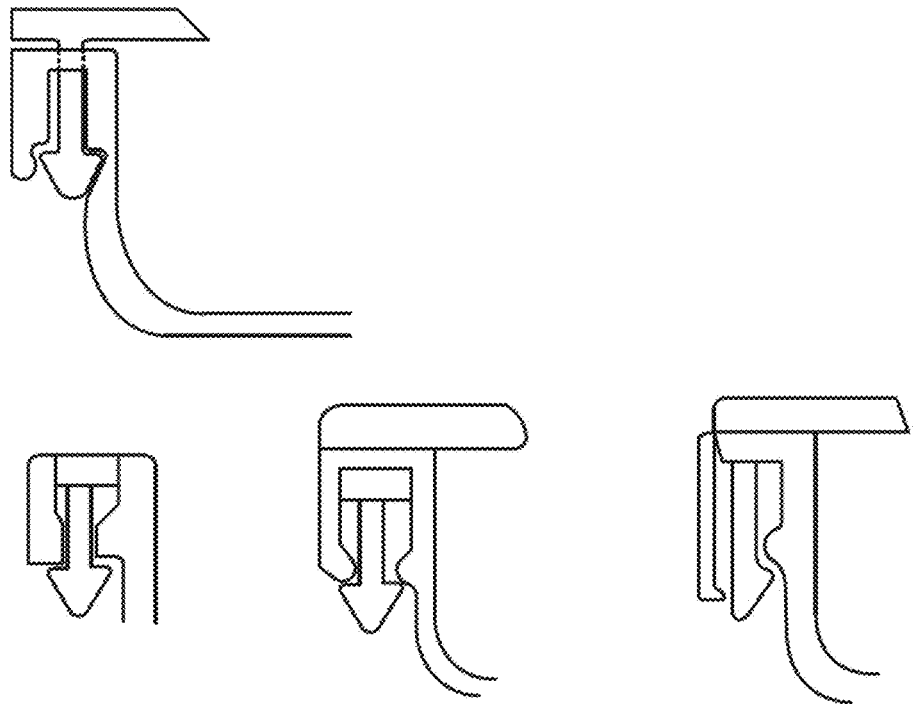
Figure 14N:
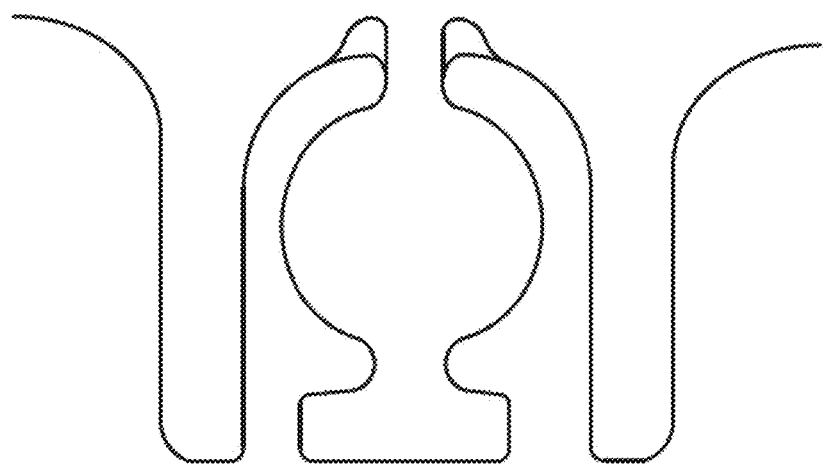
FIGS. 14N, 14O, 14P, 14Q, 14R, and 14S, show additional embodiments of deformable openings.
Figures 14O, 14P:
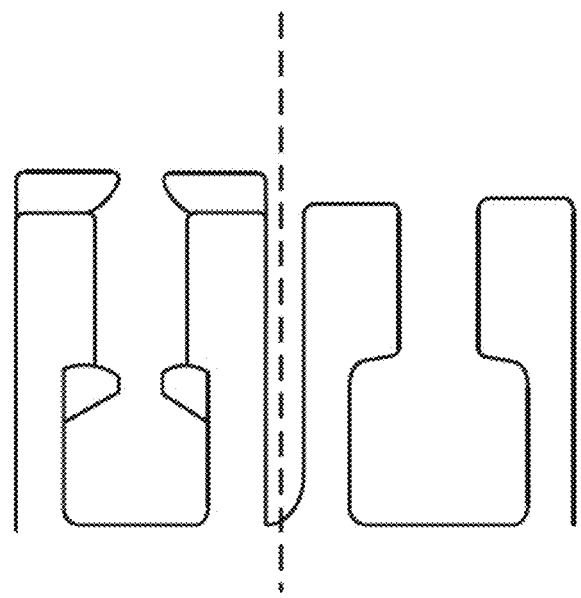
Figure 14Q:
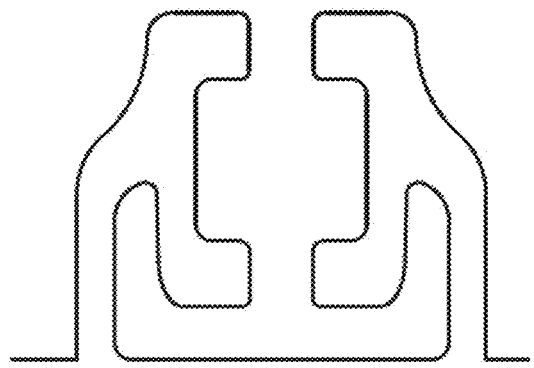
Figure 14R:
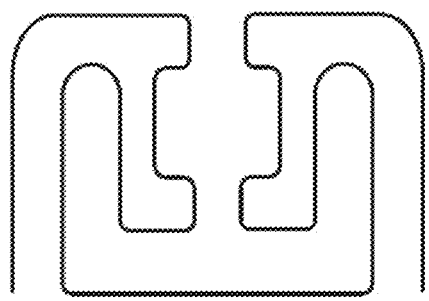
Figure 14S:
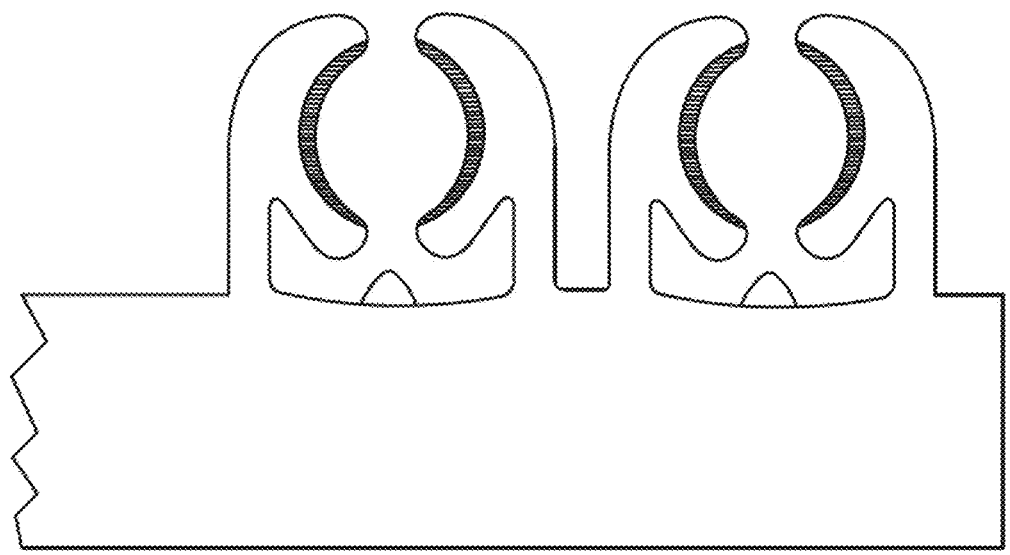

FIGS. 14K, 14L, and 14M, provide additional embodiments of the tapered post 131 and deformable opening 121. FIGS. 14N, 14O, 14P, 14Q, 14R and 14S provide additional embodiments of the deformable opening 121. In these embodiments, the tapered posts 131 have no slot 170. Thus, the deformable openings 121 need to be able to flex around the tapered posts 131. In certain embodiments, this is achieved by making the deformable openings 121 out of a less dense material, by making the deformable openings 121 out of a more flexible material, by making the deformable openings 121 out of less or thinner material or some combination of one or more of these options.

Figure 15:
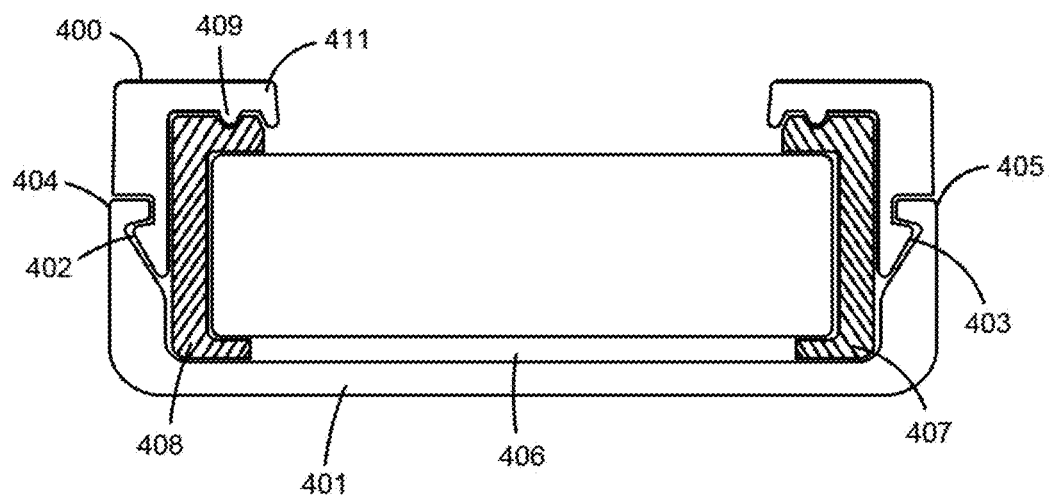
FIG. 15 shows a side cutaway view of an embodiment of a housing having top and bottom members, as well as sealing members encasing a mobile device.

The disclosure also provides a housing shown in FIG. 15. In this embodiment, the housing comprises top and bottom members 400, 401 that are joined together, also by being snapped together after the device to be encased in positioned within the bottom member 401. Of course, any suitable mechanical system can be adapted to effect watertight joining of the top and bottom members of these embodiments. In the embodiments shown in FIG. 15, the top member 400 is joined to the bottom member 401 using a clasping mechanism. Here, a plurality of internal clasping members 402, 403 are configured to engage complementary structure, here, tapered channels 404, 405 present on the interior surface 406 of the bottom member 401. These clasping structures are configured such that when the top and bottom members 400, 401 are coupled together, a liquid-proof and/or dustproof and/or shockproof seal is provided, preferably by the presence of a sealing layers 407, 408, that form the seal(s) when the top and bottom members 400, 401 are securely joined together (as happens, for example, when clasping members 402, 403 are brought into joining association with complementary structures, such as a tapered channels 404, 405). The sealing layers protect the encased electronic device (or the internally housed electrical components of such a device) from environmental constituents such as water, dust, dirt, shock, and the like. In some embodiments, the internal clasping members 402, 403 may be positioned on the interior surface 406 of the bottom member 401 and the tapered channels 404, 405 may be positioned on the top member 400.

In these embodiments, also associated with the bottom member 401 and positioned between the bottom member 401 and the electronic device to be encased in the housing, are the sealing layers 407, 408. The sealing layers 407, 408 can be a single piece or multiple pieces. In certain embodiments, when the sealing layers 407, 408 are made up of multiple pieces the pieces can be strips that run down or across the length of the bottom member 401 or diagonally across the bottom member 401. In certain embodiments, the multiple pieces can crisscross the bottom member 401. The sealing layers 407, 408 serve to cushion the electronic device when positioned between the device and the bottom member 401 and also to seal the electronic device in the housing from environmental constituents such as water, dust, dirt, shock, and the like.

In preferred embodiments, the sealing layers 407, 408 cover the sides of the electronic device when it is inserted in the housing. In certain embodiments, the sealing layers 407, 408 are placed between the electronic device and the top and bottom members 400, 401 as shown in FIG. 15. In certain embodiments, the top member 400 includes a wiper 409 that covers the periphery of the front face of the electronic device. In certain embodiments, the sealing layers 407, 408 are placed between the wiper 409 and the electronic device forming a seal at the periphery of the electronic device. The seal prevents the penetration of environmental constituents such as water, dust, dirt, shock, and the like beyond the front face of the electronic device. In preferred embodiments, the front face of the electronic device is resistant to penetration by environmental constituents such as water, dust, dirt, shock, and the like.

In other embodiments, the sealing layers 407, 408 extend from between the wiper 409 and the electronic device to between where the top and bottom members 400, 401 meet and in some embodiments, also forms a layer between the electronic device and the bottom member 401. The sealing layers 407, 408 also provide shock protection when they extend from the point where they form a seal with the electronic device and the housing. In certain embodiments, the sealing layers 407, 408 make one unitary layer between the electronic device and the bottom member 401. In certain embodiments, the sealing layers 407, 408 are formed into a sock that the electronic device is placed into. Then the electronic device/sock can be placed into a housing.

In other embodiments, the wiper 409 has an inner shoulder 411 that holds the sealing layers 407, 408 in place and also supplies pressure from the top member 400 to the electronic device when the top and bottom members 400, 401 are joined together. In certain embodiments, this helps to form a seal between the top member 401 and wiper 411 and the electronic device that keeps environmental constituents such as water, dust, dirt, shock, and the like from penetrating the housing and the front surface of the electronic device.

The sealing layers 407, 408 can be made from any suitable material, or combination of materials, including silicone, rubber, or other elastomeric or polymeric materials including the sealants and sealing materials disclosed above. As will be appreciated, in order to form watertight seals between the top and members 400, 401 and an encased electronic device, the sealing layers 407, 408 preferably do not provide for sufficient movement of the device between the top and bottom members so as to break or otherwise disrupt either of the seals formed by the sealing layers 407, 408 between the top member 400 and the display of the encased electronic device (or a screen protector or other such optically clear or translucent layer (not shown) adhered to the outer surface of the display).

Figure 16:
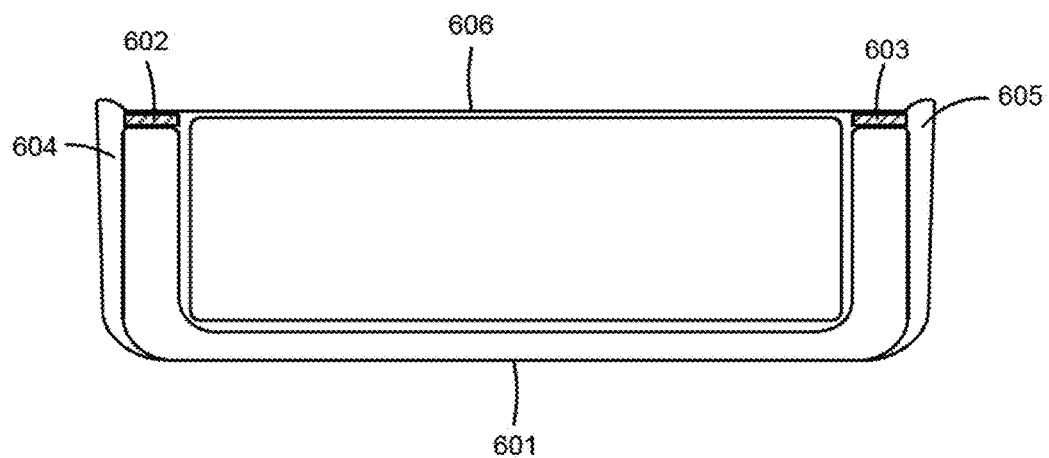
FIG. 16 depicts a side cutaway view of a housing including a screen protector and a bottom member joined together by seals.

The disclosure also provides a housing shown in FIG. 16. In this embodiment, the housing comprises a screen protector 600 and a bottom member 601. The screen protector 600 and bottom member are joined together by seals 602, 603 between the screen protector and the bottom member 601. The seal prevents the penetration of environmental constituents such as water, dust, dirt, shock, and the like into the housing. In certain embodiments, the bottom member 601 includes bumpers 604, 605 on the exterior of the bottom member 601. In certain embodiments, the bumpers 604, 605 are located on the sides of the exterior of the bottom member 601. On other embodiments, the bumpers 604, 605 extend around the entire exterior of the bottom member 601. In other embodiments, the bumpers 604, 605 are horizontal strips that extend across the exterior of the bottom member 601. In other embodiments, the bumpers 604, 605 are diagonal strips that extend across the exterior of the bottom member 601. In other embodiments, the bumpers 604, 605 could be applied to any of the housing embodiments described herein.

Figure 17A:
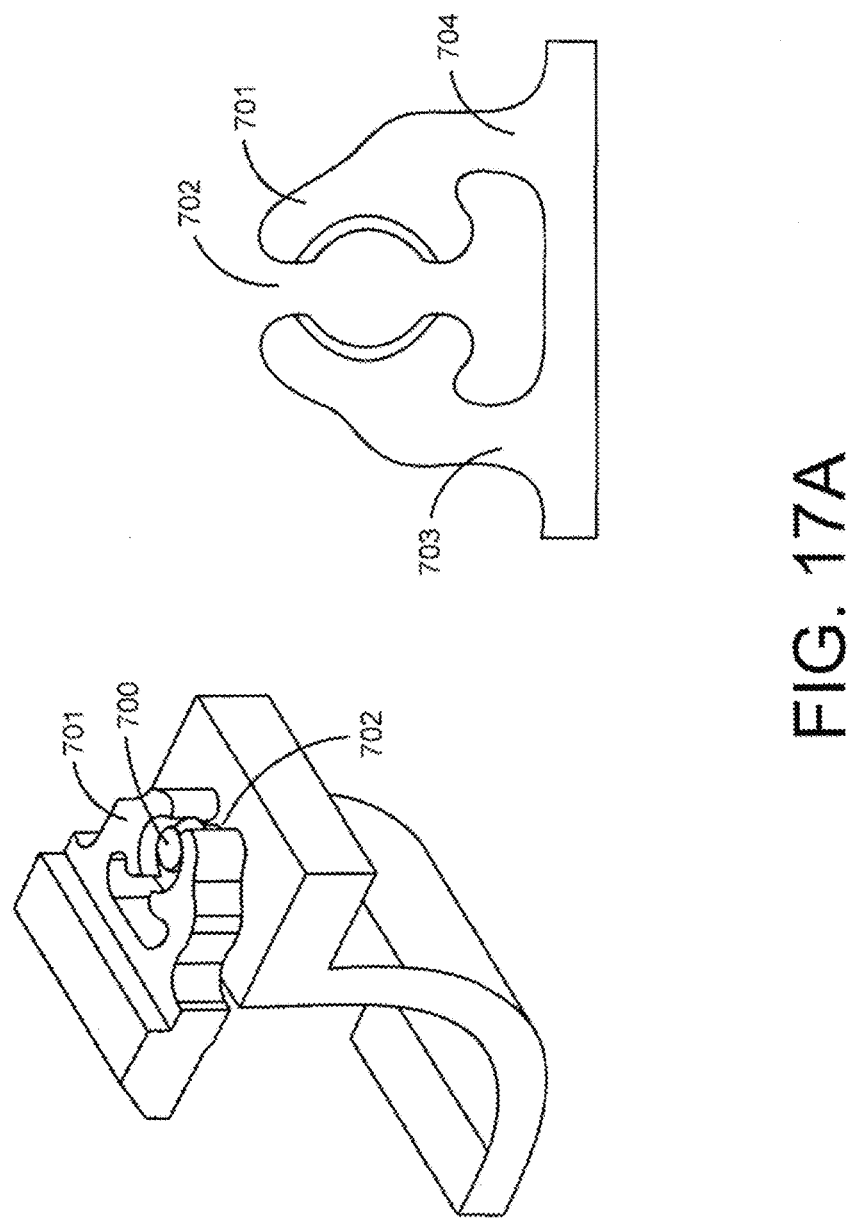
FIG. 17A shows perspective and top views of an alternative latching mechanism for a housing, including a button and a deformable opening.
Figure 17B:
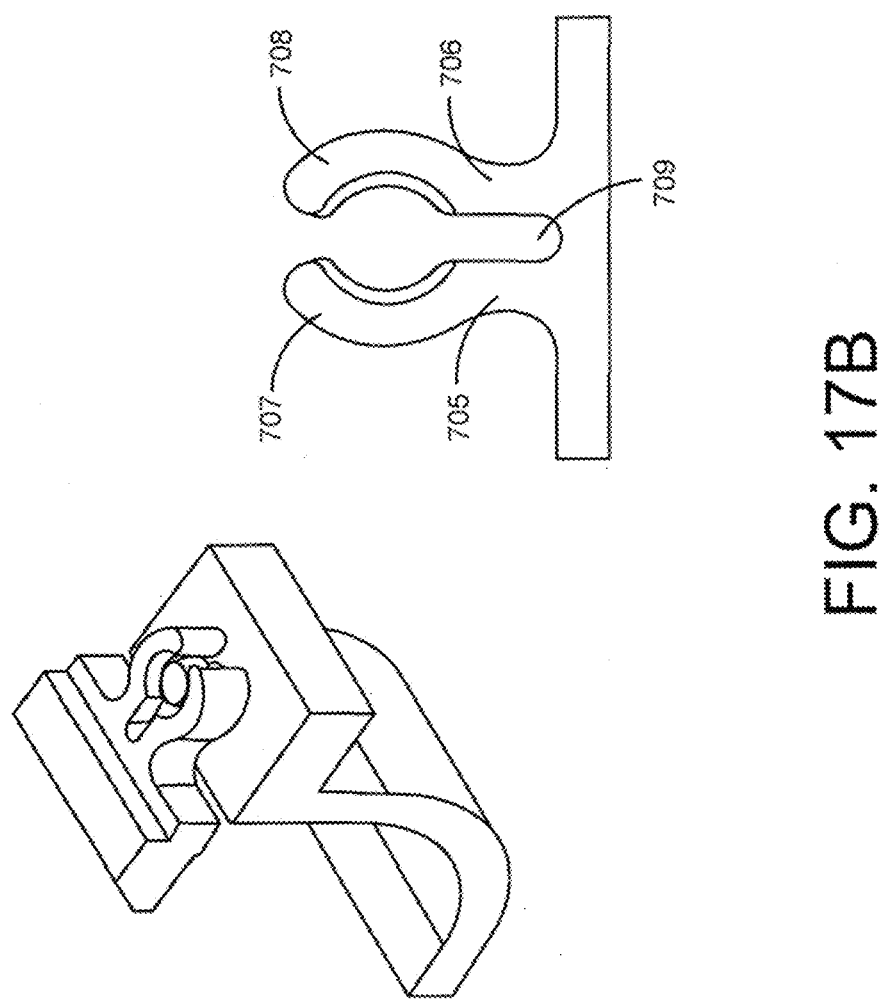
FIG. 17B shows perspective and top views of another alternative latching system that includes a button and deformable opening.

The disclosure also provides alternative latching mechanisms for the housings described herein. FIG. 17A shows a latching mechanism including a button 700 and a deformable opening 701. In this embodiment, the deformable opening comprises a lateral gap 702 through which the button can be inserted into the deformable opening. In other embodiments, the deformable opening 701 can be pressed down over the button 700 to join the button with the deformable opening. The arms 703, 704 of the deformable opening allow the deformable opening to flex around the button 700. FIG. 17B shows another embodiment, wherein the arms 705, 706 are attached to the cup portion 707, 708 of the deformable opening 701 at the bottom surface of the cup portions 707, 708. This requires a different shaped gap 709 at the base of the deformable opening 701. This embodiment can be joined to the button in a similar way to the embodiment shown in FIG. 17A.

Figure 17D:
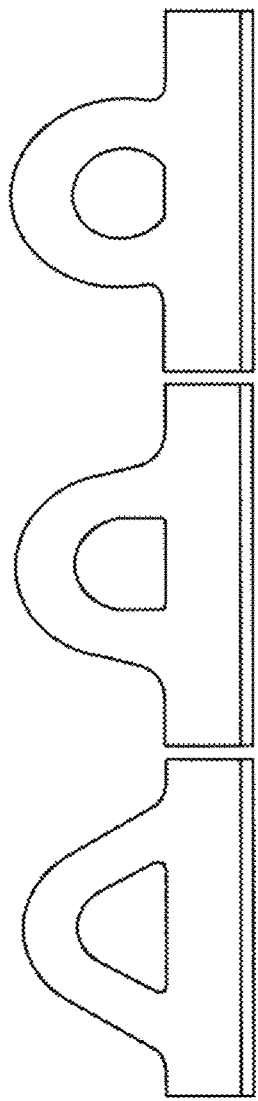
FIG. 17D shows a top view of various shapes for deformable openings.

FIG. 17C provides an alternate latching mechanism. In this embodiment, the button 710 is inserted into a deformable opening 711 with a much smaller lateral gap 712. This means that the button 710 must be inserted into the top of the deformable opening 711. The deformable opening also has a lip 713 that holds the head 714 of the button 710 in place. FIG. 17D provides other embodiments for various shapes of the deformable opening according to FIG. 17C.

As indicated above, an element of the housing 1 may be a port opening, such as a headphone port 50, that is configured for acting as an interface between a headphone, speaker, or other jack containing accessory device and a jack port of an underlying electronic device so as to provide a liquid-proof interface between the headphone, speaker jack, etc. and the underlying device. In such an instance, the interface is a liquid and dirt proof seal.

Figure 18A:
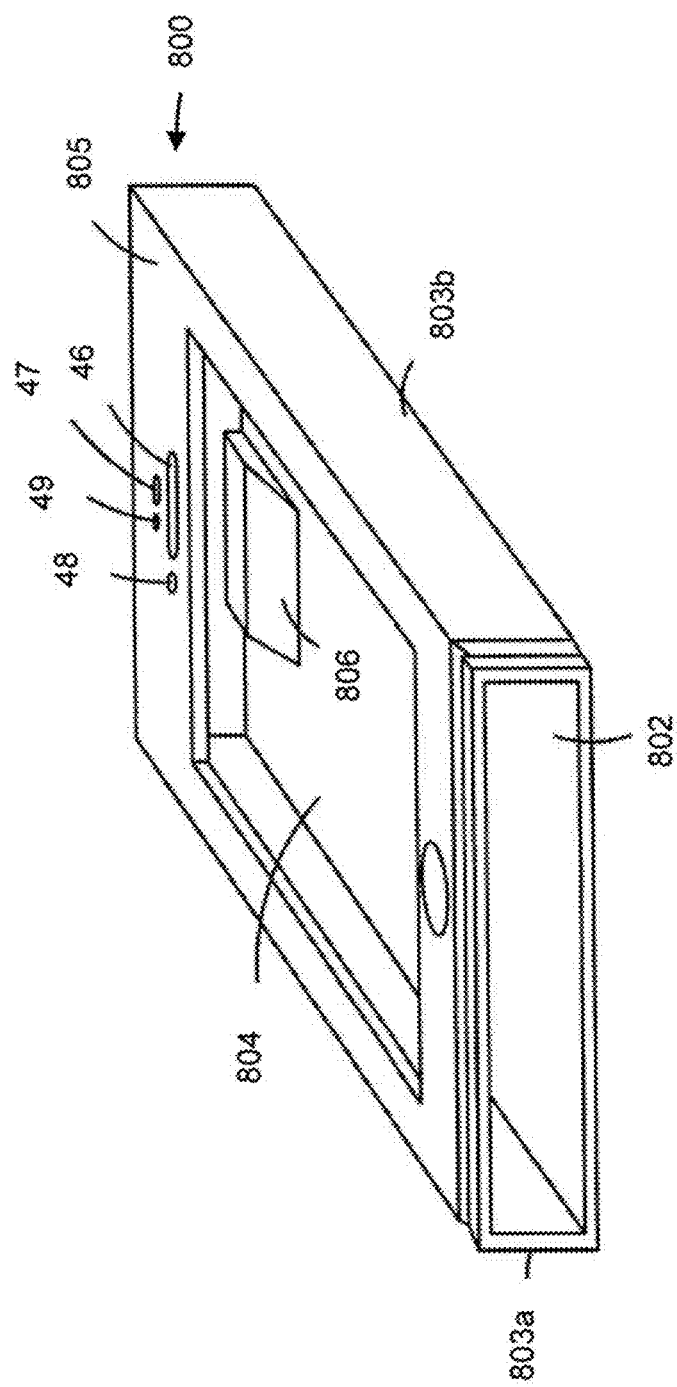
FIG. 18A depicts a perspective view of an embodiment of a housing including a proximal opening, opposing side walls, and front surface, and proximal and distal wedges on the interior of the case.
Figure 18B:
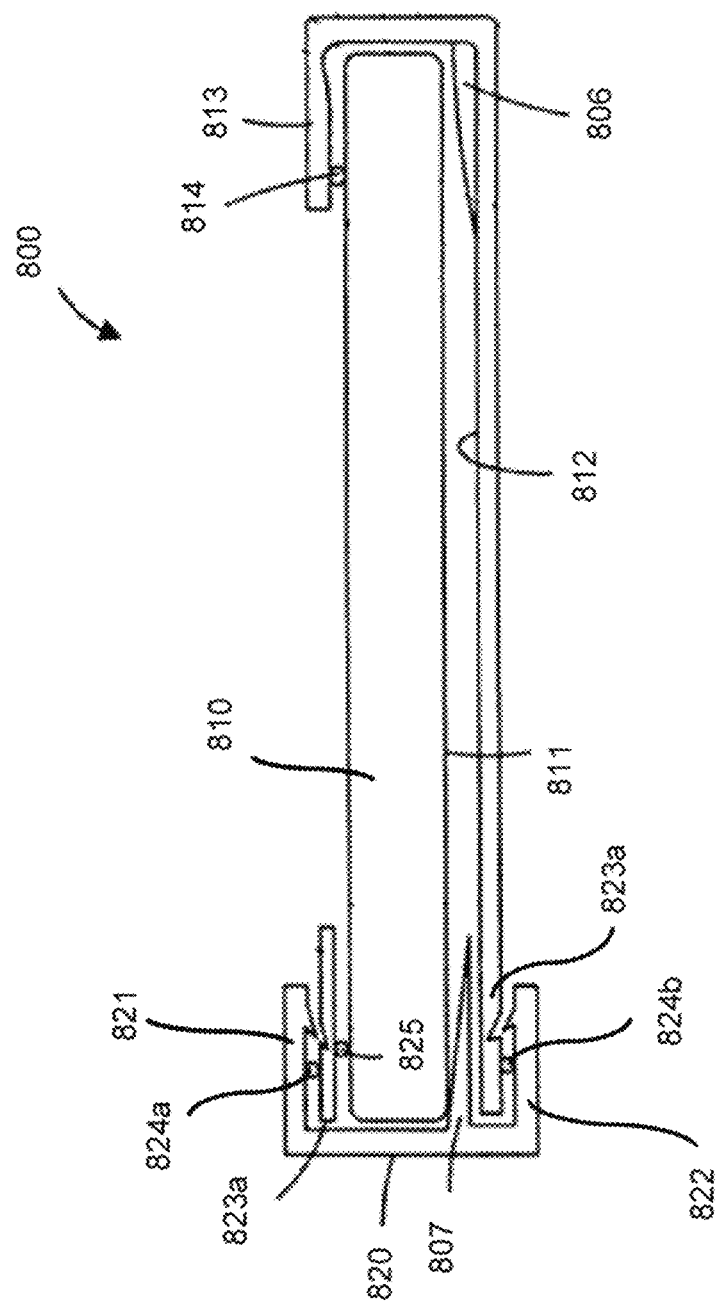
FIG. 18B shows a side cutaway view of the housing of FIG. 18A encasing a mobile electronic device.

In an alternative embodiment, a housing is formed, in part, from a single piece with an insertion aperture or port that allows insertion of an electronic device and then attachment of a latch cover lid that provides a liquidproof seal. FIG. 18A depicts a perspective view of a housing 800 that includes a proximal opening 802, opposing side walls 803a and 803b, and front surface 804. Front surface 804 includes perimeter portion 805. An electronic device may be inserted into proximal opening 802, such that the device aligns with features included as part of the front surface, such as a proximity sensor feature 48, an ambient light sensor feature 49, a camera feature 47, and a sound transmission feature 46. FIG. 18B depicts a side cutaway view of the housing of FIG. 18A, in which an electronic device is inserted into the housing and a latch cover lid is mated to the proximal opening of the housing. Distal wedge 806 (see also FIG. 18A), in combination with lid wedge 807 raises the rear surface 811 of the device 810 such that a portion of the rear surface of the device does not contact the interior rear surface 812 of the housing. This allows for additional shock absorbance as well as improved sound transmission from the electronic device across the housing. Distal perimeter portion 813 includes a distal gasket 814, such that the gasket prevents entry of liquids, dust, etc. Latch cover lid 820 also includes front and rear clasping mechanisms, 821 and 822 respectively, configured to interact with the front and rear proximal perimeter portions, 823a and 823b respectively, of the housing. The front and rear proximal perimeter portions 823a and 823b are configured to receive teeth on the front and rear clasping mechanisms. It should be noted in some embodiments, that the front and/or rear clasping mechanisms may be configured to receive the front and rear proximal perimeter portions. Any of the clasping mechanism configurations described above may also be used such that the latch cover lid is affixed firmly to the housing. Proximal lid gasket 824a and 824b is interposed between the latch cover lid and front and rear proximal perimeter portions, preventing entry of liquids, dust, etc. The proximal lid gasket may be physically attached to the latch cover lid, to the front and/or rear proximal perimeter portions, or may be unattached. In addition, a front proximal perimeter gasket 825 may be interposed between the device 810 and the proximal perimeter portion.

Figure 18C:
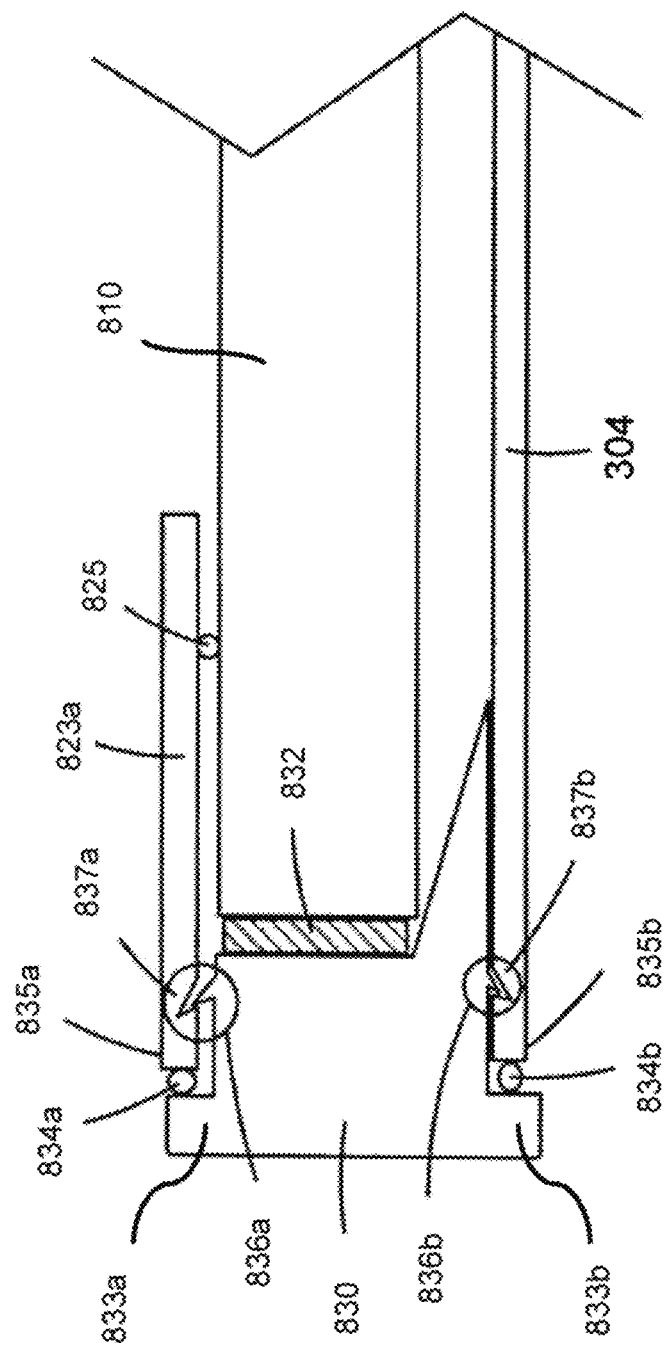
FIG. 18C shows a cutaway side view of an alternative embodiment of a housing having wedges in the housing and in a latch cover lid mated to the housing.

FIG. 18C depicts an alternative embodiment of a latch cover lid attached to a housing. A proximal device gasket 832 is interposed between the proximal end of the electronic device 810 and the latch cover lid 830. A front proximal perimeter gasket 825 is interposed between the front surface of the device and the front proximal perimeter portion 823a.

The latch cover lid 830 has a lip 833a and 833b, underneath which is a latch cover lid gasket 834a and 834b. The latch cover lid gasket is interposed between the lip 833a and 833b and the top edge 835a and 835b of the proximal opening. The latch cover lid gasket may be attached to the latch cover lid, to the top edge of the proximal opening, or is physically unattached and is held in place when the latch cover lid is affixed to the housing. Clasping channel 837a and 837b on the housing is configured to interact with lid clasping member 836a and 836b, as shown in FIG. 18C. It is noted that in alternative embodiments, lid clasping members can be included with the housing and clasping channels can be associated with the latch cover lid (or both).

Figure 19A:
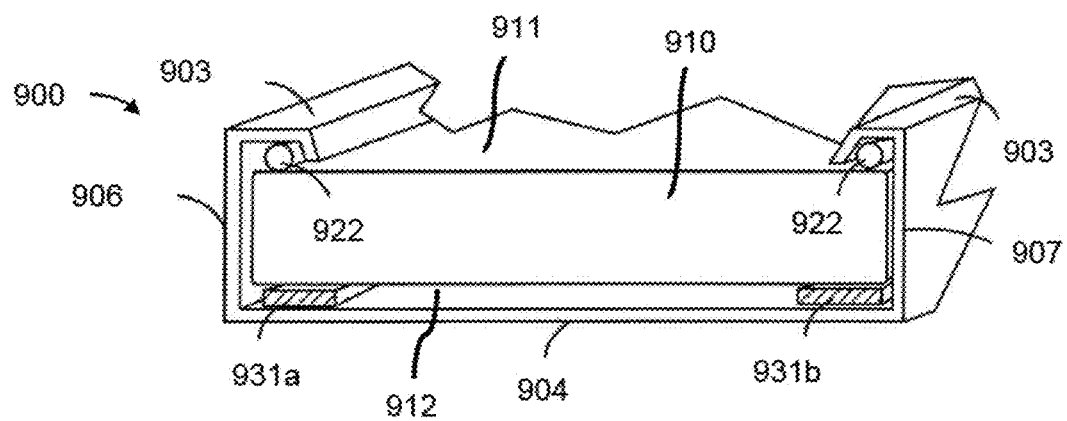
FIG. 19A depicts a cutaway perspective view of a housing in which the opposing sides extend around the sides of the encased device and exert tension on the front surface of the device via a tensioned perimeter portion.
Figure 19B:
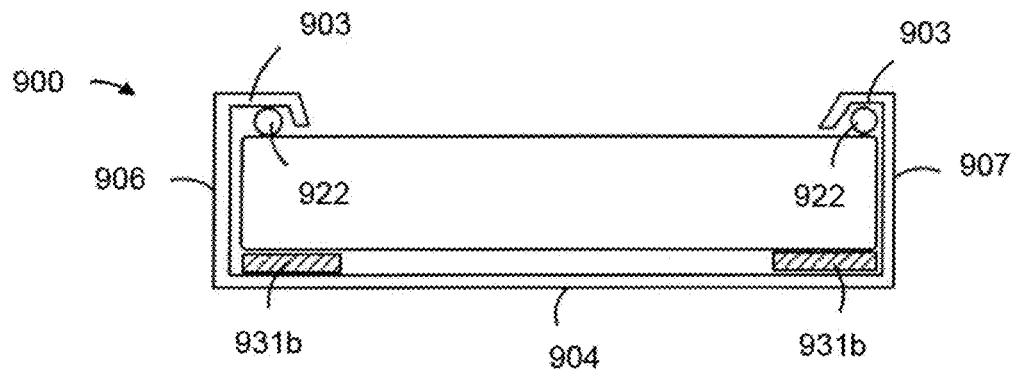
FIG. 19B shows a side cutaway view of an alternative embodiment of housing shown in FIG. 19A.
Figure 19C:
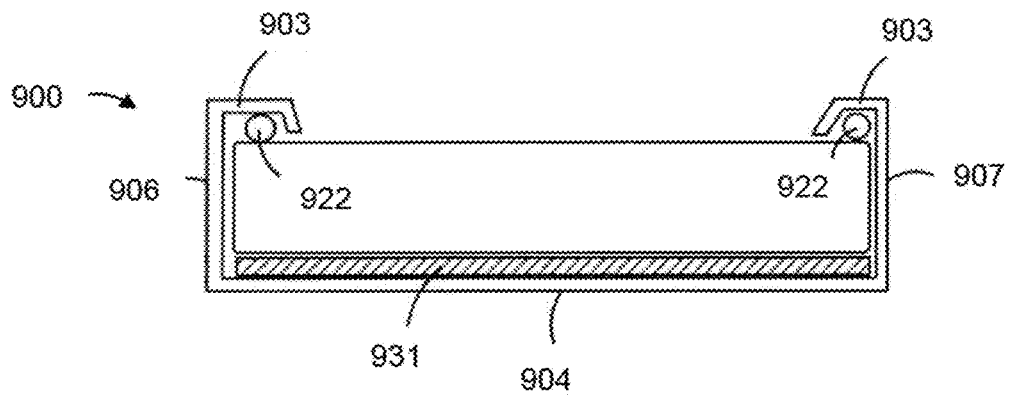
FIG. 19C shows an embodiment of the housing of FIG. 19B in which a single insert lies underneath the encased mobile device.

In an alternative embodiment of a housing, the opposing sides extend around the sides of the device and exert force onto the front surface of the device. FIG. 19A depicts a cutaway perspective view of an embodiment of a housing 900, wherein an electronic device 910 inserted into the housing is held by tensioned perimeter portion 903. The tensioned perimeter portion preferably exerts tension downward onto the edge of the front surface 911 of the device. Perimeter gasket 922 is interposed between the tensioned perimeter portion and the front surface of the device. In some embodiments, a water impermeable layer is on the front surface of the entire device, securing a liquidproof seal between the perimeter gasket and the water impermeable layer. Inserts 931a and 931b are interposed between the rear surface 912 of the device and the interior rear surface 904 of housing 900. The inserts may be made of a shock absorbent material, such as rubber or silicon. FIG. 19B is a cutaway side view of the housing depicted in FIG. 19A. FIG. 19C depicts housing 900 with a single insert 931 that covers the entire bottom of the interior of the housing.

Figure 20A:
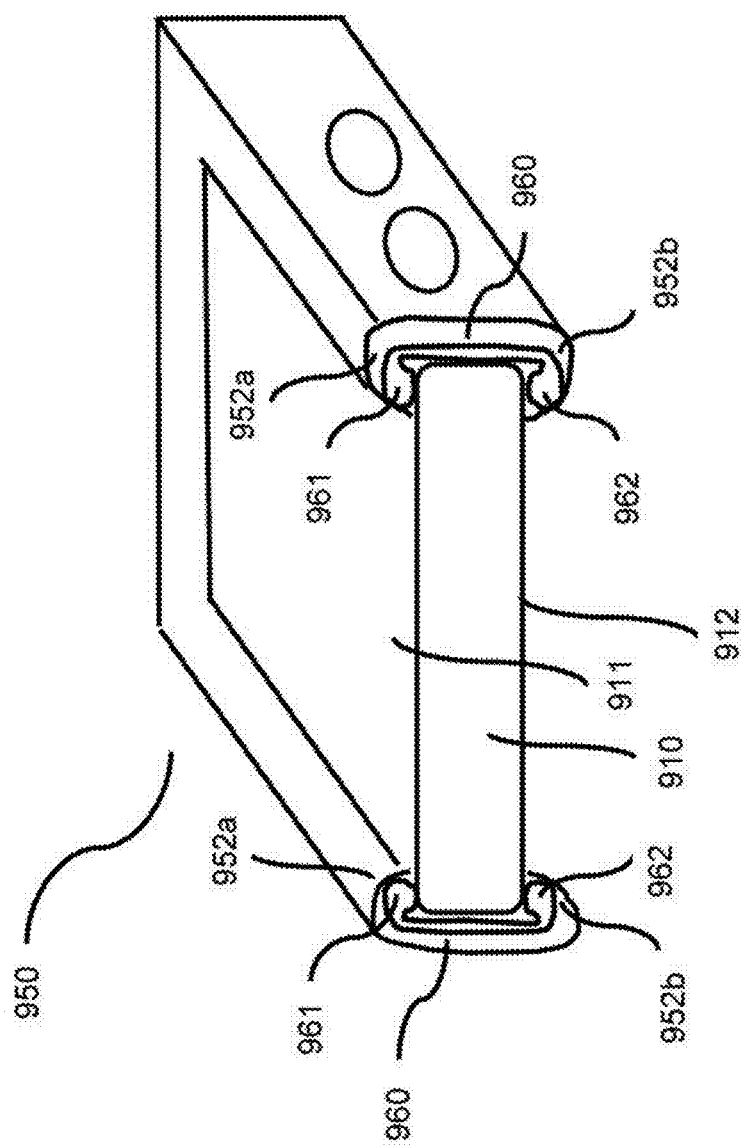
FIG. 20A shows a perspective cutaway view of a housing with a perimeter sealing jacket that wraps around the encased device.

In another alternative configuration of a housing, the opposing sides have both front and rear tensioned perimeter portions that exert force onto both the front and rear surfaces of the device. FIG. 20A depicts a perspective cutaway view of a housing 950. A perimeter sealing jacket 960 wraps around the entire edge of the electronic device 910. In certain embodiments, the perimeter sealing jacket 960 has sealing members 961 and 962 that are interposed between the front surface 911 and rear surface 912 of the device and the perimeter tension members 952a and 952b. The perimeter tension members can exert force onto the round sealing members of the perimeter sealing jacket sufficient to prevent water and dust, etc. from moving past the front and rear surface of the device. In preferred embodiments, the front and rear surfaces of the device are protected with a water impermeable layer, such that the device is protected from water or other contaminants from entering the device and causing damage. In other embodiments, the device, itself, is impermeable to water and other contaminants on the exposed portions shown in FIG. 20A. In these embodiments, a water impermeable layer is unnecessary and in certain embodiments, is not included.

Figure 20B:
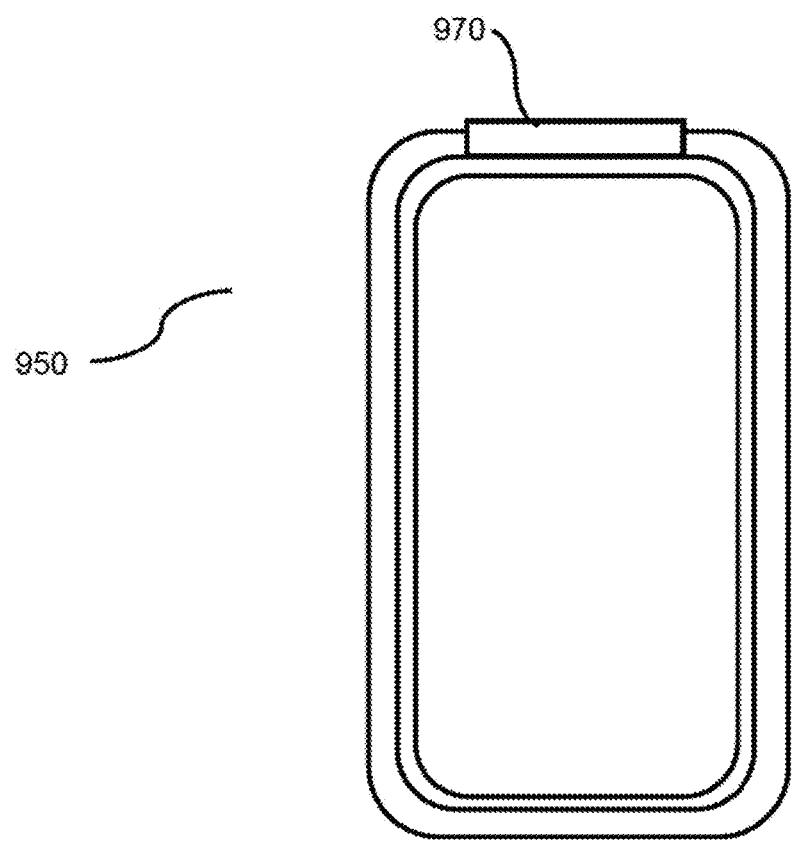
FIG. 20B shows a top view of a housing including an attached latch lid that seals a gap in the housing.

FIG. 20B shows a top view of a housing 950, that includes an attached latch lid 970 that seals a gap (not shown) in the housing. The housing is made of a semi-rigid material that allows for force to be applied to the ends of the housing at the gap in order to attach the housing to a device that has a perimeter sealing jacket. Once the housing is attached to the device, the latch lid is attached using latching mechanisms known by those skilled in the art and also described herein. The latch lid allows for easy access to the power or data connectivity portion of the electronic device. Thus, the latch lid could be configured to match the requirements of the particular electronic device to be housed. The latch lid can be attached via a hinge or it can be free from the housing when not attached to the gap that it seals. In certain embodiments, the latch lid can be similar to those described in FIG. 1A or 18B and 18C.

Figure 20C:
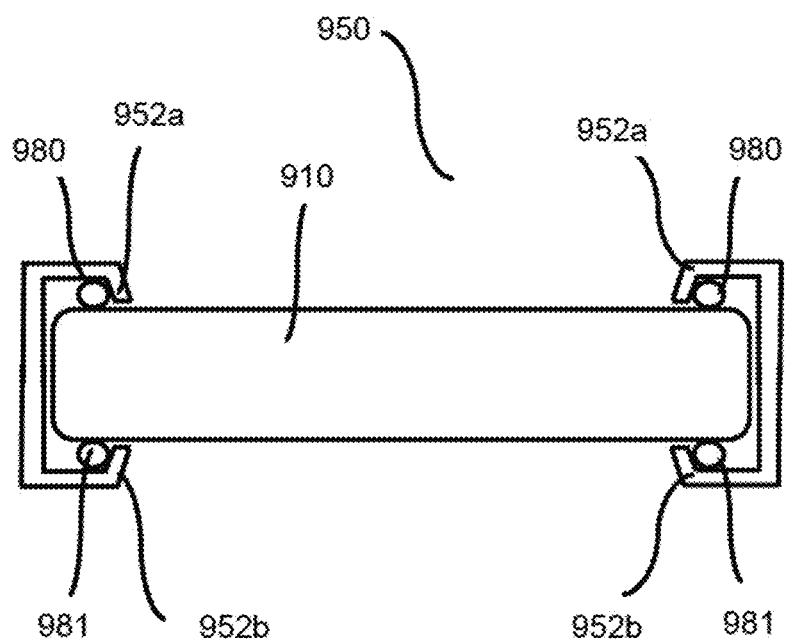
FIG. 20C shows a cutaway side view of an alternative embodiment of a housing using multiple perimeter sealing gaskets.

FIG. 20C shows a cutaway side view of an alternative embodiment of the housing 950, in which the housing seals the device 910 using a perimeter sealing gaskets 980 and 981. Perimeter tension members 952a and 952b exert force onto the perimeter sealing gaskets sufficient to prevent water and dust, etc. from moving past the front and rear surfaces of the device. Again, in certain embodiments, the front and rear surfaces of the device are protected with a water impermeable layer, such that the device is protected from water or other contaminants from entering the device and causing damage. In other embodiments, the device, itself, is impermeable to water and other contaminants on the exposed portions shown in FIG. 20C. In these embodiments, a water impermeable layer is unnecessary and in certain embodiments, is not included.

Figure 21A:
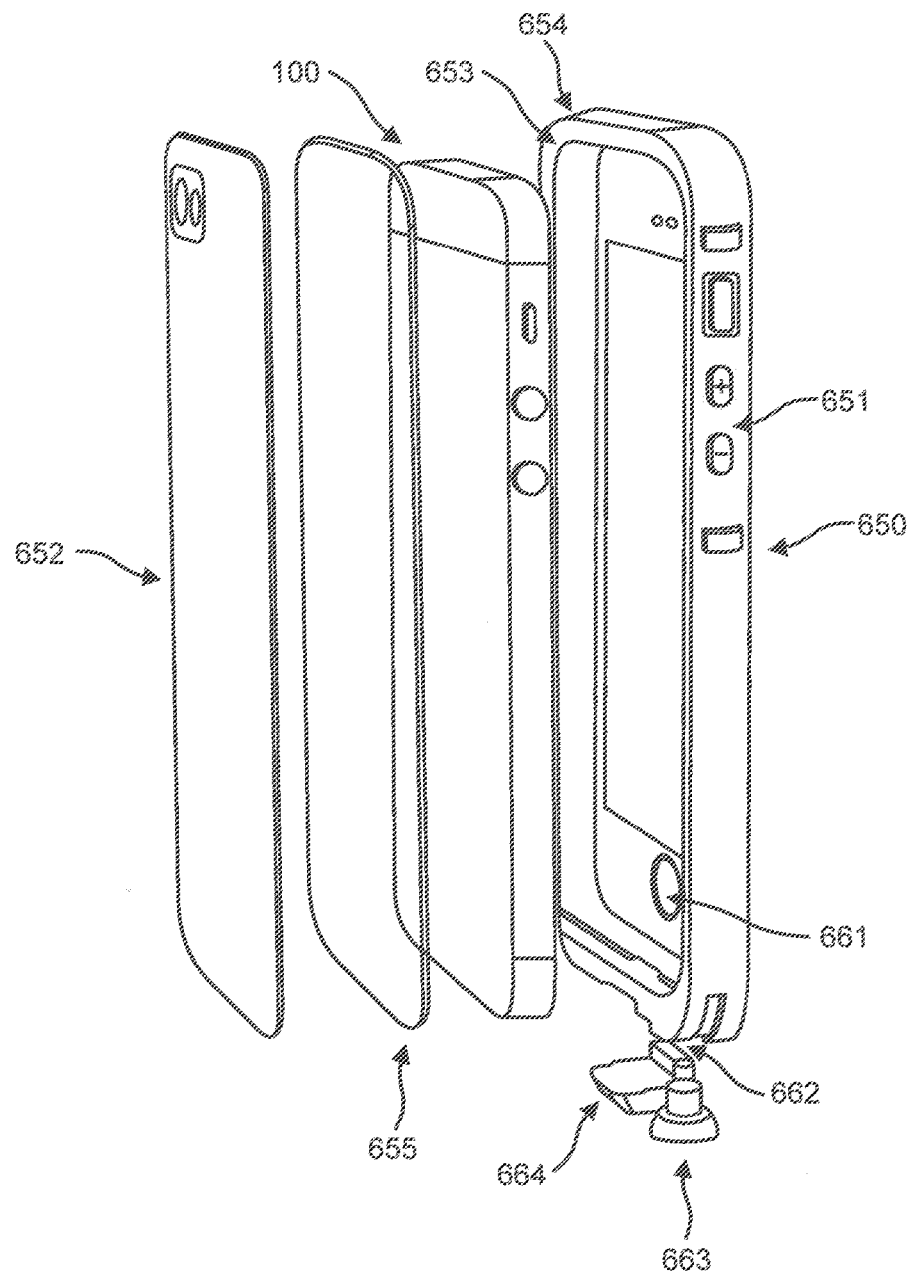
FIG. 21A shows an exploded view of an encasement having a top member and a bottom member, and a mobile computing device; the bottom member is a substantially flat piece sealed against the top member.

In an alternative embodiment, as shown in FIG. 21A, the housing is constructed of a top member 650 with a side wall 651 and a bottom member 652 that is a substantially flat or planar piece that is sealed against the top member 650 to form a housing. In some embodiments, the top member includes a groove 653 and a lip 654 for positioning and joining with the bottom member 652. However, the top and bottom members may be joined according to any method known in the art. In certain embodiments, the groove 653 provides an indentation and the lip 654 a tab so that when the bottom member 652 is joined to the top member 650 the bottom member is inserted so it is flush against the top member 650. In this embodiment, this creates a substantially continuous corner where the top member 650 and bottom members 652 meet.

Further, in certain embodiments, a sealing member 655 may be placed between the top 650 and bottom 652 members. This sealing member 655 can produce a waterproof and/or dustproof seal. The top member 650 and bottom member 652 can be joined together, with or without the sealing member 655, by any method known in the art including the use of adhesive or molding the members together. In certain embodiments, adhesive is applied to both sides of the sealing member 655 that allows for the top member 650 and bottom member 652 to be joined by applying both to opposite sides of the sealing member. In other embodiments, the sealing member 655, top member 650 and bottom member 652 are molded together.

Figure 21B:
FIG. 21B shows a rear view of the bottom member of the encasement of FIG. 21A, wherein the bottom member is substantially transparent.

As shown in FIG. 21B, in certain embodiments, the bottom member 652 is substantially transparent. In this embodiment, the rear of the electronic device 100 is visible through the bottom member 652. In certain embodiments, the bottom member can also include a lens for a camera 656 and an aperture for the flash 657. The aperture for the flash prevents the flash from being reflected from the inner surface of the bottom member 652 and into the camera of the electronic device 100. The lens for the camera 656 can have any of the properties of other corresponding lenses described herein. For example, the lens for the camera 656 can magnify, reduce, sharpen or filter an image.

Figure 21C:
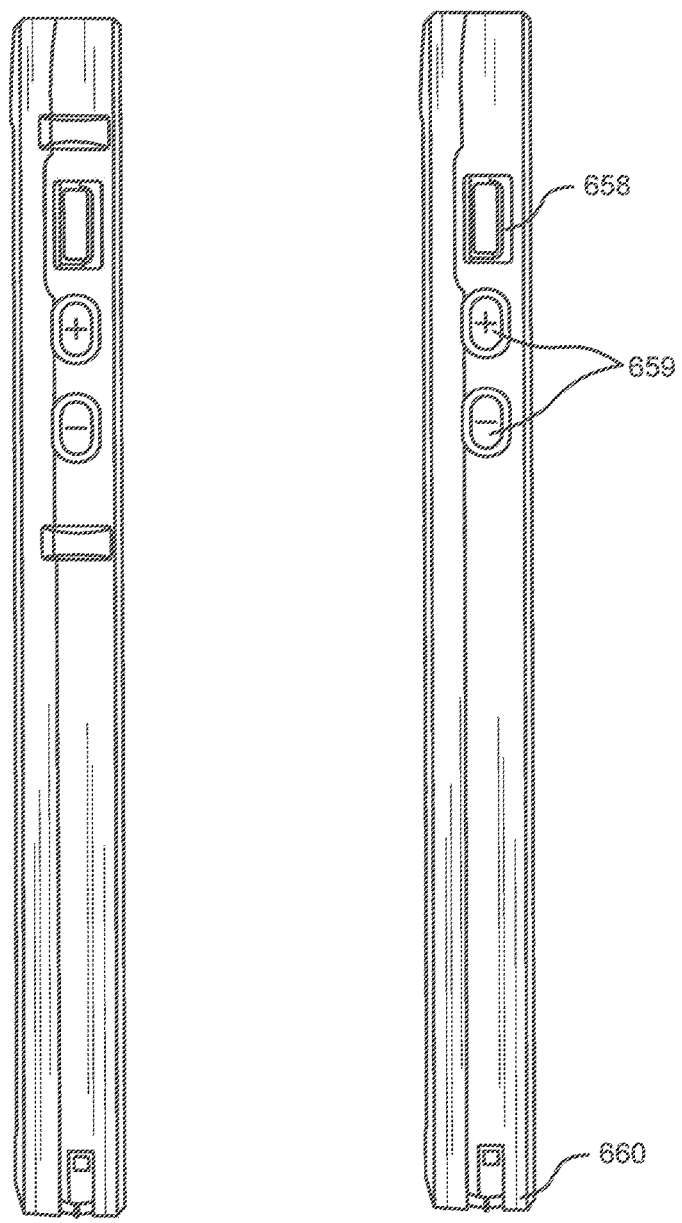
FIG. 21C shows side elevational views of an encasement having a larger bottom member (on the left) and a thinner bottom member (on the right).

As shown in FIG. 21C, apart from the different bottom member 652 and different methods of attaching the top 650 and bottom members 652 together, many of the other features of the housing can be the same as other housings described, herein. FIG. 21C shows a housing with a larger bottom member as shown in other embodiments described in the specification on the left and the current substantially flat bottom member 652 embodiment, described in FIGS. 21A and B on the right. As shown in the embodiment shown in FIG. 21C, there are features for manipulation of the mute switch 658 and volume controls 659 in the current embodiment, much like other embodiments described herein. There is also a coin tab 660 at the distal end 661 of the housing. However, the coin tab is optional. Other features are shown in FIG. 21A. These include an acoustic aperture 660 that allows the passage of sound, but not fluids. These also include a button feature 661, a hinged door 664 providing a waterproof seal over the charging portion of the electronic device 100 and a headphone jack 662 and threaded bung 663 for sealing the headphone jack 662. It should be noted that all of these features are optional and are not exhaustive. The housing shown in FIGS. 21A, 21B and 21C can include any of the features described herein for other embodiments of the housings.

FIG. 21C also demonstrates the reduced thickness of the housing. In certain embodiments, the housing shown in FIGS. 21A, B and C is 5-25% thinner than the housings described throughout the specification, but particularly, the housings described in FIGS. 1 and 2. In other embodiments, the housing shown in FIGS. 21A, B and C is 5, 6, 7, 8, 9, 10, 11, 12, 13, 14, 15, 16, 17, 18, 19, 20, 21, 22, 23, 24 or 25% thinner than the housings described throughout the specification, but particularly, the housings described in FIGS. 1 and 2. In other embodiments, the housing shown in FIGS. 21A, B and C is 5-10, 11-15, 16-20 or 21-25% thinner than the housings described throughout the specification, but particularly, the housings described in FIGS. 1 and 2. In certain embodiments, the housing is 7.7, 7.8, 7.9, 8, 9, 10, 11, 12, 13, 14, 15, 16, 17, 18, 19 or 20 mm thick. In certain embodiments, the housing is at most is 7.7, 7.8, 7.9, 8, 9, 10, 11, 12, 13, 14, 15, 16, 17, 18, 19 or 20 mm thick. In other embodiments, the housing is 7.7-8.0, 8-10, 11-15, or 16-20 mm thick.

In certain embodiments, a front and/or bottom surface membrane is provided. The front and/or bottom surface membrane can be provided as a separate element from the housing. For instance, in certain embodiments, a top and/or bottom member of the housing may include a perimeter portion only, which perimeter portion circumscribes the device to be encased but does not otherwise include a top and/or bottom surface element that spans from one perimeter portion to the other. In such an embodiment, the top and/or bottom member may be configured for interfacing with the perimeter of the top and/or bottom surface of a device to be encased in such a manner so as to provide a liquid and/or shockproof seal therewith. In certain embodiments, the top and bottom member of the housing may be formed of a single element or may be composed of separate elements. In certain instances, the top and bottom member may be adapted to interact with a separate top and/or bottom surface element, such as a top and/or bottom surface membrane member.

For instance, the top and/or bottom member may be configured for interacting with a surface membrane member in such a way that when the top and bottom member are coupled together, said coupling together secures the surface membrane across the surface of the top and/or bottom members. In other embodiments, the top and/or bottom member may be a single member that circumscribes the perimeter of the device to be contained, and further configured for interfacing with a separate surface membrane so as to provide a liquid proof seal therewith. For example, the surface membrane may span from one perimeter of a device to be encased to another and may include an adhesive that allows the surface membrane to securely attach to the surface of the device, while the perimeter portion fits over the perimeter of the device and may or may not interact with the surface membrane attachment, but together they function to make the device both liquid proof and shockproof. In certain embodiments, only a perimeter portion or only a front or back surface membrane portion may be provided.

As described herein below, one or more membranes or portions thereof may be included herein as part of the front and/or back surface of the top or bottom member or may be provided as the entire top and/or bottom member. The membrane may include a perimeter portion and/or may interact with a perimeter portion of the housing. Accordingly, the perimeter portion of the membrane may be configured so as to interface with a perimeter portion, such as an inner and/or outer perimeter portion, of the top and/or bottom member. For instance, the perimeter portion of a top and/or bottom member, such as the perimeter portion of a top member, may include a plurality of sub-portions, such as a first sub-portion, e.g., an interior perimeter portion, that includes an interior membrane interfacing member, and a second sub-portion, e.g., an exterior perimeter portion, that includes an exterior membrane interfacing member, which interfacing members are configured for interfacing with a front and back surface of a perimeter portion of the membrane, such as in an overmould fashion.

Accordingly, in certain embodiments, the membrane may be configured such that it spans from one side of the perimeter, e.g., of a top or bottom member, to another side of the perimeter in such a manner that the back surface of the membrane associates with at least the interior membrane interfacing member of the interior perimeter portion, and the front surface of the membrane associates with the exterior membrane interfacing member of the outer perimeter portion.

Hence, in some embodiments, such as where a front surface membrane is provided, e.g., on a top member, the membrane may completely cover the front surface of an electronic device when the device is encased within the housing, and in some embodiments, the membrane may cover less than the entire front surface, such as covering only a perimeter portion of the front surface thereby leaving the interactive touch portion of the front screen of the electronic device uncovered. In such an instance, the perimeter portion of the membrane may include a gasket so as to maintain the housing's overall waterproofness, such as a gasket that circumscribes the entire perimeter portion of the top member front surface membrane.

In other embodiments, a front and/or bottom surface membrane need not be provided. Rather, the perimeter portion of the top and/or bottom member may be configured for interfacing with an encased device in such a manner so as to make the perimeter portion of an encased device waterproof and shockproof. For instance, the perimeter portion may include a gasket that compresses against one or more of the surfaces of an encased device thereby preventing liquid from penetrating there between. One or more other gaskets may also be provided and configured as stickers that may be placed on or around an encased device so as to cover various different sound transmission ports of the encased device thereby rendering the encased device entirely waterproof. Such gasket covering stickers may be provided entirely on their own or in combination with a perimeter portion.

The membrane, e.g., a first membrane, may have one or more features, such as additional membrane features, for instance, an acoustic membrane feature and/or a button feature. For example, the first membrane may include an acoustic membrane feature, which acoustic membrane feature may include an aperture spanning from the front to the back surface of the first membrane. The aperture may be covered by a second membrane, such as an acoustically transmissive membrane that is offset from the first membrane. The acoustic membrane may be offset from the first membrane by any suitable element, such as by the addition of a spacer member. Accordingly, the two or more membranes may be attached to one another via a suitable adhesive.

The first membrane may additionally include a button feature. The button feature may include an indented region. The indented region may simply be an indented region in the first membrane or it may be a cut-out region that has been overlaid with an additional membrane. In various instances, the indented region is at least partially circumscribed by a ridge region. For instance, in one embodiment, the perimeter portion of the button feature may include a raised deformable perimeter portion that surrounds the indented region. The raised deformable perimeter portion may be configured so as to allow a measure of travel for the indented region of the button feature such that when the indented region is depressed the raised portion is deformed thereby allowing the indented region to travel without causing significant stretching of the first membrane.

The first membrane may also include optically opaque regions and/or optically transmissive regions, such as an optically transmissive region coincident with a proximity sensor or video camera portion of an underlying device meant to be housed by the housing. In various embodiments, a front surface membrane may be configured so as to include an optical lens, which optical lens is configured for aligning with a camera or video lens of an encased device.

In an additional embodiment, along with a perimeter portion and/or a front surface membrane, a bottom member may be provided. The bottom member may be comprised simply of a perimeter portion or may include a bottom surface member that spans from one perimeter portion to the other. The bottom member may include one or more features. For instance, the bottom member may include a lens feature, such as a feature that includes one or more lenses, for instance, a camera and/or video lens and/or a flash lens. The lens feature may additionally include an optical skirt, such as a skirt that surrounds the one or more lenses and prevents the transmission of light therethrough from one lens region to the other lens region.

Figure 22:
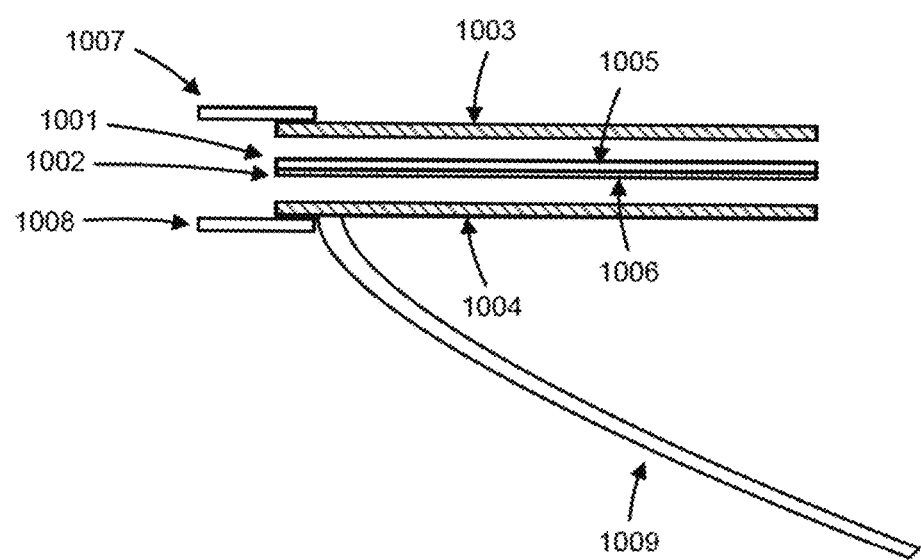
FIG. 22 depicts an exploded side view of a surface membrane for adhering to the screen of a mobile computing device, with peelable protective layers, peel tabs, and pull tabs.

FIG. 22 shows one embodiment of the surface membranes described herein. In this embodiment, the membrane 1001 includes an adhesive 1002 that allows that membrane 1001 to adhere to the surface of an electronic device. In certain embodiments, the adhesive 1002 is a temperature or pressure activated adhesive. In such an instance. In other embodiments, the membrane 1001 does not include an adhesive. In certain embodiments, the membrane 1001 adheres to the front or back surface of the electronic device. In certain embodiments, the front or back surface of the electronic device includes an electronic screen. According to some embodiments, the electronic screen allows a user to interact with the electronic device. In some embodiments, the electronic screen allows the user to interact with the electronic device by touch. According to these embodiments, the membrane 1001 can allow a user to interact with an electronic screen by touch by manipulating the membrane 1001. The user does not have to directly touch the electronic screen to interact with the electronic device by touch.

In certain embodiments, the membrane 1001 is provided in separate packaging for installation on an electronic device. In these embodiments, the packaging can include one or more peelable protective layers 1003, 1004. Each peelable protective layer 1003, 1004 protects at least a portion of a surface of the membrane 1001 prior to installation on an electronic device.

In embodiments in which the membrane 1001 includes an adhesive 1002, the membrane 1001 can include an adhesive side 1006 and a non-adhesive side 1005. In these embodiments, peelable protective layers 1003, 1004 can be used to cover either side. In certain embodiments an adhesive side peelable protective layer 1004 protects at least a portion of the adhesive side 1006 and a non-adhesive side peelable protective layer 1003 protects at least a portion of the non-adhesive side 1005. In certain embodiments, an adhesive side peelable protective layer 1004 protects the entirety of the adhesive side 1006 and a non-adhesive side peelable protective layer 1003 protects the entirety of the non-adhesive side 1005.

The non-adhesive side peelable protective layer 1003 can be used to protect the non-adhesive side 1005 from dirt, dust, oil, water, fingerprints, scratches, cuts, and puncture. The adhesive side peelable protective layer 1004 can be used to protect the adhesive side 1006 from dirt, dust, oil, water, fingerprints, scratches, cuts, and puncture. It also can be used to protect the adhesive 1002 on the adhesive side 1006 from dirt, dust, oil, water, fingerprints, scratches, cuts, and puncture. In these embodiments, the adhesive side peelable protective layer 1004 allows the adhesive 1002 to remain clean and retains its adhesive properties.

In certain embodiments, the peelable protective layers 1003, 1004 are configured so that they are easily removed from the membrane 1001. In certain embodiments, one or both of the peelable protective layers 1003, 1004 include peel tabs 1007, 1008. Each of the peelable protective layers 1003, 1004 can have one or more peel tabs 1007, 1008. In certain embodiments, each peelable protective layer can have 1, 2, 3, 4, 5, 6, 7, 8, 9, or 10 peel tabs. In certain embodiments, each protective layer has the same number of peel tabs. In other embodiments, each protective layer has different numbers of peel tabs.

The peel tabs 1007, 1008 can be made of the same material as the peelable protective layers 1003, 1004 or of a different material. The material must be strong enough to peel the peelable protective layer 1003, 1004 from the membrane 1001. In certain embodiments, the one or more of the peel tabs 1007, 1008 do not touch the adhesive side 1005 or the non-adhesive side 1006 of the membrane. Thus, the peel tabs are free to be manipulated by a user to peel away the protective layers 1003, 1004. The peel tabs 1007, 1008 may also be textured or be thicker than the protective layers 1003, 1004 in order to ease manipulation to the pull tabs. In other embodiments, the peel tabs 1007, 1008 are not textured and can be the same thickness of the protective layers 1003, 1004 or thinner.

The peel tabs 1007, 1008 can be positioned on the edges of one or more protective layers 1003, 1004. In other embodiments, the peel tabs 1007, 1008 are positioned near an edge of a protective layer 1003, 1004. Peel tabs 1007, 1008 that are positioned near an edge of a protective layer 1003, 1004 can be within 0.01 and 10 mm of the edge of the protective layer 1003, 1004. In other embodiments, a peel tab 1007, 1008 that is positioned near an edge of a protective layer 1003, 1004 is positioned within 0.01-0.05, 0.05-0.1, 0.1-0.5, 0.5-1, 1-2, 2-3, 3-4, 4-5, 5-6, 6-7, 7-8, 8-9, 9-10, 0.1-1, 1-5 or 5-10 mm of the edge of the protective layer 1003, 1004. In other embodiments, a peel tab 1007, 1008 that is positioned near an edge of a protective layer 1003, 1004 is positioned at about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9 or 10 mm of the edge of the protective layer 1003, 1004. In other embodiments, the peel tabs 1007, 1008 can be positioned anywhere on the surface of one or more protective layers.

In certain embodiments, one or more of the pull tabs also includes a pull tab 1009. The pull tab 1009 is attached to one or more of the peel tabs 1007, 1008 making it easier to access and pull the protective layer 1003, 1004 free from the membrane. In one embodiment, the pull tab 1009 can be used to ease the installation of the membrane 1001 to the electronic device. For example, the membrane could be installed by partially peeling the adhesive side protective later 1006 from the adhesive 1002. Then the portion of the membrane 1001 with free adhesive 1002 could be affixed to the electronic device. The remainder of the adhesive side protective layer 1004 could then be removed with the pull tab 1009 in a manner that the remainder of the membrane 1001 should be correctly aligned with the electronic device.

For example, in an embodiment wherein the membrane 1001 is rectangular and the electronic device includes a rectangular face and the membrane 1001 is sized to fit over and cover the rectangular face, the adhesive for one side of the membrane could be placed against the corresponding side of the device. This could allow the membrane to be more easily lined up with the rectangular face of the device. Once one side of the membrane 1001 has been adhered to the electronic device, the pull tab 1009 could be used to pull the remainder of the adhesive side protective later 1004 off of the adhesive 1002 on the adhesive side 1006 of the membrane 1001.

In certain embodiments, the pull tab 1009 would be long enough so that it would extend the length of the protective layer 1003, 1004 from the side at which it is affixed to the protective layer 1003, 1004. In other embodiments, the pull tab 1009 would be long enough to be accessed by a user when the adhesive side protective layer 1004 is removed enough to allow one edge of the adhesive side 1006 of the membrane to adhere to the electronic device. In certain embodiments, the pull tab 1009 is 150, 140, 130, 120, 110, 100, 90, 95, 90, 85, 80, 75, 70, 65, 60, 55 or 50% of the length or width of the membrane 1001 from the edge the pull tab 1009 is attached to the opposite edge of the protective layer 1003, 1004 or near to the opposite edge of the protective layer 1003, 1004.

After the adhesive 1002 has adhered to the electronic device, the non-adhesive side protective layer 1003 can be removed from the non-adhesive side 1005 of the membrane 1001.

Figure 23:
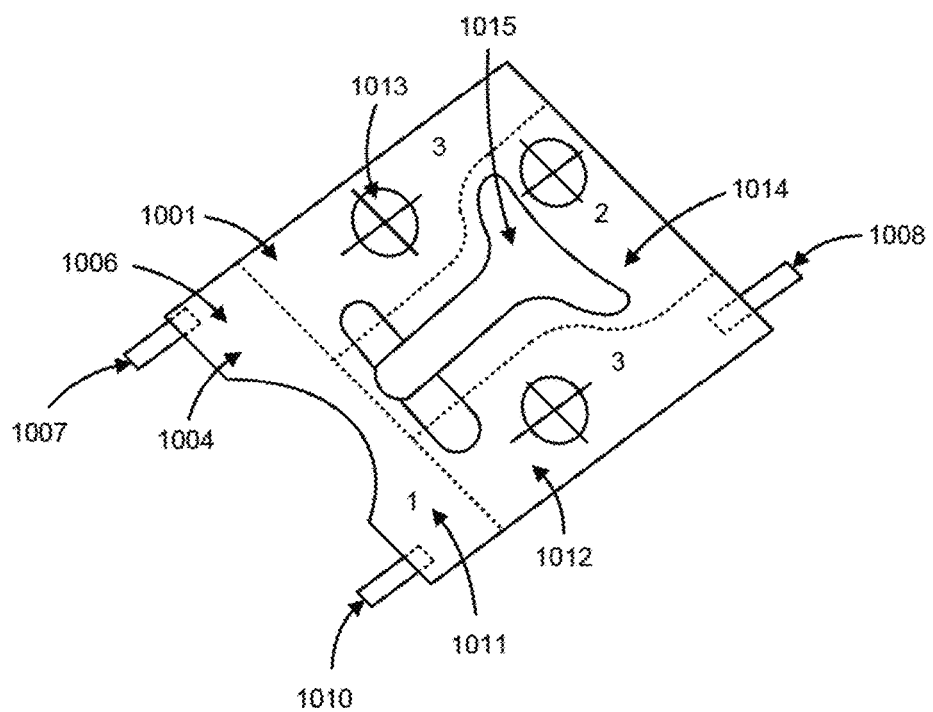
FIG. 23 shows a view of the adhesive side of a surface membrane having kiss cuts allowing portions of the peelable protective layer to be removed, as well as a tensioner that facilitates alignment of the surface membrane, and peel tabs.

FIG. 23 shows another embodiment of the surface membranes described herein. The membrane 1001 shown in FIG. 23 is shown with the adhesive side 1006 up. On top of the adhesive side 1006 membrane 1001 is the adhesive side protective layer 1004. In certain embodiments, the adhesive side protective layer 1004 can include peel tabs 1007, 1008, 1010. The embodiment shown in FIG. 23 includes three peel tabs 1007, 1008, 1010. However, the adhesive side protective layer 1004 can include 1, 2, 3, 4, 5, 6, 7, 8, 9, 10 or more peel tabs 1007, 1008, 1010. In certain embodiments, the adhesive side protective layer 1004 includes four peel tabs. In some embodiments, there can be a peel tab on each corner of the adhesive side protective layer 1004. The same arrangement can be used for the non-adhesive side protective layer 1003. Any of these peel tabs could also include a pull tab 1009.

In certain embodiments, one or more of the protective layers 1003, 1004 can be provided in multiple pieces. In certain embodiments, one or more of the protective layers can be subject to a kiss cut. This cut penetrates the protective layer(s) 1003, 1004 but not the membrane 1001, creating a perforation in the protective layer. This allows the protective layer(s) 1003, 1004 to be split into multiple pieces.

The embodiment shown in FIG. 23 shows an adhesive side protective layer 1004 split into four portions. The four portions are the leading edge portion 1011, the left and right side portions 1012, 1013 and the center portion 1014. Each of the portions of the adhesive side protective layer 1004 can be peeled off independently. This can improve the ease of application of the membrane 1001.

In certain embodiments, the non-adhesive side protective layer 1005 (which is the bottom side of the membrane shown in FIG. 23) includes a tensioner 1015. The tensioner 1015 allows at least one corner of the adhesive side protective layer 1004 to be held above the surface the adhesive side protective layer 1004 is placed upon. In certain embodiments, 2, 3 or 4 corners of the adhesive side protective layer 1004 are held above the surface the adhesive side protective layer 1004 is placed upon. The tensioner allows the center portion 1014 to be removed from the adhesive side 1006 of the membrane 1001 exposing the adhesive 1002. The exposed adhesive can then be positioned on the surface of the electronic device in a manner that the membrane 1001 is correctly oriented with the portion of the electronic device it covers. The remaining portions of the adhesive side protective layer 1004 can then be removed and the raised corners lowered. The raised corners can be lowered by manipulating the tensioner to release tension or by removing the non-adhesive side protective layer 1003.

In certain embodiments, the tensioner 1015 causes two corners to raise above the surface of the device when the membrane is placed on it adhesive side 106 down. Two corners are flat against the device when the membrane is in place. The two flat corners can be used to position the membrane while two corners are held above the device. In certain embodiments, the center portion 1014 of the adhesive side protective layer 1004 can be removed and then the two flat corners can be aligned with the device. Then the adhesive 1002 can be laid onto the device, wherein the membrane will be partially adhered in the correct orientation.

In other embodiments, all four corners of the membrane are raised above the surface of the device when the membrane is laid on it with the adhesive side 1006 down. The center portion 1014 of the adhesive side protective layer 1004 can then be removed and the membrane 1001 correctly aligned with the electronic device. When the membrane 1001 is aligned and adhered at the center of the adhesive 1002 the remaining portions of the adhesive side protective layer 1004 can be removed and the portions of the adhesive 1002 they protect adhered to the electronic device.

In other embodiments, the tensioner 1015 is absent. In these embodiments, the center portion 1014 of the adhesive side protective layer 1004 or the leading edge portion 1011 of the adhesive side protective layer 1004 can be removed first and used to position the membrane 1001 before removing the remaining portions and adhering the remainder of the membrane 1001. In other embodiments, the adhesive side protective layer 1004 can be split into other numbers of portions. The adhesive side protective layer 1004 can be split into 2, 3, 4, 5, 6, 7, 8, 9, 10 or more portions. In another embodiment, the adhesive side protective layer 1004 is split into a leading edge portion 1011 and a second portion made up of a unified left and right side portions 1012, 1013 and the center portion 1014. In this embodiment, the leading edge portion 1011 can be removed and the exposed adhesive adhered to the electronic device to correctly position the membrane 1001 before removing the remainder of the adhesive side protective layer 1004 and adhering the rest of the membrane 1001. These steps could be performed in the opposite order as well.

In other embodiments, the peel tabs 1007, 1008, 1010 can be positioned on the edges of the various portions of the adhesive side protective layer 1004 allowing for different portions to be more easily removed when other portions have already been adhered. For example, peel tabs can be positioned on the border between the left, right and center portions 1012, 1013, 1014 and the leading edge portion 1011 of the adhesive side protective layer 1004 allow these portions to be more easily removed if the adhesive covered by the leading edge portion 1011 is adhered first. In other embodiments, peel tabs can be positioned on the border between the left, right and leading edge portions 1011, 1012, 1013 and the center portion 1014 of the adhesive side protective layer 1004 allow these portions to be more easily removed if the adhesive covered by the center portion 1014 is adhered first. Pull tabs 1009 can be associated with any of the peel tabs described above.

Figure 24:
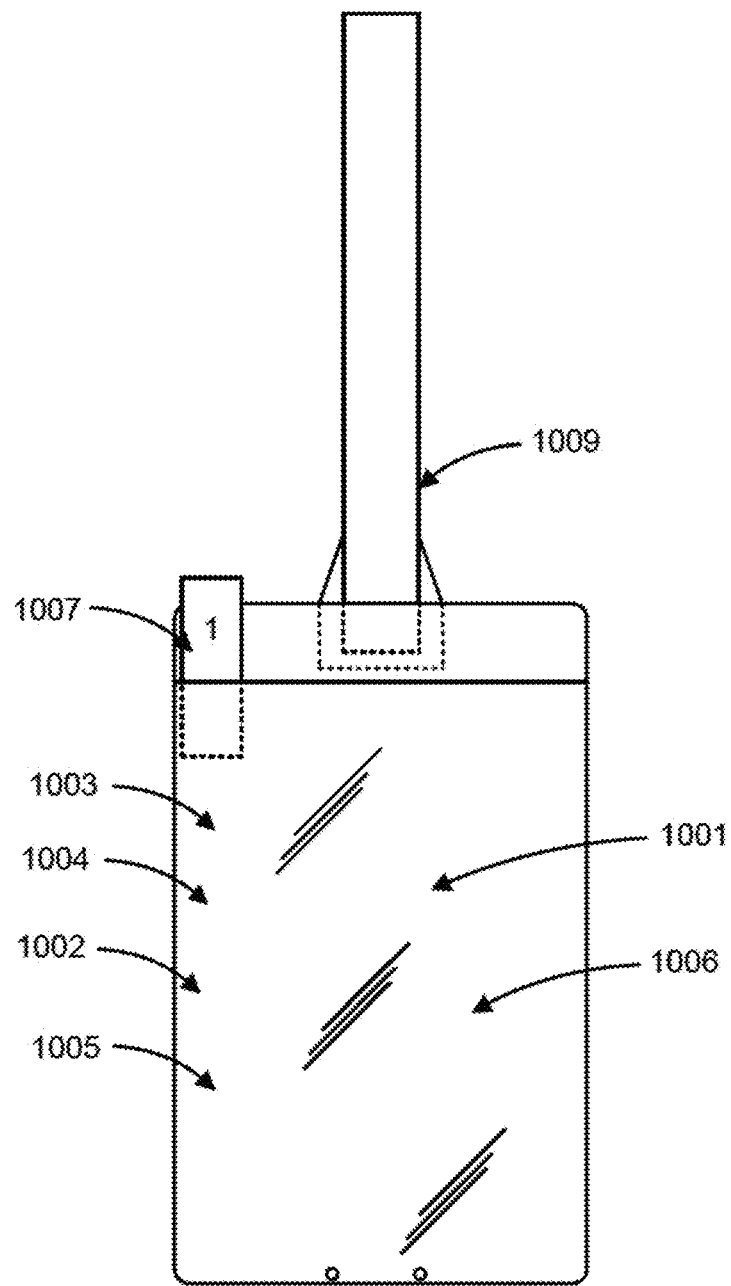
FIG. 24 shows another embodiment of a surface membrane with peelable protective layers and pull tab and peel tabs.

FIG. 24 shows another embodiment of the surface membranes described herein. FIG. 24 shows a membrane 1001 with a peel tab 1007 and a pull tab 1009. The peel tab 1007 is attached to the edge of the non-adhesive side protective layer 1005, which protects the non-adhesive side 1003 (see also FIG. 22). The pull tab 1009 is attached to the adhesive side protective layer 1004. The non-adhesive side protective layer is 1005 shown on the underside of the membrane 1001 and the adhesive side protective layer 1004 is shown on the top of the membrane 1001.

In this embodiment, the adhesive side protective layer 1004 can be partially peeled back from the end including the pull tab 1009. The exposed adhesive 1002 can then be affixed to the edge of the electronic device to which it is desired to adhere the membrane 1001. When this is done, the remainder of the adhesive side 1006 of the membrane 1001 will be in close proximity with the surface of the electronic device. This can make it difficult to remove the remainder of the adhesive side protective layer 1004. The length of the pull tab 1009 makes removing the remainder of the adhesive side protective layer 1004 easy. The leading edge of the removed portion of the adhesive side protective layer 1004 should be pointed toward the opposite end of the adhesive side protective layer 1004 as it has been pulled away from the adhesive 1002. The pull tab 1009 would also be pointed toward the opposite end of the adhesive side protective layer 1004. Because of the length of the pull tab 1009 it can be easily accessed by a user to pull the remainder of the adhesive side protective layer 1004 from the adhesive 1002. The adhesive side 1006 of the membrane 1001 is then positioned to be easily adhered to the surface of the electronic device in the correct orientation. Peel tab 1007 can then be used to remove the non-adhesive side protective layer 1005 from the non-adhesive side. In some embodiments, the non-adhesive side protective layer can be removed before or during the removal of the adhesive side protective layer using the pull tab.

In certain embodiments, the pull tab 1009 is attached to the adhesive side protective layer 1004 by a peel tab. In other embodiments, the pull tab 1009 is directly attached to the adhesive side protective layer 1004.

Figure 25:
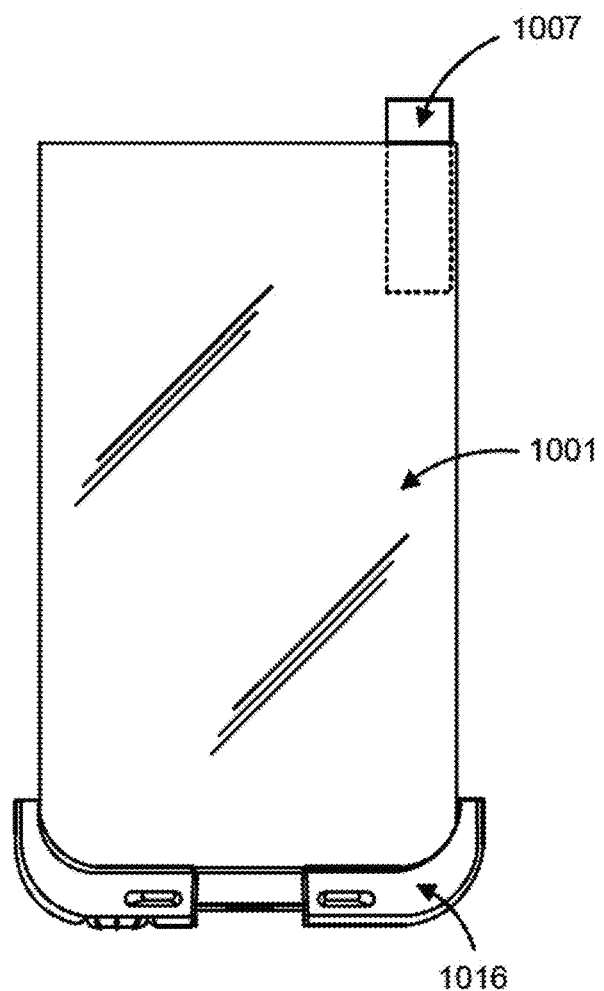
FIG. 25 shows an embodiment of surface membrane with a peel tab and a perimeter portion of a housing.

FIG. 25 shows another embodiment of the surface membranes described herein. FIG. 25 shows a membrane 1001 associated with a perimeter portion 1016 of a housing of an electronic device. The perimeter portion 1016 can be fitted onto the corresponding portion of an electronic device while the membrane 1001 is placed over a surface of the electronic device. In certain embodiments, the membrane 1001 can include a peel tab 1007 to remove protective layers 1003, 1004 from the membrane 1001 as described above. In other embodiments, more than one perimeter portion can be included with a membrane 1001 to be installed on an electronic device. In certain embodiments, each perimeter portion can cover one or more sides of the electronic device. According to one embodiment, a perimeter portion covers one or more of the top, bottom, left or right perimeter of the electronic device. According to other embodiments, the perimeter portions cover the top and bottom, bottom and right, bottom and left, top and right or top and left sides of the electronic device. According to other embodiments, the perimeter portions cover three of four sides of the perimeter of the electronic device. In certain embodiments, this leaves the top, bottom, left or right side of the electronic device without a perimeter portion. In other embodiments, the perimeter portion covers portions of one or more sides. For example, perimeter portions could cover one or more corners of an electronic device. In certain embodiments, the perimeter portions make up a bumper that covers the perimeter of the electronic device. This bumper can include one or more membranes to cover the front and/or rear surface of the electronic device.

According to certain embodiments, one or more perimeter portions 1016 could be used to position the membrane 1001 on a surface of the electronic device. The membrane 1001 may include adhesive 1002 or may be held in position by surface interactions with the electronic device or by the perimeter portions.

In certain embodiments, first the perimeter portion(s) 1026 are positioned on the electronic device followed by installation of the membrane 1001 according to any of the embodiments described above. The membrane 1001 may include adhesive 1002 and protective layers 1003, 1004 or may simply be positioned on the surface of the device.

Figure 26:
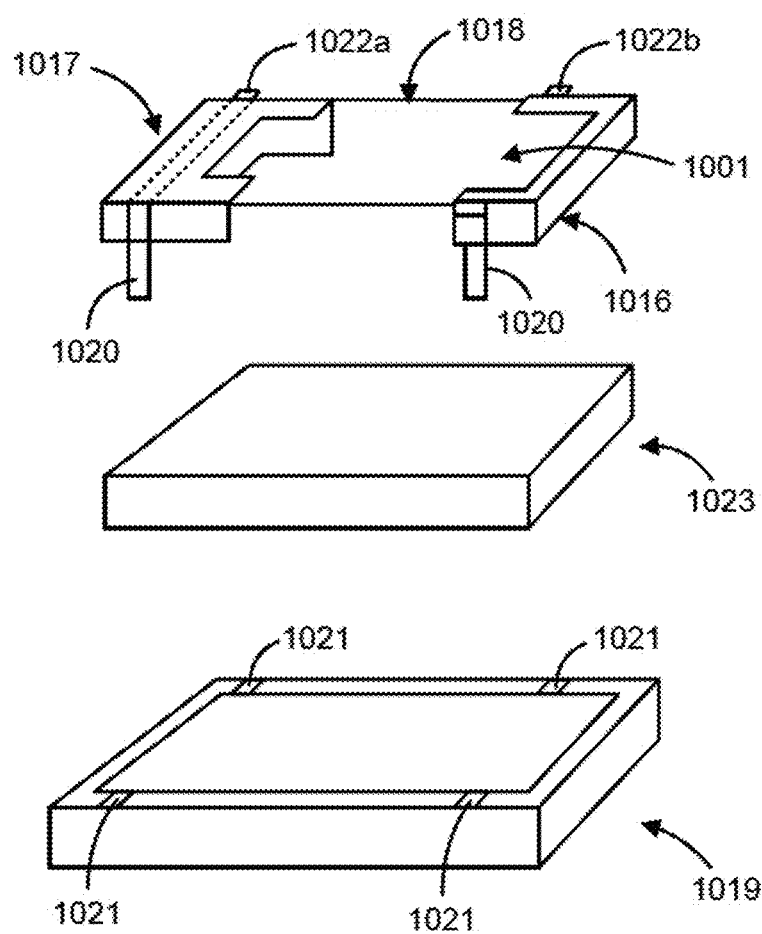
FIG. 26 shows an exploded perspective view of embodiment of a surface membrane with two perimeter portions of a housing, a mobile computing device, and a bottom member. The top member has posts that fit into openings in the bottom member.

FIG. 26 shows another embodiment of the surface membranes described herein. FIG. 26 shows a membrane 1001 positioned between a top perimeter portion 1017 and a bottom perimeter portion 1016 making a top member 1018 of a housing or case for an electronic device 1023. This top member can be used with a bottom member 1019 to encase an electronic device. In certain embodiments, the top member 1018 can include attachment devices known in the art. In certain embodiments, the top member 1018 includes posts 1020 that allow the top member 1018 to be joined to openings 1021 in the bottom member 1019. In certain embodiments, the bottom member includes posts that mate with openings in the top member. However, any attachment devices can be used to align the top and bottom members 1018, 1019 so they create a housing around the device.

In certain embodiments, the membrane 1001 is permanently attached to the perimeter members. In other embodiments, the membrane 1001 is removably attached to the perimeter members. In embodiments wherein the membrane is removably attached to the perimeter members, the perimeter members may include one or more peel tabs 1022a and 1022b that aid in removing the perimeter members from the membrane. The removable perimeter members may be attached to a non-adhesive protective layer that can be peeled from the membrane. The peel tabs may be oriented located anywhere on the removable perimeter members that facilitates removal from the membrane. In such embodiments, the top and bottom members are used primarily for temporarily orienting the membrane correctly on the screen of the mobile device. In some embodiments, the membrane 1001 has an adhesive 1002 or is held in place by the perimeter members. The perimeter members can create a water tight seal with the membrane 1001. This can occur because of a gasket between the one or more perimeter members and the membrane 1001 or any other sealing technology. For example, the membrane may be molded onto the perimeter members. A water tight seal may also be formed between the top and bottom members 1018, 1019.

In certain embodiments, the perimeter members provide shock protection to the electronic device. In certain embodiments, the membrane 1001 provides shock protection to the electronic device. In further embodiments, the membrane and perimeter portions can provide a waterproof seal.

In some embodiments, the membrane 1001 is first attached to the electronic device as described above and then the perimeter members are positioned on the electronic device. In some embodiments, this arrangement produces a waterproof seal.

In some embodiments of the present invention, an encasement may have a top member that is sprung or tensioned, and latches onto the corresponding bottom member at two points (or vice versa). For example, FIG. 27A discloses a side cutaway view of an encasement 1100 having a top latch frame 1102 and a bottom member 1112 housing a mobile electronic device 1120. Top latch frame 1102 has a face member 1104 and a side member 1106. The face and side members are sprung or tensioned such that the interior angle between the face and side members is less than 90 degrees; in one embodiment, the interior angle is about 87 degrees. The interior angle may be about 86, 85, 84, 83, 82, 81, or 80 degrees. The top member is capable of flexing when attached to the bottom member to house an electronic device, and is made of a stiff yet flexible material, such as metal or metal alloys, plastics or other polymers and polymer blends, or tempered glass. The face member 1104 partially extends over the top surface 1121 of the electronic device. A gasket or seal 1118 lies between the top surface of the electronic device and the face member, and aids to prevent entry of liquids, dust, or other particles. The seal may be moulded, bonded, or adhered to either the face member or the device. The seal may be made of a water resistant elastomeric material, such as rubber, silicon, or a releasable adhesive, such as a polyurethane gel. The top member has a plurality of face member holes (not shown, see FIG. 28), through which corresponding plurality of teeth, posts, or protrusions 1114 fit. In some embodiments, the teeth may be proud (protrude beyond the surface of the face member) as shown, the teeth may be flush with the surface of the face member, or the teeth may sit slightly below the surface of the face member. In some embodiments, each tooth or protrusion may fit in an indent in the face member. The face member may have a combination of both holes and indents. In some embodiments, the top surface of the mobile device includes a multi-touch display, and has an additional protective layer either adhered or sprayed onto the display. The additional layer overlaps with the seal 1118 sufficiently to create a barrier to entry for liquids, dust, or other particles. In some embodiments, a compressible gasket or seal lies between the outer surface of the protective layer and the face member to form a waterproof seal. The compressible gasket may be a compressible elastomer or a releasable reusable adhesive. The compressible gasket may be a gel. The compressible elastomer or the releasable reusable adhesive may be bonded, glued, molded, adhered, or mechanically retained to either the screen or the wiper.

The side member 1106 of the top latch frame also has a plurality of side member holes (not shown, see FIG. 28), into which a plurality of side wall ramps 1116 extend from the side wall 1113 of bottom member 1112. In some embodiments, the ramps may be proud (protrude beyond the surface of the side member) as shown, the ramps may be flush with the surface of the side member, or the ramps may sit slightly below the surface of the side member. In some embodiments, the ramps may fit in an indent in the side member.

Figure 27A:
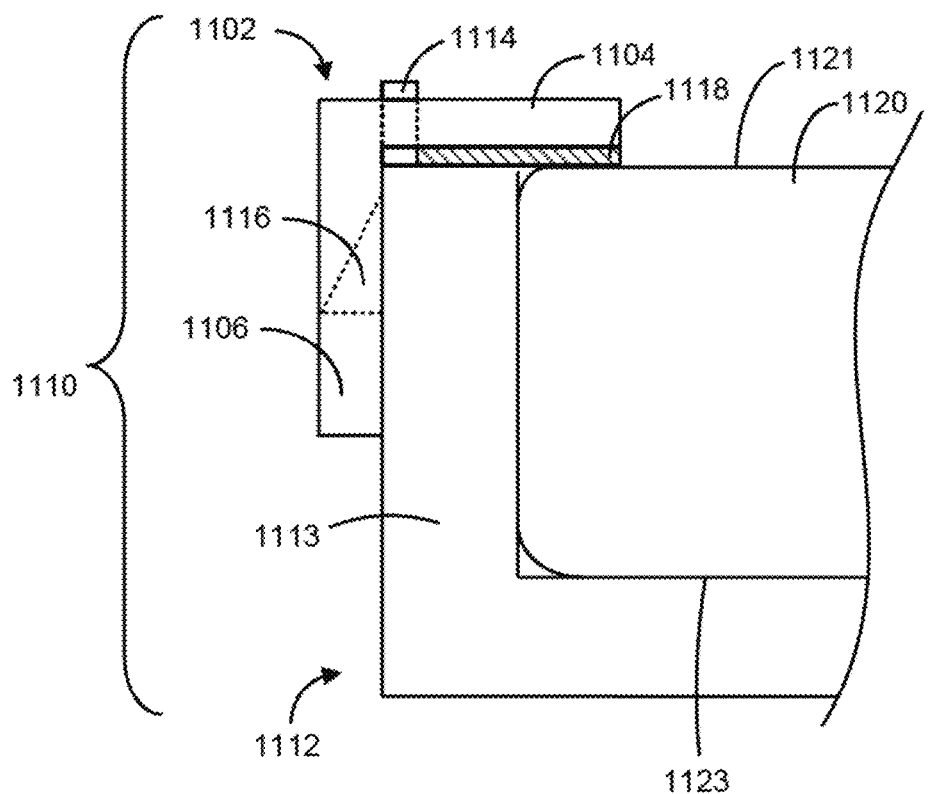
FIG. 27A shows a side cutaway view of a portion of an encasement with a tensioned top member and an alternative embodiment of a latch system to secure a top member and a bottom member around a mobile device.

To encase a device using the top latch frame and bottom member of FIG. 27A, the holes or apertures in the face member of the top latch frame 1102 are aligned with the teeth of the bottom member 1112. The side member then slides across the side wall ramps 1116 and into the side member holes. The side member may flex slightly to allow the top latch frame to be secured to the bottom member.

Figure 27B:
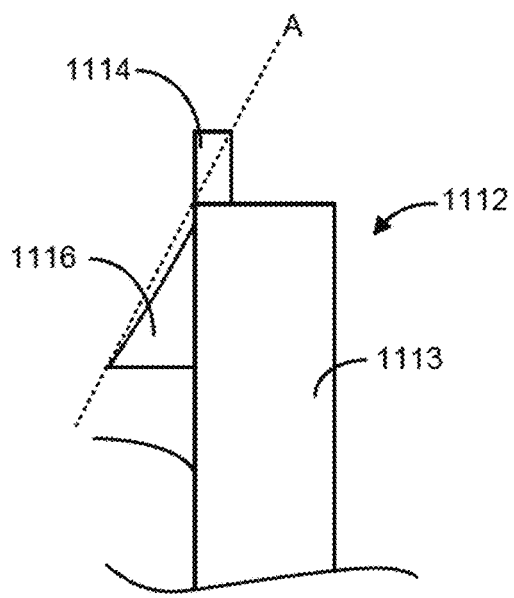
FIG. 27B shows a side cutaway view of a portion of the bottom member depicted in FIG. 27A.

FIG. 27B shows a portion of the bottom member 1112 of FIG. 27A, without an associated electronic device or top latch frame. The moment of force of the top member when attached to the bottom member is indicated by line A.

Figure 28:
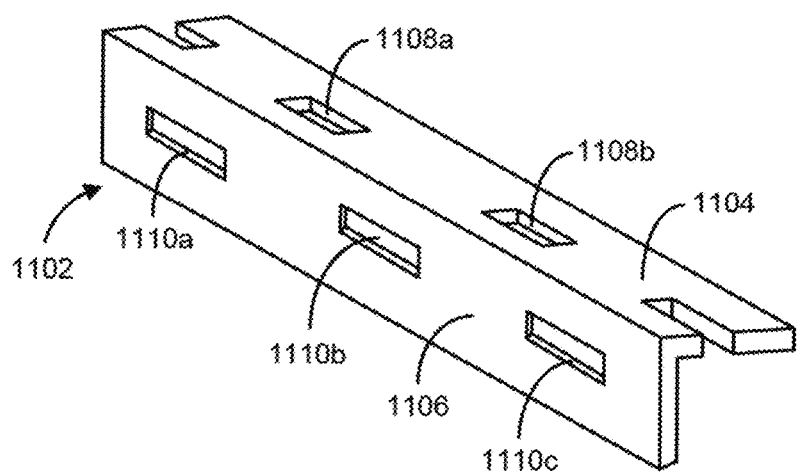
FIG. 28 depicts a perspective view of a portion of a top latch frame with holes configured to mate with posts in a bottom member.

FIG. 28 shows a perspective view of part of a top latch frame 1102, having a face member 1104 and a side member 1106. The face member holes 1108a and 1108b are staggered in relation to the side member holes 1110a, 1110b, and 1110c. In some embodiments, the face member holes and side member holes are aligned in part or all of the top latch frame.

The use of bottom member posts inserted into face member apertures, as well as bottom member side wall ramps into side member holes, helps constrain movement of the top latch frame. The posts on the top ridge of the bottom member constrain movement of the top latch frame in the plane between the opposing sides of the encased device, the side wall ramps constrain movement of the top latch frame away from the top surface of the encased device, and both the posts and the ramps prevent the top latch frame from moving along the plane between the proximal and distal end portions of the encased electronic device.

Figure 29:
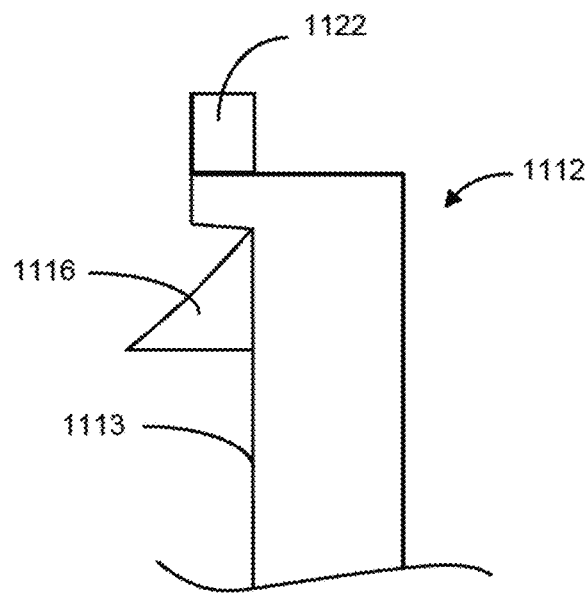
FIG. 29 shows a side view of a portion of another embodiment of a bottom member having teeth that extend past the edge of the side wall of the bottom member.

FIG. 29 shows an alternative configuration of the outer perimeter of the bottom member 1112. Teeth 1122 are offset past the edge of the side wall 1113 of the bottom member. The side wall ramp 1124 projects outward to a greater extent than in FIG. 27B.

Figure 30:
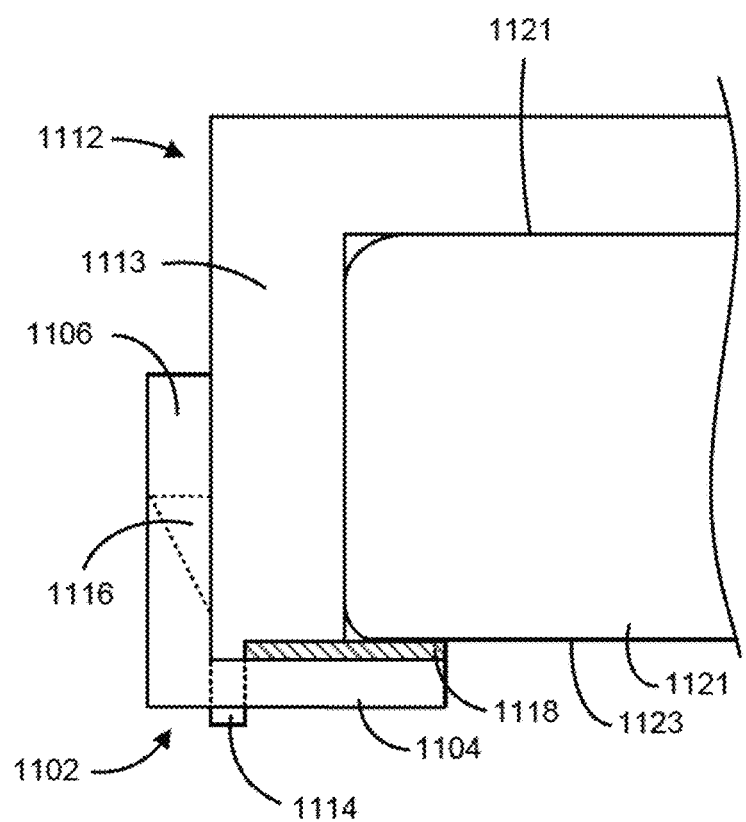
FIG. 30 depicts a side cutaway view of another embodiment of a top member and a bottom member encasing a mobile device, utilizing the latching mechanism shown in FIGS. 27 and 28. In this figure, the top latch frame lies proximate the bottom surface of the mobile device and the bottom member covers the top surface of the mobile device.

FIG. 30 depicts an alternative configuration of an encasement utilizing the clasping mechanisms described above. In this embodiment, the top surface 1121 of the mobile electronic device 1121 is proximate the bottom member 1112 and the bottom surface 1123 of the mobile device 1121 is proximate the top latch frame 1102. In some embodiments, the bottom member may include a transparent membrane, e.g. polymer or thin glass, allowing access to a multi-touch display on the top surface of the electronic device.

Figure 31:
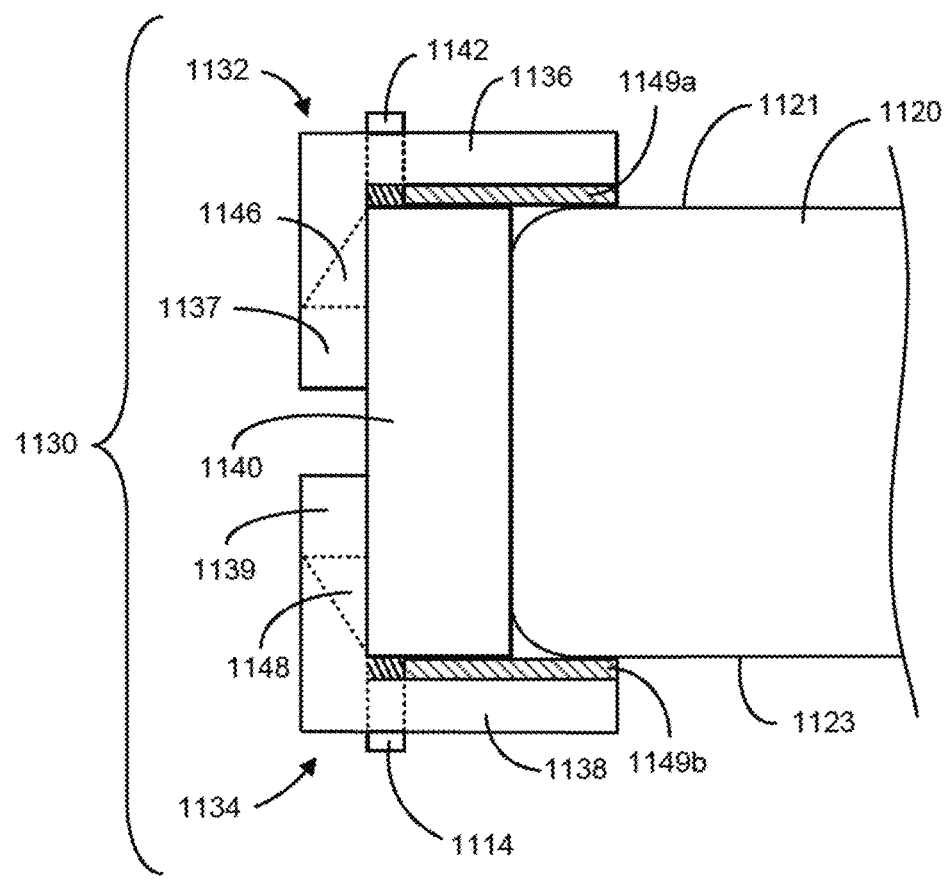
FIG. 31 shows a side cutaway view of a portion of yet another embodiment of a top member and a bottom member encasing a mobile device. In this figure, both the top and bottom members utilize the latch system shown in FIGS. 27 and 28.

FIG. 31 depicts a side cutaway view of another alternative embodiment of an encasement utilizing the clasping mechanism described above. The encasement 1130 includes a top latch frame 1132 and a bottom latch frame 1134, each of which mates with a perimeter latch frame 1140. The perimeter latch frame has upper teeth, posts, or protrusions 1142, and upper perimeter ramp 1146 that mate with holes (not shown) in the face member 1136 and side member 1137, respectively, of the top latch frame. Similarly, the perimeter latch frame also has lower teeth, posts, or protrusion 1144 and lower perimeter ramps 1148 that mate with holes (not shown) in the face member 1138 and side member 1139, respectively, of the bottom latch frame. The face members of the top and bottom latch frames extend partially over the edge of the mobile device and lie on gaskets or seals 1149a and 1149b. The seal may be moulded or adhered to either the face member or the device. The seal may be made of a water resistant elastomeric material, such as rubber, silicon, or a releasable adhesive, such as a polyurethane gel.

Figure 32:
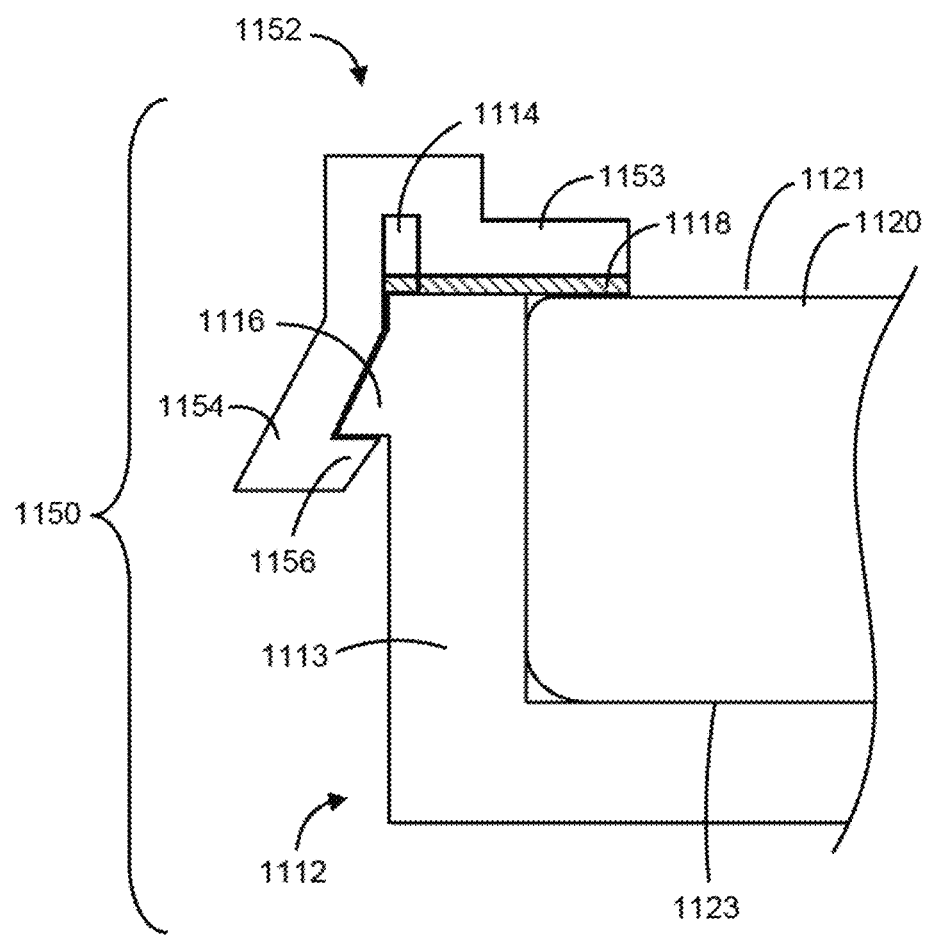
FIG. 32 shows a side cutaway view of a portion of still another embodiment of a top member and bottom member encasing a mobile device. In this figure, posts from the bottom member enter indentations in the top member.

FIG. 32 shows an alternative embodiment of a top latch frame that may be used with housings of the present invention. The housing 1150 includes a bottom member 1112 and an alternative embodiment of a top latch frame 1152. The top latch frame 1152 mates with the bottom member, and the face member 1153 extends onto the face of the electronic device. A gasket or seal 1118 lies underneath the face member. Posts 1114 fit into indentations of the face member. The side member 1154 has a clasp 1156 that mates with the side wall ramps 1124.

Figure 33A:
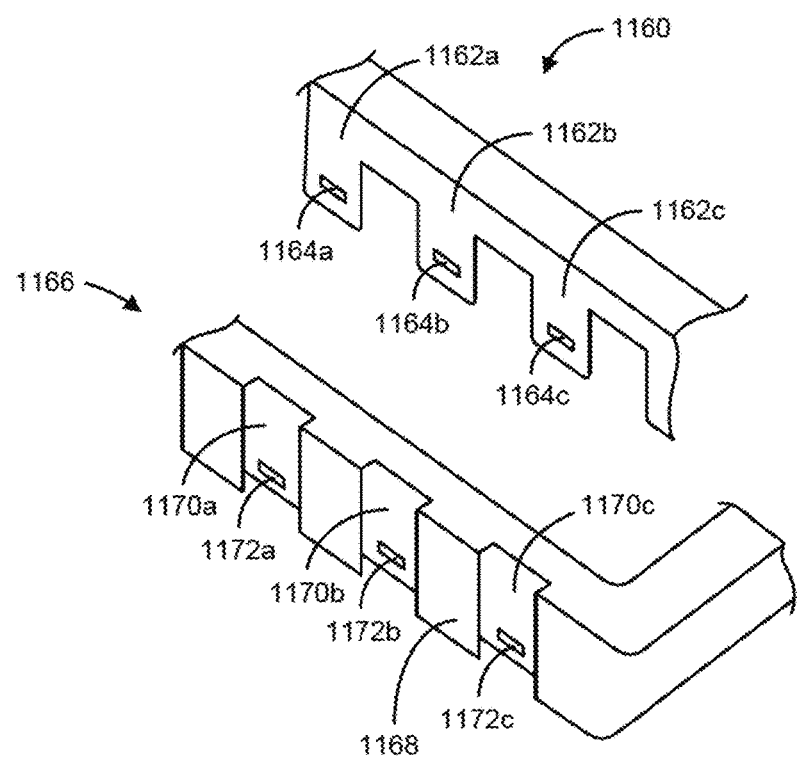
FIG. 33A shows a perspective view of portions of an embodiment of a top latch frame and bottom member that use latch tongues and tongue apertures that mate together and help prevent the top latch frame and bottom member from being jarred loose.
Figure 33B:
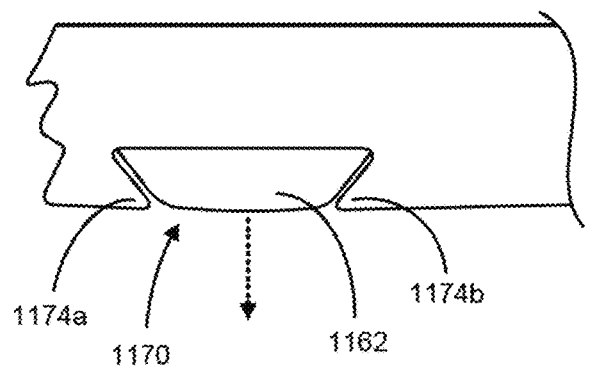
FIG. 33B shows a top cross-sectional view of an individual side wall groove from FIG. 33A.
Figure 34:
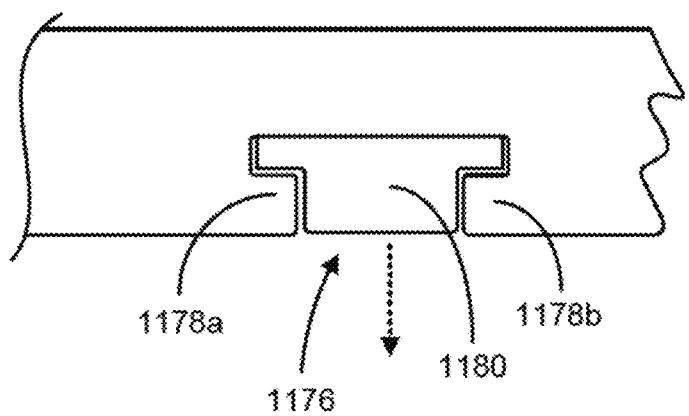
FIG. 34 shows a top cross-sectional view of another embodiment of a side wall groove and tongue having different shapes than those shown in FIGS. 33A and 33B.

In some embodiments, the side member of a top latch frame includes a plurality of tongues that fit into grooves in the side wall of the bottom member. FIG. 33A depicts perspective views of portions of a top latch frame 1160 and a bottom member 1166. The top latch frame includes a plurality of latch tongues 1162a-c, and tongue apertures 1164a-c. In some embodiments, the apertures may be configured as indentations in the tongues that face towards the side wall of the bottom member. Bottom member 1166 has side wall grooves 1170 in the side wall 1168 of the bottom member. Side wall protrusions or posts 1172a-c are situated in the grooves. The grooves are configured such that the latch tongues of the top member may be slid into the grooves, and tongue aperture of each tongue mates with the side wall posts, thus preventing the top latch frame from separating from the bottom member. The grooves are also configured such that the walls of the groove are slanted inward to prevent the tongues from exiting the grooves in a lateral direction. FIG. 33B shows a top cross sectional view of an individual side wall groove 1170 with a latch tongue 1162 inside the groove. The slanted walls 1174a and 1174b of the groove are configured to form a trapezoidal shape inside the groove, thus partially surrounding the tongue 1162 and preventing it from leaving the groove in the direction of the dashed arrow. FIG. 34 shows an alternative embodiment of tongue and groove in which the groove 1176 has flanged walls 1178a and 1178b that create a T-shaped void in the groove. The tongue 1180 is also T-shaped, and is prevented from being removed from the groove in the direction of the dashed arrow.

Figure 35:
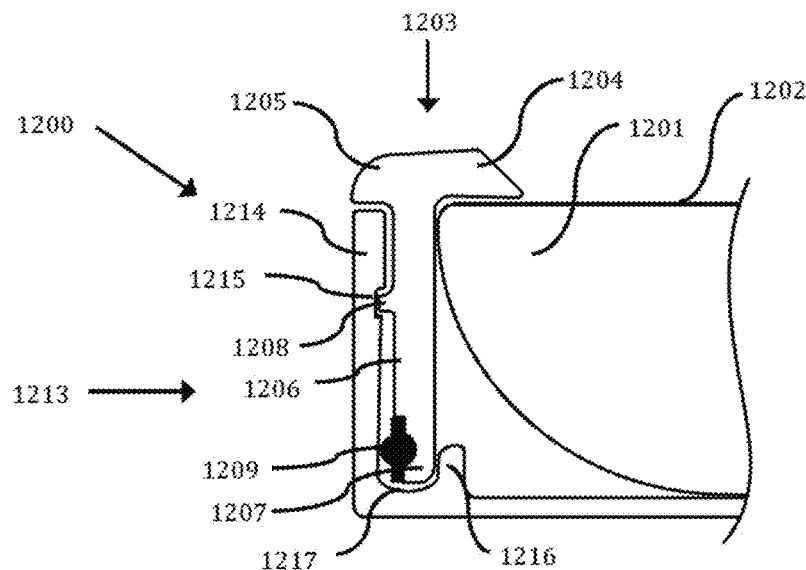
FIG. 35 shows a cutaway view of a portion of an exemplary housing (between the proximal and distal ends of the device) having a top member and a bottom member, in which a tooth and clasp are located on the interior of the assembled housing, and a gasket is located on the outer wall of the bottom member.

In some embodiments of an encasement, the housing has a seal that is molded into a portion of either the top member or the bottom member. FIG. 35 shows a cutaway view (between the proximal and distal ends) of a portion of an exemplary housing 1200 with a top member 1203 and a bottom member 1213 encasing a mobile computing device 1201. The top member has a wiper 1204 that partially extends over the front surface 1202 of the electronic device or mobile device, an outer perimeter extension 1205, a rigid frame 1206 that extends to a bottom ridge 1207, a tooth 1208 that extends towards the outer perimeter of the housing, and a gasket 1209 that is molded, bonded, or adhered into the rigid frame facing towards the outer perimeter of the housing. In some embodiments, the gasket is molded, bonded, or adhered into the outer wall of the bottom member. In some embodiments, the gasket may be an elastomeric compound such as synthetic or natural rubber, silicone rubber, or an elastomeric gel. Molding, bonding, or adhering the gasket to either the outer wall of the bottom member or the rigid frame of the top member can aid in preventing the gasket from twisting, slipping, or rolling when the top and bottom members are mated or unmated and thus preventing wear or breakage of the gasket and a possible loss of sealing over time.

The bottom member 1213 includes an outer wall 1214 having a notch or indentation 1215 configured to receive the tooth of the top member and an inner wall 1216, the inner and outer walls forming a channel 1217 into which a portion of the rigid frame and the bottom ridge of the top member extend. FIG. 35 is drawn to distinctly show each of the components described, but in some embodiments, the outer wall and the rigid frame mate together, pressing the gasket between the outer wall and the rigid frame to create a seal. Similarly, the outer perimeter extension can mate against the top ridge of the outer wall 1214, and the wiper 1204 can press against the front surface 1202 of the mobile device 1201. In some embodiments, the wiper 1204 is made of elastomeric material that is less rigid than the rigid frame and creates a waterproof or water-resistant seal against the front surface 1202 of the mobile device 1201. In some embodiments, a screen protector lies on the front surface 1202 of the mobile device 1201 and extends underneath the wiper 1204 to form a waterproof or water-resistant seal. In some embodiments, a screen protector lies on the front surface 1202 of the mobile device 1201 and does not extend underneath the wiper 1204. In some embodiments, a second gasket lies underneath the wiper 1204 to form a waterproof or water-resistant seal. In some embodiments, a compressible gasket or seal lies between the outer surface of the screen protector and the wiper 1204 to form a waterproof seal. The compressible gasket may be a compressible elastomer or a releasable reusable adhesive. The compressible gasket may be a gel (e.g. a poloxamer or poloxameric compound). The compressible elastomer or the releasable reusable adhesive may be bonded, glued, molded, adhered, or mechanically retained to either the screen or the wiper.

Figure 36:
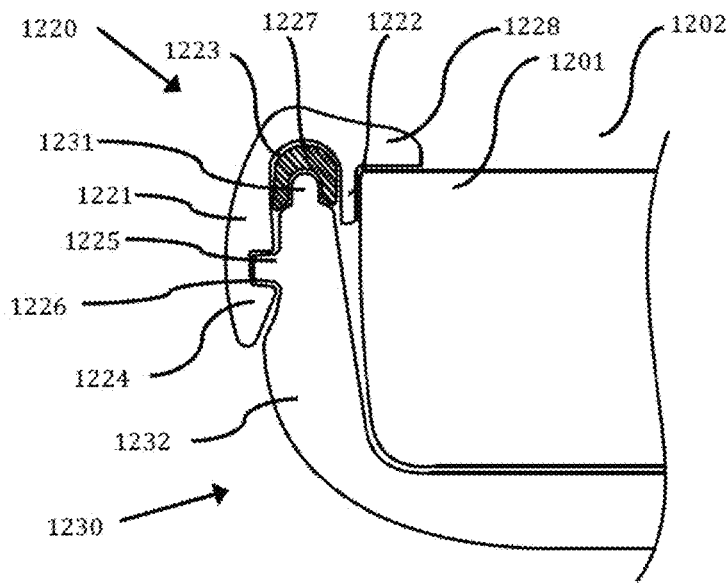
FIG. 36 shows a top cross-sectional view of yet another embodiment of a housing having a top member and a bottom member, in which the housing has a clasp and tooth on the exterior of the encasement, and the gasket or seal is proximate the tapered top ridge.

FIG. 36 shows an alternative embodiment of a housing having a top member 1220 and a bottom member 1230. The top member 1220 has an outer wall 1221 and an inner wall 1222 forming a channel 1223 configured to receive a top ridge 1231 of the bottom member 1230. The top ridge 1231 of the bottom member 1230 extends from a side wall 1232. The top member has a clasp 1224 that fits over a tooth 1225 that extends outward from the side wall 1232, as well as a notch or indentation 1226 that mates with the tooth 1225. In some embodiments, the side wall 1232 may lack a tooth 1225 and mate with a notch or indentation in the side wall of the bottom member 1232. A gasket 1227 lies on the top ridge 1231 and is molded, bonded, or adhered to the top ridge 1231. In some embodiments, the gasket 1227 is molded, bonded, or adhered to the channel 1223 of the top member 1220. In other embodiments, the gasket 1227 covers a portion of both the inner and outer surfaces of the top ridge 1231, and the top ridge 1231 is tapered in a stepped configuration relative to the rest of the side wall 1232. The tapered top ridge 1231 can allow for room for the gasket 1227 without increasing the distance between the inner and outer walls of the top member 1220. In some embodiments, the taper may be continuous. The gasket 1227 can form a waterproof or water-resistant seal. In some embodiments, the gasket 1227 may be an elastomeric compound such as synthetic or natural rubber, silicone rubber, or an elastomeric gel (such as a poloxamer or poloxameric compound).

The top member has a wiper 1228 that partially extends over the front surface 1202 of the mobile computing device 1201. In some embodiments, the wiper 1228 is made of elastomeric material that is less rigid than the rigid frame and creates a waterproof or water-resistant seal against the front surface 1202 of the mobile device 1201. In some embodiments, a screen protector lies on the front surface 1202 of the mobile device 1201 and extends underneath the wiper 1228 to form a waterproof or water-resistant seal. In some embodiments, a screen protector lies on the front surface 1202 of the mobile device 1201 and does not extend underneath the wiper 1228. In some embodiments, a second gasket lies underneath the wiper 1228 to form a waterproof or water-resistant seal. FIG. 36 is drawn to distinctly show each of the components described, but in some embodiments, the top and bottom members mate closely together with each other and with the mobile device 1201, pressing the first and/or second gasket between the top ridge 1231 of the bottom member 1230 and the channel 1223 to form a seal.

Figure 37:
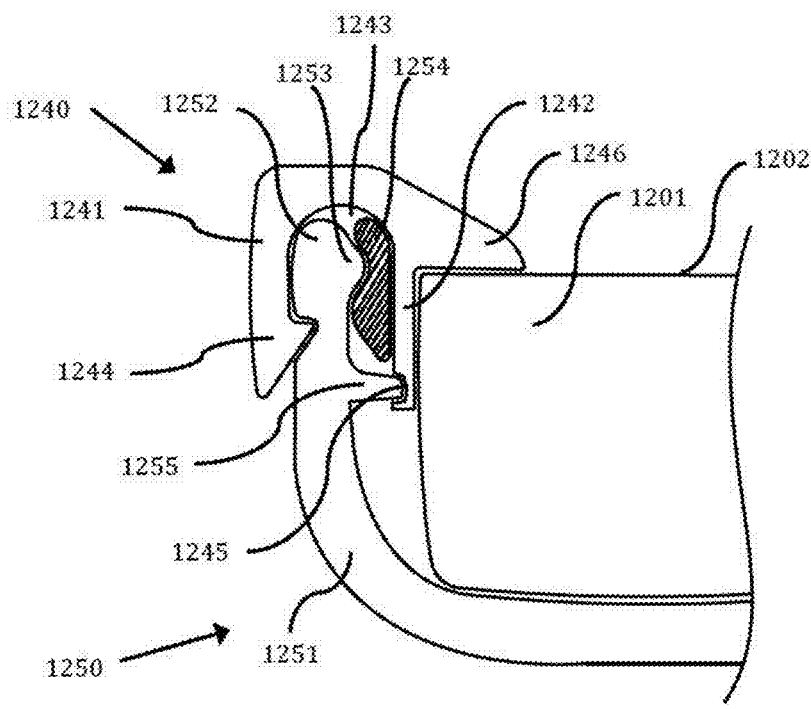
FIG. 37 shows a top cross-sectional view of still another embodiment of a housing having a top member, a bottom member, and a gasket that lies between the inner wall of the top member and the side wall of the bottom member.

FIG. 37 depicts an alternative embodiment of a housing having a top member 1240 and a bottom member 1250, and a gasket 1254 molded into the housing. The top member 1240 has an outer wall 1241 and an inner wall 1242 that form a channel 1243, the outer wall 1241 having a clasp 1244 and the inner wall having a notch 1245. The notch 1245 is configured for receiving a tooth 1255 that extends inward from the side wall 1251 of the bottom member 1250. The bottom member 1250 has a side wall 1251 that extends to a top ridge 1252. The top ridge 1252 of the bottom member 1250 has a protrusion 1253 that extends laterally inward towards the inner wall 1242 and presses against a gasket 1254 that lies between the inner wall 1242 and the side wall 1251, and is lateral to the top ridge 1252. In some embodiments, the protrusion may be located on the inner wall 1242, facing into the channel. In some embodiments, there is no protrusion. In some embodiments, the gasket 1254 is molded, bonded, or adhered to the inner wall 1242 of the channel of the top member 1240. In some embodiments, the gasket 1254 is molded, bonded, or adhered to the inner surface of the side wall 1251. The gasket 1254 can form a waterproof or water-resistant seal. In some embodiments, the gasket 1254 may be an elastomeric compound such as synthetic or natural rubber, silicone rubber, or an elastomeric gel (e.g. a poloxamer or poloxameric compound). The top member 1240 can have a wiper 1246 that partially extends over the front surface 1202 of the mobile computing device 1201. In some embodiments, the wiper 1246 is made of elastomeric material that is less rigid than the rigid frame and creates a waterproof or water-resistant seal against the front surface 1202 of the mobile device 1201. In some embodiments, a screen protector lies on the front surface 1202 of the mobile device 1201 and extends underneath the wiper 1246 to form a waterproof or water-resistant seal. In some embodiments, a screen protector lies on the front surface 1202 of the mobile device 1201 and does not extend underneath the wiper 1246. In some embodiments, a second gasket lies underneath the wiper 1246 to form a waterproof or water-resistant seal. FIG. 37 is drawn to distinctly show each of the components described, but in some embodiments, the top and bottom members mate closely together with each other and with the mobile device, pressing the first and/or second gasket between the inner lateral surface proximate the top ridge of the bottom member and the channel to form a seal.

Figure 38:
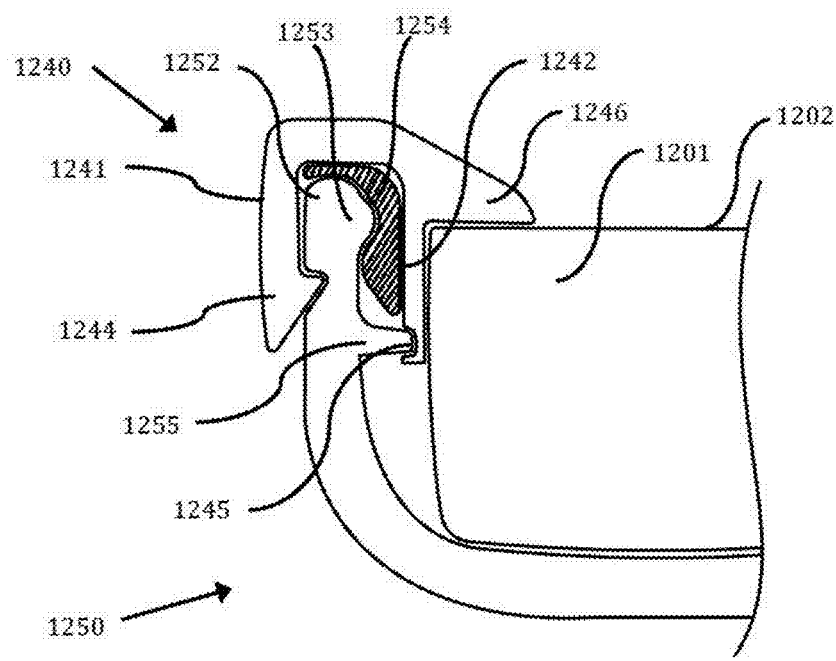
FIG. 38 shows a top cross-sectional view of another embodiment of a housing having a top member, a bottom member, and a gasket that lies on top of the top ridge of the bottom member and between the inner wall of the top member and inner lateral surface of a side wall of the bottom member.

FIG. 38 shows yet another alternative embodiment of the housing of FIG. 37, in which the gasket 1254 lies both on the inner lateral surface of the side wall 1251 and on the top ridge 1253 of the bottom member 1250. As described with FIG. 37 above, in some embodiments, the gasket 1254 is molded, bonded, or adhered to the inner wall 1242 and horizontal surface of the channel 1243 of the top member 1240. In some embodiments, the gasket 1254 is molded, bonded, or adhered to the inner surface of the side wall 1251 and the top ridge 1253 of the bottom member 1250. In some embodiments, the gasket 1254 may be an elastomeric compound such as synthetic or natural rubber, silicone rubber, or an elastomeric gel (e.g. a poloxamer or poloxameric compound).

Figure 39:
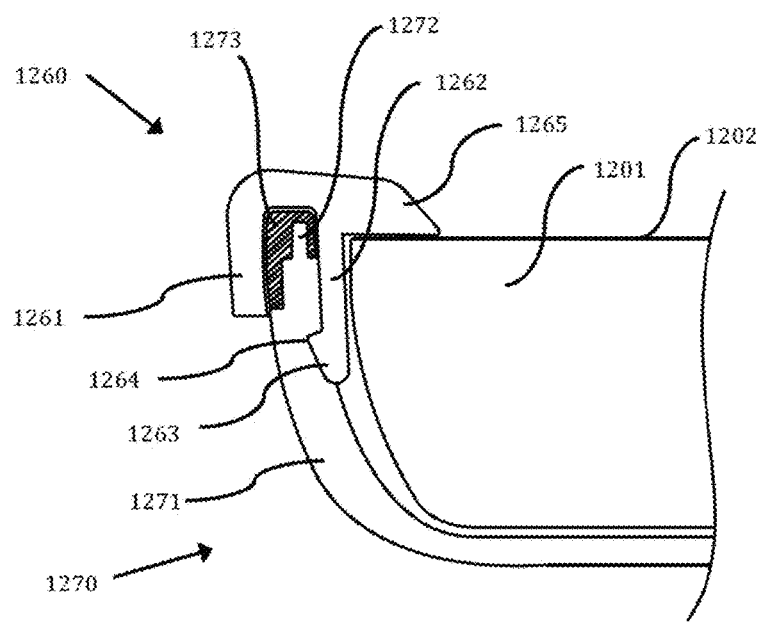
FIG. 39 shows a top cross-sectional view of yet another embodiment of a housing having a top member and a bottom member, and a gasket that lies on top of the top ridge of the bottom member and between the outer wall of the top member and the side wall of the bottom member.

FIG. 39 depicts yet another embodiment of a housing having a top member 1260 and a bottom member 1270, and a gasket 1273 molded into the housing. Top member 1260 has an outer wall 1261 and an inner wall 1262. The inner wall 1262 has a clasp 1263 configured to mate with an indentation or notch 1264 on the side wall 1271 of the bottom member 1270. The side wall 1271 can extend to a top ridge 1272. A gasket 1273 lies on the top ridge 1272 and can be molded, bonded, or adhered to the top ridge. In some embodiments, the gasket 1273 is molded, bonded, or adhered to the channel of the top member 1260. The top ridge 1272 can be tapered in a stepped configuration relative to the rest of the side wall 1271. In certain embodiments, the tapered top ridge 1253 allows room for the gasket 1273 without increasing the distance between the inner 1262 and outer 1261 walls of the top member 1260. In other embodiments, the taper may be continuous. The gasket 1273 forms a waterproof or water-resistant seal. In some embodiments, the gasket 1273 may be an elastomeric compound such as synthetic or natural rubber, silicone rubber, or an elastomeric gel.

The top member has a wiper 1265 that partially extends over the front surface 1202 of the mobile device 1201. In some embodiments, the wiper 1265 is made of elastomeric material that is less rigid than the rigid frame and creates a waterproof or water-resistant seal against the front surface 1202 of the mobile device 1201. In some embodiments, a screen protector lies on the front surface 1202 of the mobile device 1201 and extends underneath the wiper 1265 to form a waterproof or water-resistant seal. In some embodiments, a screen protector lies on the front surface 1202 of the mobile device 1201 and does not extend underneath the wiper 1265. In some embodiments, a second gasket lies underneath the wiper 1265 to form a waterproof or water-resistant seal. FIG. 39 is drawn to distinctly show each of the components described, but in some embodiments, the top and bottom members mate closely together with each other and with the mobile device, pressing the first and/or second gasket between the top ridge of the bottom member and the channel to form a seal.

Figure 40A:
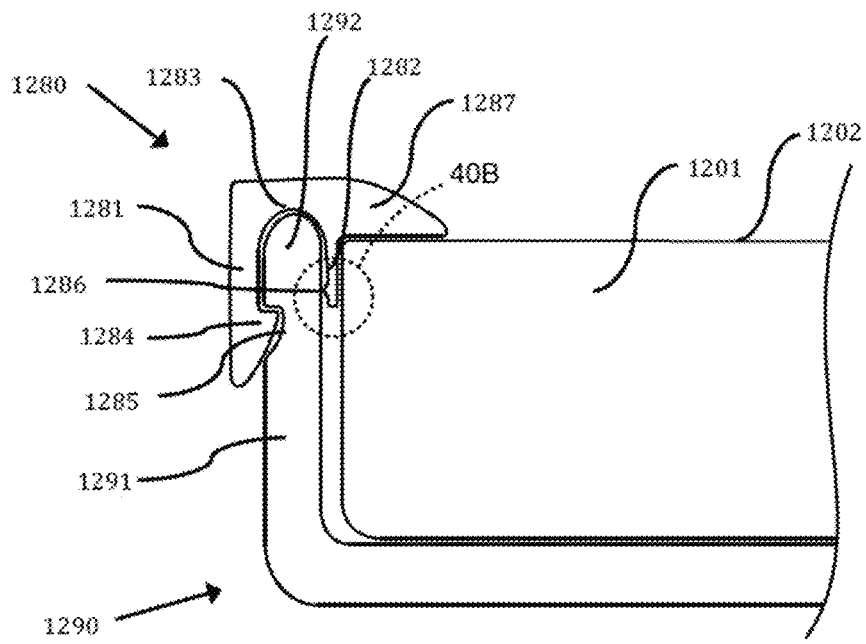
FIG. 40A shows a side cutaway view of a portion of a top member and bottom member of an encasement in which a lateral protrusion, and not a gasket, is used to create a water resistant seal between the top and bottom members.
Figure 40B:
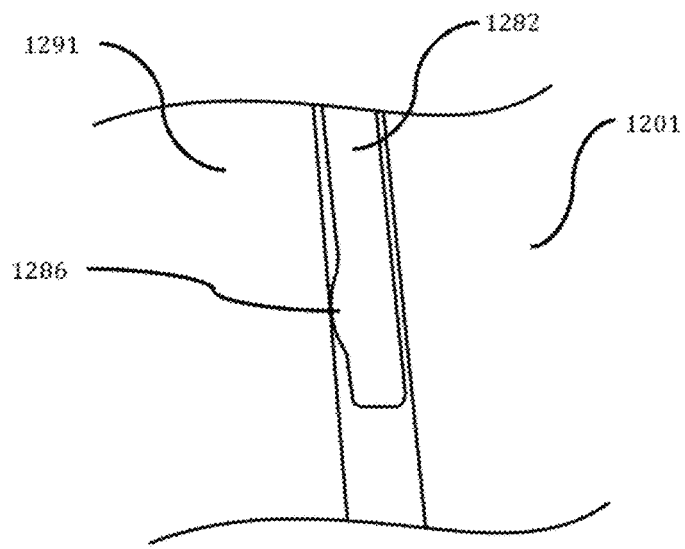
FIG. 40B shows a close-up view of the lateral protrusion in FIG. 40A.

FIG. 40A shows another alternative embodiment of a top member and bottom member of an encasement that fits together without an elastomeric gasket to create a water resistant seal to protect a mobile computing device from liquids, dust particles, etc. The top member 1280 has an outer wall 1281 and an inner wall 1282 forming a channel 1283 configured to receive a top ridge 1292 of the bottom member 1290. The top ridge of the bottom member extends from a side wall 1291. The top member has a clasp 1284 that fits into a notch or indentation 1285 in the side wall 1291. The inner wall 1282 includes a lateral protrusion or bump 1286 that faces towards the side wall 1291. The inner wall 1282 is biased inward towards the side wall 1291. The flexural modulus of each of the side wall 1291 and the inner wall 1282 is configured such that the protrusion 1286 presses against the side wall 1291 with sufficient force to form a water resistant seal. The inner wall 1282 of the top member and the side wall of the bottom member 1291 can both be made of a rigid polymer, such as a thermoplastic polymer; in some embodiments, the inner wall 1282 of the top member can also have an elastic modulus that is greater than that of the side wall 1291. Thus, when the top 1280 and bottom members 1290 are mated, the protrusion 1286 has an elastic modulus sufficient to partially deform against the side wall 1291 and maintain a water resistant seal. FIG. 40B shows a close-up view of the lateral protrusion in FIG. 40A and how it abuts the side wall. In some embodiments, the bottom member has inner and outer walls forming a channel configured to receive a bottom ridge of the top member.

Similar to FIGS. 36-39, the top member has a wiper 1287 that partially extends over the front surface 1202 of the mobile computing device 1201. In some embodiments, the wiper 1287 is made of elastomeric material that is less rigid than the rigid frame and creates a waterproof or water-resistant seal against the front surface 1202 of the mobile device 1201. In some embodiments, a screen protector lies on the front surface 1202 of the mobile device 1201 and extends underneath the wiper 1287 to form a waterproof or water-resistant seal. In some embodiments, a screen protector lies on the front surface 1202 of the mobile device 1201 and does not extend underneath the wiper 1287. In some embodiments, a gasket lies proximate the wiper 1287 to form a waterproof or water-resistant seal. In certain embodiments, other clasp mechanisms, such as those described throughout this specification may be utilized on the top and bottom members (see e.g. FIGS. 3A, 14D-S, 27-29, 33A-B, and 34). FIGS. 40A and 40B are drawn to distinctly show each of the components described, but in some embodiments, the top and bottom members mate closely together with each other and with the mobile device.

Figure 41:
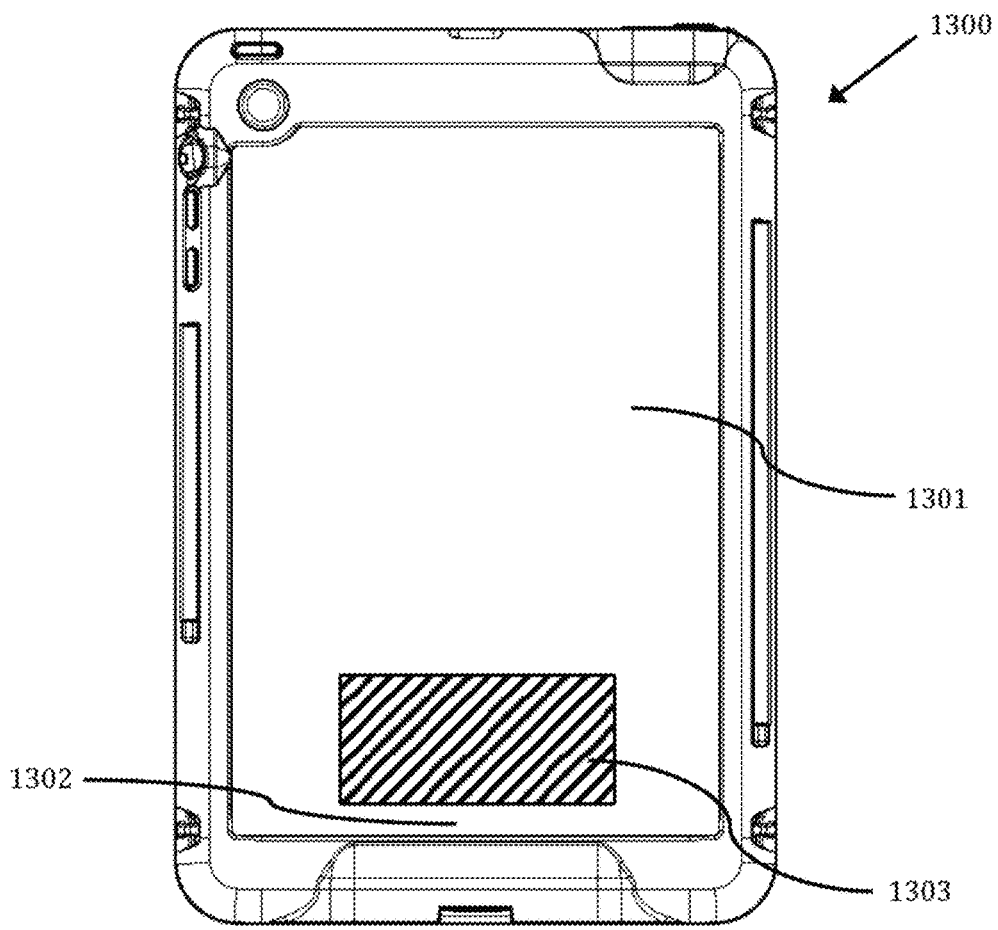
FIG. 41 shows a rear elevational view of an encasement for a mobile device having a sound enhancing region on the rear surface of the housing.

It is desirable in housings that encase a mobile computing device to be able to increase the volume levels of sound emanating from the mobile device. The following describes a modification of an encasement to increase the volume of sound. In some embodiments of housings described herein, a portion of the bottom member surface of the encasement has a region that is thinner than that of the remainder of the bottom member surface. This sound enhancing region facilitates amplification of sound emanating from the enclosed device and out of the encasement. For example, as shown in FIG. 41, the sound enhancing region 1303 may be located near the distal end 1302 of the bottom member surface 1301 of case 1300. In some embodiments, the sound enhancing region 1303 may be located near the proximal end of the case 1300. Preferably, the sound enhancing region 1303 is located proximate to the speaker outputs of the encased mobile computing device. The sound enhancing region 1303 includes an area that is thinner than the rest of the bottom member surface 1301. For example, the sound enhancing region 1303 may be about 0.9 mm thick, while the remainder of the rear surface of the encasement may be about 1.2 mm to about 0.4 mm thick. In some embodiments, the sound enhancing region 1303 may be about 0.8 mm thick, about 0.7 mm thick, about 0.5 mm thick, about 0.4 mm thick, about 0.3 mm thick, about 0.2 mm thick, or about 0.1 mm thick. In some embodiments, the sound enhancing region 1303 may be about 0.1 mm to about 0.5 mm thick, or about 0.5 mm thick to about 1 mm thick.

Figure 42:
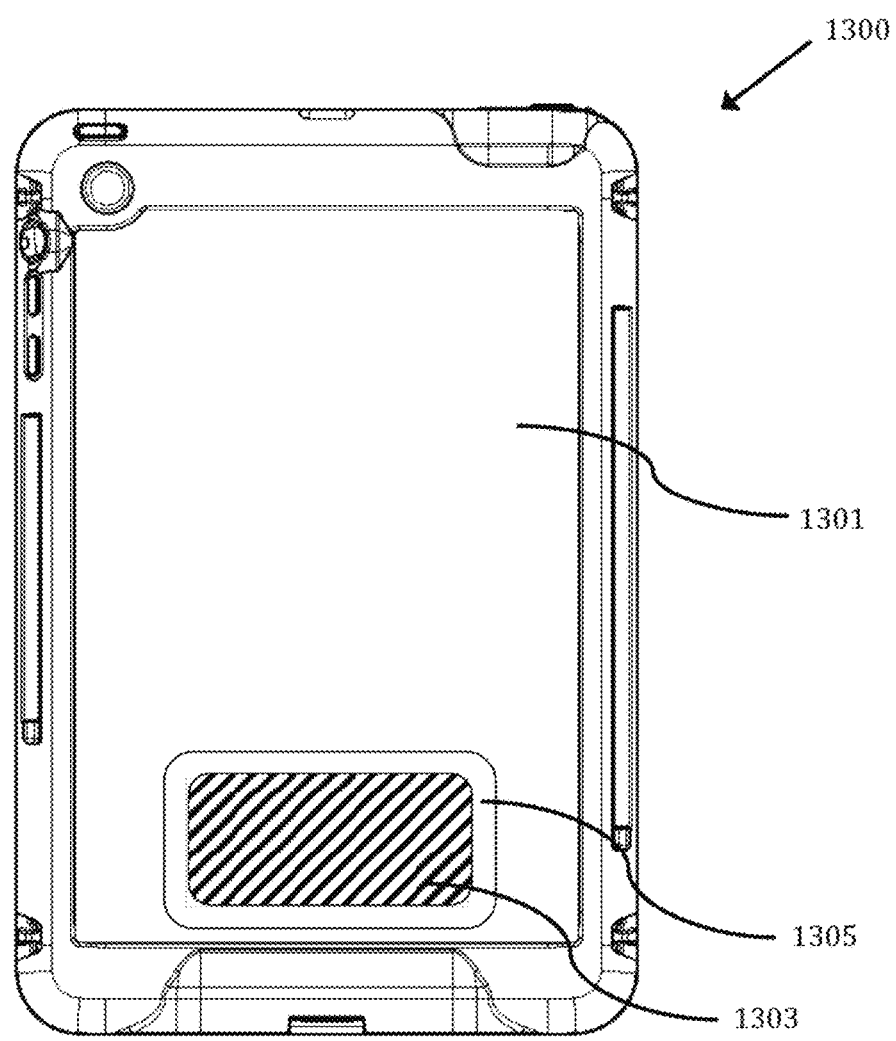
FIG. 42 shows a rear elevational view of an encasement for a mobile device having another embodiment of a sound enhancing region on the rear surface of the housing.

In some embodiments, the sound enhancing region 1303 is integrally molded from the same material as the rear surface of the bottom member 1301. In some embodiments, as shown in FIG. 42, the sound enhancing region 1303 is molded such that the boundary between the rear surface of the bottom member and the thinned area of the sound enhancing region has a sloped region 1305. The sloped region 1305 can include a gradual slope between the thicker bottom member surface 1301 and the thinned region. The sloped region 1305 can help to maintain the shock absorbing and shatter-resistant strength of the bottom surface 1301 of the case 1300.

In some embodiments, the sound enhancing region has dimensions of about 80 mm by about 67 mm. In some embodiments, the sound enhancing region has dimensions of about 67 mm by about 49 mm. In some embodiments, the sound enhancing region has a surface area of about 5360 mm$^2$. In some embodiments, the sound enhancing region has a surface area of between about 100 mm$^2$ and about 500 mm$^2$, between about 500 mm$^2$ and about 1000 mm$^2$, between about 1000 mm$^2$ and about 2000 mm$^2$, between about 2000 mm$^2$ and about 3000 mm$^2$, between about 3000 mm$^2$ and about 4000 mm$^2$, between about 4000 mm$^2$ and about 5000 mm$^2$, between about 5000 mm$^2$ and about 6000 mm$^2$, between about 6000 mm$^2$ and about 7000 mm$^2$, between about 7000 mm$^2$ and about 8000 mm$^2$, between about 8000 mm$^2$ and about 9000 mm$^2$, or between about 9000 mm$^2$ and about 10,000 mm$^2$. In some embodiments, the surface area of the sound enhancing region may cover substantially the entire bottom surface of the encasement. Preferably the sound enhancing region has a surface area less than that of the bottom surface of the case in order to preserve the shockproof and/or shatterproof properties of the bottom surface. For example, the ratio of the surface area of the sound enhancing region relative to the surface area of the back of the case may be between 1:3 and 1:4, between 1:4 and 1:5, between 1:5 and 1:6, between 1:6 and 1:7, between 1:7 and 1:8, between 1:8 and 1:9, between 1:9 and 1:10. In some embodiments, the ratio of the surface area of the sound enhancing region relative to the surface area of the back of the case may be 1 to about 3.75.

In some embodiments, the thinner area of the sound enhancing region may be a membrane (e.g. a semi-rigid plastic polymer or glass) that is adhered to cover a cut-out region of the rear surface of bottom member in a manner to render the cut-out region waterproof. The membrane may be made of the same material as the rear surface of the bottom member, or a different material. The cut-out region may be any shape, such as polygonal or ovoid.

Figure 43A:
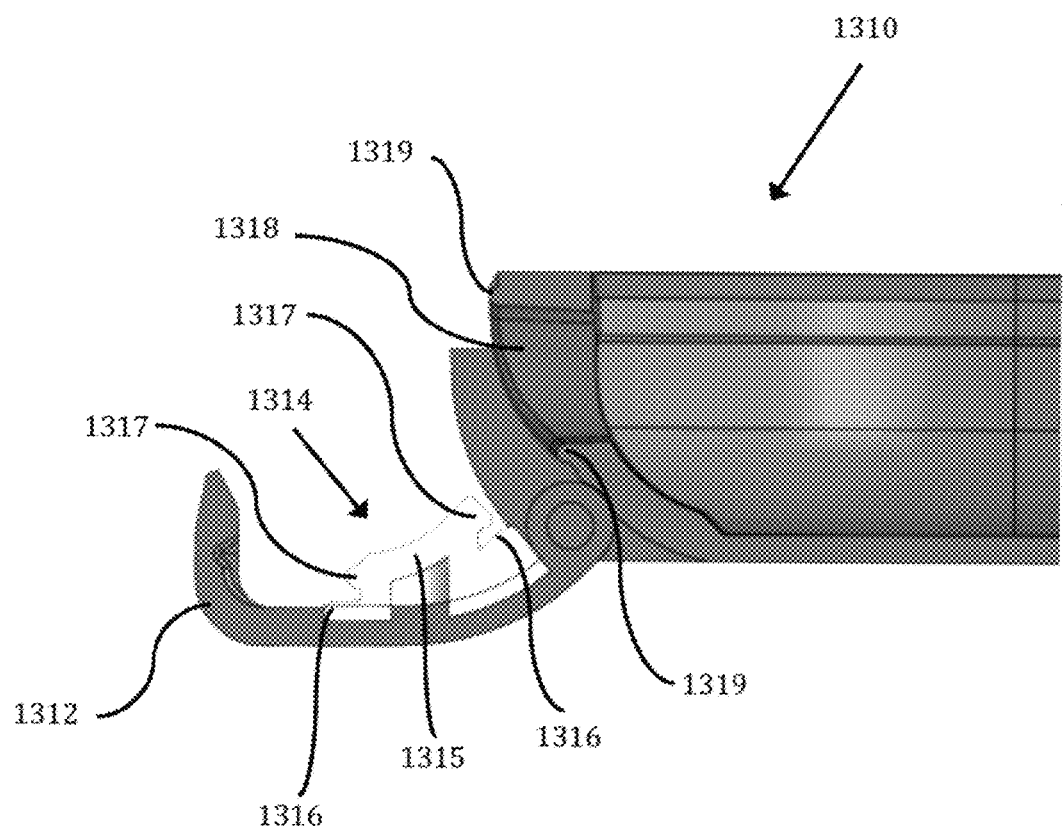
FIG. 43A depicts a side partial cutaway view of a portion of an encasement having a dual seal gasket attached to a charge port door.

A gasket associated with a charge port door and used to seal a charge port of an encasement may be configured to seal both at the face or outer ridge of the charge port and annularly, inside the charge port of the encasement. This provides seals at multiple potential entry points for liquid, preventing entry of liquid if one seal is compromised. FIG. 43A depicts a side partial cutaway view of a portion of an encasement 1310 having a dual seal gasket 1314 attached to a charge port door 1312 in an open configuration, and a charge port 1318. The charge port has a charge port face or ridge 1319 that surrounds the charge port. The dual seal gasket 1314 has an annular plug 1315 configured to enter the charge port, and a face-sealing portion 1316 that surrounds the annular plug 1315. The annular plug 1315 has an annular protrusion 1317 that surrounds the annular plug 1315. In some embodiments, the dual seal gasket 1314 is made of an elastomeric material. The dual seal gasket 1314 may be a contiguous piece, or may be configured as two separate pieces, each of which may be made of a different elastomeric material. In some embodiments, the face-sealing portion, the annular plug, or both may be made of a rigid polymer with an elastic modulus that is lower than that of the charge port face, and deforms slightly when the charge port door is closed, forming a water resistant seal.

Figure 43B:
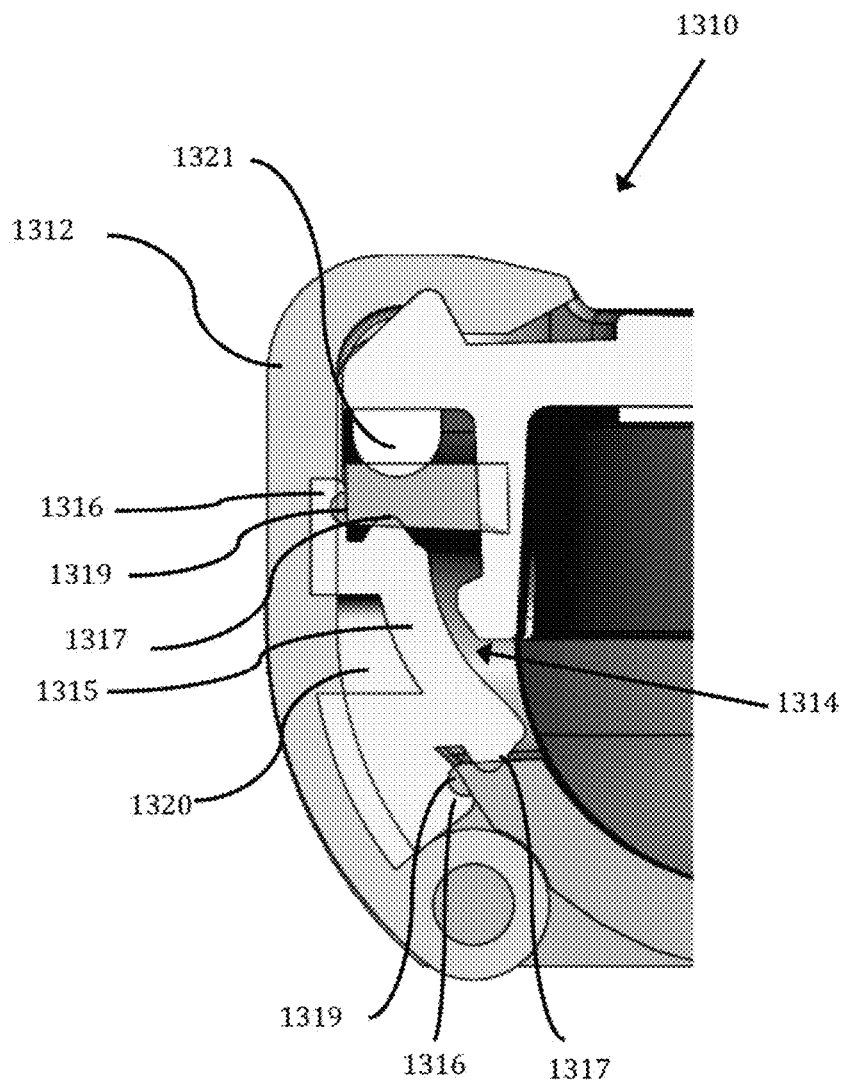
FIG. 43B is a side cutaway view of the encasement of FIG. 43A with the charge port door in a closed configuration.

FIG. 43B is a side cutaway view of the encasement 1310 of FIG. 43A with the charge port door 1312 in a closed configuration. The charge port ridge 1319 presses against the face-sealing portion 1316 of the dual seal gasket 1314, forming a first seal. This seal prevents the entry of water, liquids, dust, etc. into the encasement 1310. The annular plug 1315 of the dual seal gasket 1314 is inside the charge port 1318, with the annular protrusion 1317 pressing against the inner wall of the charge port 1318 to form a second seal. This second seal also prevents the entry of water, liquids, dust, etc. into the encasement. Channel gasket 1321 is also shown which is compressed against the outer edge of the charge port 1318. The charge port door 1312 also includes a gasket post 1320. When using an elastomeric dual sealing gasket, the post 1320 provides stiffness that helps force the annular plug 1315 and the more flexible annular protrusions 1317 into the charge port 1318. In some embodiments including a gasket with a lower elastic modulus, the post 1320 may not be necessary and can be omitted.

Figure 43C:
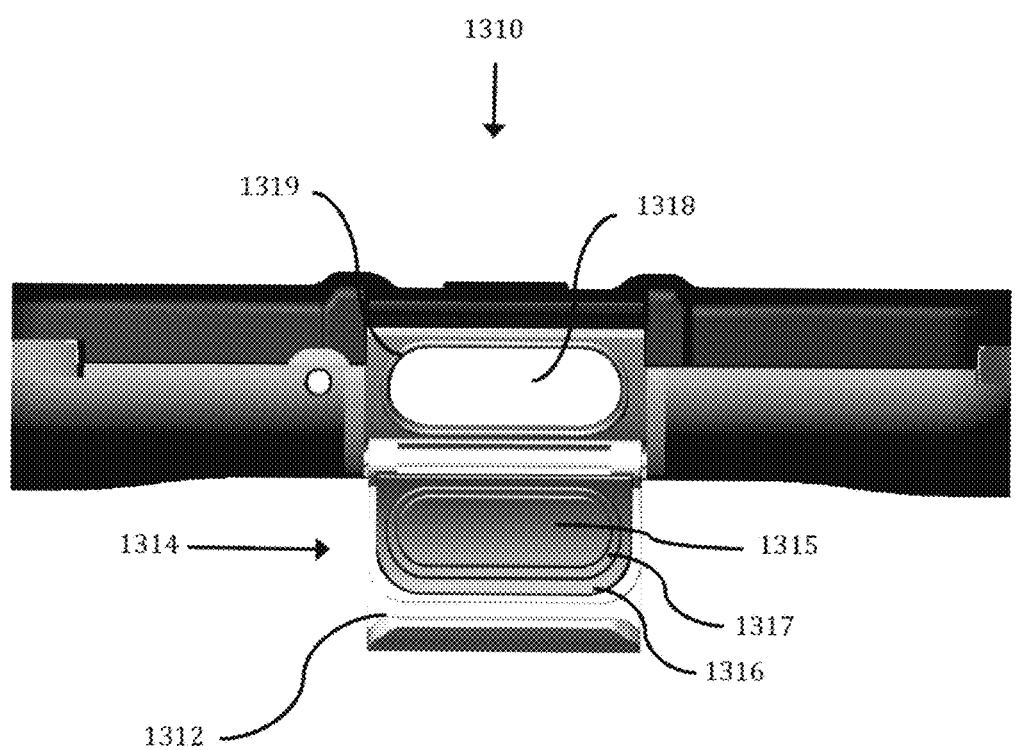
FIG. 43C shows a bottom view of a portion of the charge port and charge port door of the encasement shown in FIGS. 43A-B.

FIG. 43C depicts a bottom view of a portion of the charge port 1318 and charge port door 1312 of the encasement 1310 shown in FIGS. 43A-B, the charge port door being in the open configuration. Dual seal gasket 1314 is attached to charge port door 1312 and includes annular plug 1315, annular protrusion 1317, and face-sealing portion 1316. The face-sealing portion interfaces with the charge port face 1319 of charge port 1318 and the annular protrusion interfaces with the inner surface of the charge port when the charge port door is closed.

Figure 44A:
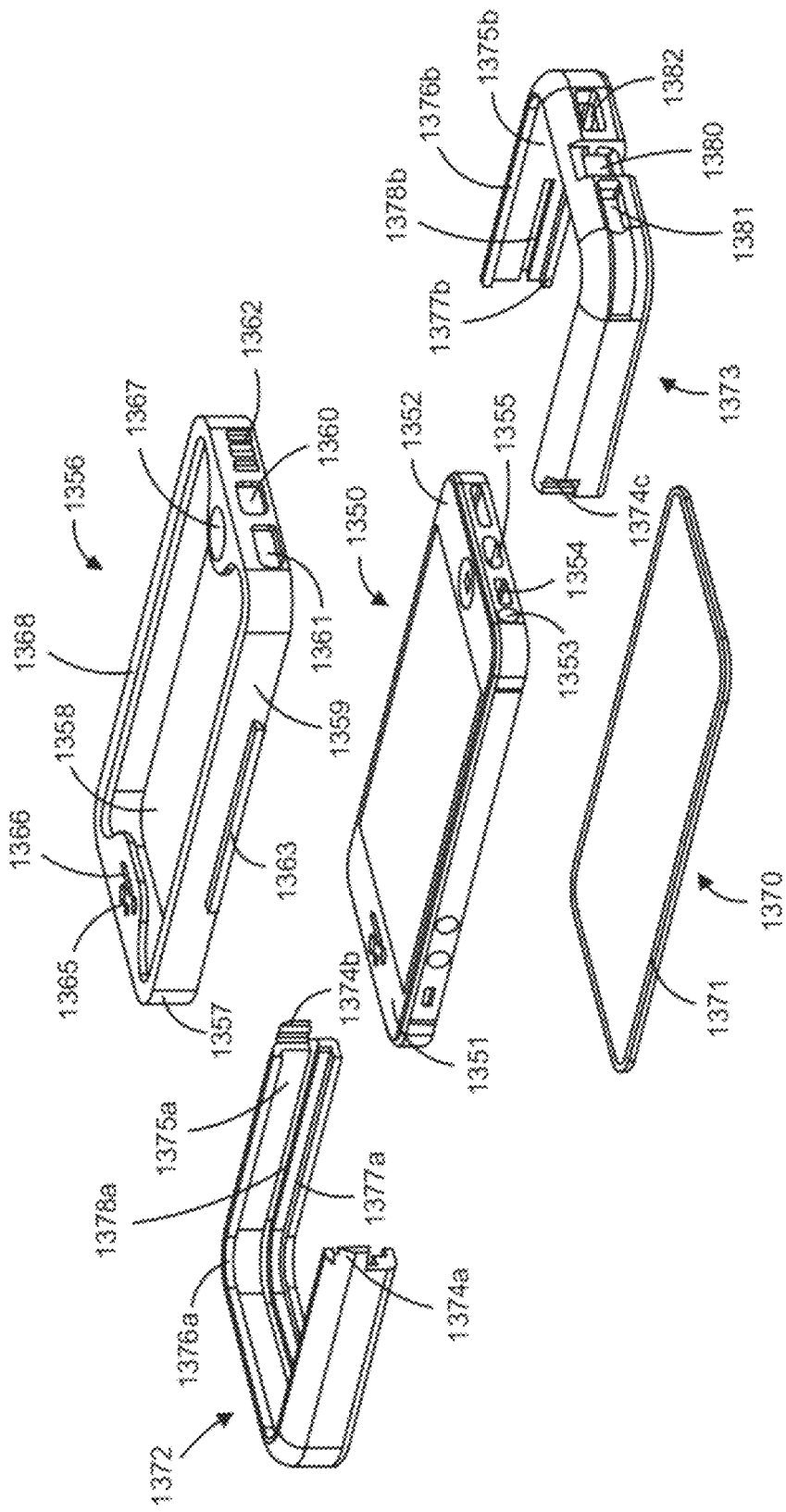
FIG. 44A shows an exploded view of an embodiment of a case having four pieces and a mobile device to be encased. The encasement includes a top member, a bottom member, a proximal slide, and a distal slide.

In certain embodiments of a thin profile case for a mobile computing device, the case includes four pieces that are mated around the mobile computing device to form a housing. FIG. 44A shows an exploded view of an embodiment of a case having four pieces and a mobile device 1350 to be encased, the mobile device having a proximal end 1351 and a distal end 1352. The encasement includes a top member 1356, a bottom member 1370, a proximal slide 1372, and a distal slide 1373. The top member 1356 has a rigid frame 1357 that defines a cavity 1358 configured to hold the mobile computing device. The proximal 1372 and distal 1373 slides include frame channels 1375a and 1375b (respectively), configured to receive the aligned top 1356 and bottom 1370 members. The bottom member 1370 includes a bottom member gasket or seal 1371 around the perimeter of the bottom member 1370. In some embodiments, the bottom member 1370 is constructed from a substantially transparent material and allows the camera and flash of the mobile device 1350 to be used when the device is encased. In some embodiments, only a portion of the bottom member 1370 is transparent and may be coated to make a portion opaque. In some embodiments, the bottom member 1370 includes a camera lens and a flash lens (not shown) bonded, welded, or adhered into aperture in the bottom member, each of which allow the camera and flash to be used while encased. The bottom member 1370 may also include one or more acoustic vents (not shown) for sound transmission.

The case is assembled by inserting the mobile device 1350 into the cavity 1358 of the top member 1356 and then aligning the bottom member 1370 over the cavity opening to enclose the mobile device 1350. The aligned top 1356 and bottom 1370 members are then slid into the frame channels 1375a-b of the proximal 1372 and distal 1373 slides, compressing the top 1356 and bottom 1370 members together to form a waterproof seal. The seal is between the gasket of the bottom member 1370 and the rear of the mobile device, as well as between a perimeter portion of the top member 1356 and the front face of the mobile device.

The proximal 1372 and distal 1373 slides have clasp or latch mechanisms 1374*a-c* (1374*d* not shown) that hold the proximal 1372 and distal 1373 slides together and prevent them from coming apart when dropped. Suitable latches include hooks that mate together, tooth and receptacles, snap and receptacles, and other clasps and latches described herein and known in the art. In some embodiments, the latch mechanism is engaged internal to the proximal and/or distal slides. For example, one of the slides may have an exposed tooth at each of the connective ends of the slide; the teeth are configured such that, when the proximal slide is mated with a distal slide, the tooth enters a receptacle or opening within the connective end of the opposing slide. The teeth can be on the connective ends of one slide and the receptacles on the connective ends of the other slide, or each slide may have a tooth on one connective end and a receptacle on the other connective end of the same slide. A notch or another tooth rests inside the opening and removably mates with the tooth of the proximal slide. The proximal 1372 and distal 1373 slides each include a front pressure rim 1376*a-b* and a rear pressure rim 1377*a-b* configured to exert sufficient pressure between the top 1356 and bottom 1370 members to maintain a waterproof seal. In some embodiments, the front and rear pressure rims are sprung or tensioned in order to apply sufficient force between the top 1356 and bottom 1370 members. In certain embodiments, the distance between the front and rear pressure rims is slightly smaller than the distance between an uncompressed and aligned top 1356 and bottom 1370 members with a gasket interposed between them. Such a configuration allows the top and bottom members to compress the gasket when they are inserted into the frame channel of the proximal and distal slides.

In certain embodiments, the rigid frame also includes one or more sound transmission features, one or more optically transmissive features, and/or one or more button features proximate to the corresponding features on the mobile device. FIG. 44A shows an exemplary optically transmissive feature 1365 and a sound transmission feature 1366 on the proximal end of the top member, as well as a button feature 1367 on the distal end of the top member. The optically transmissive feature 1365, sound transmission feature 1366, and button feature 1367 are included in the inner perimeter portion 1367 of the top member 1356. The features may be created as described herein, supra, and are configured to align with the corresponding features of the mobile device to be encased.

The rigid frame 1357 of the top member 1356 includes a peripheral wall 1359 and an inner perimeter portion 1367. In some embodiments of the rigid frame 1357, the peripheral wall 1359 includes overmolded buttons and/or switches (not shown) configured to interact with the buttons and switches of the encased mobile device 1350. In another embodiment, the peripheral wall 1359 includes apertures or holes configured to allow access to the buttons and/or switches of the encased device via overmolded buttons and/or switches mechanisms included with the proximal 1372 and distal 1373 slides (discussed supra). In some embodiments, the peripheral wall 1359 of the top member 1356 also includes a charge port aperture 1360 that facilitates access to the charge port 1355 of the encased mobile device 1350, a headphone aperture 1361 that allows access to the headphone jack of the encased device 1350, and one or more sound transmission apertures 1360. In certain embodiments, a single aperture allows access to multiple features of the mobile device. For example, headphone aperture 1361 allows access to both the headphone jack 1353 and bottom microphone 1354 of the mobile device depicted in FIG. 44A. In certain embodiments, the one or more sound transmission apertures are covered with water-impermeable material (not shown) that permits transmission of sound into and out of the encasement.

Figure 44B:
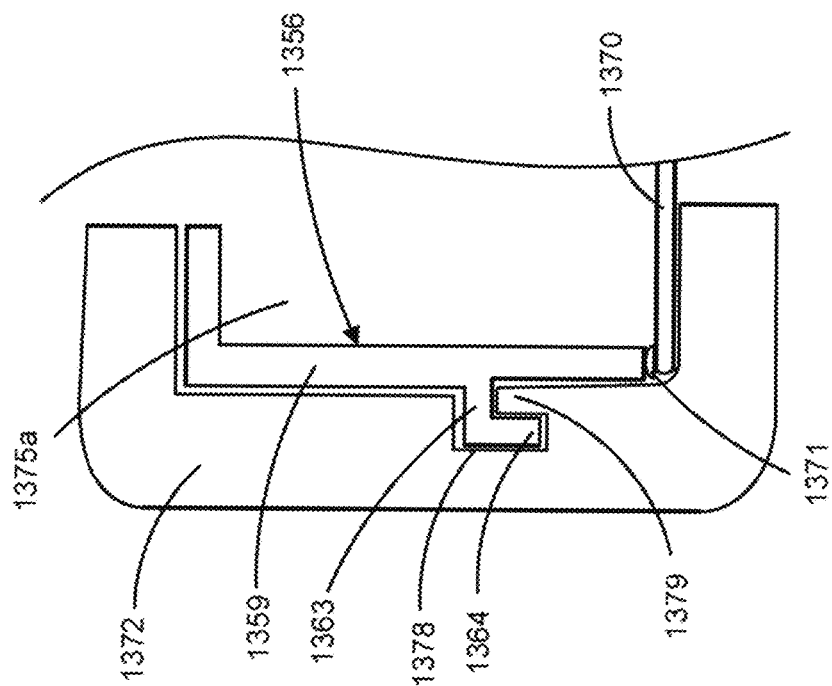
FIG. 44B shows a side cutaway view through one side of a proximal slide mated with an aligned top member and bottom member (not encasing a device) in a frame channel.

The peripheral wall 1359 of the top member 1356 also includes retention rails 1363 that facilitate retention of the proximal 1372 and distal 1373 slides around the assembled top 1356 and bottom 1370 members when the encasement is dropped or receives a sudden concentrated force. The rails 1363 are configured to prevent flexion of the slides and releasing the aligned top 1356 and bottom 1370 members. FIG. 44B shows a side cutaway view through one side of a proximal slide 1372 mated with an aligned top member 1356 and bottom member 1370 (not encasing a device) in the frame channel 1375*a*. The retention rail 1363 has a retention hook 1364 that is approximately parallel with the peripheral wall 1359 of the top member 1356. In certain embodiments, the retention hook 1364 may be angled toward the peripheral wall 1359. The retention rail 1363 is configured to slide into a retention channel 1378. The retention channel 1378 includes a retention channel wall 1379 configured to abut the retention hook 1364 when the retention rail 1363 is inserted into the retention channel 1378. The presence of the retention hook 1364 and the retention channel wall prevents the slide and the top member 1356 from pulling apart from each other and allowing the aligned top 1356 and bottom 1370 members from slipping out of the frame channel.

The proximal 1372 and distal 1373 slides may be overmolded with a flexible or shock absorbing material, such as a flexible or semi-flexible material such as TPE, silicone, polypropylene, or other such rubber material. The proximal 1372 and distal 1373 slides can also include one or more holes or apertures allowing access to overmolded buttons and/or switches on the peripheral wall 1359 of the top member 1356. In certain embodiments, the slides may include buttons and/or switches in the apertures that are sealed with an overmolded flexible material. Such overmolded buttons and/or switches in the slides are configured to interact with buttons and/or switches of the mobile device 1350 through apertures in the top member 1356.

The proximal 1372 and distal 1373 slides can also include sound transmission apertures 1362 that align with sound transmission apertures in the peripheral wall 1359 of the top member 1356 (see FIG. 44A). If the sound transmission apertures of the top member 1356 are sealed against water and liquids by a water-impermeable material, the sound apertures 1362 of the slides may be uncovered. If the sound apertures of the top member 1356 are not sealed against water, then the sound apertures 1362 of the slides may be covered with water-impermeable material (not shown) that permits transmission of sound into and out of the encasement.

Figure 44C:
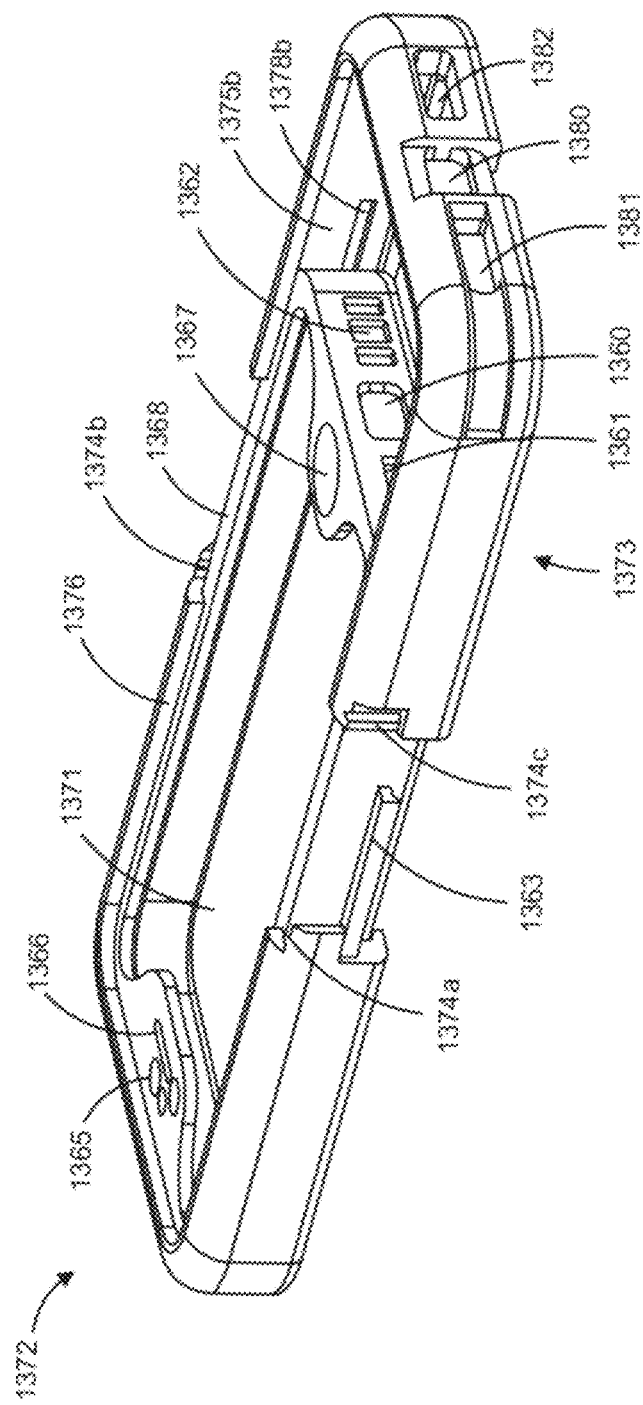
FIG. 44C depicts a perspective view of a partially assembled encasement of FIG. 44A without an encased device.

The slides may also include one or more apertures for a charge port and/or a headphone jack that align with the charge port aperture and/or headphone jack apertures of the top member 1356. The apertures for the charge port and/or headphone jack may be separate apertures (e.g. FIGS. 44A and 44C showing outer charge port aperture 1380, outer headphone aperture 1381, and outer sound transmission aperture 1382) or a single aperture that allows access to both the charge port and headphone jack. The slides also include a door and gasket configured to cover the charge port aperture of both the slide and the top member and provide a waterproof seal. The door may be attached to the slide, for example by a hinge or by a tether. The door may include a gasket that seals the aperture, or a bung made of a flexible or semi-flexible material that enters the aperture to form a seal. The door can seal only the charge port aperture, or both the charge port and headphone apertures. In embodiments wherein the headphone and charge port apertures are separate, a headphone aperture bung may be included (not shown). The bung may be tethered to the slide or attached by a hinge.

In some embodiments, the top member also includes an inner perimeter portion 1368 that overlays the face of an encased mobile device. In some embodiments, the inner perimeter portion 1368 includes a wiper (not shown) that is fabricated from a flexible or semi-rigid material and is adapted to provide a measure of sealing for the interior of the housing. For instance, the wiper is adapted so as to interact with a screen portion of an encased device in such a manner that a close interface is generated. This close interface aids in preventing water from seeping in under the wiper. Additionally, the interior perimeter portion 1368 is adapted such that fluids and/or particulate matter will slide or otherwise flow over the inner perimeter portion of the top member, rather than under the interior perimeter portion. The flexible or semi rigid material may include but is not hereby limited to natural or synthetic rubbers, or a combination thereof, such as natural rubber and/or nitrile, and/or neoprene, and/or silicones, and/or fluorosilicones and/or fluorocarbons, and/or perfluor elastomer and/or polyurethanes, and/or thermoplastic elastomers such as ethylene propylene, and/or thermoplastic vulcanates, and/or thermoplastics such as polypropylene, and/or polyethylene and/or foams such as foamed polyvinyl chloride, and/or foamed nitrile rubber, and/or foamed polyurethane urethane, and the like. The wiper may be made and associated with the rigid frame by any suitable process such as overmoulding, in-mould decorating, vulcanizing, adhesive bonding, thermal bonding, substrate bonding such as an adhesive tape substrate, mechanical bonding such as stretching around, and/or entrapment in a groove and/or other mechanical bonding method and the like. In some embodiments, the inner perimeter portion may be made of the same material as the rigid frame, or a different material.

Figure 44D:
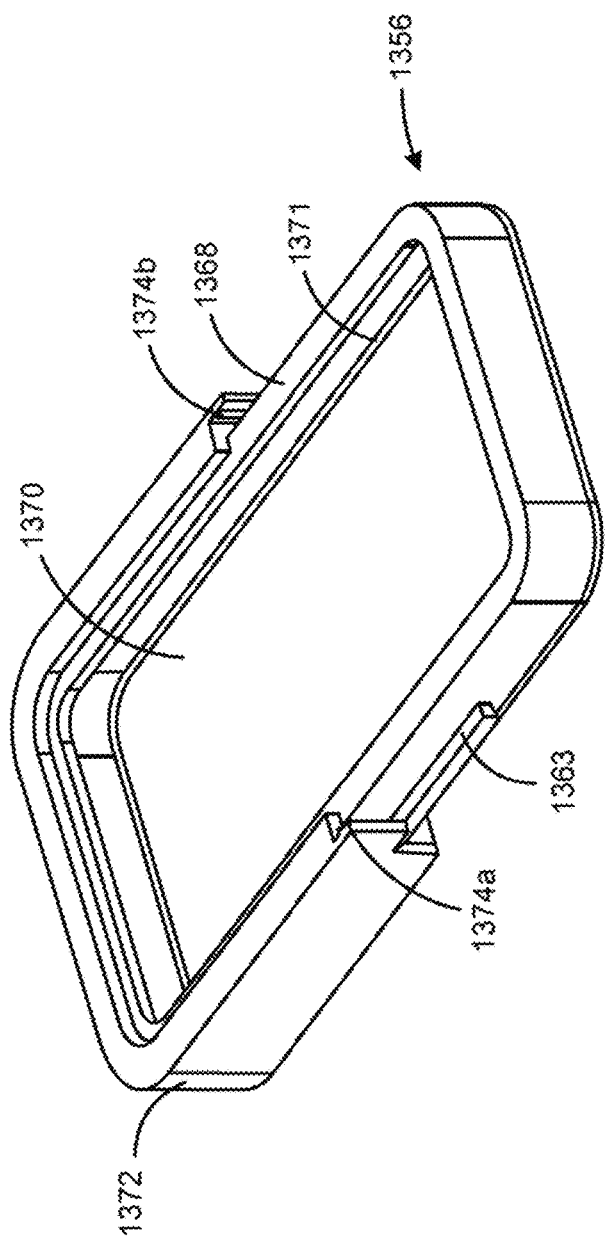
FIG. 44D shows a perspective view of a partially assembled case of FIG. 44A with the presence of the top member, simplified for clarity.
Figure 44E:
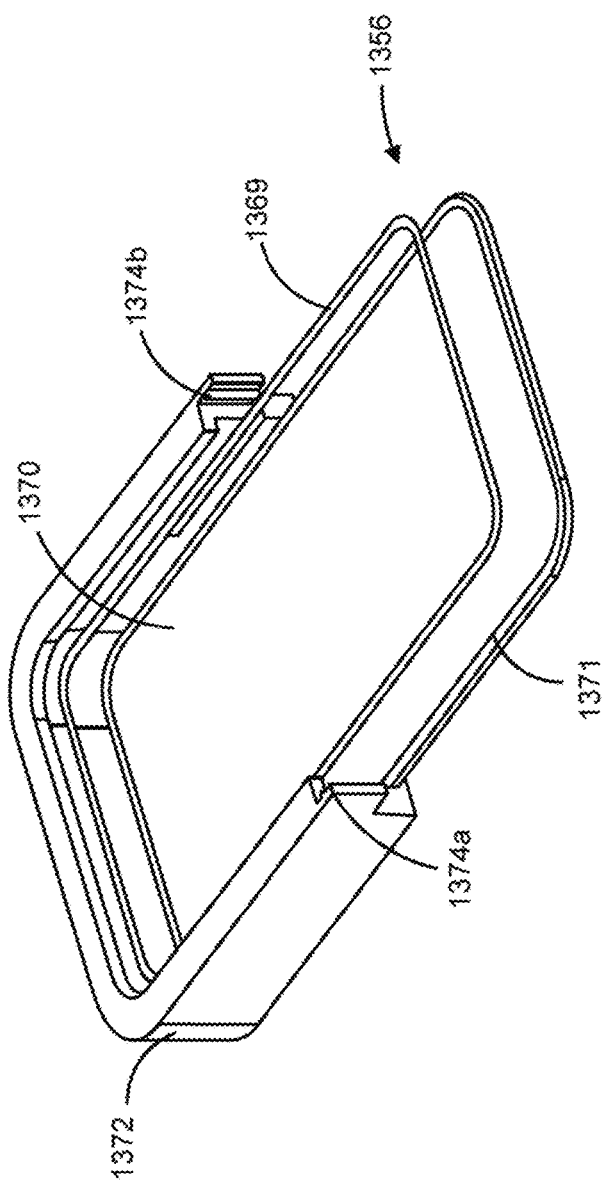
FIG. 44E shows a perspective view of a partially assembled case of FIG. 44A without the presence of the top member, simplified for clarity.

FIG. 44C depicts a partially assembled encasement of FIG. 44A without an encased device. The aligned top and bottom member assembly is inserted into the frame channel (not shown) of the proximal slide 1372, and the aligned assembly is partially inserted into the frame channel 1375*b* of the distal slide 1373. FIGS. 44D and 44E depict a partially assembled case with and without the presence of the top member, respectively. The simplified drawings do not depict apertures, buttons, switches or other features for clarity. FIG. 44D shows an aligned top member 1356 and bottom member 1370 inserted into the frame channel (not shown) of a proximal slide 1372. In some embodiments, the inner perimeter portion 1368 of the top member includes a front perimeter seal or gasket (not shown) that seals against the face of the mobile device when the housing is assembled around the mobile device. FIG. 44E depicts a bottom member 1370 inserted into the frame channel (not shown) of the proximal slide 1372; the front perimeter seal 1371 can be seen in the position it would occupy if the top member were present. The front perimeter seal 1371 may be made of any water-impermeable material (e.g. silicone rubber or elastomeric gel). The front perimeter seal 1371 may be glued, heat welded, bonded or molded into the portion of the inner perimeter portion that faces the front screen of the mobile device.

In some embodiments, the top member includes a transparent membrane that is adhered, molded, welded or otherwise attached to the inner perimeter portion to form a waterproof seal with an inner perimeter portion of the rigid frame.

Figure 45A:
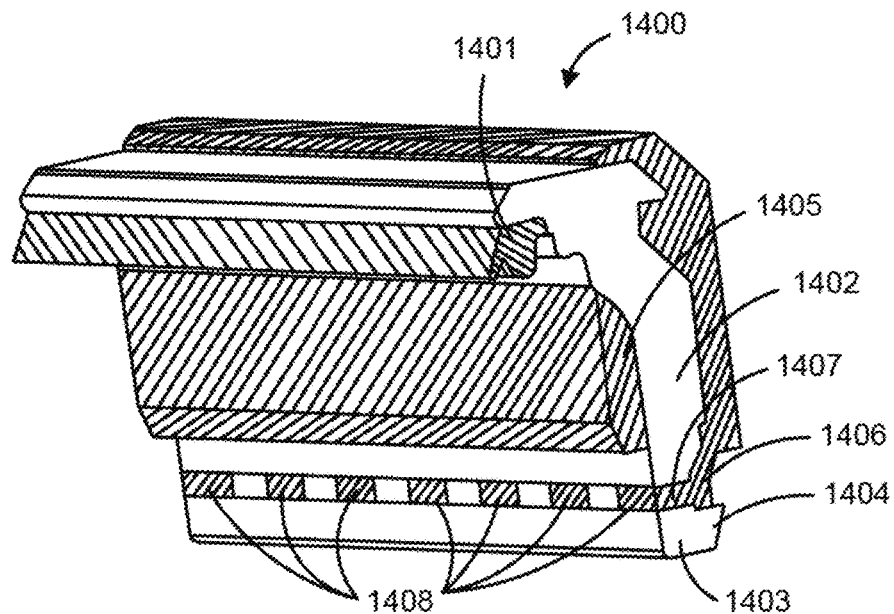
FIG. 45A shows a perspective view of a portion of a top member of an encasement that includes perpendicular channels that span the width of the peripheral wall and are filled with overmolded material from the exterior of the encasement.

In another aspect of the instant technology, a gasket may be formed that is located in the interior of the case and is contiguous with flexible material overmolded to the exterior of the encasement. The overmolded material can act as a gasket on both the interior and exterior surface of the peripheral wall of the top member. FIG. 45A shows a perspective view of a portion of a top member 1400 of an encasement. The top member 1400 includes a wiper portion 1401, a peripheral wall 1402, a bottom ridge 1403 that includes a clasp mechanism 1404, an exterior overmolded gasket 1406, and an interior overmolded gasket 1408. The top member 1400 also includes perpendicular channels 1406 that span the width of the peripheral wall 1402 and are filled with the overmolded material on the exterior of the peripheral wall 1402. An interior overmolded portion 1405 is formed on the interior of the peripheral wall 1402. During the overmoulding process to form the overmolded exterior gasket, the material flows through the perpendicular channels 1407 and forms the overmolded interior gasket. When the bottom ridge 1403 of the top member 1400 is inserted into a channel of the bottom member, the overmolded interior and exterior gaskets form a waterproof seal.

Figure 45B:
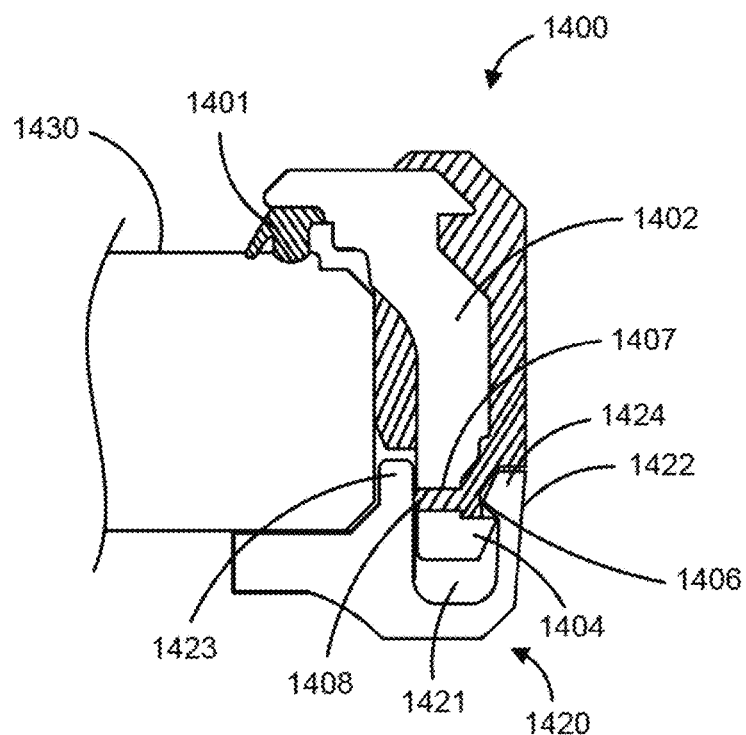
FIG. 45B shows a side cutaway view of a top member depicted in FIG. 45A mated with a bottom member of an encasement enclosing a mobile electronic device.
Figure 45C:
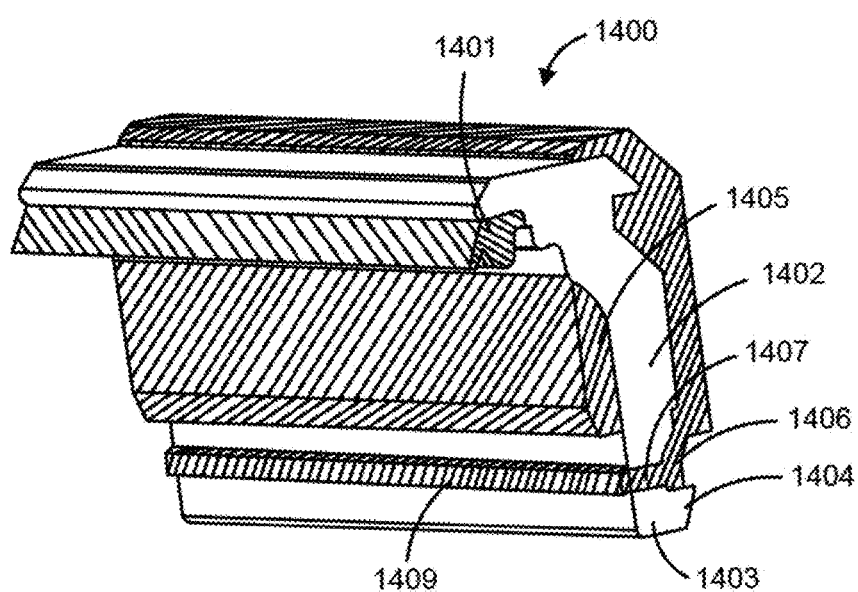
FIG. 45C depicts a perspective cutaway view of another embodiment of the top member shown in FIG. 45A, in which the overmolded flexible material has merged to form a contiguous interior overmolded gasket on the interior surface of the peripheral wall.

FIG. 45B shows a side cutaway view of a top member 1400 depicted in FIG. 45A mated with a bottom member 1420 of an encasement enclosing a mobile electronic device 1430. The plane of the cutaway runs through a perpendicular channel 1406 of the top member 1400. The bottom member 1420 includes a channel 1421 formed between an outer channel wall 1422 and an inner channel wall 1423 into which the bottom ridge 1403 of the top member 1400 is inserted. The bottom ridge has a clasp mechanism 1404 configured to mate with a channel clasp mechanism 1424 on the outer channel wall of the bottom member. In some embodiments, the clasp mechanism of the bottom member is included on the inner channel wall and the clasp mechanism of the bottom ridge is configured to mate with the channel clasp mechanism. The overmolded flexible portion 1406 on the exterior of the peripheral wall 1402 presses against the outer channel wall 1422, creating a waterproof seal. At the same time, the flexible material extends through the perpendicular channel 1407 and emerges past the mouth of the perpendicular channel, such that a second seal is created on the interior surface of the top member ridge. FIG. 45C depicts a perspective cutaway view of an alternative embodiment of the overmolded flexible material configured to form two gaskets. In this embodiment, a sufficient volume of flexible material is overmolded to flow through the peripheral channels (not shown) and merge to form a contiguous interior overmolded gasket 1409 on the interior surface of the peripheral wall 1402.

Figure 46A:
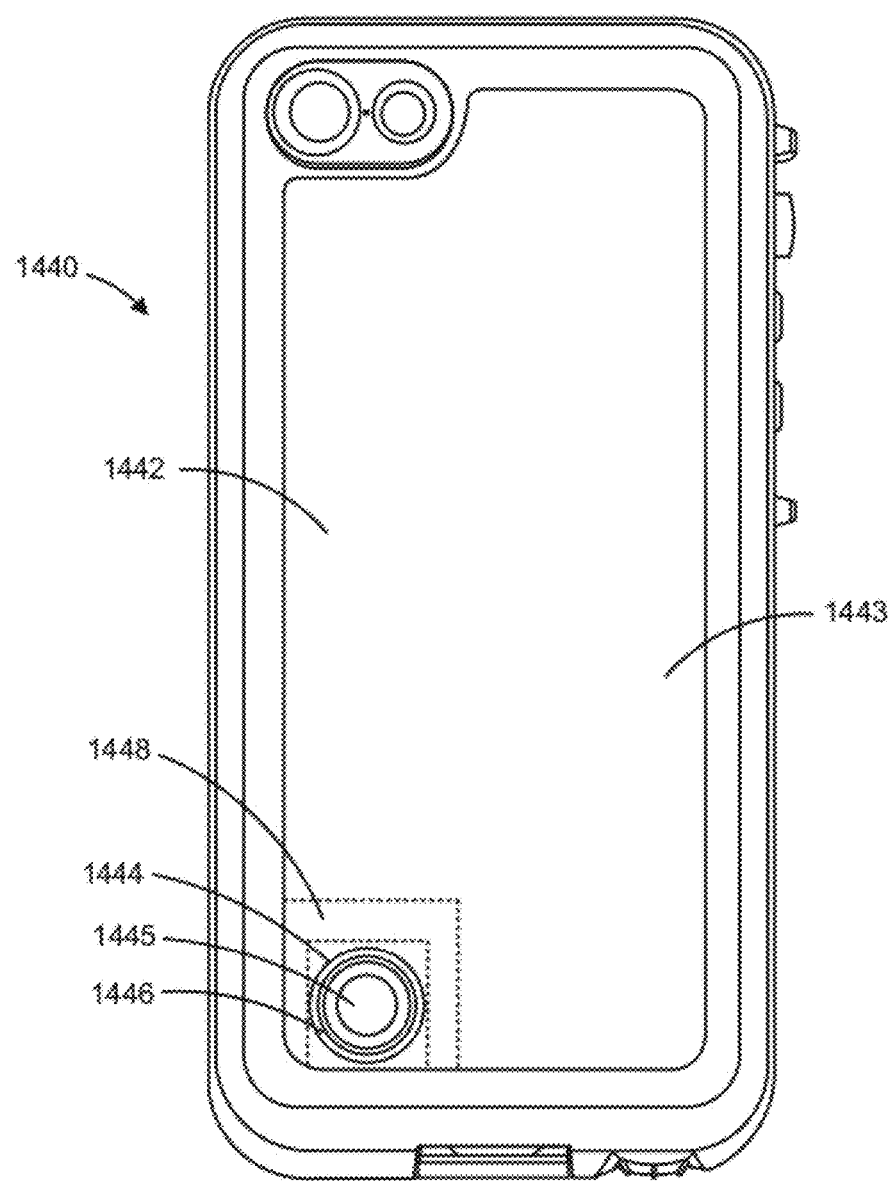
FIG. 46A depicts a rear elevation of an exterior of a housing that includes a passive radiator in the rear exterior surface of a bottom member of the encasement.

The following describes an additional modification of an encasement to increase the volume and quality of sound. In some embodiments of a housing, a portion of the encasement includes a passive radiator in acoustic communication with one or more speakers of the mobile device. FIG. 46A depicts a rear elevation of an exterior of a housing 1440 with a passive radiator 1444 in the rear exterior surface 1443 of a bottom member 1442 of the encasement. The passive radiator includes a diaphragm 1445 and a roll surround 1446 that surrounds the diaphragm 1445 and allows the diaphragm 1445 to move in and out of the plane of the rear surface. The passive radiator can have any shape, such as round, elliptical, or polygonal (e.g. square, hexagonal, etc.). The material of the diaphragm 1445 can be any material that is thin and light, with sufficient stiffness to passively resonate sound from an encased mobile device. Suitable materials for forming the diaphragm 1445 include, without limitation, paper, paper composites and laminates, plastic (e.g. mylar or polypropylene), metal and metal composites (e.g. beryllium, titanium, magnesium, aluminum), ceramics (e.g. diamond or aluminum oxide), fabrics, and silicone rubber. The material can be varied to tune the sound frequencies that are passed through the passive resonator. In some embodiments, a mass can be added to the diaphragm 1445. The weight of the mass may be varied to tune the sound frequencies emitted from the passive resonator. The roll surround 1446 can be made of an elastomeric material, such as foam or rubber. In some embodiments, the roll surround 1446 may be substituted with an accordion surround. Preferably, the roll surround 1446 and diaphragm 1445 are made from materials that are impermeable to water. The passive radiator 1444 may be glued, adhered, welded, or otherwise attached to an aperture cut into the bottom member of the case to form a waterproof seal. In some embodiments, the diaphragm 1445 and surround 1446 of the passive radiator 1444 may be formed by overmoulding material over the aperture, thereby creating a waterproof seal.

Figure 46B:
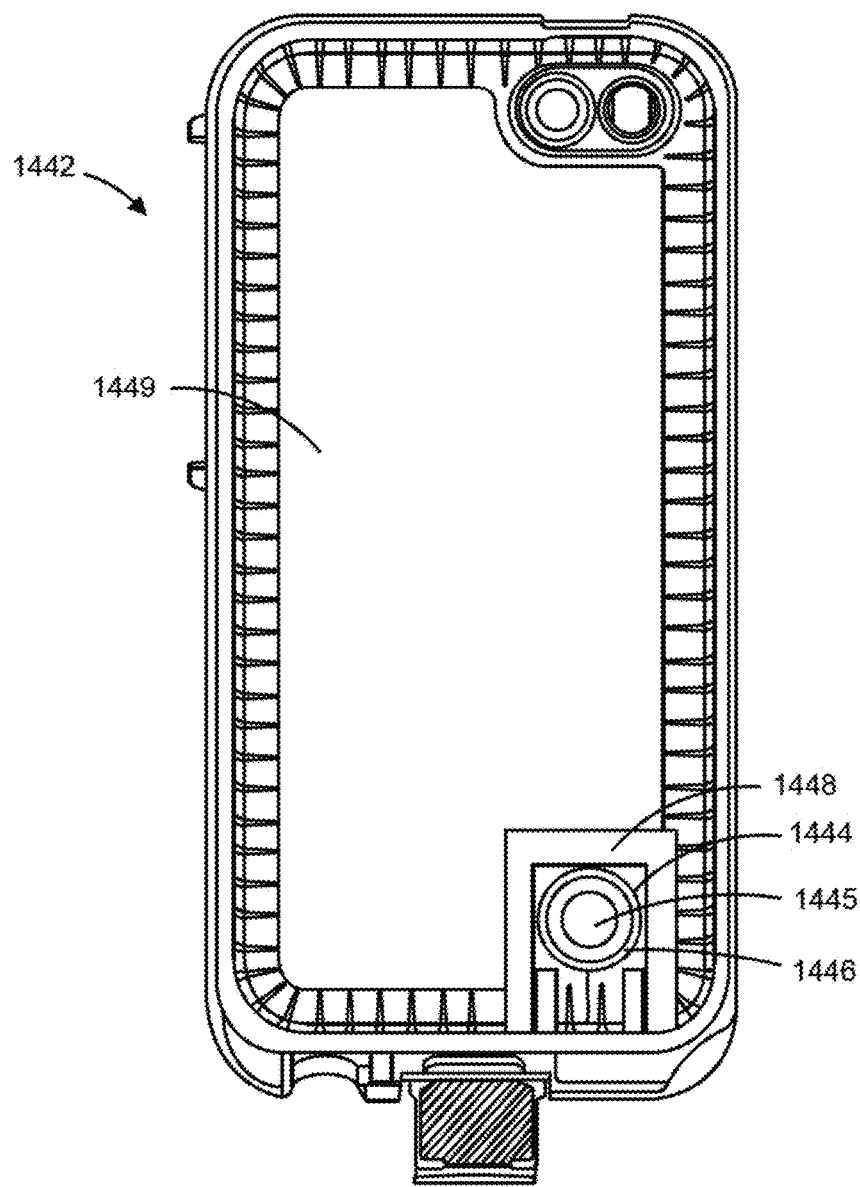
FIG. 46B shows a rear elevation of the interior of the bottom member of the encasement shown in FIG. 46A.

A bottom member sound barrier 1448 on the interior of the bottom member surrounds the passive radiator. FIG. 46B shows a rear elevation of the interior of the bottom member 1442 of the encasement 1440 shown in FIG. 46A. The passive radiator 1444 is surrounded by the bottom member sound barrier 1448. When a mobile device is encased in the housing, the bottom member sound barrier presses against the rear surface of the mobile device (not shown). Sound emerging from the mobile device is channeled towards the passive radiator and prevented from radiating throughout the remainder of the encasement.

Figure 46C:
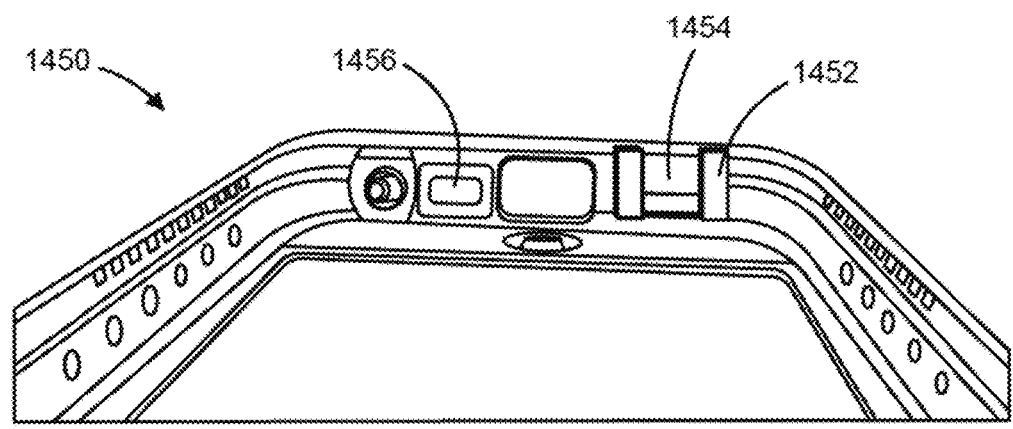
FIG. 46C shows a perspective view of a portion of the distal interior of a top member configured to mate with the bottom member of FIG. 46A.

The top member of the encasement also includes a top member sound barrier, configured to mate with a portion of the bottom member sound barrier when the top and bottom members are joined. For example, FIG. 46C shows a perspective view of the distal interior of a top member 1450. A top member sound barrier 1452 is attached to the top member. The top member sound barrier surrounds a sound enhancement chamber 1454, in the region adjacent to where the speaker of the mobile device is located when encased in the housing. When the top and bottom members are mated to enclose a mobile device, the sound chamber is in air communication with both the passive radiator on the bottom member and one or more speakers of the mobile device. Sound emerging from the speaker of the mobile device is channeled into the sound chamber and towards the passive radiator. The passive radiator then moves in and out of the plane of the rear surface, radiating the sound from the mobile device speaker to the exterior of the encasement.

Figure 46D:
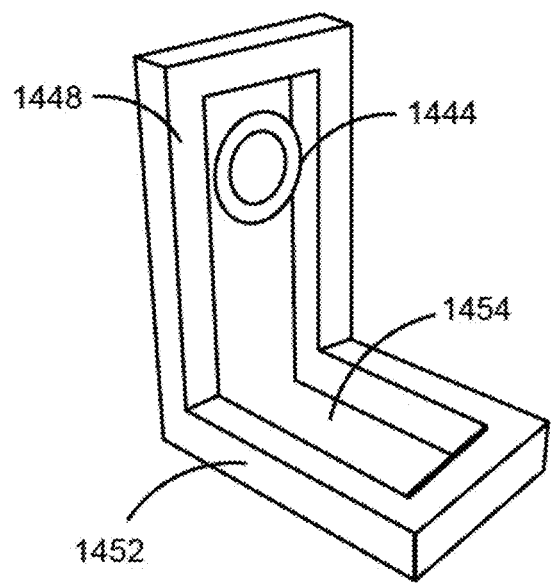
FIG. 46D shows a perspective view of a top member sound barrier, a bottom member sound barrier, and a passive radiator, configured as they would be if the top and bottom members are mated together.

FIG. 46D shows a perspective view of a top member sound barrier 1452, a bottom member sound barrier 1448, and a passive radiator 1444. The sound barriers and passive radiator are configured as they would be if the top and bottom members are mated together. Sound chamber 1454 is positioned proximate the speaker of the mobile device. Sound from the speaker travels through the sound chamber 1454 and agitates the passive radiator 1444 to send sound frequencies to the exterior of the case. In some embodiments, the sound barrier may be made of more than one sound resistant material. Exemplary sound resistant materials include foam, plastic, or rubber.

In some embodiments of passive radiator sound enhancement apparatus, the passive radiator can be located on either the top member or the bottom member. The passive radiator may be in any orientation relative to the plane of the mobile device speaker. In preferred embodiments, the passive radiator is located in close proximity to the speaker of the mobile device. The top member sound barrier and the bottom member sound barrier may be in any configuration that creates an air path between the area proximate the speaker of the mobile device and the passive radiator. In certain embodiments, the passive radiator is covered by a grating or grille that protects the passive radiator from tears and punctures. In some embodiments, the passive radiator lies between gratings on both the interior and exterior of the encasement.

Figure 46E:
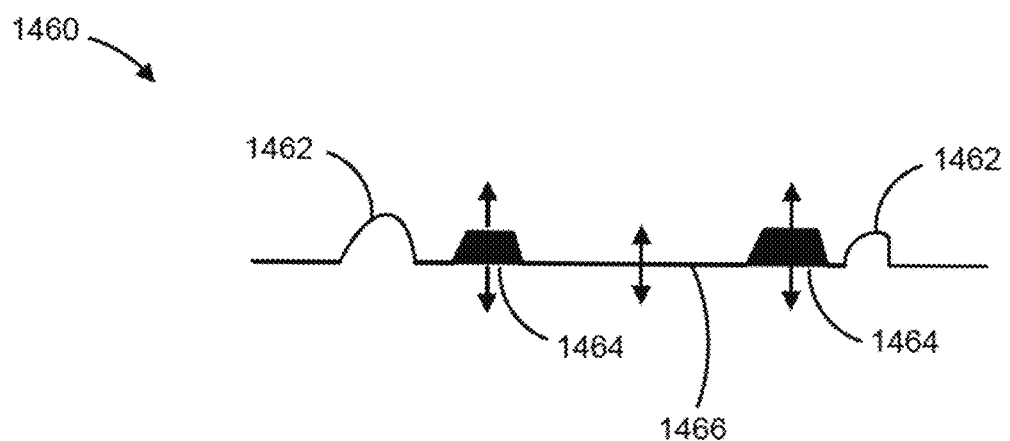
FIG. 46E shows a side cutaway view of a passive radiator that includes a tuning mass associated with a diaphragm and near an outer roll surround.
Figure 46F:
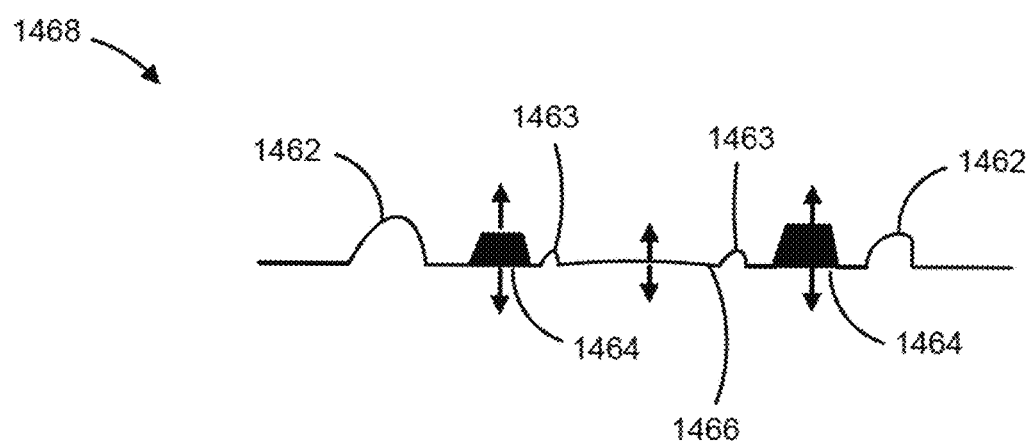
FIG. 46F shows a side cutaway view of another embodiment of a passive radiator that includes a tuning mass, an outer roll surround, an inner roll surround, and a diaphragm.

As described above, the passive radiator of the instant encasement technology may include masses that may be used to tune the sound frequencies that are passed through the passive resonator. For example, FIG. 46E shows a side cutaway view of a passive radiator 1460 that has a tuning mass 1464 associated with the diaphragm 1466 and near the outer roll surround 1462. The tuning mass 1464 may be made of the same material as the diaphragm 1466 and molded contiguous with the diaphragm 1466, or it may be adhered or bonded to the diaphragm 1466. In some embodiments, the tuning mass 1464 may be made of a material different from that of the diaphragm 1466. The tuning mass 1464 facilitates increasing lower frequencies of sound, depending on the weight of the mass 1464. In certain embodiments, the passive radiator 1460 may include an additional roll surround to facilitate tuning the radiator to emphasize and/or de-emphasize specific frequencies. FIG. 46F shows a side cutaway view of another embodiment of a passive radiator 1468. The tuning mass lies in between the outer roll surround 1462 and an inner roll surround 1463. The diaphragm 1466 is separated from the tuning mass by the inner roll surround.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limitations of the range are inclusive of all of the intermediary units therein.

The foregoing description is intended to illustrate but not to limit the scope of the disclosure, which is defined by the scope of the appended claims. Other embodiments are within the scope of the following claims.

What is claimed is:

1. A protective case for an electronic device, the electronic device having a front surface and a display on the front surface, the protective case comprising:
 a bottom member including a back wall and side walls that define a cavity, the cavity sized for receiving at least a portion of the electronic device, the bottom member further including a tapered channel on an interior surface of one or more of the side walls;
 a top member including one or more clasping members positioned around a perimeter of the top member, the one or more clasping members extending from the top member to engage the tapered channel on the interior surface of the one or more side walls of the bottom member to removably attach the top member to the bottom member to at least partially enclose the electronic device when the electronic device is installed in the protective case, the top member having an opening that frames the display of the installed electronic device when the top member is removably attached to the bottom member;
 a first gasket proximate the perimeter of the top member, wherein the first gasket forms a first water resistant seal between the top member and top edges of the side walls of the bottom member when the top member is removably attached to the bottom member with the one or more clasping members; and
 a second gasket proximate the opening of the top member, wherein the second gasket forms a second water resistant seal between the top member and the front surface of the electronic device proximate the display when the electronic device is installed in the protective case and the top member is removably attached to the bottom member.

2. The protective case of claim 1 further comprising a transparent screen protector that extends over at least a portion of the display of the installed electronic device.

3. The protective case of claim 2 wherein the transparent screen protector includes holes through which the one or more clasping members extend when the top member is removably attached to the bottom member.

4. The protective case of claim 1 wherein at least one of the first gasket and the second gasket is an O-ring.

5. The protective case of claim 1 wherein at least one of the first gasket and the second gasket comprise a releasable adhesive material.

6. The protective case of claim 1 further comprising a compressible dampening member disposed in the bottom member to cushion the installed electronic device.

7. The protective case of claim 6 further comprising a second compressible dampening member.

8. The protective case of claim 1 wherein the one or more clasping members comprise hooks that engage the tapered channel to removably attach the top member to the bottom member.

9. The protective case of claim 1 wherein the first gasket and the second gasket are positioned on opposite sides of each of the one or more clasping members.

10. A protective case for an electronic device, the electronic device having a front surface with a display on the front surface, the protective case comprising:
 a bottom member having a back wall and side walls for receiving at least a portion of the electronic device, the side walls including a channel extending around respective interior surfaces of the side walls;
 a top member including a plurality of clasping members on a perimeter of the top member, the clasping members extending from the top member to engage the channel of the bottom member to removably attach the top member to the bottom member to at least partially enclose the electronic device, the top member having an aperture that provides direct touch access to the display of the electronic device when the electronic device is installed in the protective case and when the top member is removably attached to the bottom member;
 a first gasket extending around outside edges of the clasping members, the first gasket configured to form a first seal between the top member and the side walls of the bottom member when the top member is removably attached to the bottom member with the clasping members; and
 a second gasket extending around inside edges of the clasping members, the second gasket configured to form a second seal between the top member and the front surface of the electronic device proximate the display when the electronic device is installed in the protective case and the top member is removably attached to the bottom member.

11. The protective case of claim 10 wherein at least one of the first gasket and the second gasket is an O-ring.

12. The protective case of claim 10 wherein at least one of the first gasket and the second gasket includes a releasable adhesive material.

13. The protective case of claim 10 wherein the channel has two or more sections distributed among the side walls.

14. The protective case of claim 10 wherein the channel is a tapered channel.

15. The protective case of claim 10 further comprising a compressible dampening member disposed in the bottom member to cushion the installed electronic device.

16. The protective case of claim 15 wherein the dampening member includes multiple pieces.

17. A protective cover for an electronic device, the electronic device having a display on a front surface of the electronic device, the protective cover comprising:
 a first member having a back wall and side walls for receiving at least a portion of the electronic device, the side walls defining a perimeter of the first member, the first member including a first set of clasping features along the side walls;

a second member including a second set of clasping features around a perimeter of the second member, the second set of clasping features positioned to engage the first set of clasping features of the first member to removably join the second member to the first member to at least partially enclose the electronic device, the second member having an opening that frames the display of the electronic device and permits direct touch access to the display when the electronic device is inside the protective cover, wherein one of the first and the second set of clasping features includes a channel extending around interior surfaces of the side walls and another of the first and the second set of clasping features includes a hook that engages the channel; and a set of gaskets, a first gasket of the set of gaskets proximate the perimeter of the second member to form a first water resistant seal between the first member and the second member when the first set of clasping features engages the second set of clasping features to removably join the first member and the second member, a second gasket of the set of gaskets to form a second water resistant seal between the second member and the front surface of the installed electronic device proximate the display when the first member is removably joined to the second member.

18. The protective cover of claim 17 wherein at least one of the first gasket and the second gasket of the pair of gaskets is an O-ring.

* * * * *